US010839719B2

(12) United States Patent
Rankine

(10) Patent No.: US 10,839,719 B2
(45) Date of Patent: Nov. 17, 2020

(54) BEAD-ON-TILE APPARATUS AND METHODS

(71) Applicant: Anthony John Rankine, Hickory, NC (US)

(72) Inventor: Anthony John Rankine, Hickory, NC (US)

( * ) Notice: Subject to any disclaimer, the term of this patent is extended or adjusted under 35 U.S.C. 154(b) by 232 days.

(21) Appl. No.: 15/906,374

(22) Filed: Feb. 27, 2018

(65) Prior Publication Data

US 2019/0266919 A1 Aug. 29, 2019

(51) Int. Cl.

| | |
|---|---|
| ***G09B 23/02*** | (2006.01) |
| ***G09B 23/04*** | (2006.01) |
| ***G09B 19/02*** | (2006.01) |
| ***G09B 1/04*** | (2006.01) |

(52) U.S. Cl.

CPC ............... *G09B 23/04* (2013.01); *G09B 1/04* (2013.01); *G09B 19/02* (2013.01)

(58) Field of Classification Search

CPC ...................................................... G09B 23/02

USPC ....... 434/188, 191, 193, 195, 196, 200, 205, 434/209

See application file for complete search history.

(56) References Cited

U.S. PATENT DOCUMENTS

| | | | | | |
|---|---|---|---|---|---|
| 2,304,893 | A * | 12/1942 | Dickson | G09B 19/02 | 434/200 |
| 3,235,975 | A * | 2/1966 | Pierson | G09B 23/04 | 434/189 |
| 3,596,377 | A * | 8/1971 | Abbey | G09B 1/06 | 434/236 |
| 3,837,096 | A * | 9/1974 | Sterling | G09B 19/02 | 434/200 |
| 4,334,869 | A | 6/1982 | Wilcox et al. | | |
| 5,039,603 | A * | 8/1991 | Pocius | G09B 19/02 | 434/188 |
| 5,167,505 | A * | 12/1992 | Walsh | G09B 1/16 | 434/200 |
| 5,520,541 | A * | 5/1996 | Shedeur | G09B 5/02 | 273/272 |
| 7,052,279 | B1 * | 5/2006 | Losq | G09B 19/02 | 434/188 |
| 7,104,799 | B1 * | 9/2006 | Sansing | G09B 19/02 | 434/188 |

(Continued)

FOREIGN PATENT DOCUMENTS

| | | |
|---|---|---|
| CN | 204740770 U | 11/2015 |
| FR | 2892946 A1 | 5/2007 |
| GB | 2311404 A | 9/1997 |

OTHER PUBLICATIONS

International Searching Authority (EP/ISA), International Search Report and Written Opinion of the International Searching Authority, dated May 24, 2019 (May 24, 2019), 12 pages, European Patent Office, Rijswijk, Netherlands (NL).

*Primary Examiner* — Kurt Fernstrom

(74) *Attorney, Agent, or Firm* — Christopher C. Dremann, P.C.; Christopher C. Dremann

(57) ABSTRACT

Apparatus and methods based on applied cognitive science, where children play the lead role in storylines staged upon a rule-enforcing apparatus and by so doing, become self-enlightened about denumerability, rank-wise denumerability, addition, subtraction, multiplication, division, and other change-of-state processes encountered in mathematics and the quantifiable sciences.

19 Claims, 117 Drawing Sheets

(56) References Cited

U.S. PATENT DOCUMENTS

| | | | | |
|---|---|---|---|---|
| 7,549,865 | B2 * | 6/2009 | Avery | G09B 19/02 434/191 |
| 8,021,159 | B1 * | 9/2011 | Siegel | G09B 19/02 434/203 |
| 8,529,266 | B1 | 9/2013 | Akin et al. | |
| 2014/0329209 | A1 * | 11/2014 | Kelly | G09B 23/02 434/188 |

* cited by examiner

Prior Art – Ayala Yupana, Rotated 90° CCW

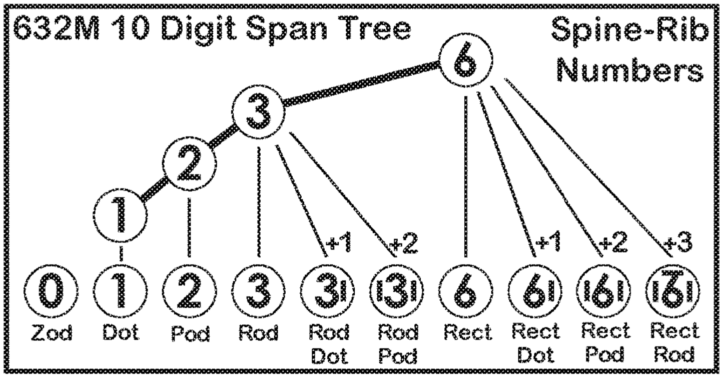
FIG. 12A
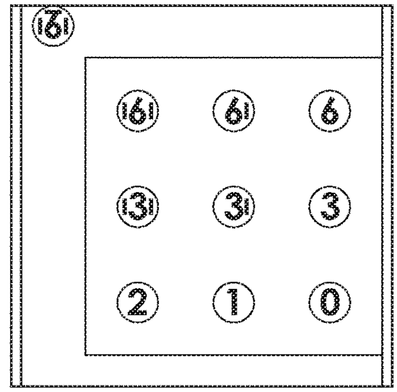
FIG. 12B
Multiplication Speed Factor — 632M Process relative to Traditional
| Multiplier Size (Digits) \ Multiplicand Size (Digits) | 2 | 3 | 4 | 5 | 6 | 7 | 8 | 9 | 10 |
|---|---|---|---|---|---|---|---|---|---|
| 2 | 0.72 | 0.74 | 0.75 | 0.75 | 0.76 | 0.76 | 0.76 | 0.76 | 0.76 |
| 3 | | 0.94 | 0.95 | 0.95 | 0.96 | 0.96 | 0.96 | 0.96 | 0.96 |
| 4 | | | 1.10 | 1.10 | 1.10 | 1.10 | 1.10 | 1.10 | 1.10 |
| 5 | | | | 1.22 | 1.21 | 1.21 | 1.20 | 1.20 | 1.20 |
| 6 | | | | | 1.33 | 1.31 | 1.30 | 1.29 | 1.29 |
| 7 | | | | | | 1.42 | 1.40 | 1.38 | 1.37 |
| 8 | | | | | | | 1.49 | 1.47 | 1.45 |
| 9 | | | | | | | | 1.56 | 1.53 |
| 10 | | | | | | | | | 1.62 |
FIG. 13A
Division Speed Factor — 632M Process relative to Traditional
| Divisor Size (Digits) \ Dividend Size (Digits) | 2 | 3 | 4 | 5 | 6 | 7 | 8 | 9 | 10 |
|---|---|---|---|---|---|---|---|---|---|
| 2 | 0.98 | 1.30 | 1.46 | 1.55 | 1.62 | 1.66 | 1.70 | 1.72 | 1.74 |
| 3 | | 1.17 | 1.46 | 1.59 | 1.66 | 1.71 | 1.74 | 1.77 | 1.79 |
| 4 | | | 1.30 | 1.55 | 1.66 | 1.72 | 1.76 | 1.79 | 1.80 |
| 5 | | | | 1.39 | 1.62 | 1.71 | 1.76 | 1.79 | 1.81 |
| 6 | | | | | 1.46 | 1.66 | 1.74 | 1.79 | 1.81 |
| 7 | | | | | | 1.51 | 1.70 | 1.77 | 1.80 |
| 8 | | | | | | | 1.55 | 1.72 | 1.79 |
| 9 | | | | | | | | 1.59 | 1.74 |
| 10 | | | | | | | | | 1.62 |
FIG. 13B Bead-on-Tile Apparatus and Methods.
Anthony John Rankine

BEAD-ON-TILE APPARATUS AND METHODS

CROSS-REFERENCE TO RELATED APPLICATIONS

Not applicable.

BACKGROUND OF THE INVENTION

The field of the invention relates to apparatus and methods designed to provide children grounding, insights, and self-directed instruction in mathematics and the quantifiable sciences.

Founded upon insights about childhood brain development, cognitive science has validated the golden rule of didactics: Without relatability, learning is imposition not acquisition.

Knowing when you are getting shafted, meaning subtracted, is a survival trait many animals share. Borne of evolution, subtraction is more primitive than language. Even birds relate to numbers. Experiments have established that birds know the difference between 1 seed, 2 seeds, 3 seeds, a seed cluster, i.e. 4 to 7 seeds as a single cognitive cluster, and oodles of seeds, being 8 seeds and above. Avian-brain denumerability partitions the world into six numeric states: 0, 1, 2, 3, cluster, oodles. Termed subitization, this perception-by-sight is innate.

When an experimenter subtracts seeds one by one, ultimately causing one subitized state to become a lesser subitized state, only then does the bird react harshly. The screech of "You subtracted me!" is a risk-aversion survival response in many animals, most especially humans aged two and above. Counterpoised against subtractive shrieking, addition triggered cheers and smiles, long before man uttered words.

Denumerability and change-of-state denumerability is cognitively more fundamental than language. However, in the twenty-first century, the vast majority of children turn up for their first day of schooling talented in spoken language but wolf-children in mathematics. Academics claim such lycanthropic deficits are due to "lack of formal learning." A cognitive scientist parses that blithe excuse to "lack of formal imposition."

Surveying the historic record, literature, prior art and patent records reveals a lack of understanding about how to unleash the natural mathematician that resides in every toddler old enough to know subtraction equals scowls and addition equals smiles. The natural cognitive order is numbers, language, and lastly writing. Around 4,000 B.C., the so-called civilized-man order imposed language, writing, and lastly numbers.

Thence began a parade of prior art normalizing the inversion of the natural cognitive order. And, ever since, the prior art fixation with scribe method how-to's continues to squander every child's pre-school years.

Consider the Chinese abacus, a 2×5 bead-state device where rank-wise denumerability is embodied via columns of rods. The abacus is designed to provide scribes the means to perform intermediate calculations, which are subsequently recorded on paper. Every abacus practitioner requires a precursory understanding of arithmetic based on scribe methods as well as fluency with multiplication tables. Furthermore, the abacus provides no auto-correlation between a bead-state and a written numeric symbol. The abacus and its derivatives are not teaching devices, and cannot be divorced from the need for a child to hold a pencil between their fingers, make reasoned bead moves based on mental models, and assign a written numeric symbol to a given bead-state.

Consider the erstwhile, Incan abacus, the Yupana. Along the Chilean coast in 1867, archeologists unearthed several artifacts used by the ancient Incas. To the modem eye, they appear as platters on which party snacks and dipping sauce, such as guacamole, might be served. Without any reference to any manuscript, archeologists speculate the artifacts were counting tables, and so gave them the designation, Yupana.

Decades later, rediscovered in the archives of the Royal Danish Library in 1908, inside a solitary, hand-written manuscript dating to 1615 titled "El Primera Nueva Coronica y Buen Gobiemo" by its author, Felipe Guaman Poma de Ayala, is an illustration of an Incan holding a quipu full stretch between his two arms. Beside his right leg, is a free-hand sketch of what twentieth century historians call the Ayala Yupana. Ayala's hand sketch is reproduced in FIG. 1A, rotated 90° counterclockwise. No other sketch like it exists. Nor has any embodiment ever been unearthed. Nor does anyone know what tokens were used on the Ayala Yupana or any Yupana, for that matter. Some speculate a solitary type of token, others speculate multiple types based on a one line observation from Father Juan de Velasco apparently about archeological Yupanas.

Despite the fact that the Ayala Yupana is designed for a radix-12 number system, several western-centric radix-10 numerical models have force-fit potential ways the Ayala Yupana could be used as a planar, single register, radix-10 abacus, comparable to the Chinese abacus, but without rods, in 2001, Nicolino de Pasquale proposed a radix-40 model. Academics love to pontificate about ancient peoples. As for children, academics don't invent.

Prior-art inventions fall into three paradigm classes: metrical, abacus and typographic.

Reasoning is defined as scientific if it satisfies three tenets/legs: (i) phenomena are observable, (ii) an observable is measurable, and (iii) all measurements are repeatable. The metrical paradigm focuses on the second leg of scientific truth-seeking, measurement. Using radix-10 scaled embodiments of length, area, volume or mass, metric-focused prior art aims to associate numerical quantities with size, spread, extents or weight.

The metrical paradigm fails as a means of teaching arithmetic because arithmetic is about denumerability, not how to measure things and assign a metric to an observable. For example, two big apples plus two small apples equals four apples. Four is the bird-brain observation expressing denumerability. Big and small express tnetricity. Not merely is metricity irrelevant, worse, it stiff-arms the indispensable concept at the heart of what denumerability is and means. It is imperative children come to grips with denumerability before discovering how numerics has a metrical application, such as how one big apple metrically equates to two small apples. Nor does the metrical paradigm analogize the way typographic numbers are represented in ranks of increasing order of magnitude, right to left in Western conventions.

The principal insight the metrical paradigm provides is: Eschew metrics and return to the observable, the first leg of scientific reasoning.

Prior art harnessing the abacus paradigm mimics the observable tenet of scientific reasoning. In rank-wise order in columns of rods on which beads are fixed, a single multi-digit number can be represented in rod and bead-placement form. However, the state of bead position on a given rod provides no correlation to typographic representation. Furthermore, no prior art has liberated the abacus from its confines as a single register device, where the practitioner must deploy arithmetic skills to perform binary operations, the most taxing being division. Despite every inventive gimmick to minimize teacher intervention, the abacus remains structurally and functionally incapable of being a teaching device for children.

Prior art using the typographic paradigm falls into two representation classes that often overlap, (a) dot-count embodiments, and (b) numeric symbol embodiments. Both classes comprise components inscribed with symbolic representations. Most embodiments use placing and stacking of various typographic pieces into a grid-like order on a board/pegboard. Wedded to the 4,000 B.C. civilized-man imposed constraints of language, writing, and lastly numbers, the typographic paradigm mimics the scribe approach, albeit compensating for the inability of young children to write. As such, the typographic instruction process and rules of arithmetic operations are no different than in a formal class at school. Essentially, young children are expected to decode the ancient rules of the scribes and learn arithmetic like any studious eight-year-old with the cognitive abilities of an eight-year-old.

All prior art evidences a refusal to embrace the challenge and the promise that subitization provides, and do something inventive.

SUMMARY DESCRIPTION

Children are innately pre-equipped to auto-acquire the principles behind mathematics and other quantifiable sciences, as long as the invention taps into their subitization arsenal. The unswerving focus of the present invention is to relate to children and their creature capabilities. The apparatus, on which children play and learn, must reinforce correctness and minimize the potential for goof-ups and self-doubt. Life lessons, such as adding up a shopping receipt, must be relatable to children, preferably through game-play storylines, and preferably using enticements like candy to heighten engagement.

Despite the invention's broad scope of application to all quantifiable science, radix-10 mathematics will be the focus of disclosure because radix-10 mathematics is the first quantitative science children experience, making it a perfect acid test for any quantitative science teaching apparatus. At the end of the description of the drawings is a lexicon that provides more exacting definitions of the various components that make up the invention and how it finds ready adaptation and application to all quantifiable sciences.

The apparatus uses a bead-on-tile approach for modeling because such an approach deftly harnesses subitization and provides the means to extend its power in a novel way, namely super-subitization.

Subitization is about the power of three. Every animal is equipped to make three field of view distinctions, namely right, center and left. In humans, there is ground level, eye level and overhead. Nine zones of mental alertness makes radix-10 numeric states a natural fit for human super-subitized perception.

Called a Digit-Square (27), and depicted in FIGS. 2A through 2C in plan and section views, the preferred tile for radix-10 numeric state representations is a compact, super-subitized, square tile. Sculpted into the tile's overall design is a subitize-informed bead site layout that breathes life into the super-subitization perceptiveness human brains are capable of, FIG. 12A tabulates the basis for this natural 0/3/6 fit using typographically super-subitized representations of radix-10 numbers, along with super-subitized linguistics to match. The Digit-Square of FIG. 12B minors FIG. 2A but substitutes super-subitized "Spine+Rib" numeric glyphs to make the "power of three" clustering inherent to super-subitization more demonstrably clear. A tenth bead site (17), representing a saturation state, comparable to all ten fingers outstretched, is located in the top left corner.

Preferably, the appropriate cultural and language glyph (10) is printed within the bounds of each bead site (11) and (17) on the tile. For example, the bead site layout of FIG. 2A depicts a right to left magnitude sequence (left is greater) with ascending row/echelons (above is greater), imprinted with conventional Hindu-Arabic digit glyphs, namely "0" through "9". Typographic glyphs act as stepping stones so that, in due course, children self-acquire adult symbol usage. As FIGS. 6AA through 6JJ make clear, when beads occupy bead sites on a Digit-Square, the bead count, the bead pattern, and numeric value/state is reinforced by the numeric glyph in the next higher bead site.

Compatible with the Digit-Square tile is the Tray tile (28), as depicted in FIGS. 3A through 3C in plan and section views, also showing the preferred bead (24). Trays serve as bead repository adjuncts to Digit-Squares.

Claim 1 defines the unadorned apparatus. The first physical component is called a singular tessellation embodiment because it is comprised of one or more tiles, such as the Digit-Square (27) and the Tray (28), assembled into a unified tessellation, called a Candy Board, as depicted in FIG. 2A, being a stand-alone unit tile, and FIG. 1B, FIG. 4 and FIG. 5, being a unity of plural tiles adhering to a schema of tessellation.

Candy Boards can be custom-module assembled from tile and tile composites, interconnected through various interlocking mechanisms including bridging tiles and base mats, to create a desired schema of tessellation. Candy Boards can also be single-molded ready-to-play units with a single row, mimicking an abacus, or two-row, three-row and higher order assemblages, with or without built-in Trays.

With storylines to match, examples of various Candy Board schemas are provided in the figures and the lessons of the detailed description. The FIG. 9 series relates to clock addition. The FIG. 15 series relates to addition. The FIG. 16 series relates to in-situ addition and subtraction. The FIG. 22 series relates to subtraction using gratuitous borrow. The FIG. 23 series relates to using numbers on a chip. The FIG. 17 series and FIG. 24 series relates to single digit algebra. The FIG. 25 series relates to two-man split. The FIG. 26 series relates to simple division. The FIG. 27 series relates to simple multiplication. The FIG. 28 series relates to the 632M-Board. The FIG. 29 series relates to 632M multiplication. The FIG. 30 series relates to the 632M division. The FIG. 31 series relates to finding the square root through iterative improvement.

The second components of the unadorned apparatus of claim 1 are called bead sites, preferably bearing indicia (10) and recessed into the tile substrate (11, 17) to better create a cavity-mating profile with the body of beads. While all bead sites, as depicted in FIG. 2A and shown in section in FIGS. 2B and 2C, are circular-dimple in form to be compatible with candy beads such as M&Ms, they can take any predetermined form.

The third components of the unadorned apparatus of claim 1, called beads (24), put the experience of playing and experimenting with super-subitization, and other quantifiable science focused layouts, at a child's fingertips.

Conforming to the dimensions of M&Ms, Skittles and. Smarties, the preferred beads (24) are round, ovulate, finger-friendly candy having an approximate diameter of 12 mm. Choking hazards should be avoided at all costs. Because candy is cheap, there is no reason not to use edible beads. Candy is preferred, not merely for safety and economy, not only to remind children about bead counts and bead patterns, but also to impress upon them how candy is life's little motivator. Any candy makes a suitable bead as long as it is compatible with bead site recesses (11, 17).

As depicted in the Digit-Square of FIG. 2A, two horizontal channels (14) and (15) and one vertical channel (16) provide bead sliding pathways because sliding is preferred over placement. These channels frame three edges (14A), (15A) and (16A) that surround and thus define a bead site plateau region. For other science modeling, such as the electron shells of an atom, channels and plateau regions may number more than one.

Preferably, the Digit-Square is hemmed in by a right bead-control fence (12) and a left bead-control fence (13). Such fencing aims to enforce tile grouping, such as the rank system, i.e. numeric order of magnitude. Similar to and compatible with a Digit-Square's enforcement of tile grouping, each Tray has three fences (21), (22) and (23) to confine beads to a given rank. One primary objective of the method of plosive-state equilibration is to straddle or to hurdle such fencing.

Plosive-state equilibration is the preferred method for one tile group to interact with another tile group. On the Digit-Square, a plosive-state lock up occurs when beads occupy every allowable bead site. As depicted in FIG. 2A, the "9" bead site (17) is preferably located on the Digit-Square at the junction of the horizontal channel (15) and the vertical channel (16). Once a bead occupies this bead site it physically blockades further bead-in-channel sliding onto the Digit-Square. During addition, such a physical lock-up manifests what is called a plosive-state TEN, i.e. the bead count and bead pattern depicted in FIG. 6KK.

More generally described, the method of plosive-state equilibration is triggered whenever a plosive-state bead condition arises on a tile during an operation in progress. Preferred tile designs employ a bead site layout that causes a physical lock-up that arrests further bead play. For the operation to proceed further the method of plosive-state equilibration must resolve the lock-up, thereafter the operation in progress resumes. Otherwise the operation in progress must abort and perform a related exception state process.

Plosive-state equilibration is the means for exploded value representations to normalize into canonical representations and visa-versa. For example, on the Candy Board during addition, a candy packaging operation converts plosive-state TEN Candies into 1 Packet, 0 Candies, namely "10" in the canonical form adults speak aloud as "ten." FIGS. 10A through 10D show how 199 plus 1 triggers plosive-state rippling until a stable equilibrium state/value occurs, namely 200.

Because self-acquisition of knowledge is the invention's purpose, relatability to children is paramount. For an adult to say "Two hundred is the result of the rippling of plosive-state equilibration" stiff-arms self-learning. The detailed description of Lesson #2, Game of Packaging and Unpackaging provides a child-friendly breakdown of the process of plosive-state equilibration, and how ten candies get packaged into a packet and visa versa.

Demonstrable reality is king, as far as children are concerned. A pair of hands gave birth to the radix-10 convention, but what adults have overlooked is that a pair of hands has eleven counting states not ten counting states. Two closed fists means zero, i.e. all fingers imploded. Then, one, two, three as each digit on each hand is unfurled one by one, i.e. incremental changes of state. Finally, with all digits outstretched, the plosive-state TEN under addition has occurred because the child has run out of fingers.

To a child, this eleventh state called TEN outstretched fingers is hands-on reality. It should never be confused with the typographic convention "10", the canonical notation adults use to denote the eleventh state of the human hand, spoken aloud as "ten." Plosive-state TEN fingers, or plosive-state TEN candies, as depicted in FIG. 6K as a TEN chip (26) and FIG. 6KK as a count of ten beads and the TEN bead pattern where all bead sites on the Digit-Square are occupied, represent this eleventh state on the Digit-Square.

Mimicking reality is essential. On the Digit-Square, starting at "0" incrementing to TEN involves eleven states and ten changes of state, as depicted in the eleven FIGS. 6AA through 6KK. What children see visually are eleven states. What children don't see visually are the ten changes of state because those are mental constructs called counting, i.e. changes of states via incrementing. The adult mind might call such rigor a quibbling distinction. However, when dealing with children, failing to apply hands-on reality has huge didactic consequences because the goal is for children to learn naturally and at their own pace via self-acquisition rather than adult imposition, as per the golden rule: Without relatability, learning is imposition not acquisition.

Mathematical order of magnitude conventions map directly to the Candy Board's Digit-Square ranking system. For example, in FIG. 4 depicting a three-row, four rank Candy Board, a decal (25) marks the Candy rank. All higher ranks tessellate leftward, using Western conventions. Thus, ranks of candy containment take on child-friendly names. Adults have an obligation to relate to children. Applying reality to a horde of candy, "8 Bags, 4 Packets, 3 Candies" adroitly describes rank-wise denumerability. Expecting a child to decode eight hundred and forty-three, a mind boggling number with no subitization qualities whatsoever, is the height of adult contempt for children.

Preferably, each Digit-Square of the same rank is colored and color consistent. Hence, a full-scale Candy Board appears as a series of vertical strips in a light-shade of color that correlate with a set of rank-specific beads in a darker-shade of the same color.

Preferably, Trays use color to delineate rank that is compatible with the color used by Digit-Squares of the same rank. Preferably, label decals (25) or clipart decals (29) denote the rank to which the Tray pertains. As depicted in FIG. 4, for example, one or more Tray tiles act as bead repositories in conjunction with one or more Digit-Square tiles when setup in a given singular tessellation embodiment. Other such embodiments are depicted in FIG. 1B and FIG. 5, and the 632M-Board setup with beads is depicted in FIG. 28G.

Preferably, indicia bearing chips (26), as depicted in FIG. 6K and FIG. 7 as a set, act as substitutes for beads laid on the Digit-Square, as well as a means for guiding the child through Candy Board storyline operations, as demonstrated in the lessons of the detailed description. Furthermore, chips are the primary means for weaning a child away from bead patterns. Chips are also one means for manifesting algebraic substitution on the Candy Board, as detailed in Lesson #5, Game of BPC Mystery and Lesson #9, Game of Algebra.

FIGS. 6A through 6J along the left-hand margin of the drawings depict stencils (30 . . . 39) optionally bearing indicia, and with optional cut-out holes (40 . . . 49). When placed over a Digit-Square, stencils are the preferred means for enforcing the setup of the correct stencil-specific bead count and bead pattern.

Stencils with cut-outs (40 . . . 49) included permit the underlying glyph printed in the predetermined bead site on the Digit-Square to show through which reinforces the bead pattern to numeric symbol association. The cut-out also facilitates radix choking, whereby the radix of a Digit-Square is reduced, as illustrated in FIGS. 8A, 8B and 8E, and as applied to the clock tessellation of FIG. 9A. The cut-out defines the plosive-state bead site. For example, analogous to plosive-state TEN, plosive-state "8" in octal becomes "10", the octal canonical form.

In another Digit-Square customization, using decals if desired, FIG. 8D depicts how a kludge on the radix-10 Digit-Square can emulate radixes up to hexadecimal, i.e. ounces, and for radix-12, i.e, inches or hours, as depicted in FIG. 8C.

A cogently designed bead-on-tile model is admirably suited for handling many seemingly complex problems that go beyond rote pencil-and-paper arithmetic. For example, mixed radix systems such as days, hours, minutes, and seconds are represented and operated on under the Game of Candy rules of arithmetic. As depicted in FIG. 9A, dual Digit-Squares are used for seconds and minutes. The hours are split into two one-dozen intervals, one for a.m. and one for p.m. The first rank of the hours uses the radix-12 Digit-Square kludge as depicted in FIG. 8C. The a.m./p.m. rank uses a radix-2, binary stencil adapted from the basic form of FIG. 8A. Days are radix-10. To illustrate how the Candy Board handles mixed radix arithmetic, FIGS. 9A and 9B illustrate the before and after when 7 hours, 43 minutes and 38 seconds is added to 1 day, 10 pm, 2.6 minutes and 12 seconds.

Rigor makes for relatability. In the clock tessellation, a dual Digit-Square subassembly emulates radix-60 via a specialized stencil. FIG. 8E depicts the use of a "Seconds" stencil in which a cutout set in the "5" location when placed atop a Digit-Square allows the "5" glyph to show through. For example, with five beads on the left Digit-Square and nine on the right, a typographic value "59" is displayed. Add 1 second to "59" and plosive-state TEN lock-up occurs, i.e. "5TEN". Plosive-state equilibration of TEN causes a sixth bead to socket atop the plosive-state "5" cutout on the stencil, which occludes the "5" glyph printed on the tile bead site, i.e. a second plosive-state lock-up has occurred. Under the rule of rippling, after a second plosive-state equilibration takes place the Candy Board becomes "100", namely, 1 minute, 00 seconds in canonical form. Rippling is demonstrated in FIGS. 10A through 10D where "199" plus 1 ripples via plosive-state equilibration into the canonical form "200". This might seem tedious overkill, but the apparatus enforces rigor in order to provide a child the means to walk through and demystify quantitative processes step by step.

Because physical bead movement on structured, rule-enforcing terrain, such as rows and ranks, fences, channels and bead site stamped with a location or number, can be threaded into a storyline and expressed unambiguously via navigation directions, storytelling on a physical Candy Board becomes a means for demonstrating concepts that are not easily explained. On intelligent Digit-Squares, flashing bead sites can further augment clarity of play.

To enforce correct game-play, so a story leads to correct resolution, and thus, a lesson learned, a standard vocabulary is essential. To better describe the rigor of exposition required of stories and the story process itself, the detailed description tackles fifteen storylines via fifteen lessons.

As children become adept, they will ignore the one bead at a time tedium and do whatever multi-bead movement rapidly fills the requisite bead pattern the fastest. Moreover, subitization at the finger tips leads naturally into expeditious single bead play once the child dispenses with the need to visualize total bead count, but rather forms a sense of number based on bead location alone. Conforming to a subitized 6321 process, moving the bead, row by row, in three-count jumps, namely "spine" jumps, followed by a final adjustment of zero, one or two counts, namely "rib" increments, expedites reaching the requisite end-state for a given operation. The single bead method for solving the problem 9+1 is depicted in FIGS. 32A through 32J for addition, and FIGS. 33A through 33J showcase the steps for solving the subtraction problem 10−9.

Although game-play on a physical Candy Board is preferred, especially during a child's earliest learning phases, computer-proctored display devices designed around the layout and techniques of a physical Candy Board provide greater flexibility for dynamically animating storylines in more sophisticated games, or where detection and correction of erroneous game-play is paramount.

Be it stand-alone intelligent Digit-Squares, computer connected Digit-Squares, or display device Digit-Square analogues, in a computer-proctored embodiment of the apparatus, storylines are preferably presented as text, audio or video, or any combination thereof.

A computer-networked embodiment of the invention enables an instructor to walk a classroom through a generic problem, but one where each student has a unique instance of the problem on his personal display device to resolve.

The computer-proctored embodiment provides huge scope for personalized interaction. For example, whenever the child correctly moves a Packet-Rank colored bead/icon to cover-up the "2" bead site in the Packet-Rank on the row of Digit-Squares representing the inventory of candy in some storyline pantry, this change of state triggers a computer-proctored display and voice system to respond, "The new packet added makes three packets of candy in the pantry."

Computer-proctored Candy Boards are well suited to rigorously enforcing the storyline and the rules of the problem at hand. For example, enforcing the order in which bead/icons are placed so the child adheres to "0" followed by "1" and so forth to "3", rather than "2", "1", "0" and "3" or any other haphazard bead sequence and placement.

All other modes of exposition parallel to the tangible and digital game board models and their co-related methods are also contemplated when future technology devises and implements new interaction devices. Such devices include virtual reality 3D configurations, tangible 3D configurations and directly mapping real fingers and finger patterns to virtual digit configurations, along with co-related gestures and words animating the methods by which a game scenario is played out.

The Method of 632M Summarized

Based on the principle of super-subitization, the method of 632M multiplication and quotient auto-generation enables children to do multiplication and division without multiplication tables, without the need for memorizing them, without doing single digit multiplication in their heads, and without guess-estimating a candidate quotient digit, rather the quotient is auto-generated as 632M division unfolds. FIG. 11. illustrates the symmetry and subitization qualities of the 632M method when applied to a pencil-on-paper problem.

The M in 632M denotes the baseline multiplicand or the divisor value relevant to the problem, also called 1M M-value associated with the 1S S-value. The "632" designates three other S-values, namely 6S, 3S and 2S, being the additional multiples of 1M, calculated via three addition operations. FIGS. 28A through 28G depict the process of generating the 6M, 3M, 2M M-values as explained in the detailed description for setting up the 632M-Table on a four-row Candy Board called the 632M-Board.

Relatability is essential for children. Using quasi-English linguistics to express super-subitization, consider what a child's brain must grapple with when adults nonchalantly count: zod, dot, pod, rod, roddot, rodpod, rect, rectdot, rectpod, rectrod, ten, as depicted at the base of the table in FIG. 12A, in place of the words for zero through ten. Indifferent to a child's level of comprehension, adults might blithely recite "roddot times rectrod equals roden-rect," namely four times nine equals thirty-six, of course. However, to a young child such simple single digit multiplication comes across as perplexing, not to mention a multiplication table, which one is expected to memorize, based upon such crazy talk. The 632M method completely unburdens the child from knowing anything about the concept of a multiplication table, and how "roddot times rectrod equals roden-rect."

Fifteen Advances over Prior Art

Utilizing a bead-on-tile approach, the invention's many advances go straight to the heart of arithmetic, and make no demands beyond a child's innate perceptual and household senses.

First advance over prior art. Packaged candy is a scientific observable that needs no special explanation for a youngster. The apparatus uses a candy/bead model because it embodies the natural idea of "How much" in the concrete form of boxes, bags, packets and pieces of candy. Games of Candy are the perfect means for motivating children to game-play story-driven, candy-rewarding mathematics.

Second advance over prior art. The apparatus comprises a singular tessellated embodiment, namely the Candy Board, several hand-size ancillary elements, such as stencils and guide chips when need be, and a load of candy. Children are loath to lose candy, and regardless candy is cheap and replaceable. In contrast, much prior art comprises a plethora of small custom pieces, many of which are choking hazards and none of which have the allure of candy. As such, loss of pieces becomes inevitable, and unless replacement parts are re-purchased, functionality is degraded.

Third advance over prior art. From a tactile playing-experience perspective, unlike peg board with pick up peg, place peg over correct hole and plug in peg, the apparatus's bead-on-tile sliding and bead-in-cavity socketing provides fast, regimented, placement-stable bead counts and bead patterns on the Candy Board. Furthermore, unlike the domino family, where dominos must be picked up and placed, the apparatus functions like a lock-set mega-domino where beads dynamically populate empty pips, namely bead sites, and do so in a value order adhering to the strictures of super-subitization, as well as to the order of magnitude ranking conventions of multi-digit numbers.

Fourth advance over prior art. Unlike the 2×5 elongated Ten-Frame rectangle, subitization and super-subitization are compactly embodied on square Digit-Squares, which allows a child to auto-acquire denumerability via perception rather than via instruction or overt counting.

Fifth advance over prior art. Using a box, bag, packet, pieces model based on hands-on candy, the child auto-acquires the concept of rank-wise denumerability. The reality of candy packaging is simulated via right to left ranks on the Candy Board, and is the means for representing numeric orders of magnitude. Not only are abstractions like thousands, hundred, tens and ones eschewed, they are irrelevant, and moreover stiff-arm learning.

Sixth advance over prior art. The child auto-acquires the concept of packaging and unpackaging as a means of ordering magnitude, namely put ten candies in a packet produces one packet, put ten packets in a bag produces one bag and so forth. Because packaging involves no specially staged factor-of-ten apparatus divorced from a child's every day "Pick up your toys" experience, the packaging paradigm has none of the drawbacks of the metrical paradigm.

Seventh advance over prior art. Two or more numeric values placed on two or more adjacent rows on the Candy Board mimic the natural layout for scribe-written binary operations, such as A±B, A−B, A×B and A/B, as exemplified in Lesson #3, the Game of One Digit Addition of "7 plus 6". However, "7 plus 6" implemented on a single register device such as the abacus or the Ayala Yupana requires a child to know that three is the remainder, and one bead in the tens rod/column must be augmented. This multi vs. one register distinction is more evident in Lesson #5, Game of BPC Mystery, as depicted in the FIG. 17 series, where the child solves problems containing three unknown variables on a three-row Candy Board. Furthermore, what makes gratuitous borrow even possible in Lesson #7, which simplifies subtraction, is the Candy Board's multi-row feature. Similarly, for using iterative improvement on a three-row Candy Board to find square roots, as detailed in Lesson #15, Game of Magic Twins.

Eighth advance over prior art. A multi-row Candy Board makes a child's errors more apparent and easier to correct. Single register prior art is not only error intolerant, but requires a high degree of mental mathematics, and as such, invites error, including error in usage.

Ninth advance over prior art. Digit-Squares and the structure of the Candy Board enforce the rules of mathematics, so usage error is minimized.

Tenth advance over prior art The invention uses a storyline approach to make the uptake of mathematics a matter of game-play that is so hands-on and so relatable to children that algebra, the game of solving mystery information, becomes a natural use of the apparatus.

Eleventh advance over the prior art. Based on the principle of super-subitization, the invention discloses and applies the 632M method for executing multiplication and division. Consider how the 632M method conquers division. Adult long division is besotted with smashing the problem into one subtraction step per quotient digit, and this fixation is time consuming, requires tables, mentally taxing and prone to error. The 632M method requires 1.4 rote subtractions per quotient digit on average. However, compensating for the extra 0.4 rote subtraction penalty, is the fact that children are oblivious to the existence of an adult system revolving around a multiplication table, let alone memorizing such table. Nor does a child need to skunk-out an appropriate quotient value or generate a trial subtrahend in his head via one digit multiplication across a multi-digit divisor. With the 632M method the unknown-in-advance quotient digit falls out in the process.

Twelfth advance over prior art. Subitization focused game-play accelerates fine-muscle control development in the fingers because the positioning challenges of free-ranging beads makes small but insistent demands on fingers. These eye-to-hand and finger co-ordination skills translate into the fine motor dexterity needed for mastering pencils. Abacus devices have beads constrained to rods, so a child never develops fully independent finger motor skills.

Thirteenth advance over prior art. With mastery and maturity subitization will blossom at the fingertips, Bead sliding fades into obsolescence once the child starts moving beads in clusters of three at a time. In due course, the child will prefer the use of a single bead to mark a Digit-Square's value rather than a sequence of multiple beads in proper number and pattern. The FIG. 32 series and FIG. 33 series illustrate maturation into more astute and expeditious bead usage.

Fourteenth advance over prior art. Iterative improvement methods demand a multi-row apparatus in order to perform numerically interactive and intensive calculations. Finding square roots, as detailed in Lesson #15, Game of Magic Twins, is a problem no prior art pretends to tackle.

Fifteenth advance over prior art. The apparatus remains fresh, relevant and challenging at every age because its flexible tessellation architecture allows it to be re-adapted for any conceivable problem in the quantifiable sciences. On a single, familiar and friendly apparatus, a child graduates from "One, Two, Three," all the way to calculating square roots and beyond. The apparatus and methods provide systematic mastery and confidence at every level of use, which inspires a child to graduate at his own pace from one level to the next.

BRIEF DESCRIPTION OF THE DRAWINGS

FIG. 12A: 632M Method's inherent subitization in span tree "Spine+Rib" form.

FIG. 12B: 632M Method's inherent subitization on a super-subitized Digit-Square.

FIG. 13A: Efficiency/Speed Improvement Table, comparing 632M method to traditional multiplication.

FIG. 13B: Efficiency/Speed Improvement Table comparing 632M method to traditional long division.

LEXICON OF MEANS AND TERMS OF ART

Figure 1A:
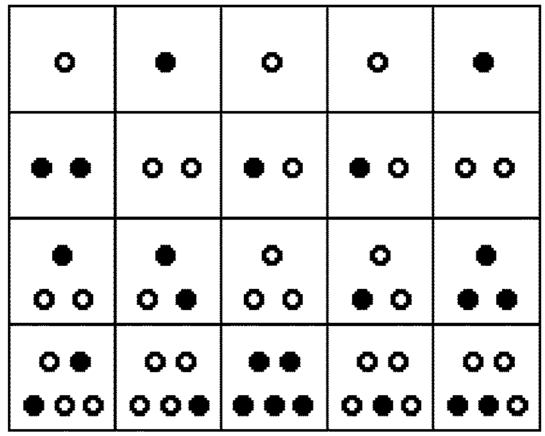
FIG. 1A: Sketch of single-row, five order of magnitude Ayala Yupana, presumed prior art of ancient Inca.
Figure 1B:
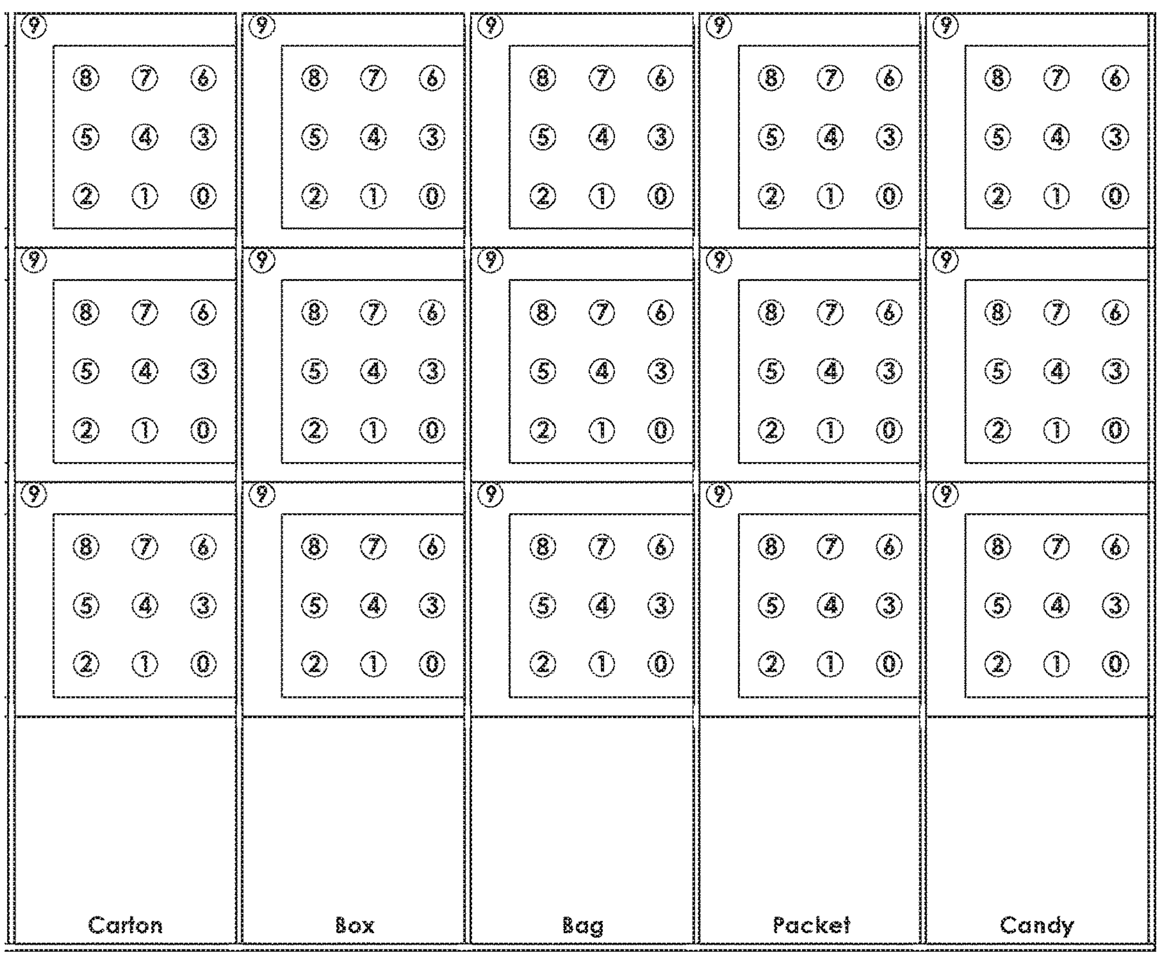
FIG. 1B: Three-row, five order of magnitude Candy Board with Tray.

To ensure the invention is articulated as coherently as possible and its fabrication is readily apparent to any person having ordinary skill in the arts relevant to the invention, the following defined terms apply to the Claims and the Specifications. All terms used in their capitalized form are used to aid readability, and all capitalized forms shall be read and understood as the lowercase forms, and visa versa.

STORYLINE defined. Storylines are narratives that guide a child through a story that requires the resolution of a particular dilemma or mystery. For example, in the "Game of Adding Up Mommy's Grocery List," the child is given a sequence of grocery item costs that must be setup on the Candy Board and accumulated one by one. Storylines can revolve around mysteries such as solving primitive algebra problems where the mystery is the unknown values of its variables.

BEAD defined: Beads (24) are preferably spheroidal objects, and include ellipsoid, ovulate, single and double crescent cross-section profiles; in disk form when viewed in plan view, as well as single and multi-punctured toroidal forms. Beads also include multi-faceted prismatic objects and flattened forms stylizing silhouettes of said prismatic objects or art objects, such as Monopoly-type pieces and such, as well as naturally occurring objects such as pebbles, seeds, nuts or parts thereof. Beads also include bead composites whereby beads are interconnected into a rigid unity. For example, three beads interconnected in a row creates a "rod", and two beads creates a "pod", both of which are shaped on the underside so as to socket into a given cluster of three and two bead sites respectively. For example, a pod can represent paired electrons on a given tile, where said tile represents a particular atomic element or bond state. From the viewpoint of child safety, candies in the form of M&Ms, Smarties, Skittles and similarly shaped edibles are the preferred embodiments for all beads used by or accessible to children. All figures, disclosed herein, depict this focus on bead safety. Beads are characterized, and may be distinguished one from the other, by any combination of and any distribution over the extents of their physical body, via the following features: (a) size, shape, reshaping, plasticity, remoldability, divisibility into sub-beads and aggregation into bead composites, (b) color and color patterning, including typographic symbols and glyphs, (c) material, (d) texture, (e) electro-sensitive properties, (f) non-passive sound and light emitting properties, including the indication of state changes resulting from movement, position and bead site location within tiles, (g) magnetic properties, (h) sonic properties, and (i) all known and yet to be discovered properties and sensor means that permit tracking of bead movement, including the movement of beads into out-of-bounds regions, the confirmation of correct and incorrect bead placement, and means capable of discerning said bead's proximity to one or more other beads, tiles, bridging tiles, chips and stencils. Furthermore, beads are not limited to a top-side with a single-facet display purpose, but can be re-oriented in-situ or otherwise, and thereby take on multiple top-side display purposes. For example, the spin up and spin down states of an electron. While not essential to the unadorned embodiment of a bead, all bead manifestations may transmit and receive broadcast signals. Beads include icons reproduced on computer-proctored display devices and other reprographic analogues, whereby said icons aim to conceptualize bead function and emulate physical beads, as characterized by properties (a) through (i) above, including any multi-faceted character.

Figure 2A:
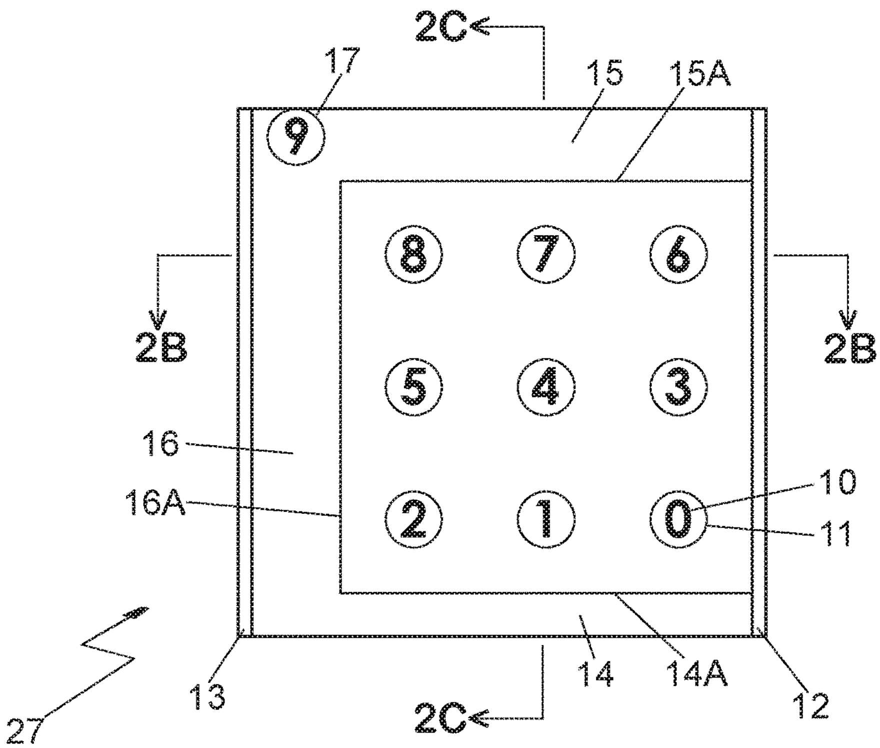
FIGS. 2A, 2B, 2C: Radix-10 Digit-Square, plan and elevation views (tessellation interconnects not shown).
Figure 2B:
Figure 2C:
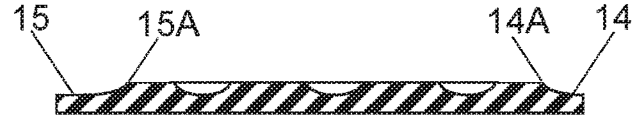
Figure 3A:
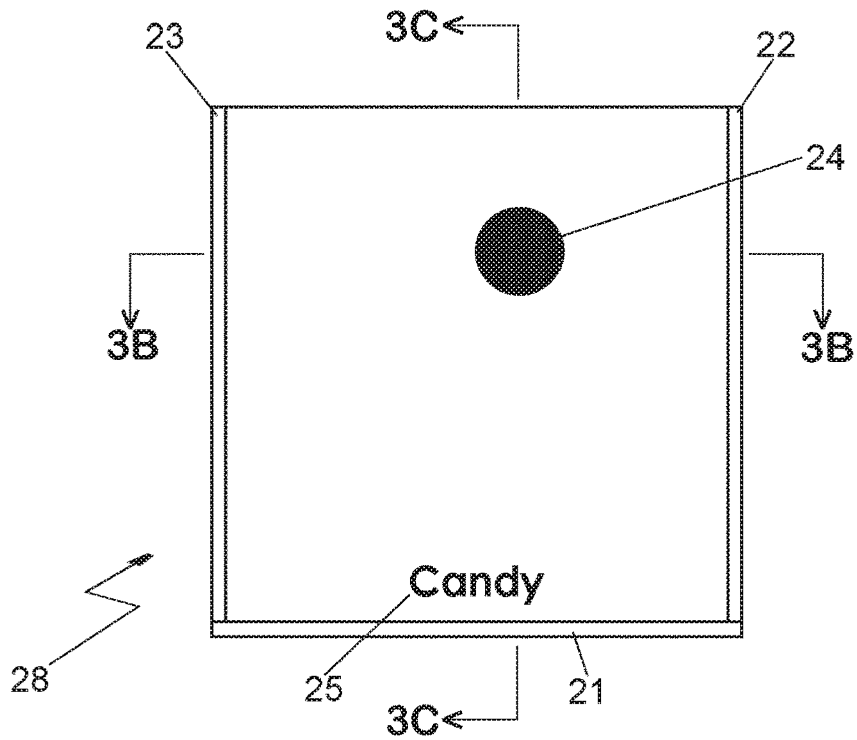
FIGS. 3A, 3B, 3C: Tray with one bead, plan and elevation views (tessellation interconnects not shown).
Figure 3B:
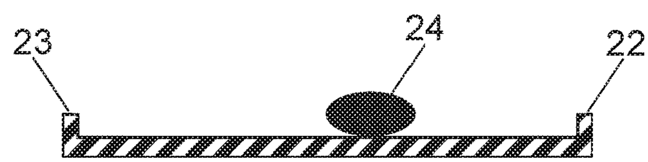
Figure 3C:

TILE defined: A tile (27, 28) is a planar object comprising of any finite number of edges in any combination of edge straightness and curvature which demark the extents of said tile's boundaries. A tile includes (a) a tile with bead sites, and thus is capable of state representation, such as a Digit-Square, as depicted in FIG. 2A for example, or (b) a bead repository tile with no particularized bead sites, such as a Tray or a Boson tile, as depicted in 3A. Not depicted in figures because it entails obvious art, is that along any of its edges and underlying surface any given tile may possess male-female interlocks, nub and groove dovetailing, magnetic interlocks, tangs and tang sockets in order to customize physical tile-to-tile alignment, mating and interconnection, as well as provide feed through power and data communication from one tile to another. Tiles are characterized, and may be distinguished one from the other, by any combination of and any distribution over the extents of their embodiments, via the following features: (a) size, shape, including one or more cut-out holes, drop-through cavities and dimple regions, as well as plasticity and remoldability, (b) color and color patterning, including typographic symbols and glyphs, (c) material, (d) texture, (e) electro-sensitive properties, (f) non-passive sound and light emitting properties, including alerts of erroneous bead choice, usage and placement within said tile, (g) magnetic properties, (h) all known and yet to be discovered properties and sensor means that permit tracking of bead movement on said tile, including the movement of beads into out-of-bounds regions, and the confirmation of correct and incorrect bead placement within said tile, (i) the presence of constraint fences (21, 22, 23) and elevated ridge fences (12, 13) of a height pertinent to the modeled constraint along one or more edges of said tile, (j) the number, location and direction of bead ingress and egress channels (14, 15, 16), (k) number and location of bead sites, (l) indicia identifying said bead sites (10), (m) the physical concave dimpling of said bead sites (11, 17), including the use of undersized holes drilled partially or completely through the tile to create a socket effect between bead and bead site, as well as the use of convex nubs to create a similar but opposite socketing effect that co-ordinates with concave bead profiles, (n) contouring, including troughs, ridges (14A, 15A, 16A), and valleys to demark clustering of said bead sites, (o) fixed peaks and mountable pegs that demark bead-exclusion sites, and/or enhance bridging tile, stencil and chip placement, and (p) the provisioning of active power and a localized channel of communication to elements placed in proximity to said tile, such as beads, tiles, bridging tiles, chips and stencils. Furthermore, tiles are not limited to a top-side with a single-use purpose, but can be designed to be flipped, thereby serving dual purposes. Tiles include tile-panes reproduced on computer-proctored display devices and other reprographic analogues whereby said tile-panes aim to emulate physical tiles, as characterized by (a) through (p) above. While not essential to the unadorned embodiment of a tile, all tile manifestations may transmit and receive broadcast signals. The embodiment of a tile includes a multi-state bit, i.e. a "mit" in a plosive-state enabled, multi-state computer. The use of inter-tile bridging and schemas of tessellation define the embodiment system architecture of said computers when technology exists to do so. This includes the methods of plosive-state equilibration and 632M deployed on said computers.

BEAD SITE defined: Bead sites (11, 17) are preferably indicia bearing recessed cavities in the substrate of the tile which conform with and are compatible to the physical profiles of all beads pertinent to the bead site and placeable within the bead site. As groups, bead sites are located in plateau-region layouts on a tile and laid out to optimize their didactic function based on a pertinent principle of pedagogy, such as the principle of subitization and super-subitization, as applied to a given problem domain in the quantifiable sciences. Bead sites may be characterized by any of the character features (a) through (i) that characterize beads. While not essential to the unadorned embodiment of a bead site, all bead site manifestations may transmit and receive broadcast signals. Bead sites include bead-spaces reproduced on computer-proctored display devices and other reprographic analogues, whereby said bead-spaces aim to conceptualize bead site function, and emulate bead-space to icon correlation and virtualized rubber-banding.

BRIDGING TILE defined. Bridging tiles are special purpose tiles capable of corralling a series of two or more tiles into a unity whether overlaid or underlaid across said tiles and thereby interlocking said plurality of tiles into a schema of tessellation. Bridging tiles include underlay base-mats capable of creating a variety of game board embodiments of the invention. For example, for the purposes of emulating chemical bonds, such as hybridized and co-ordinate bonding, bridging tiles in either overlay bond bridges or underlay base-mat bridges employ a socket profile that mates with the non-bridging tiles that represent the chemical elements so bonded within the given molecule being emulated. Bridging tiles have all the properties and full feature set of tiles, as defined under TILE, including proximity behavior. Bridging tiles can interbridge other bridging tiles, i.e. be nested. Bridging tiles include multi-prong stanchions that when affixed to a base mat of tiles creates vertically layered schemas of tessellation incorporating a plurality of tiles and schemas of tessellation at other levels in the structure. Bridging tiles can serve as power and communication pathways into all tiles they interconnect.

SCHEMA OF TESSELLATION defined. A schema of tessellation is the architecture that embraces a problem domain, and is manifested in a unified object called a singular tessellation embodiment. Such notional and physical tessellations comprise a plurality of tiles, including bridging tiles, chips and stencils, chosen to address one or more specific problem sets in the study of mathematics and the quantifiable sciences. A singular tessellation embodiment could have, but does not need to have, physical connectivity one tile to another in the form of edge-to-edge adjacency, vertex-to-vertex adjacency, or any adjacency combination thereof, either with or without the use of bridging tiles. Schemas of tessellation include storyline specific singular tessellation embodiments. While not essential to the unadorned singular tessellation embodiment, all singular tessellation embodiments may transmit and receive broadcast signals. All schemas of tessellation are capable of replication on computer-proctored display devices and other reprographic analogues, whereby said virtual singular tessellation embodiments aim to emulate physical singular tessellation embodiments. Several custom multi-row and multi-column Game of Candy singular tessellation embodiment configurations are specifically addressed in the detailed description.

Figure 6A:
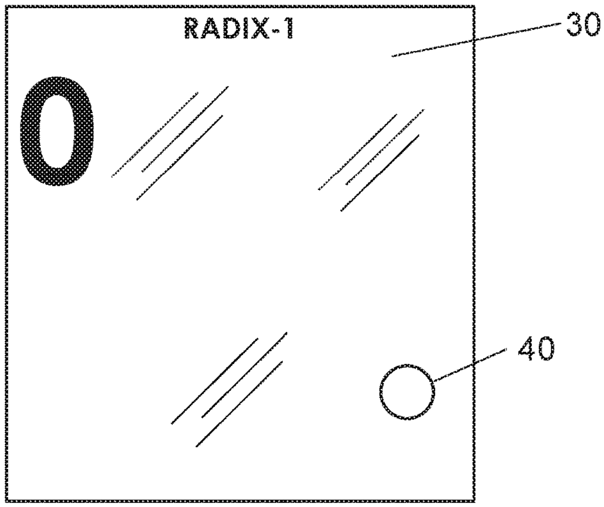
FIGS. 6A to 6K, and 6AA to 6KK: Ten stencils/TEN chip along the left margin with their bead pattern counterparts along the right margin.
Figure 6A:
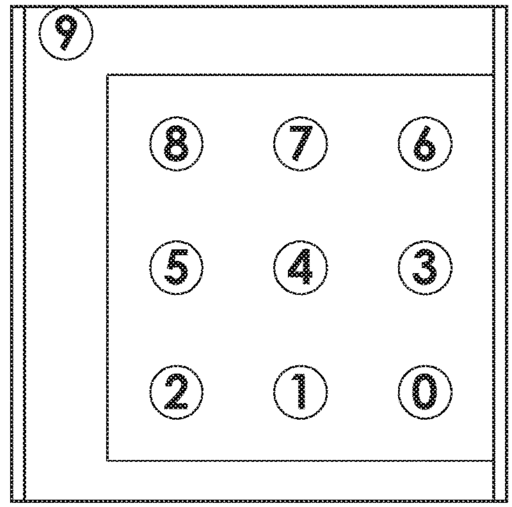
Figure 6B:
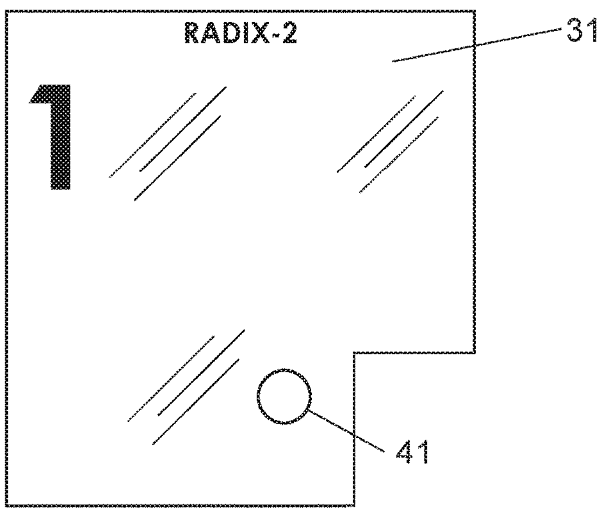
Figure 6B:
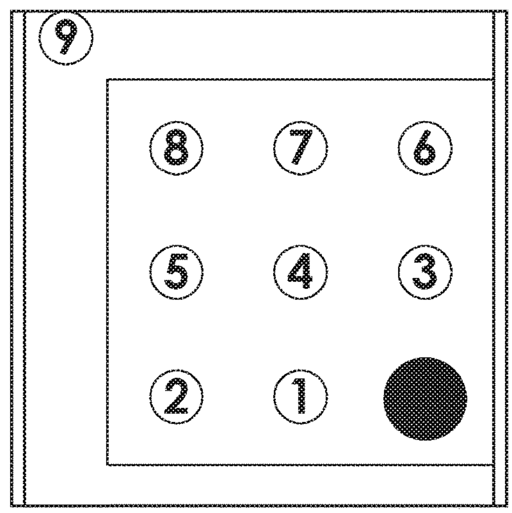
Figure 6C:
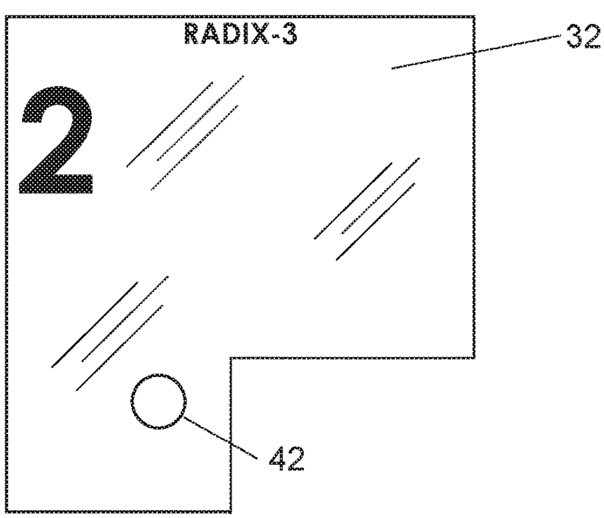
Figure 6C:
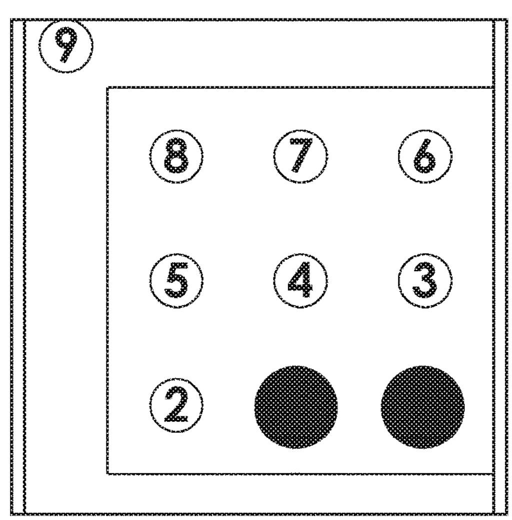
Figure 6D:
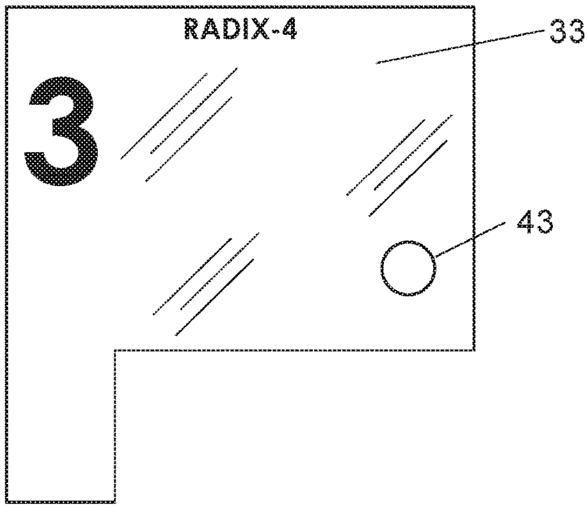
Figure 6D:
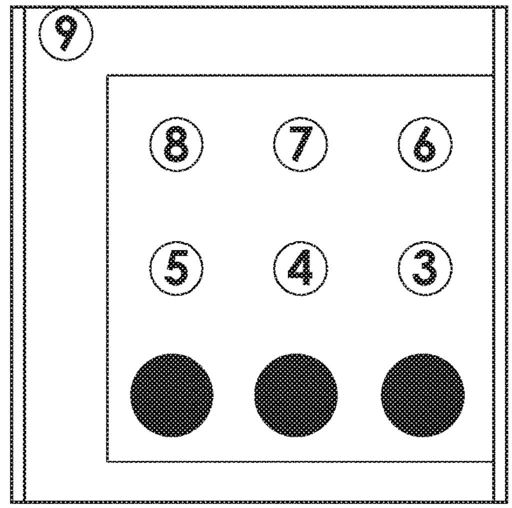
Figure 6E:
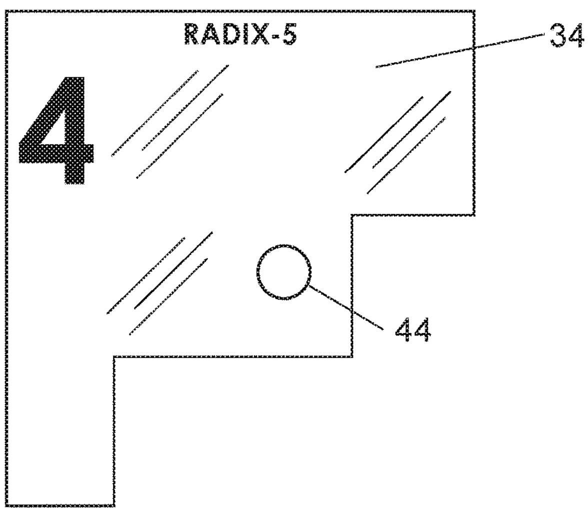
Figure 6E:
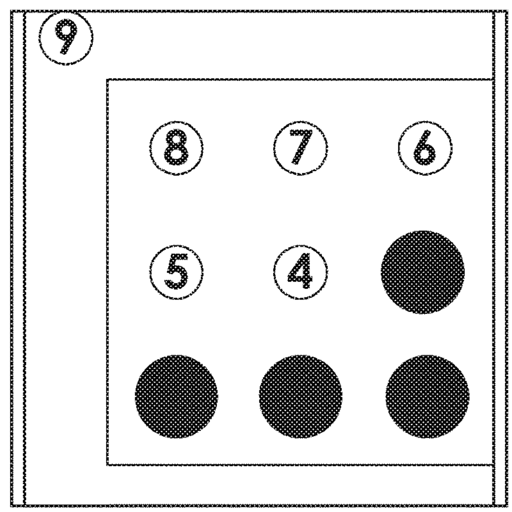
Figure 6F:
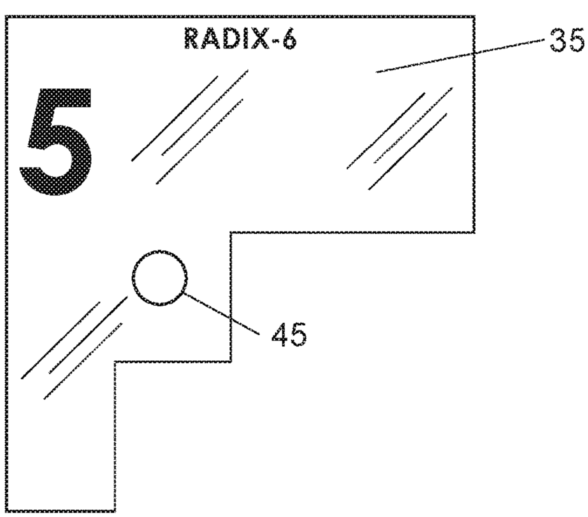
Figure 6F:
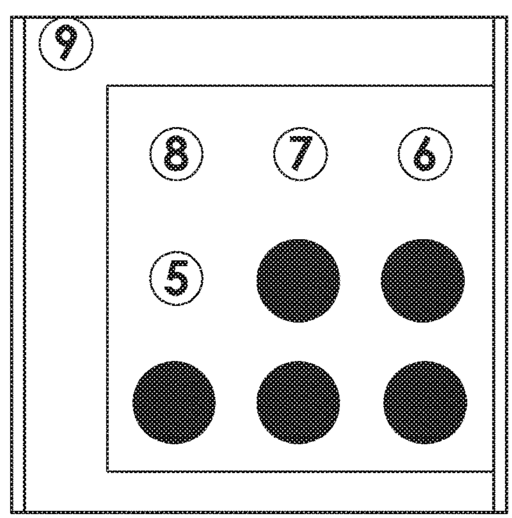
Figure 6G:
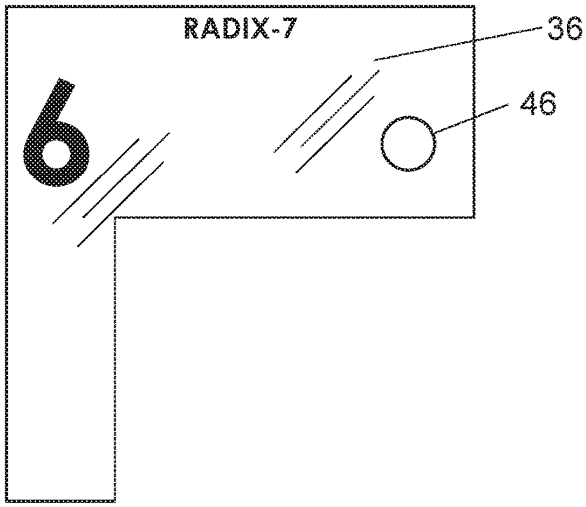
Figure 6G:
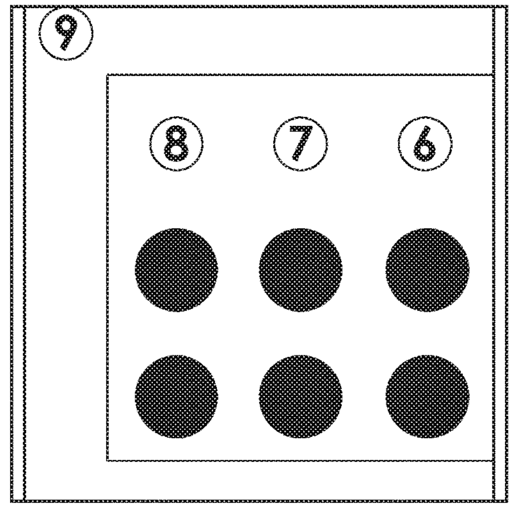
Figure 6H:
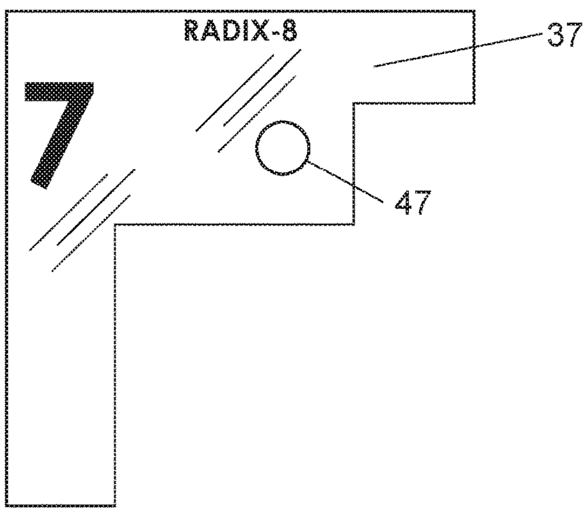
Figure 6H:
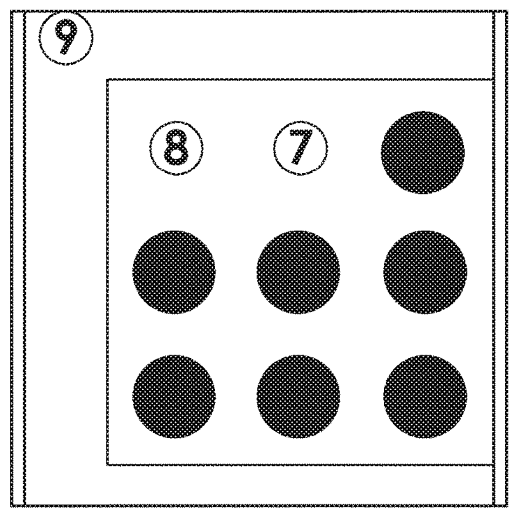
Figure 6I:
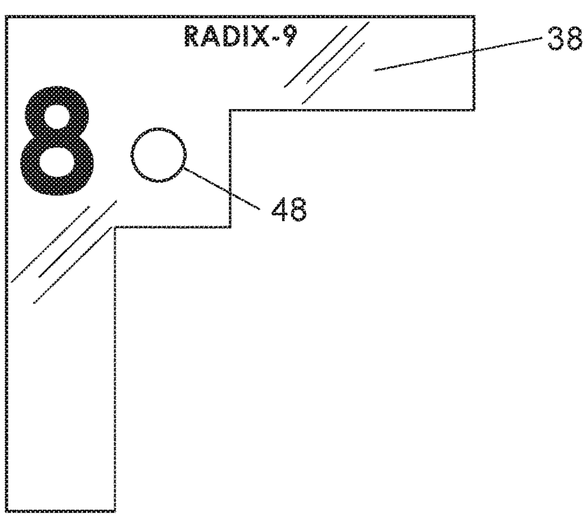
Figure 6I:
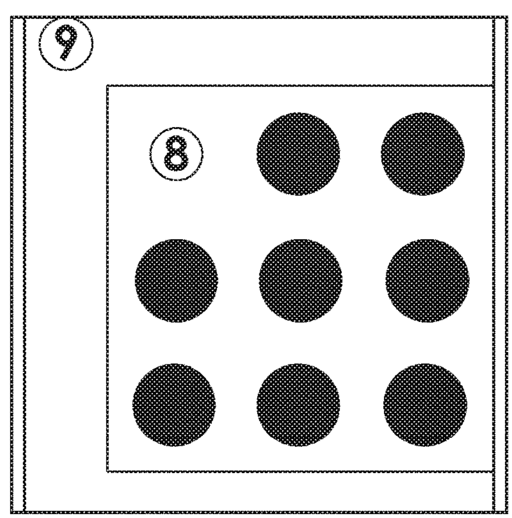
Figure 6J:
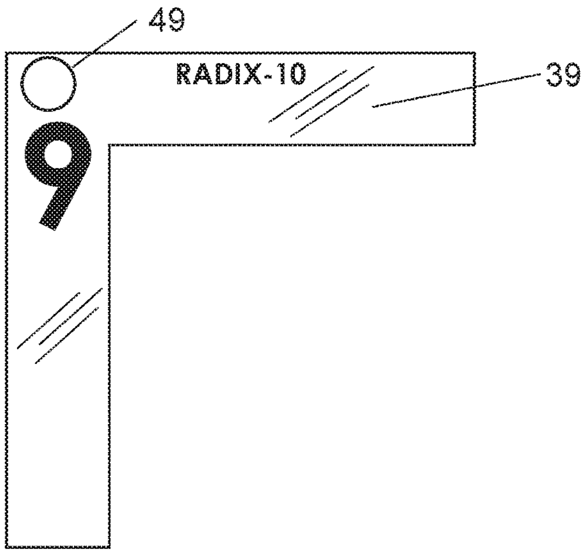
Figure 6J:
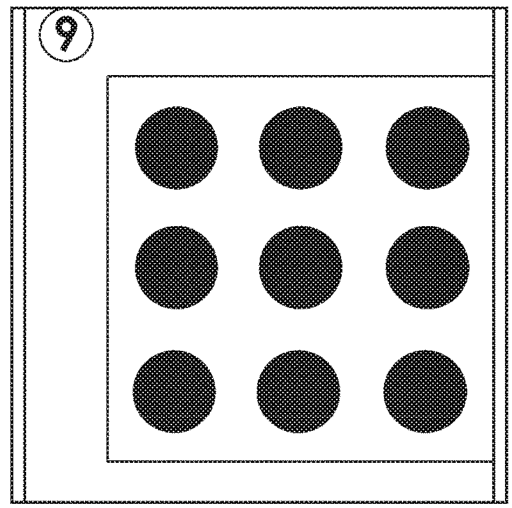
Figure 6K:
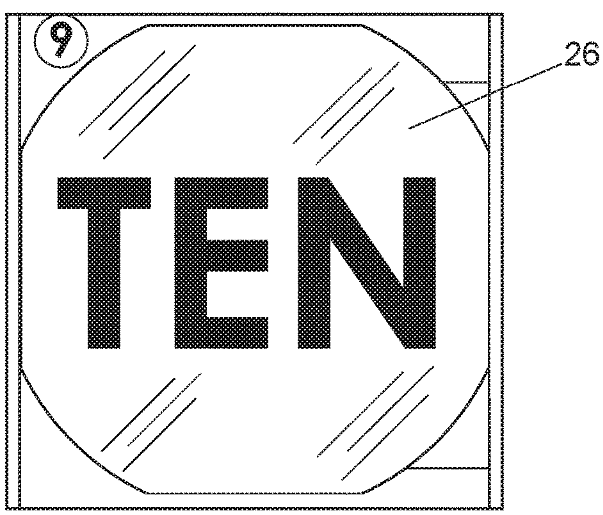
Figure 6K:
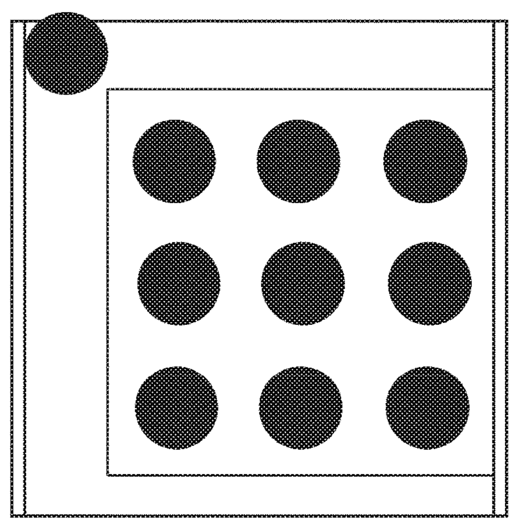
Figure 7:
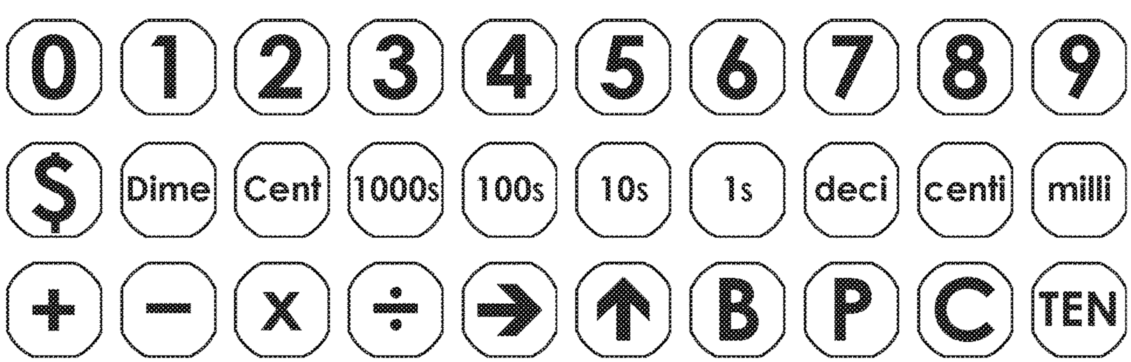
FIG. 7: Examples of typographic symbols on a typical set of chips.

CHIP defined: Chips (26) are preferably disc-shaped objects that preferably are contoured or have edges which enable them to be fixed in location across a tessellation of interconnected tiles or more simply on a single tile, as depicted in FIG. 6K. Chips comprise a mathematical toolset as depicted in FIG. 7. Chips are characterized, and may be distinguished one from the other, by any combination of and any distribution over the extents of their embodiments, via the following features: (a) size, shape, including one or more cut-out holes, drop-through cavities and dimples, as well as plasticity and remoldability, (b) color and color patterning, including typographic symbols and glyphs, (c) material, (d) texture, (e) electro-sensitive properties, (f) non-passive sound and light emitting properties, including the indication of changes resulting from chip movement, positioning, orientation and proximity to or overlying one or more beads, or overlying another chip, (g) magnetic properties, (h) sonic properties, and (i) all known and yet to be discovered properties and sensor means that permit tracking of chip movement, including the movement of chips into out-of-bounds regions, the confirmation of correct and incorrect chip placement, and sensor means capable of discerning said chip's proximity to one or more beads, tiles, bridging tiles, stencils and other chips. Furthermore, chips are not limited to a top-side with a single-use purpose, but can be flipped and thereby take on dual purposes. Chips include chip-icons reproduced on computer-proctored display devices and other reprographic analogues, whereby said chip-icons aim to emulate physical chips, as characterized by (a) through (i) above. While not essential to the unadorned embodiment of a chip, all chip manifestations may transmit and receive broadcast signals. For example, the use of chips reduces the chance of error during bead-on-tile processing, enhances an understanding of the process under study, as well as creating a stepping stone from a pure bead-on-tile representation to typographic representation.

Figure 4:
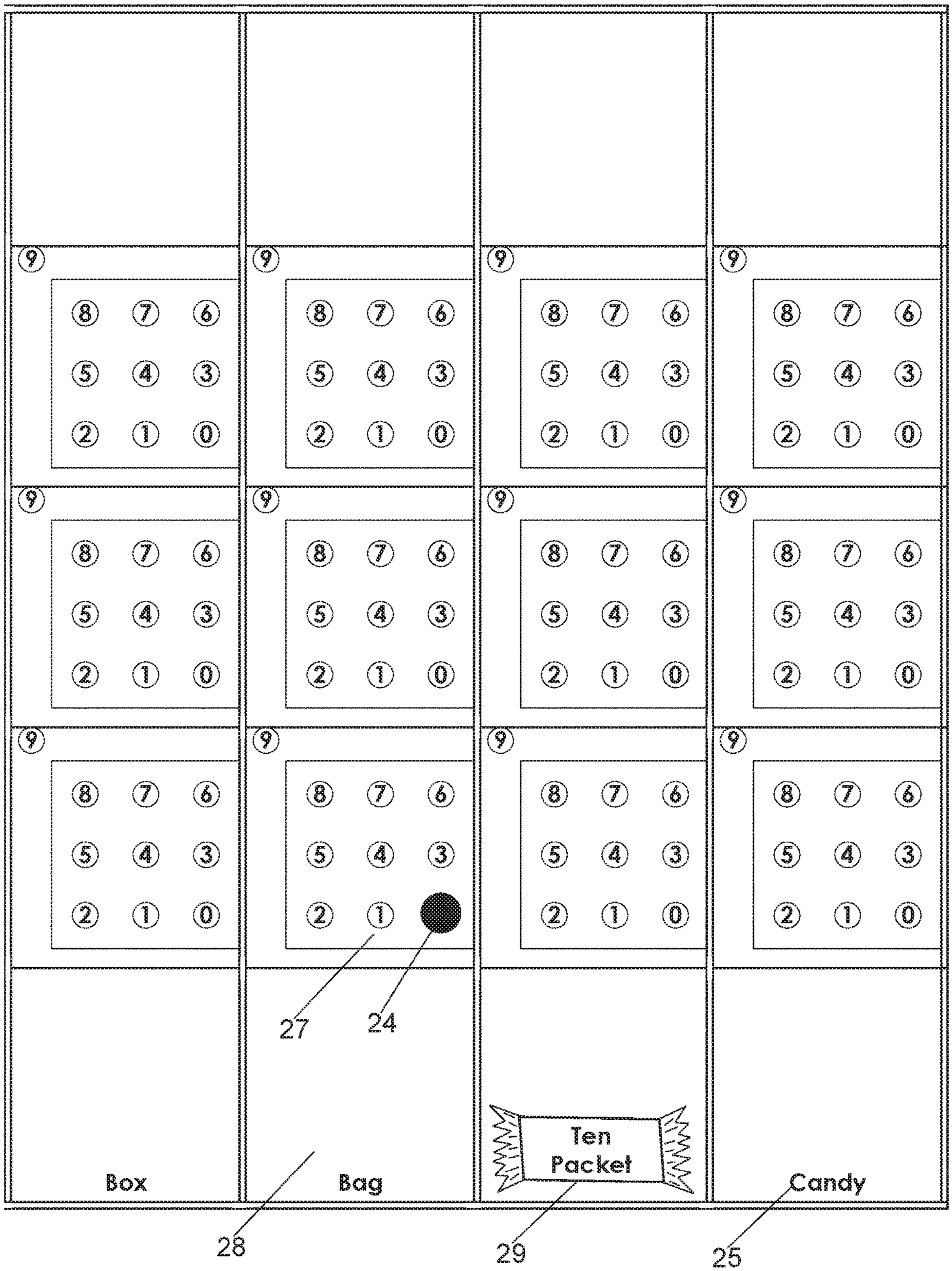
FIG. 4: Candy Board comprising three rows of Digit-Squares, with top and bottom trays.
Figure 8A:
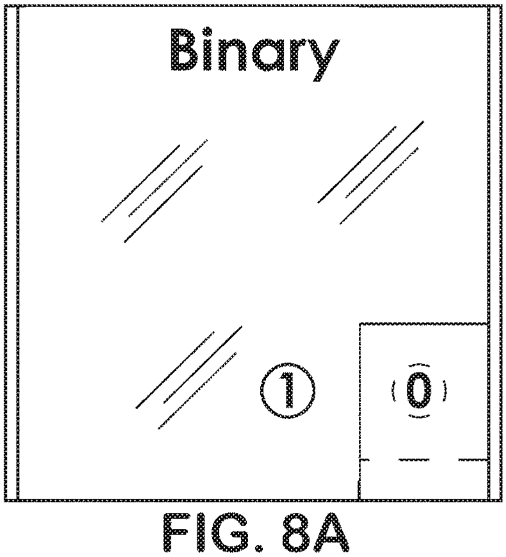
FIGS. 8A to 8E: Modification means for radix 2, 8, 12, 16 and 60 arithmetic.
Figure 8B:
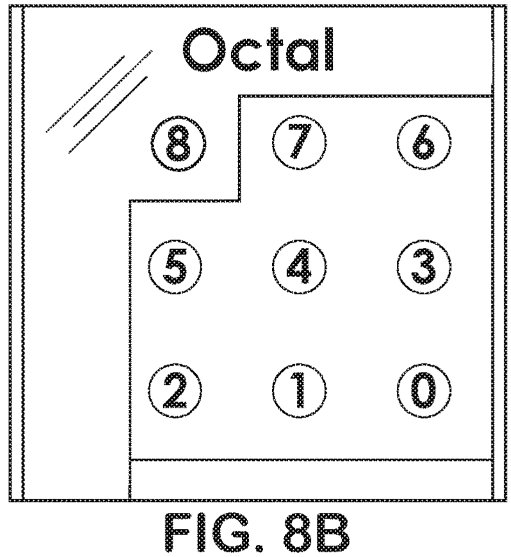
Figure 8C:
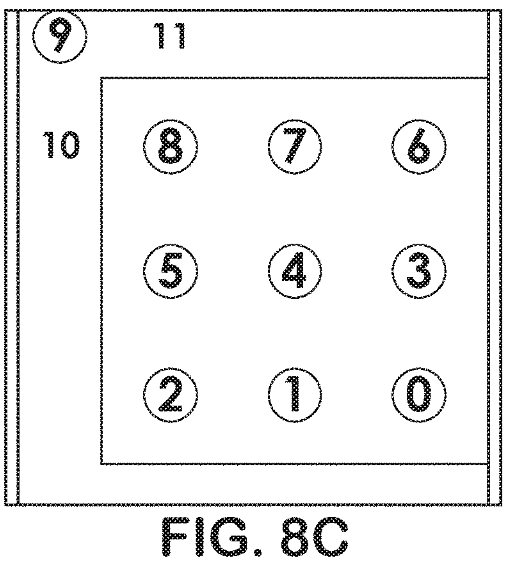
Figure 8D:
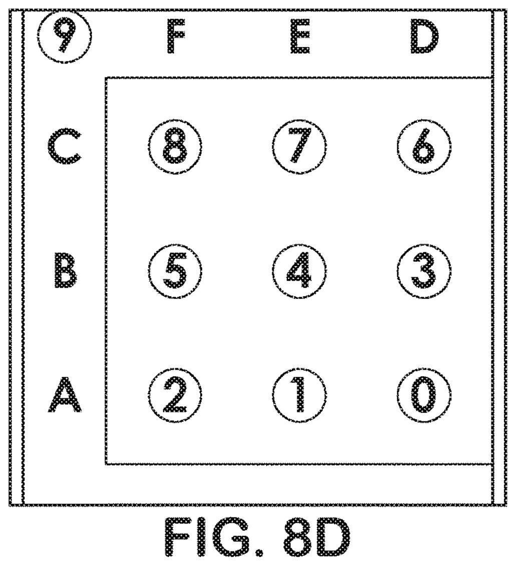
Figure 8E:
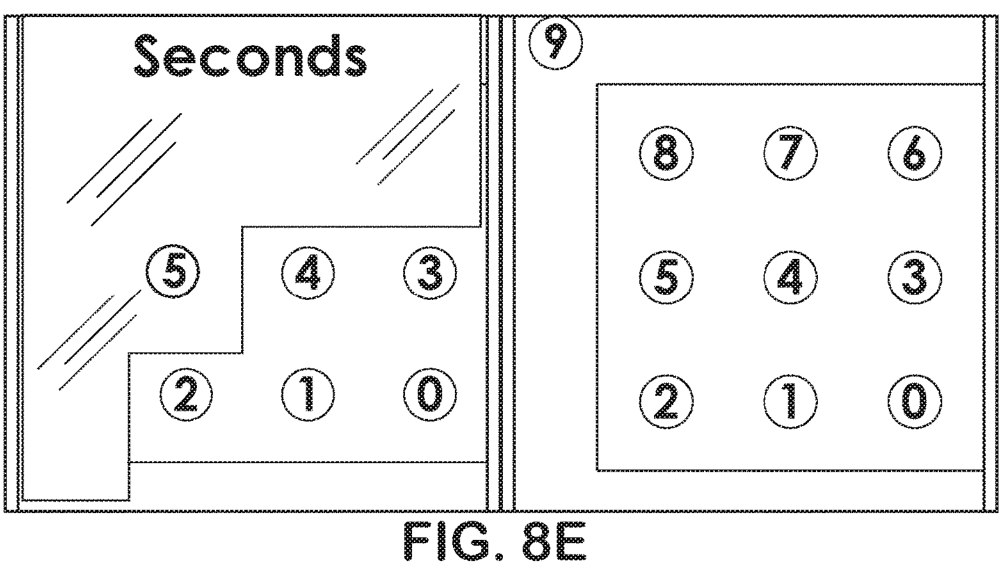
Figure 9A:
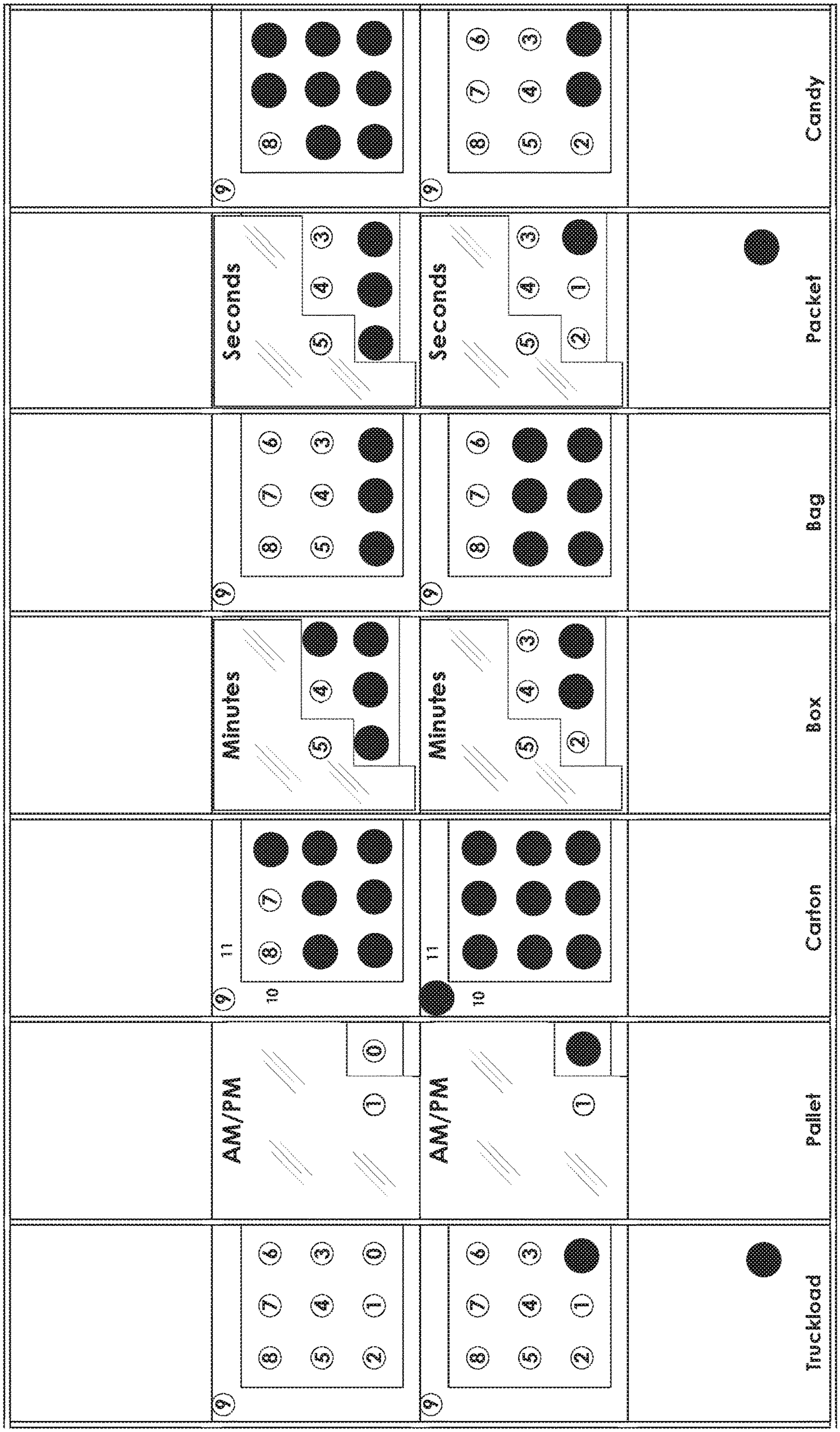
FIGS. 9A, 9B: Mixed-radix day:hour:min:sec clock tessellation on the Candy Board, worked example.
Figure 9B:
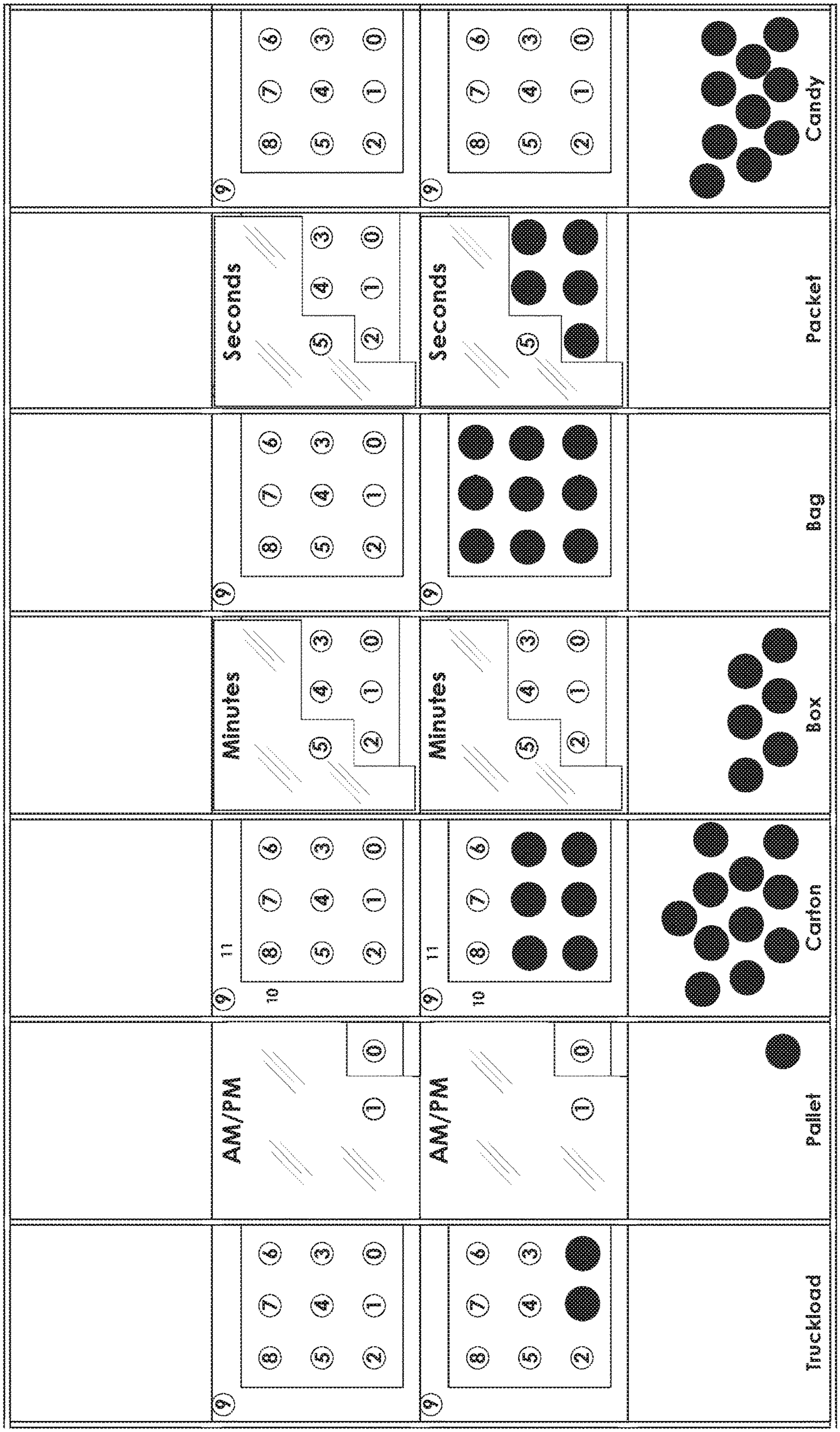
Figure 10A:
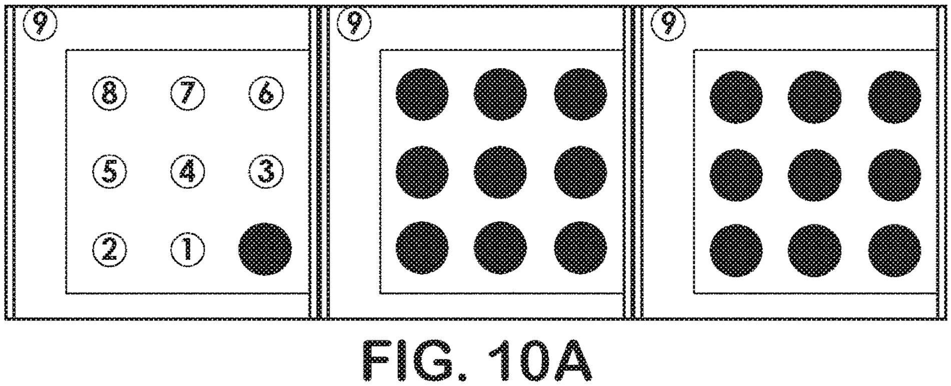
FIGS. 10A to 10D: Plosive-state equilibration normalizing plosive-state TENs into canonical form, worked example.
Figure 10B:
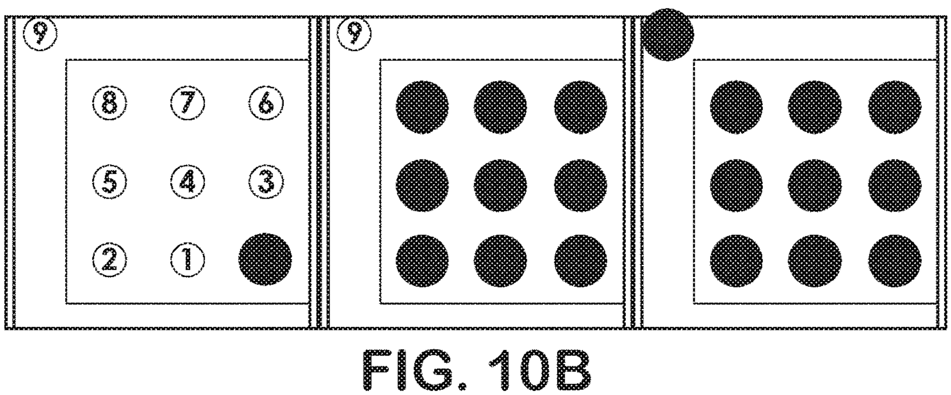
Figure 10C:
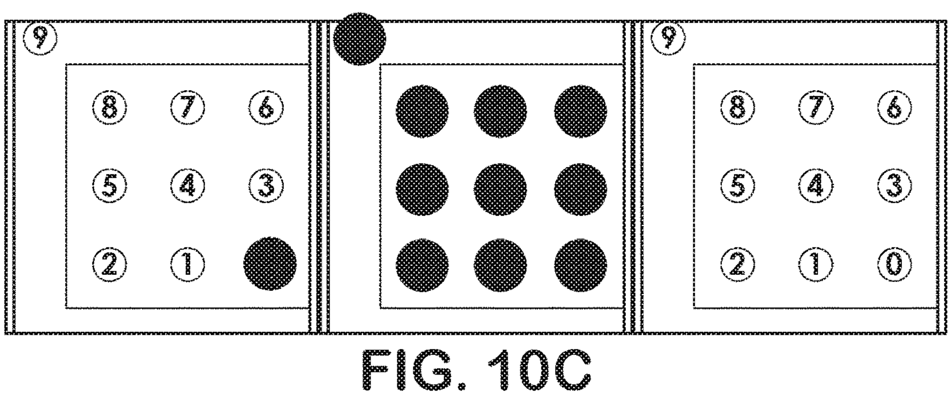
Figure 10D:
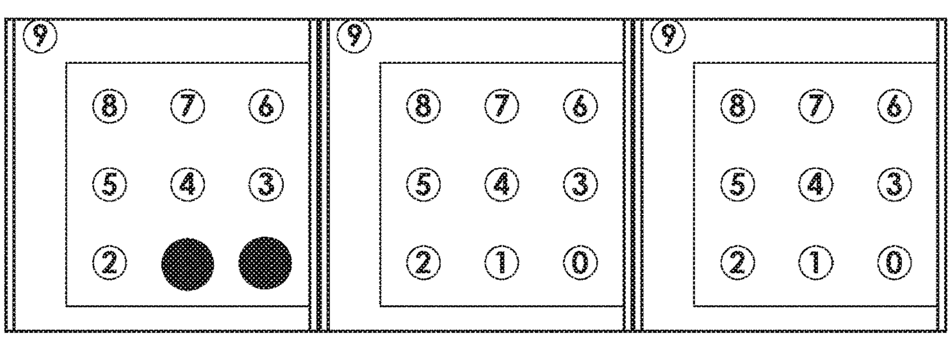

STENCH, defined: Stencils (30 . . . 39) are preferably rigid sheets, which conform to some restricted region of a tile or a tessellation of interconnected tiles, as depicted in FIGS. 6A through 6J. Preferably, the perimeter edges of said stencil in conjunction with any underlying contoured mold-image conforming to the contours of the one or more tiles, atop which said stencil is placed, shall enable said stencil to be unambiguously located within said tile or across a tessellation of interconnected tiles, as the case maybe. Stencils are characterized, and may be distinguished one from the other, by any combination of and any distribution over the extents of their embodiments, via, the following features: (a) size, shape, including one or more cut-out holes (40 . . . 49), drop-through cavities and dimples within their extents, (b) color and color patterning, including typographic symbols and glyphs, (c) material, (d) texture, (e) electro-sensitive properties, (f) non-passive sound and light emitting properties, including the indication of changes resulting from stencil movement, positioning, orientation and proximity to or overlying one or more tiles or bridging tiles, one or more beads, or overlying another stencil or chip, (g) magnetic properties, (h) sonic properties, and (i) all known and yet to be discovered properties and sensor means that permit tracking of stencil movement, including the movement of stencils into out-of-bounds regions, the confirmation of correct and incorrect stencil placement, and sensor means capable of discerning said stencil's proximity to one or more other stencils, beads, tiles, bridging tiles and chips. Furthermore, stencils are not limited to a top-side with a single-use purpose, but may be flipped and thereby take on dual purposes. Stencils include stencil-icons reproduced on computer-proctored display devices and other reprographic analogues, whereby said stencil-icons aim to emulate physical stencils, as characterized by (a) through (i) above. While not essential to the unadorned embodiment of a stencil, all stencil manifestations may transmit and receive broadcast signals. By way of example, stencils reduce the chance of initial setup error when a young child places beads on the tile. For constraint usage, a stencil can be used to constrain what bead states are allowable on the tile, such as choking the bead-state scope of a radix-10 Digit-Square to behave like radix-2 and radix-8, as depicted in FIGS. 8A and 8B respectively. Decal stencils (25) and (29) can be affixed to trays to make nomenclature more flexible, as depicted in FIG. 4. Decals affixed to radix-10 Digit-Squares can create kludges for radix-12, as depicted in FIG. 8C via the decals "10" and "11", and radix-16 forms, as depicted in FIG. 8D via the decals "A" through "F". A plurality Digit-Square subassembly can be configured with a stencil to create a radix-60 form, as depicted in FIG. 8E. and in a schema of tessellation a Candy Board clock, as depicted in FIGS. 9A and 9B, on which calculations can be performed.

PLOSIVE-STATE defined. A plosive-state is an operation-lock-up state that may occur during an operation on the focus tile, and in an alternate embodiment, on the multi-state focus bit, i.e. a "mit," in a plosive-state enabled, multi-state computer. A plosive-state causes the operation on the focus tile or mit to lock-up, which prevents said operation-in-progress from executing further. For example, during addition of beads onto the focus tile, a TEN state, as depicted in FIG. 6KK, is a plosive-state, which blockades the use of both the horizontal and vertical tile channels to slide additional beads onto the tile, and thereby locks-up further addition on the tile. Before said addition operation can continue said focus tile must be equilibrated, as covered in the detailed descriptions and the claims. Similarly, during subtraction, a "0" state, as depicted in FIG. 6AA, is a plosive-state which locks-up further subtraction because no beads remain to be subtracted.

PLOSIVE-STATE EQUILIBRATION defined. Plosive-state equilibration is the process of resolving operation-in-progress lock-up conditions, and such resolution is dependant on the particular schema of tessellation, the particular focus tile on which the lock-up has occurred, the particular plosive-state and the particular operation-in-progress. For example, during an addition operation when a plosive-state TEN lock-up occurs on a radix-10 focus tile, the process of equilibration under addition-in-progress ripples into a co-ordinate tile one rank of higher order of magnitude, by Western conventions on the leftside edge of the focus tile. Additive ripple increments the bead count of said co-ordinate tile. Mathematicians call this "Carry". In the parlance of children playing a Game of Candy, equilibration under addition causes a "Packaging" operation to reset the state of the focus tile from the plosive-state TEN, where ten candies await packaging, to its plosive-state conjugate "0". Similarly, during radix-10 subtraction, when the plosive-state "0" lock-up occurs in the focus tile, equilibration ripples into a co-ordinate tile one rank of higher order of magnitude. Subtractive ripple decrements the bead count of said co-ordinate tile. Children relate to this as "Unpackaging," which notionally tears open a packet of candy and creates in the focus tile a bead state of TEN unpackaged beads, the plosive-state conjugate to "0".

DETAILED DESCRIPTION

The invention's target users are children aged three and above. When combined with a need for rigor, this makes the kid-friendly description of the invention lengthy.

Lesson #1, The Stencil Game

The first concepts young children must acquire about bead patterns come by way of the bead pattern Stencil system of FIGS. 6A through 6J, as depicted along the left-hand margin of the drawings. To reinforce typographic numeric symbols, each Stencil bears its corresponding digit glyph/name in the relevant language.

The bead pattern Stencil system enforces a correct understanding of what the bead sites on a Digit-Square represent, how beads correlate to count and number, and how the sites are populated with the correct order of beads from bottom right to top left, and produce valid bead patterns on the Digit-Square, as depicted in FIGS. 6AA through 6JJ along the right-hand margin of the drawings. The TEN bead pattern, as depicted in FIG. 6KK, requires no stencil because the Digit-Square itself unambiguously furnishes the pattern.

The first game involves cycling through the stencils in count sequence on a single Digit-Square. The parent shows the child the sequence of bead sites starting at the lower right corner, moving leftwards, and upwards in ascending order. Insert the "1" Stencil and take a candy from the Tray and socket it into the "0" bead site, and speak aloud "Fill zero and you have one." Proceed with the Stencil for "2" by placing it into the Digit-Square and take a second candy from the Tray and socket it into the "1" bead site, and speak aloud "Fill one and you have two." and so on, all the way to the TEN pattern, as depicted in FIG. 6KK, and speak aloud "Fill nine and you have ten. All done." Take note that depending on the child's age, the cycle can be short, i.e. zero to three rather than all the way to ten. If teaching toddlers, let the child graduate into the higher digits on higher rows. The focus is on harnessing the child's capacity to subitize 1, 2, 3, then second row, and finally third row.

As the child repeats the game, moving beads one by one from the Tray and socketing them into the Digit-Square using ascending stencil value placement, i.e. "1" Stencil, "2" Stencil, and so forth, he acquires (a) the typographic number symbol, (b) an escalating bead count, (c) placement in the correct bead site, and (d) the overall bead pattern on the Candy Board. This process regiments a child's capacity to subitize three candies in a row and thereafter super-subitize one, two and three rows of bead patterns all the way to nine. The TEN pattern auto-subitizes because the Digit-Square is saturated. The means of communicating with toddlers is: first the pattern, next the pattern embeds as a subitized unity, and finally, the actual numeric count becomes embedded in due course. Digits correlate at-a-glance with a symbol "5", and the spoken word "five," which a child sees at a glance as the 3,2 bead pattern, as depicted in FIG. 6FF.

Even if the toddler is too young to speak unerringly, by finger movement of candy alone, he can master the task of bead placement in the proper order to create the corresponding pattern, as he progresses through the Stencil sequence from "0" to "9", and lastly, TEN.

Once the child masters a single Digit-Square, next comes the Game of Setup the Candy Board, where the child sets up values on multiple Digit-Squares joined side by side in what is explained to the child as the Bag, Packet and Candy ranking system. Proper language is vital so that learning via acquisition takes root. In due course, a three digit glyph sequence "243" takes on the meaning "2 Bags, 4 Packets, 3 Candies," something relatable to children because that is what "243" represents in real life, not abstractions like hundreds, tens and ones. Abstraction comes later, as the child's brain matures.

Figure 5:
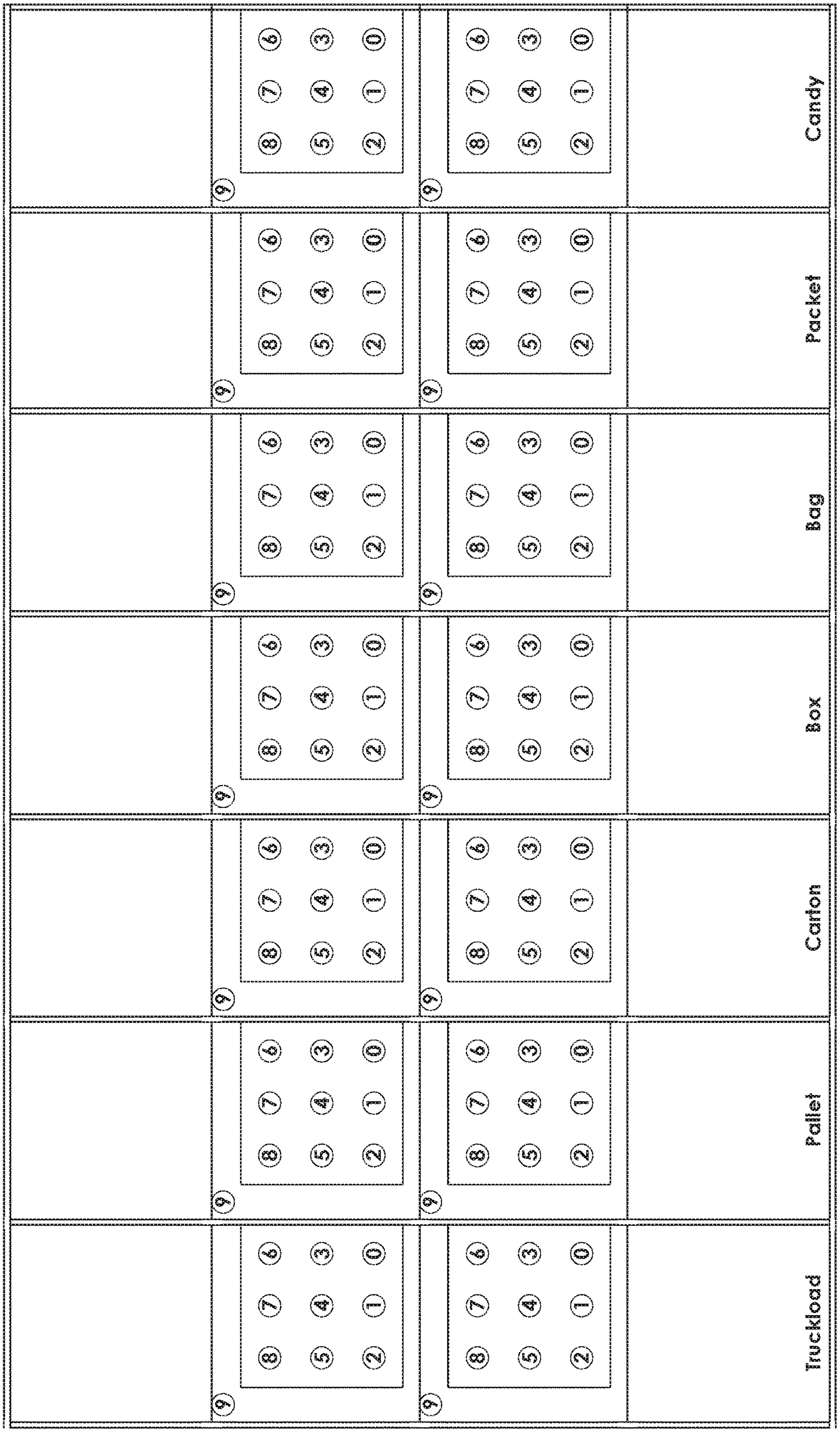
FIG. 5: Candy Board comprising two rows of Digit-Squares, with top and bottom trays.

The final task of Lesson #1 uses a two-row multi-rank Candy Board, as depicted in FIG. 5, where the child can set up numbers in both rows. As an adjunct exercise, going from left to right, the child should be asked to point to which Digit-Square in each rank is larger, the top or bottom. This trains the child in top/bottom Digit-Square comparison, a process necessary for division. Depending on the child's maturity, an excursion into Lesson #8, Introducing Symbol Chips into Calculations enhances the parent's capacity to communicate written rather than spoken or stencil layouts.

Setting up a two-row Candy Board is the initial task in all Games of Candy involving addition and subtraction, so mastery of this is essential.

Lesson #2, Game of Packaging and Unpackaging

Lesson #2 has two purposes. Demonstrate how each rank presents a higher containment of candy, namely candy, packets, bags and boxes, and how each correlate one to the other. More importantly, Lesson #2 details how the plosive-state equilibration method resolves lock-up conditions under various mathematical operations on the Candy Board. Take note that the plosive-state equilibration aspect of Lesson #2 can be deferred and Lesson #3 and #4 addition can proceed as long as the summations do not create a plosive-state lock-up condition, i.e. carry. Similarly, Lesson #6 subtraction can also be played as long as the numbers do not create a plosive-state lock-up condition, i.e. borrow.

Because candy comes in boxes, bags, packets and individual pieces, candy inside real-life packaging is the simplest vehicle to describe the rank-wise denumeration of candy in conjunction with the process of Packaging and Unpackaging.

Figure 14A:
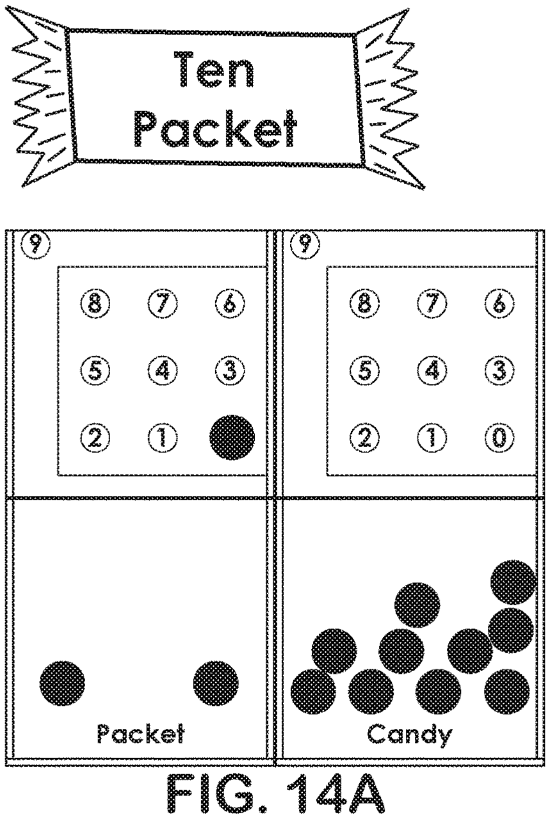
FIGS. 14A to 14H: Lesson #2. Packaging and Unpackaging, plosive-state equilibration method, worked example.
Figure 14B:
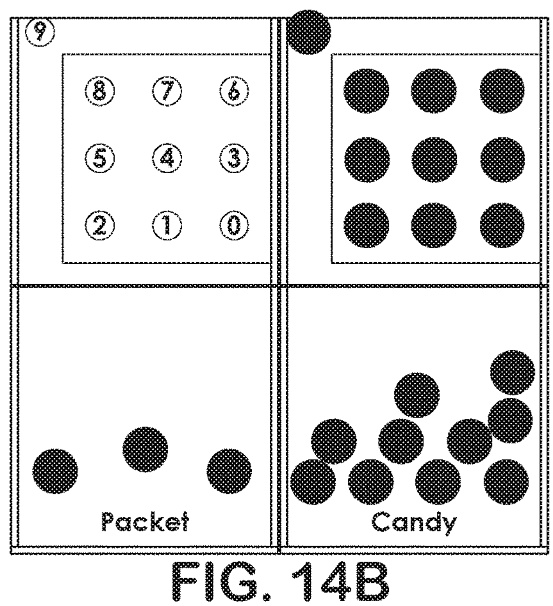

The storyline starts with one packet of ten candies above the Packet-Rank Digit-Square and one bead socketed into the "0" bead site of the Packet-Rank Digit-Square, as depicted in FIG. 14A. The parent picks up the packet and explains, "This is one packet with ten candies inside. I am now opening the packet and unpackaging the candy." The parent conspicuously slides the bead in the Packet-Rank Digit-Square back into the Tray indicating a "0" packet value then opens the physical packet and pours the ten candies onto the Candy-Rank Digit-Square. The parent sockets the ten pieces of candy into the ten bead sites to prove that the packet was full and demonstrates how ten candies now unpackaged corresponds to the TEN bead pattern, as depicted in FIG. 14B.

Figure 14C:
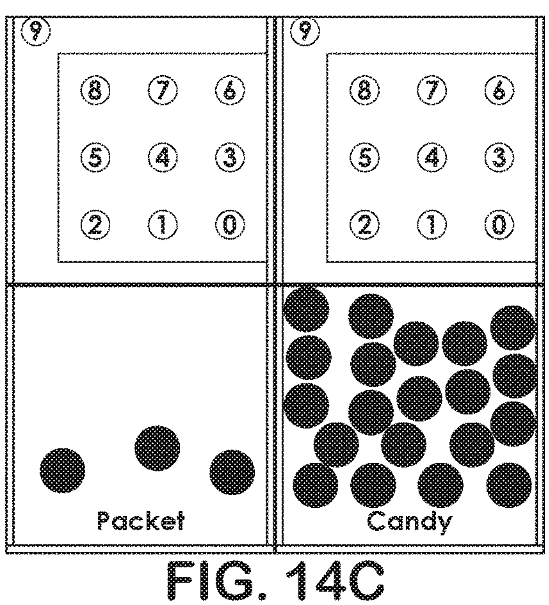

Next, the parent sweeps all the candy into the Tray, so all Digit-Squares are zeroed out, as depicted in FIG. 14C. One by one, the parent slides candy from the Tray into the bead sites of the Candy-Rank Digit-Square in ascending order until the TEN bead pattern saturates the Digit-Square, as depicted in FIG. 14B, thus re-instating the unpackaged candy as before. The TEN plosive-state is what triggers packaging during the process of addition and normalization into canonical form.

Figure 14D:
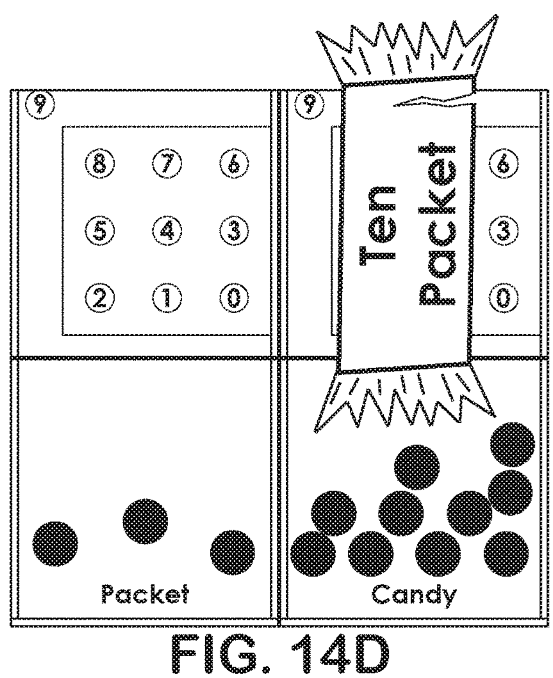

The parent demonstrates the Packaging process by picking up the ten candies, putting them back into the improvised packet opened earlier and places the filled packet in the Candy-Rank Digit-Square but maintains a hold on the packet, as depicted in FIG. 14D. With the other hand, the parent points to a bead in the Packet-Rank Tray and slides the bead over the “0” bead site in the Packet-Rank Digit-Square while simultaneously moving the physical packet from the Candy-Rank and positions it above the Packet-Rank, as depicted in FIG. 14A, thus the game concludes back at its initial condition. The Candy Board now shows the value of 1 Packet, 0 Candy in two ways (a) via the beads in the Digit-Squares, and (b) via one physical packet and zero physical candy.

Figure 14E:
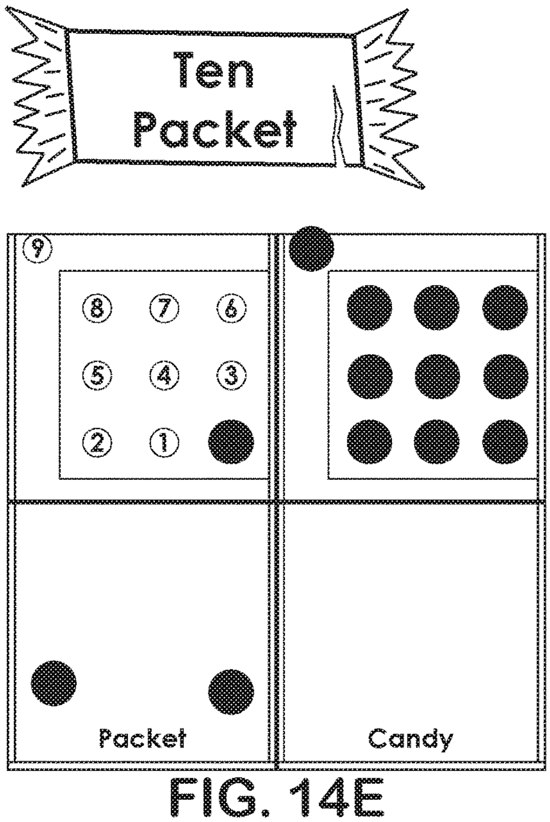

The next game in this lesson proceeds as follows. Focus returns to the Candy-Rank, and the parent slides one candy from the Tray into the “0” bead site in the Candy-Rank Digit-Square. After each candy placement, the parent points to the bead in the Packet-Rank and picking up the improvised packet explains and shakes the packet so the association is clear, and then speaks the number represented on the Candy Board, i.e. 1 Packet, 1 Candy. This is repeated until 1 Packet, TEN Candies, as depicted in FIG. 14E.

Figure 14F:
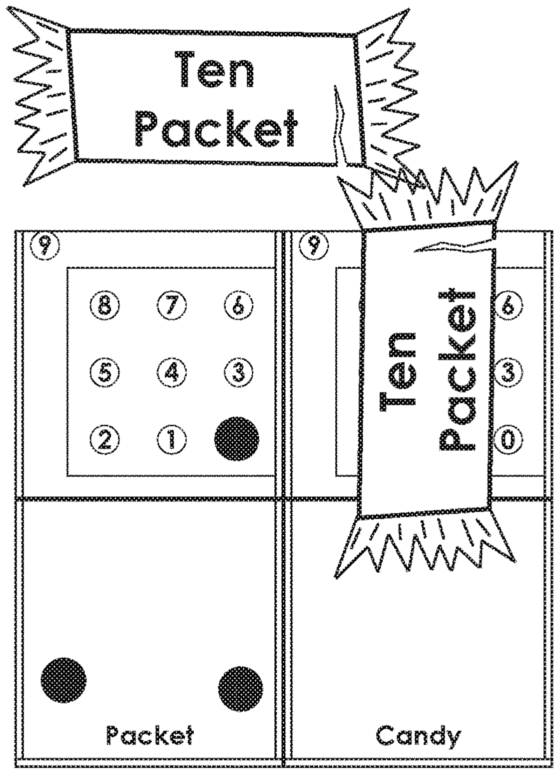
Figure 14G:
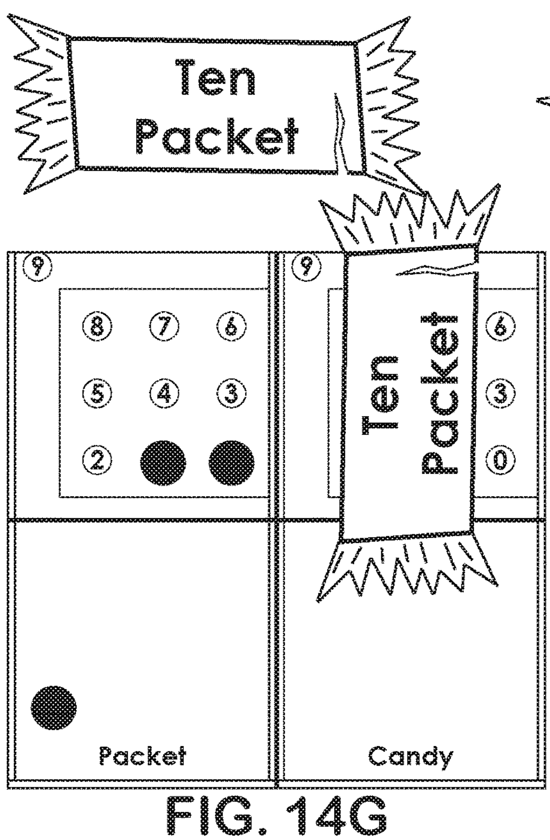
Figure 14H:
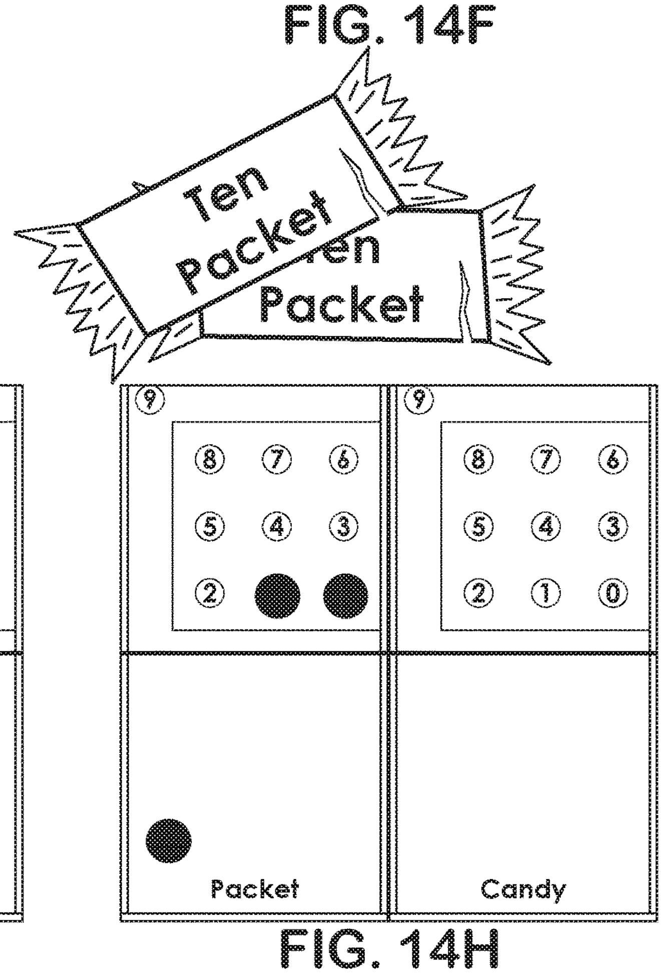

The parent opens a second empty packet, such as a mini ziplock bag, and asks the child to fill the second packet with the ten candies saturating the Candy-Rank Digit-Square. Next, the filled packet is placed on top of the Candy-Rank Digit-Square, as depicted in FIG. 14F. The parent asks the child to show what comes next, which is sliding a second bead from the Packet-Rank Tray and socketing it into the “1” bead site of the Packet-Rank Digit-Square, bringing the packet count to 2 Packets, 0 Candy, as depicted in FIG. 14G. Once this is done, the parent moves the second packet from the Candy-Rank and places it with the first packet. This makes two physical packets and two beads showing in the Packet-Rank Digit-Square, as depicted in FIG. 14H. The child learns how these two Packet-Rank beads act as stand-ins for and represent two physical packets of candy.

This exercise should be repeated one more time so the child understands the process that incrementing to the TEN bead pattern triggers a Packaging operation where all candies are removed from the Candy-Rank Digit-Square, in this case by physical packaging, and one bead in the Packet-Rank is slid into its corresponding next bead site in the Packet-Rank Digit-Square.

Unpackaging arises during subtraction and can only proceed when there are zero beads in the Digit-Square on the right. Hence, sliding a bead from the Digit-Square into the Tray on the left triggers the Unpackaging of ten beads into the Digit-Square on the right, namely zero is the plosive-state that may require equilibration during subtraction operations, and which creates a TEN conjugate state as a result.

Lesson #3, Game of One Digit Addition

Once Lessons #1 and #2 are mastered, the child can launch into the adventure aspect of the Game of Candy, starting with single digit numbers with low values then graduating to larger values that cause Packaging to be triggered.

Figure 15A:
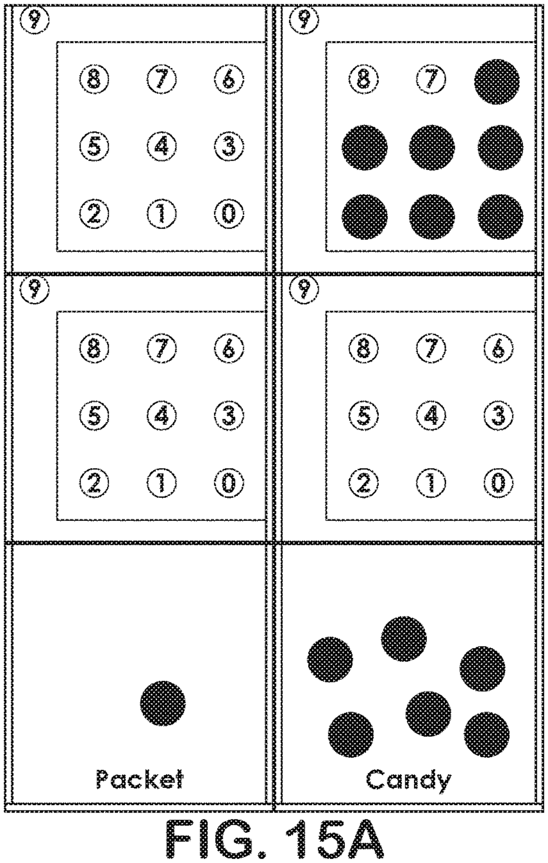
FIGS. 15A to 15H: Lesson #3, Game of Single-Digit Addition, worked example.

Because addition is a binary operation, even on paper, the Game of Addition requires at least two rows of Digit-Squares, as depicted in FIG. 15A. On the Candy Board, addition is simply the process of moving beads in each rank from the Addend row into the same rank in the Result row, i.e. the Accumulator. The most efficient movement of beads is downwards, from an upper row to the adjacent lower row because the upper bead sites of the lower row are directly accessible when sliding beads downward.

Figure 15B:
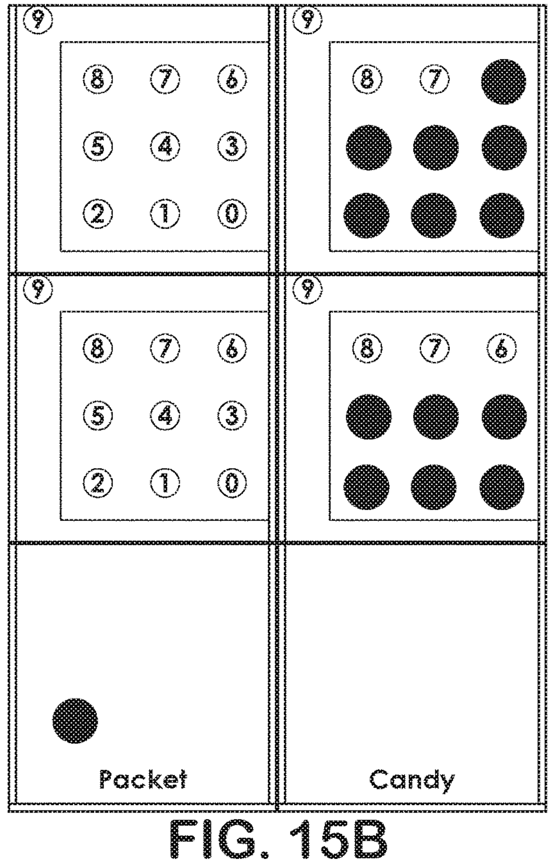

For example, because the process must be relatable to children, a storyline for single digit “7 plus 6” addition with Packaging would proceed as follows. Katie has seven candies for the church and they are located on the top row, i.e. Addend, as depicted in FIG. 15A. Mommy gives six candies to Tommy for the church. The child performs the storyline by moving six candies into the bottom row which represents Tommy’s contribution, creating a two row Candy Board now setup for addition, as depicted in FIG. 15B. Katie and Tommy get together and decide to pool their candy and make a single packet donation to the church because that is a more germ-free method of packaging food.

Figure 15C:
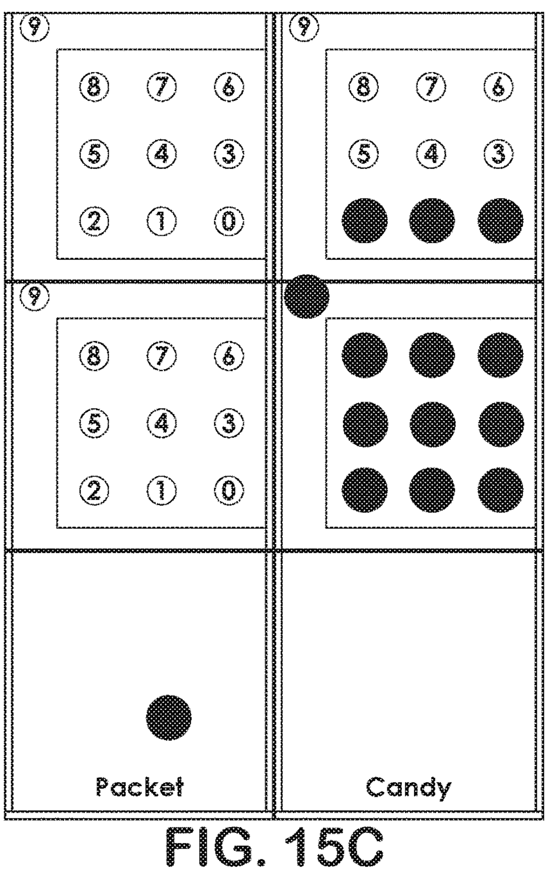
Figure 15D:
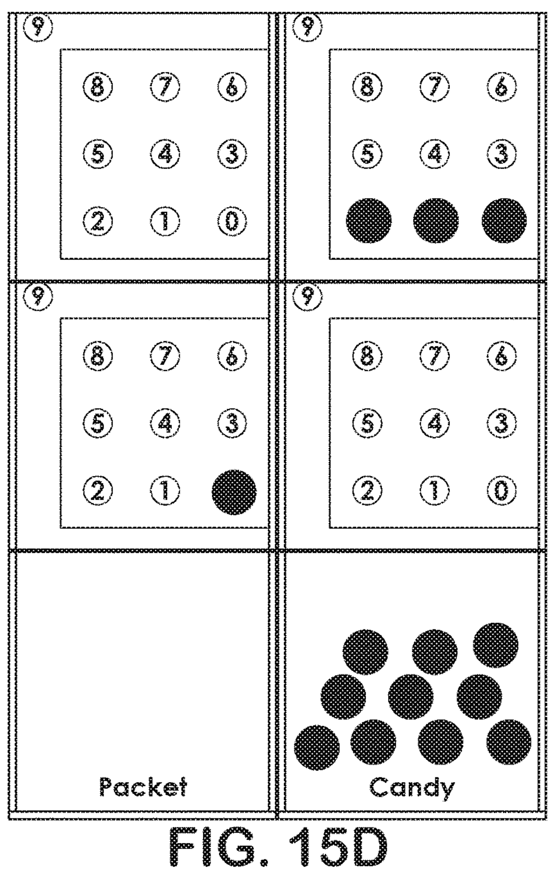
Figure 15E:
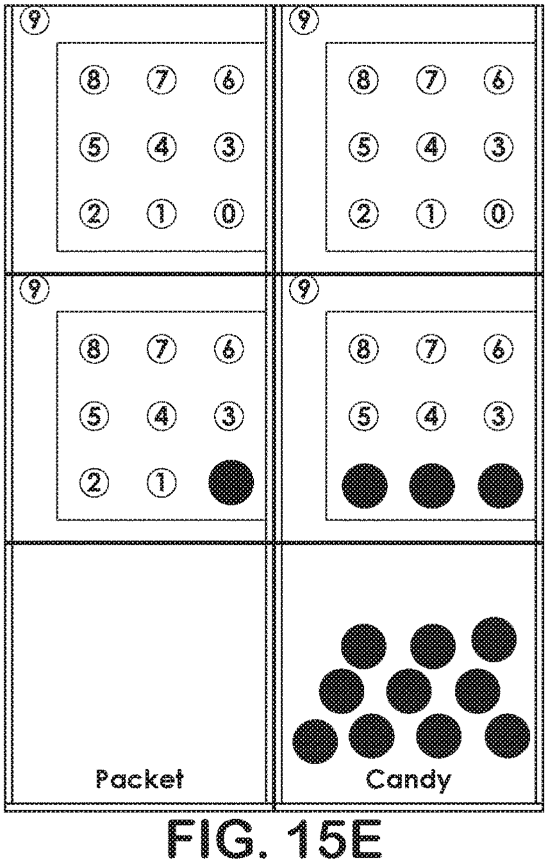

The parent then demonstrates how to create the packet via a process called Addition and Packaging. Starting with the candy on the “6” bead site, to the immediate right of the visible “7” bead site on the top row, one by one, the candy is added to Tommy’s candy in the bottom row. Finally, the candy on the “3” bead site in the top row is slid down to the unoccupied “9” bead site in the bottom row, which forms a plosive-state TEN bead pattern, as depicted in FIG. 15C. A Packaging operation must be performed before addition resumes. The ten candies in the bottom row get swept into the Tray and one bead in the Packet-Rank is slid out of the Tray and socketed into the “0” bead site of the Packet-Rank Digit-Square in the bottom row as depicted in FIG. 15D. This leaves three candies in the top row, which get transferred into the bottom row, as depicted in FIG. 15E. Thus, Katie and Tommy donate 1 Packet, 3 Candies to Reverend Michaels.

Figure 15F:
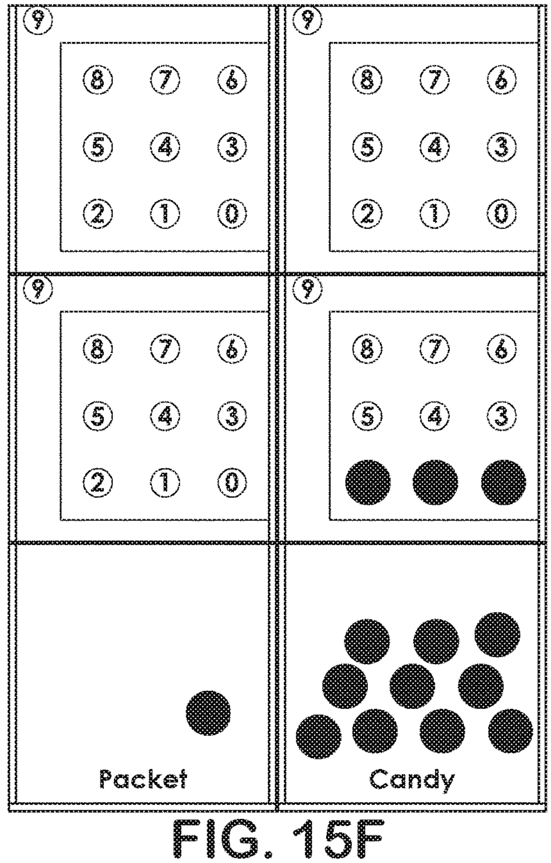
Figure 15G:
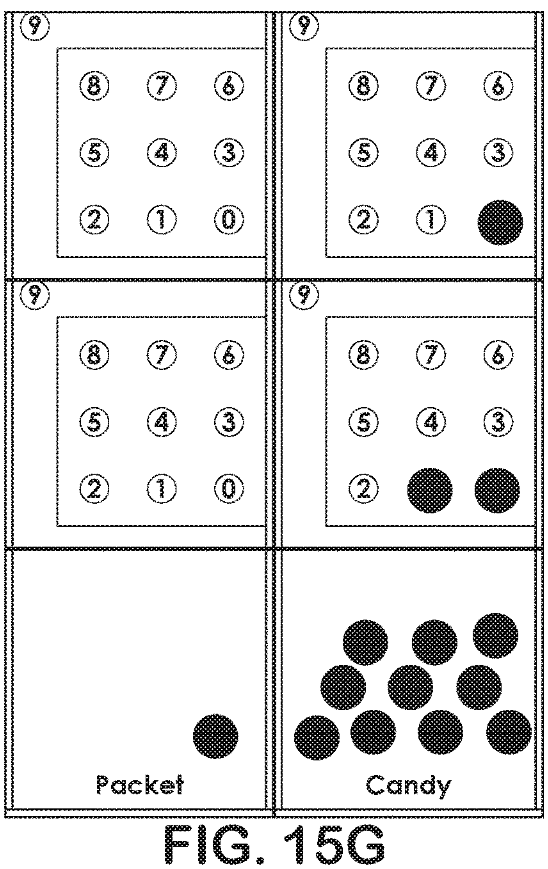
Figure 15H:
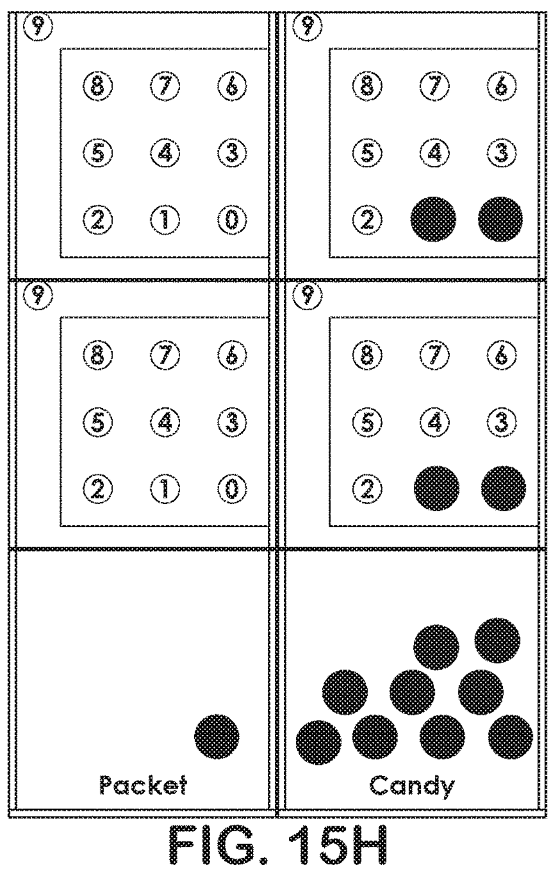

Reverend Michaels thanks the children, and tells them that the three Candies are their reward for their charity, which they must share together, as depicted in FIG. 15F. At this point, the parent slides one candy in the Candy-Rank from the bottom row back into the top row and into the “0” bead site, as depicted in FIG. 15G. The parent slides the other candy halfway and asks the young child to solve the problem of how can Katie and Tommy share this one candy. After the child posits some ideas, Reverend Michaels steps into the picture and gives the children a gift of one candy, so the candy in play is moved into the top row occupying the “1” bead site, and the extra church gift candy is slid from the Tray into the “1” bead site on the bottom row, as depicted in FIG. 15H. This way Katie and Tommy have two Candies each.

Thus, the storyline concludes with a two-candy reward for the child, too. Such rewards turn stories into candy motivated adventures, and where arithmetic is an auto-acquired dividend.

Lesson #4, Game of Adding Up a List of Numbers

Technically, the addition process can proceed in any piecemeal Digit-Square order, the only essential requirement is that every bead in the Addend row must be moved down to the Result row until the Addend row is completely zeroed out. However, the most efficient process of addition mimics the traditional addition process of pencil-on-paper arithmetic where Packaging performs "carry," and the digits in the result reveal their final values in the customary leftward sequence ones, tens, hundreds and so on, in their normalized canonical form.

The traditional approach for adding up one or more numbers in a list on the Candy Board executes as follows.

Step (A): Setup the first number on the list in the Results row, i.e. bottom row.

Step (B): If all numbers in the list are exhausted, addition is complete and the Result row contains the answer, so stop. Otherwise, setup up the next number on the list on the Addend row, i.e. top row. Set the focus of addition on the Candy-rank, i.e. the rightmost rank.

Step (C): Move all the beads in the Addend Digit-Square on the focus rank into the Result Digit-Square being sure to perform a Packaging operation whenever it is triggered.

Step (D): If the Addend row is completely devoid of beads, go to Step (B). Otherwise move the focus left one rank and go to Step (C).

Figure 16A:
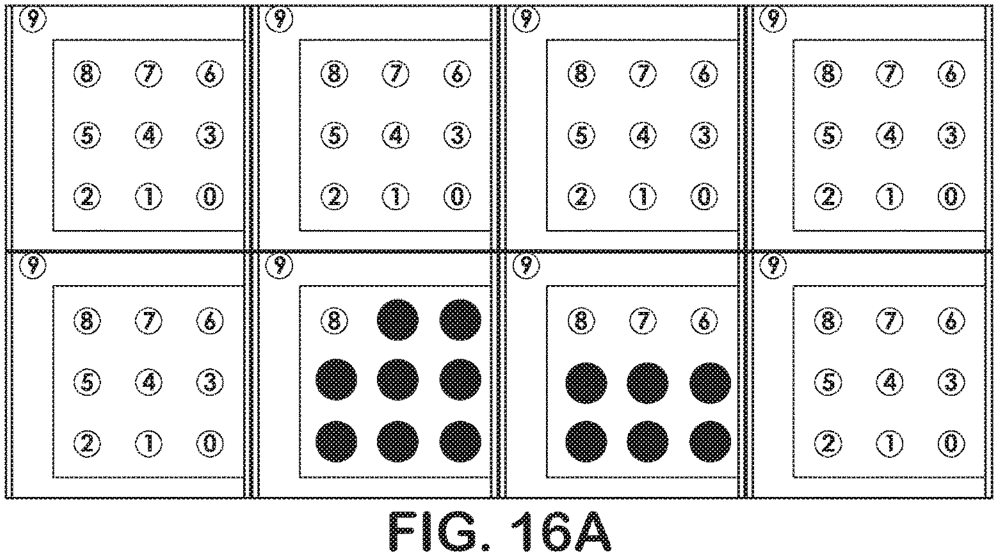
FIGS. 16A to 16I: Lesson #4. Game of Multi-Digit Addition, worked example.
Figure 16B:
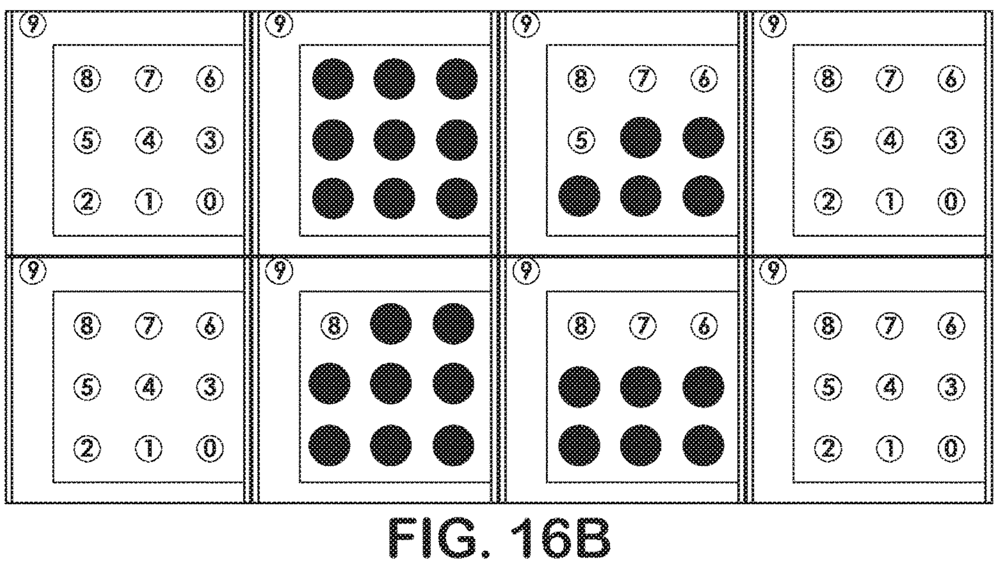
Figure 16C:
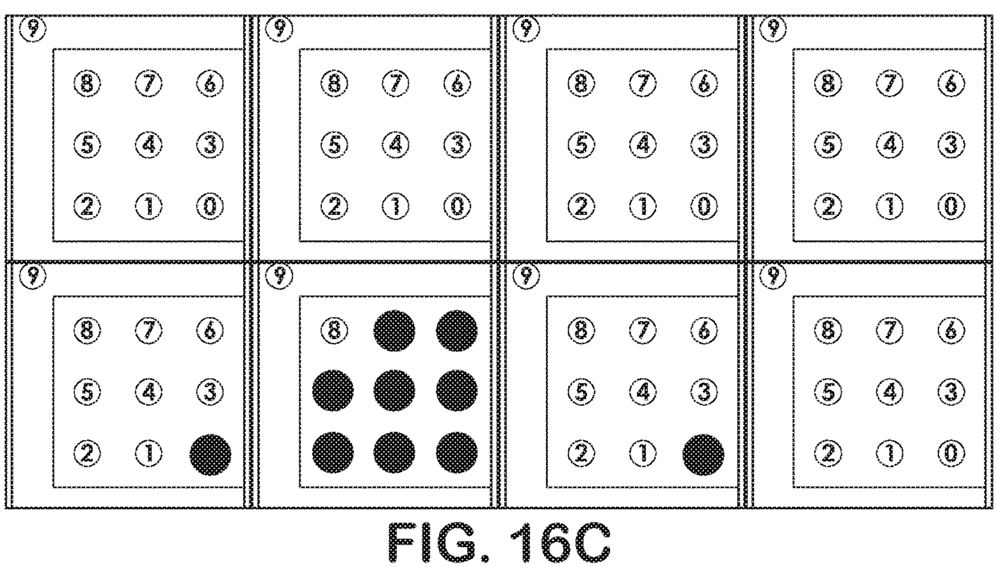
Figure 16D:
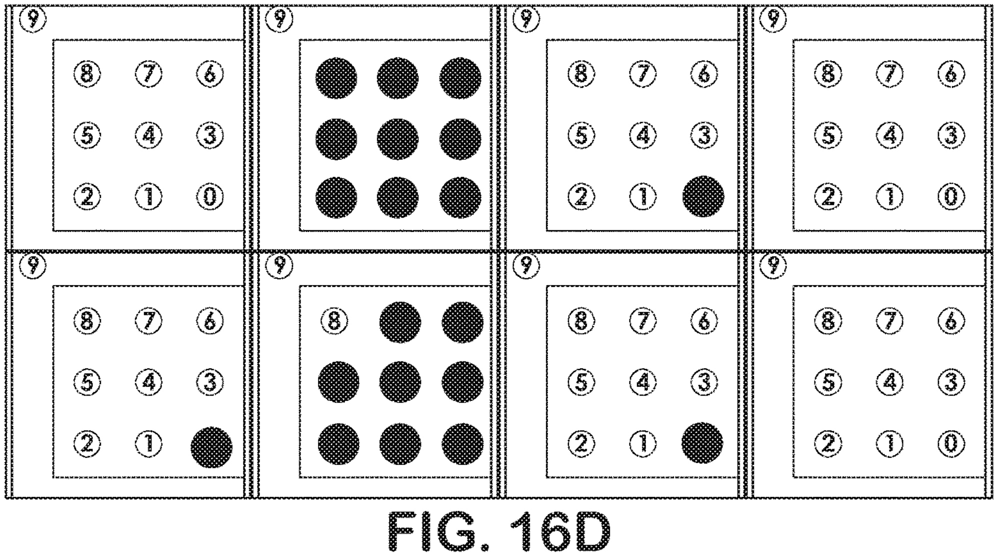
Figure 16E:
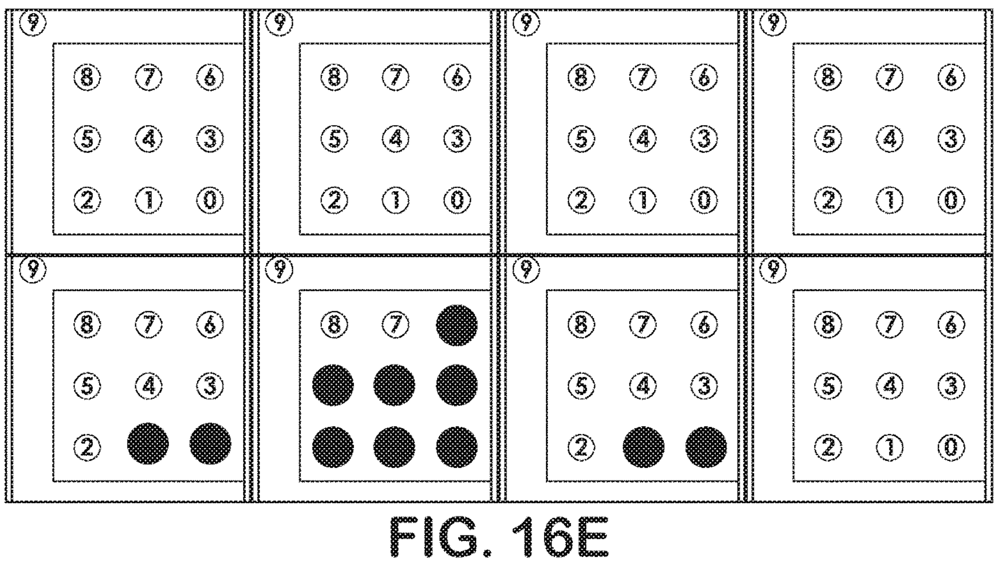
Figure 16F:
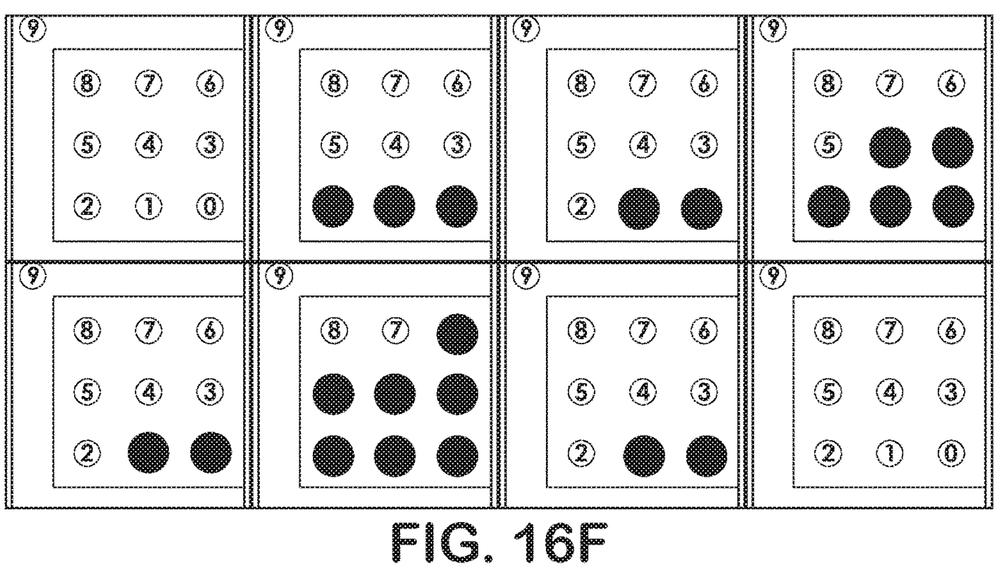
Figure 16G:
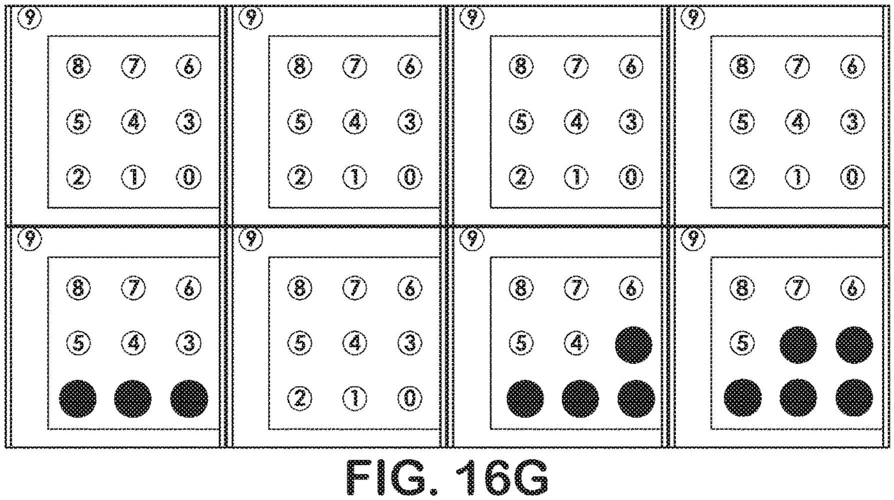
Figure 16H:
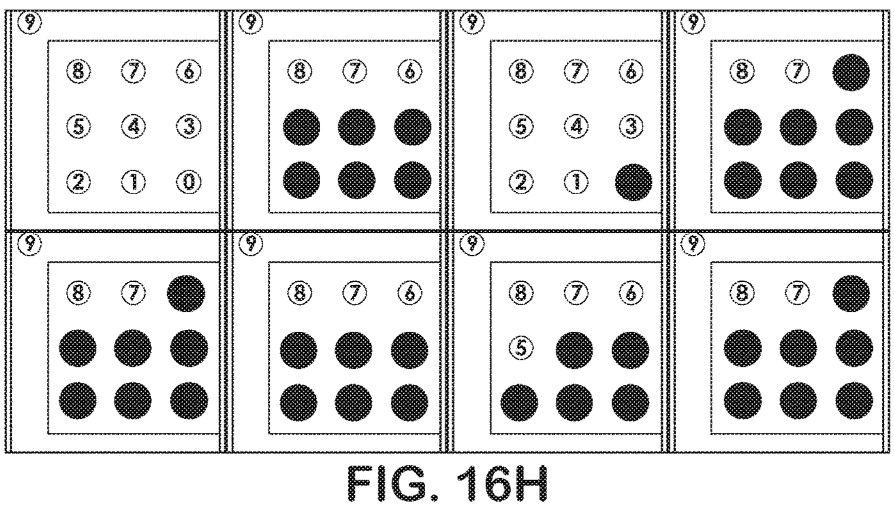
Figure 16I:
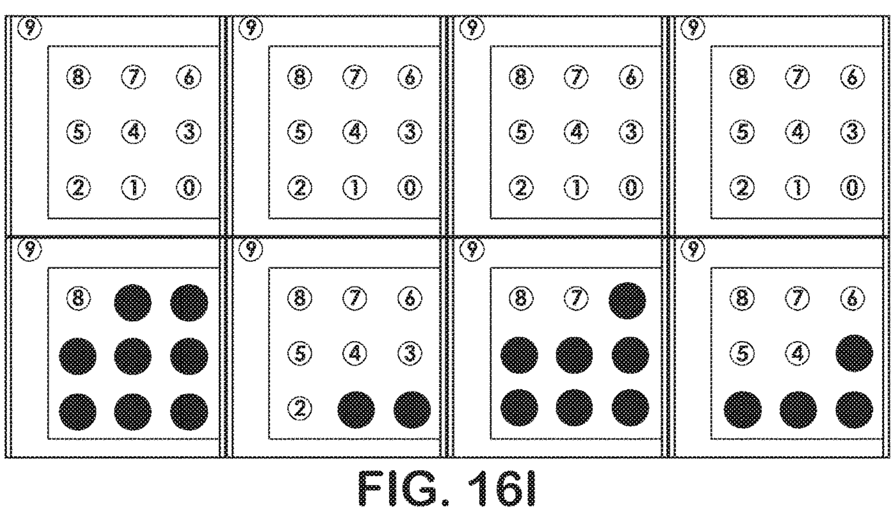

Atypical storyline is as follows. Each year on the day after Christmas, the Church hands-out all the candy accumulated in the Church pantry over the preceding twelve months. In January, the parishioners donate a combined amount of 8 Bags, 6 Packets. This number is setup in the bottom row, as depicted in FIG. 16A. In February, total donations come to 9 Bags, 5 Packets as setup in the top row, depicted in FIG. 16B. The two rows are added together into the bottom row to get the total for the first two months of the year, namely, 1 Box, 8 Bags, 1 Packet, as depicted in FIG. 16C. March brings in 9 Bags, 1 Packet. This is setup on the Candy Board, as depicted in FIG. 16D and added into the total, as depicted in FIG. 16E. The same is done for April, 3 Bags, 2 Packets, 5 Candies, as depicted in FIG. 16F, yielding a total church inventory of 3 Boxes, 0 Bags, 4 Packets, 5 Candies, as depicted in FIG. 16G. And, so on for May, 8 Bags, 1 Packet, 8 Candies, and for June, 4 Bags, 2 Packets, 3 Candies, and for July, 6 Bags, 7 Packets, 7 Candies, and for August, 6 Bags, 1 Packet, 4 Candies, and for September, 8 Bags, 9 Packets, 5 Candies, and for October, 7 Bags, 6 Packets, 6 Candies, and for November, 4 Bag, 1 Packet, 9 Candies. Finally, the last donations totaling 6 Bags, 1 Packet and 7 Candies come in the day before Christmas, as depicted in FIG. 16H. Thus, the church has a total inventory in its pantry of 8 Boxes, 2 Bags, 7 Packets, 4 Candies, as depicted in FIG. 16I.

This story shows the child how simply moving beads on the Candy Board allows a long list of numbers to be added up in a logical and orderly manner. Employing a similar storyline, parents can make a customized "Game of Adding Up Mommy's Grocery List" using shopping receipts. Every game is end-capped by the use of plosive-state equilibration if normalizing the final value into canonical form is required.

Lesson #5, Game of BPC Mystery

An excursion into experimenting with primitive algebra is worthwhile to season the child's mind about the ins and outs of solving storyline mysteries.

Figure 17A:
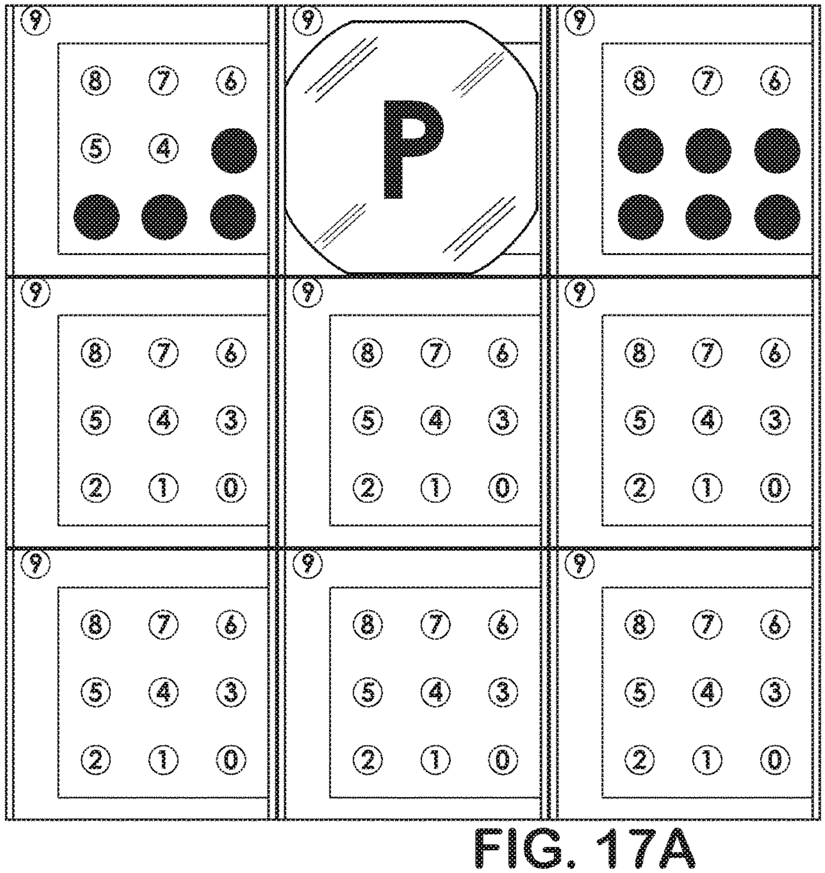
FIGS. 17A to 17L: Lesson #5. Game of BPC Mystery, worked example.

In this lesson, the Candy Board configuration is a three-row board with three ranks and three mystery values. The storyline goes: Daddy brings home candy and puts it all in the pantry. He knows he added 4 Bags and 6 Candies to the pantry, but he forgets how many packets resulted. In the top row of the Candy Board, the child is told to setup 4 beads in the Bag-Rank Digit-Square and 6 beads in the Candy-Rank Digit-Square, and then told to place the [P] guide chip in the Packet-Rank Digit-Square, as depicted in FIG. 17A. Thus, the storyline sets up the mystery about whether the value for [P] can be solved.

Figure 17B:
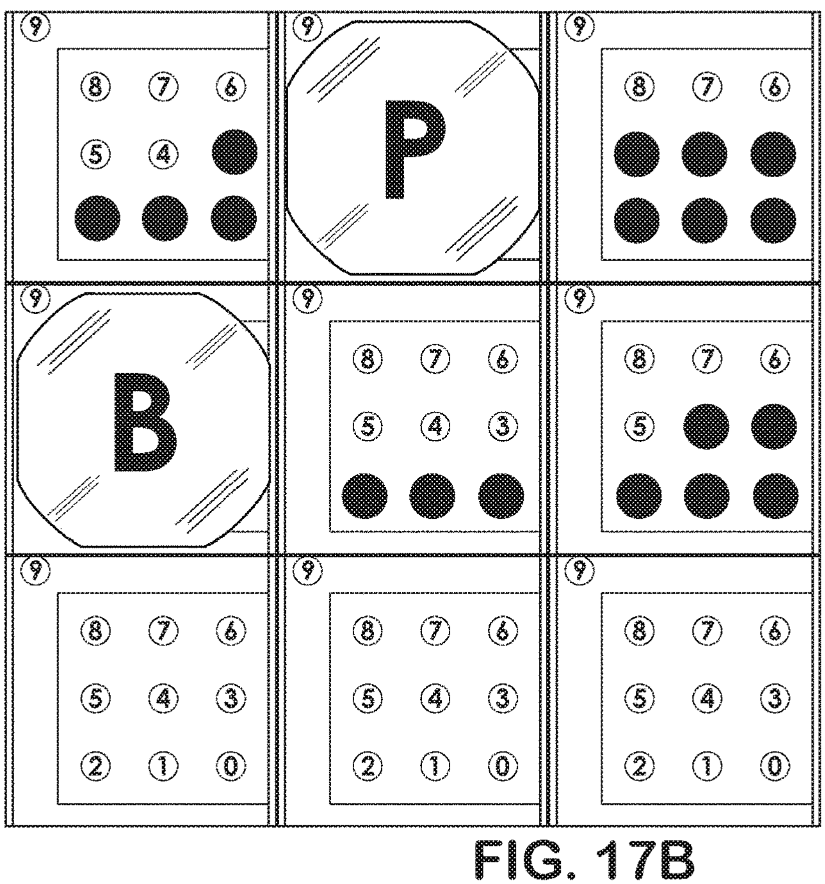

Before Daddy came home the pantry had 3 Packets, 5 Candies, but Mommy isn't sure how many bags of candy were there originally. The child is told to setup the middle row with 3 beads in the Packet-Rank Digit-Square and 5 beads in the Candy-Rank Digit-Square, and to place a [B] guide chip in the Bag-Rank Digit-Square, as depicted in FIG. 17B. The [B] chip represents the mystery of how many bags were in the pantry before Daddy came home and added more candy to the pantry.

Figure 17C:
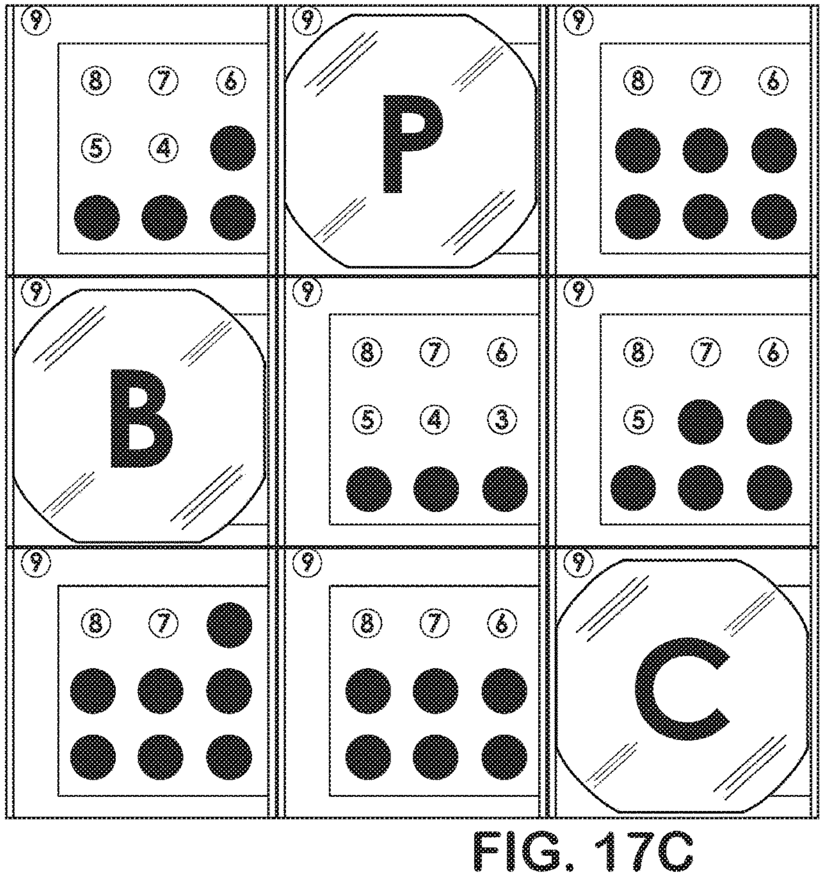

The storyline continues. Mommy, Daddy and Tommy go into the pantry to count everything, because that might help solve what are now two mysteries. Tabby the house cat runs out with candy in its mouth, and disappears. Mommy, Daddy and Tommy see that all the individual pieces of candy have been stolen, leaving 7 Bags and 6 Packets on the shelf. In the bottom row representing the current pantry inventory, the child is told to place 7 beads in the Bag-Rank Digit-Square and 6 beads in the Packet-Rank Digit-Square and a [C] guide chip in the Candy-Rank Digit-Square, as depicted in FIG. 17C. Thus, the storyline sets up the mystery about whether the value for [C] can be solved.

With 4P6+B35=76C setup on the Candy Board, the storyline dilemma presents three mysteries called [B], [P] and [C]. The parent and child work through the three mysteries.

Figure 17D:
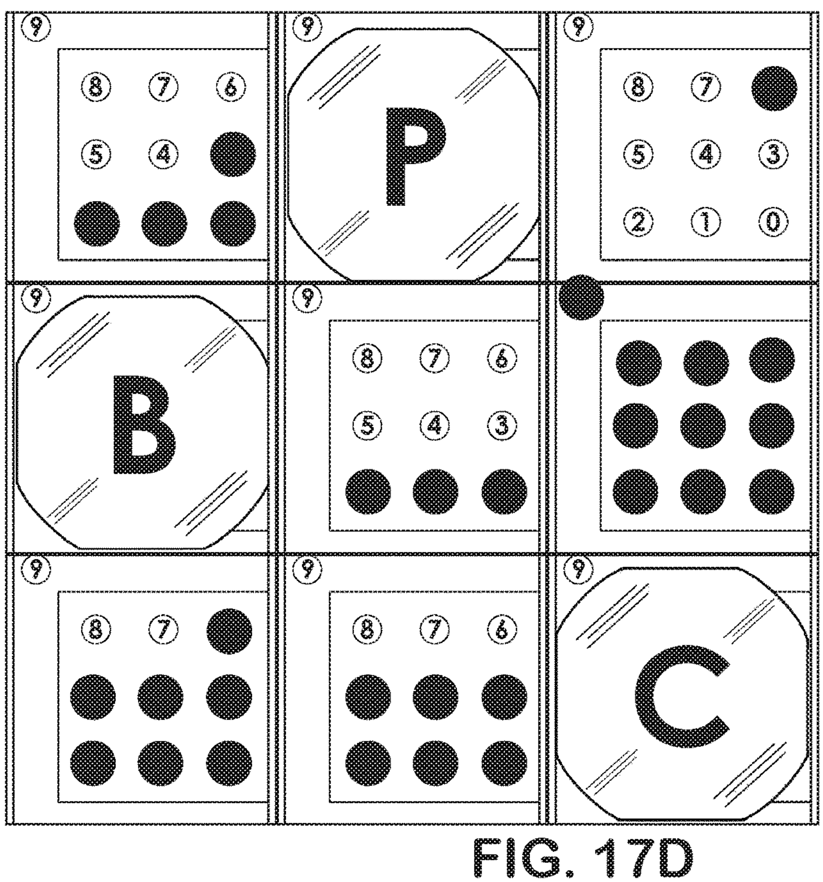
Figure 17E:
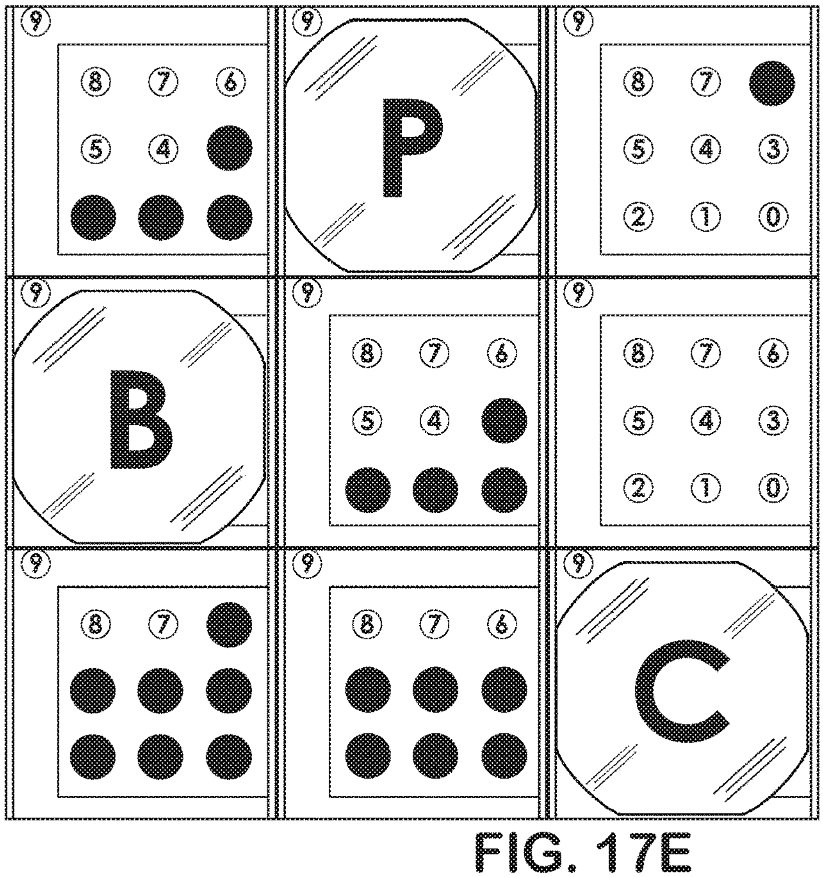
Figure 17F:
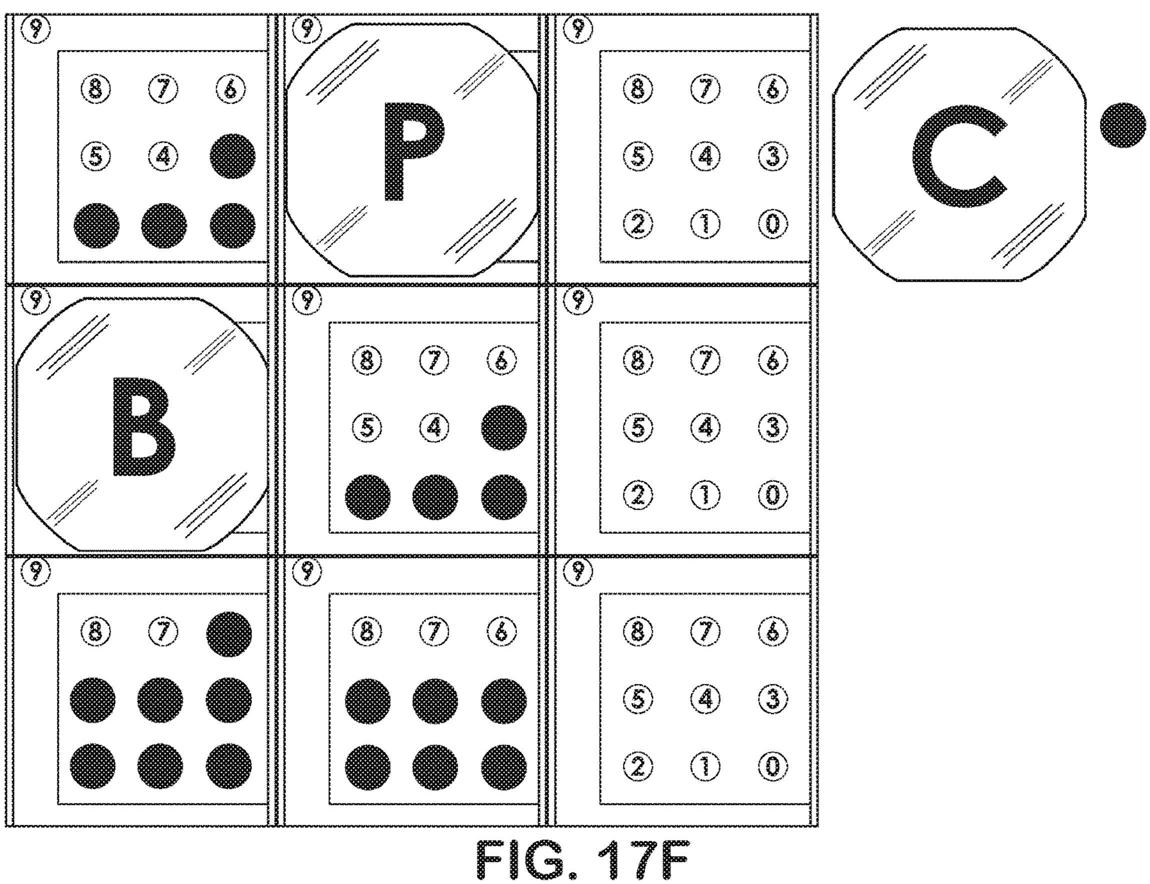

First, the focus is on solving the [C] chip mystery. Since 6 candies came home with Daddy and there were already 5 in the pantry, adding these two values together and treating the middle row as the Result row, a plosive-state TEN results, as depicted in FIG. 17D. Requiring normalization, this triggers a Packaging operation into the middle row Packet-Rank, the 3 becomes 4, as depicted in FIG. 17E. Resuming the Candy count there is only 1 candy left in the top row, so 1 Candy was added to the pantry. Hence, Tabby cat stole only 1 Candy. The [C] chip is removed from the board and placed to right-side along with its solution bead, as depicted in FIG. 17F. The [C] mystery is now solved.

Figure 17G:
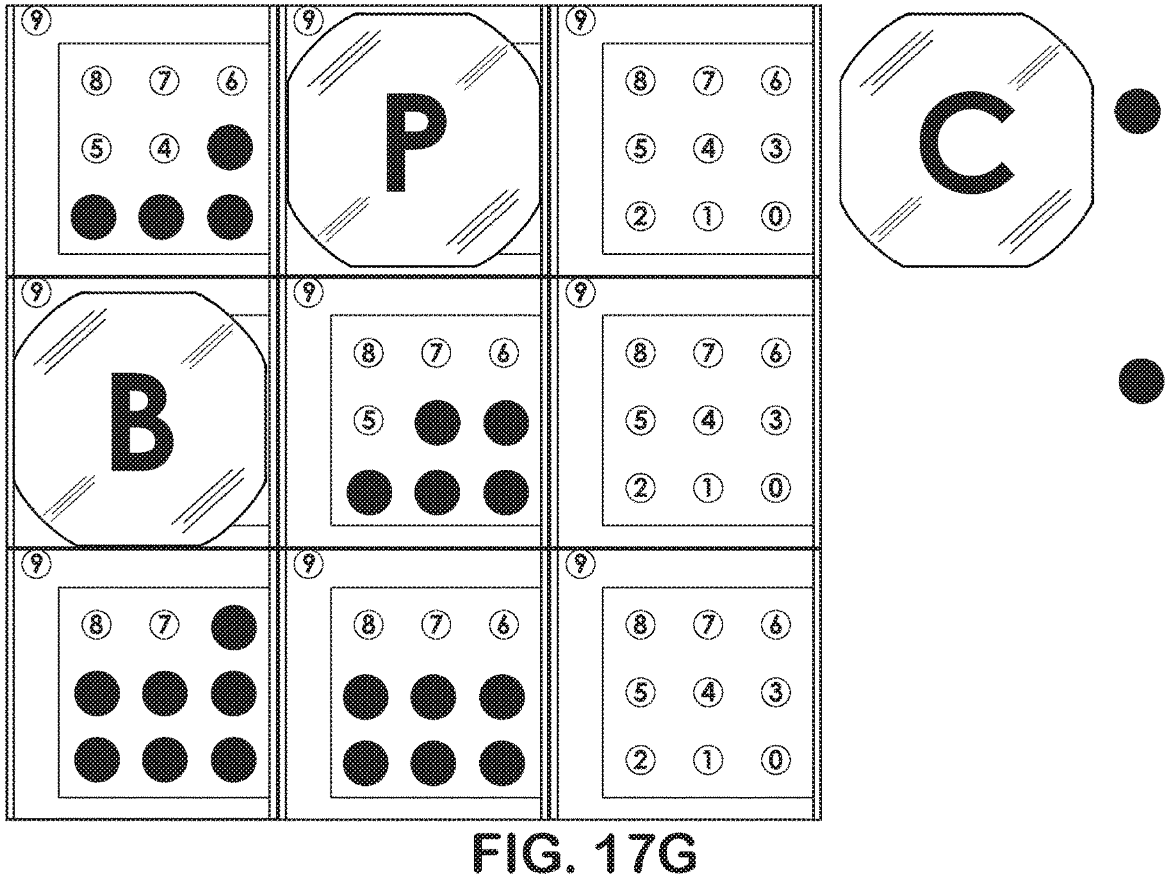
Figure 17H:
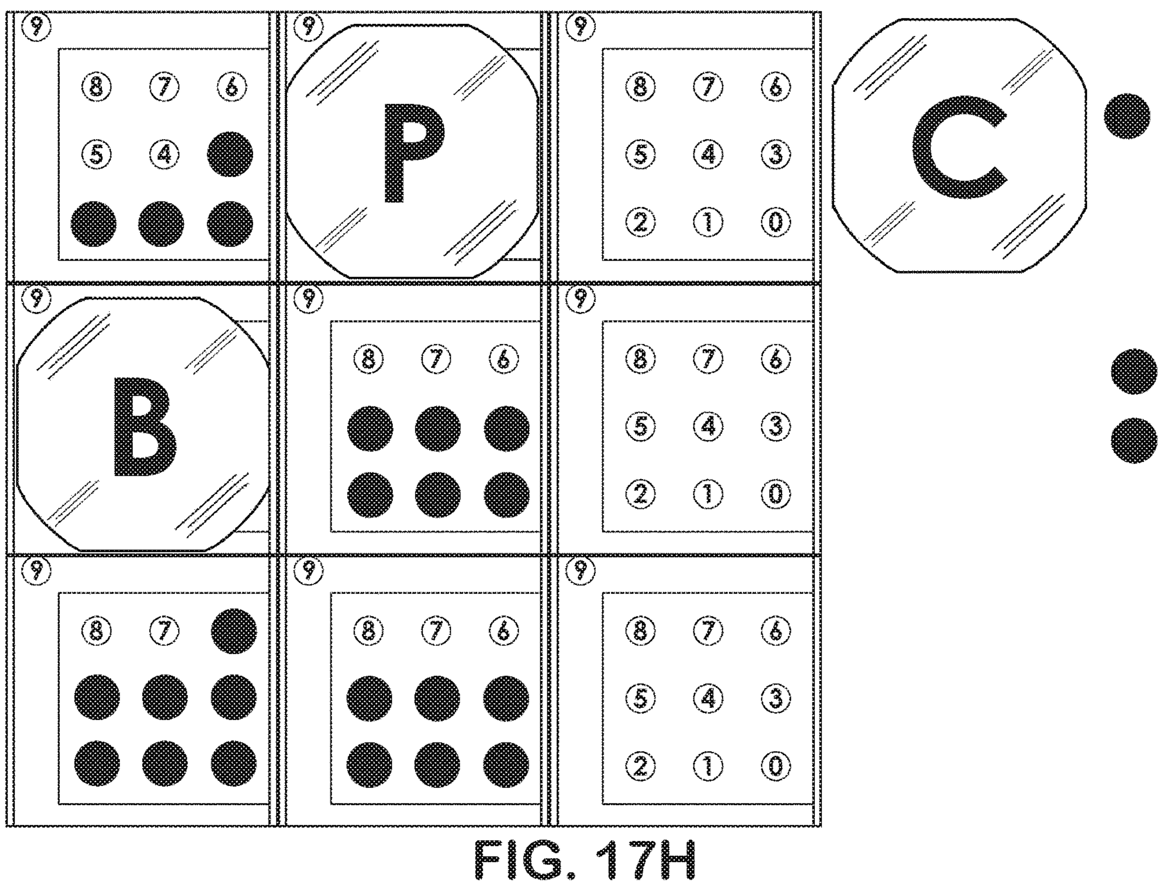
Figure 17I:
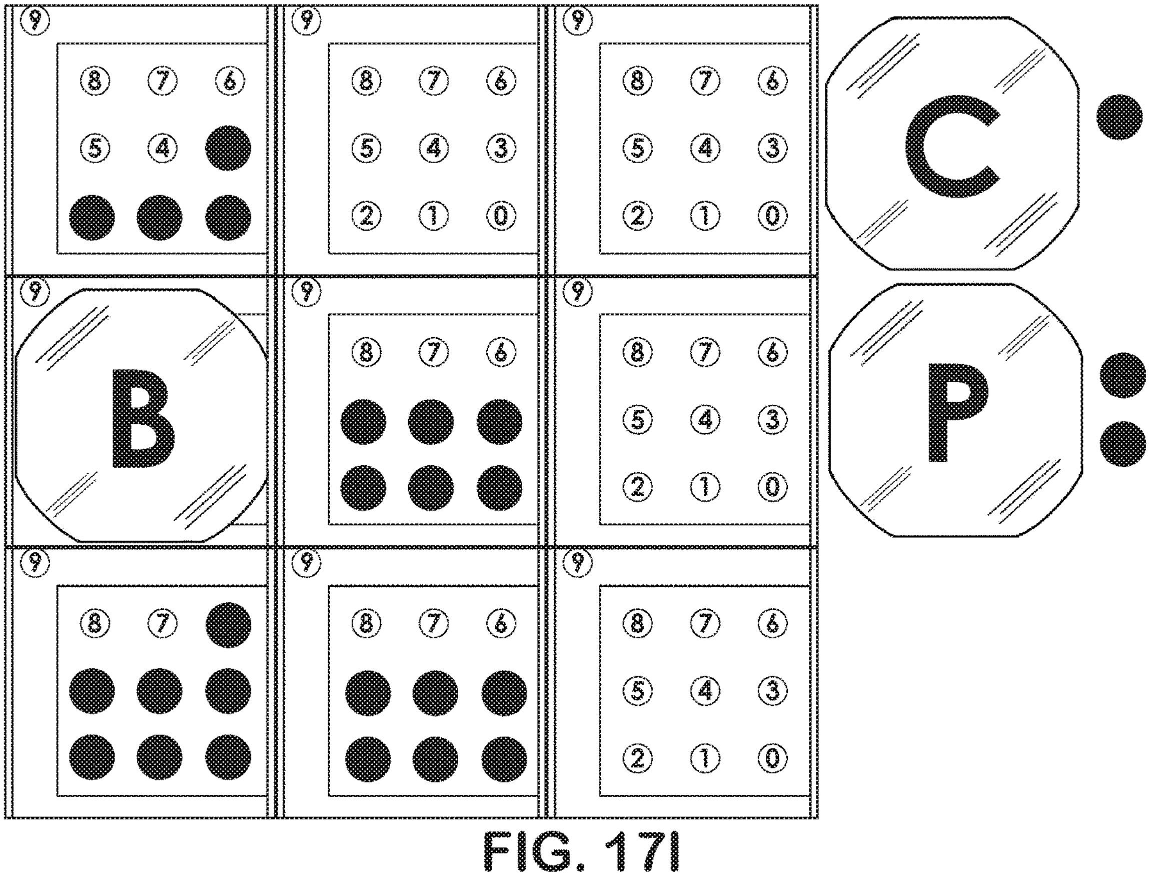

The focus resumes with the Packet-Rank. We now know there were 4 packets, shown in the middle row, before Daddy added more packets, and we know after Daddy added his full packets the pantry now has 7 Packets. The parent and child can walk through the process of adding beads one by one until the middle row Packet-Rank bead pattern/count equals the Bottom row pattern/count of 6. From the Packet Tray, one by one beads are added to the middle row, as well as placed on the right-side of the board, as depicted in FIGS. 17G and H. The [P] guide chip is removed from the board and placed to the right-side along with the two beads, as depicted in FIG. 17I. The [P] mystery is solved.

Figure 17J:
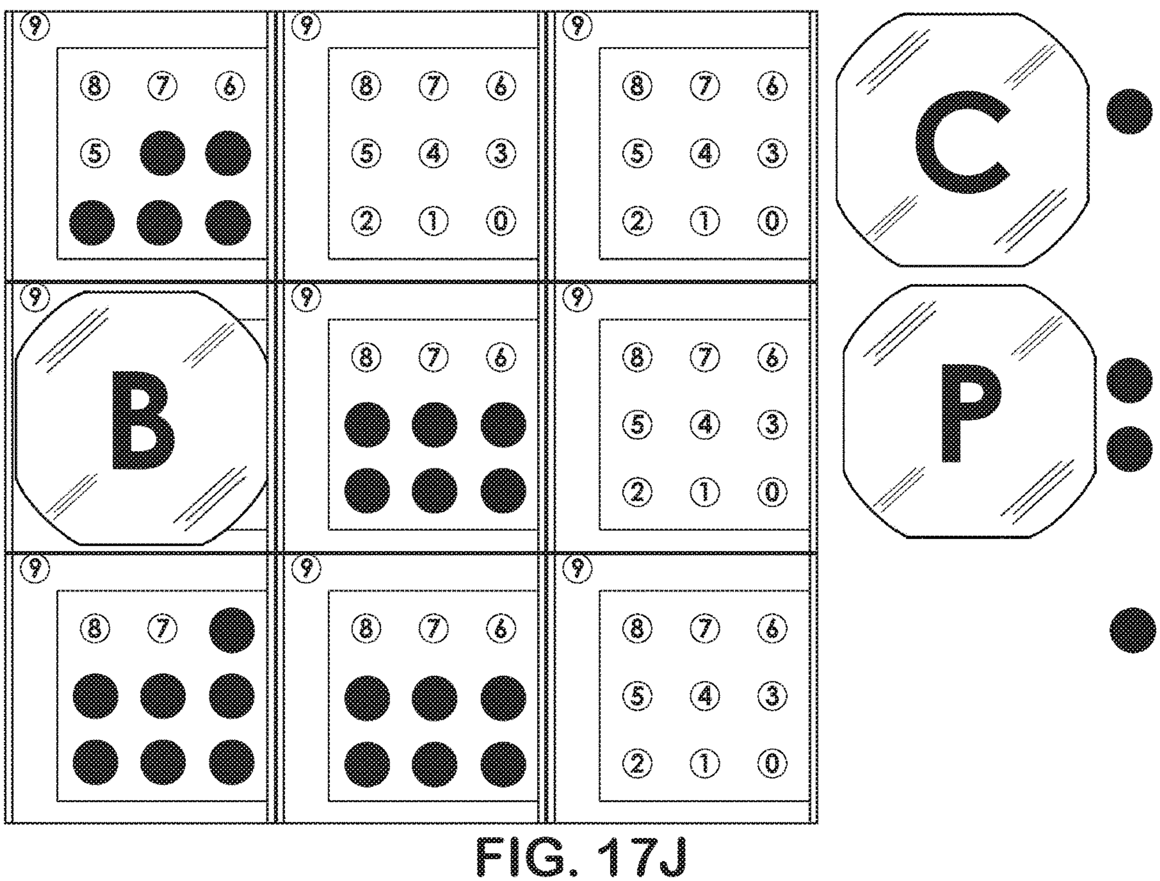
Figure 17K:
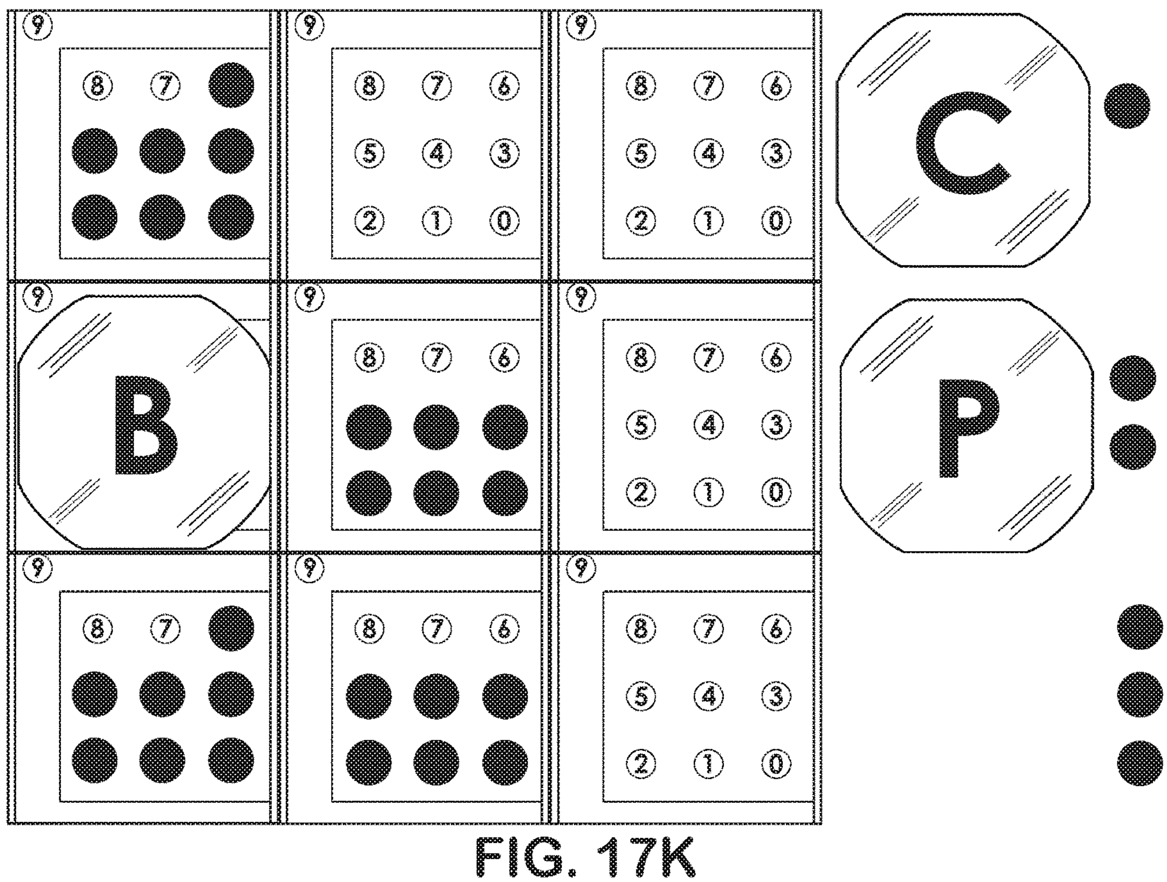
Figure 17L:
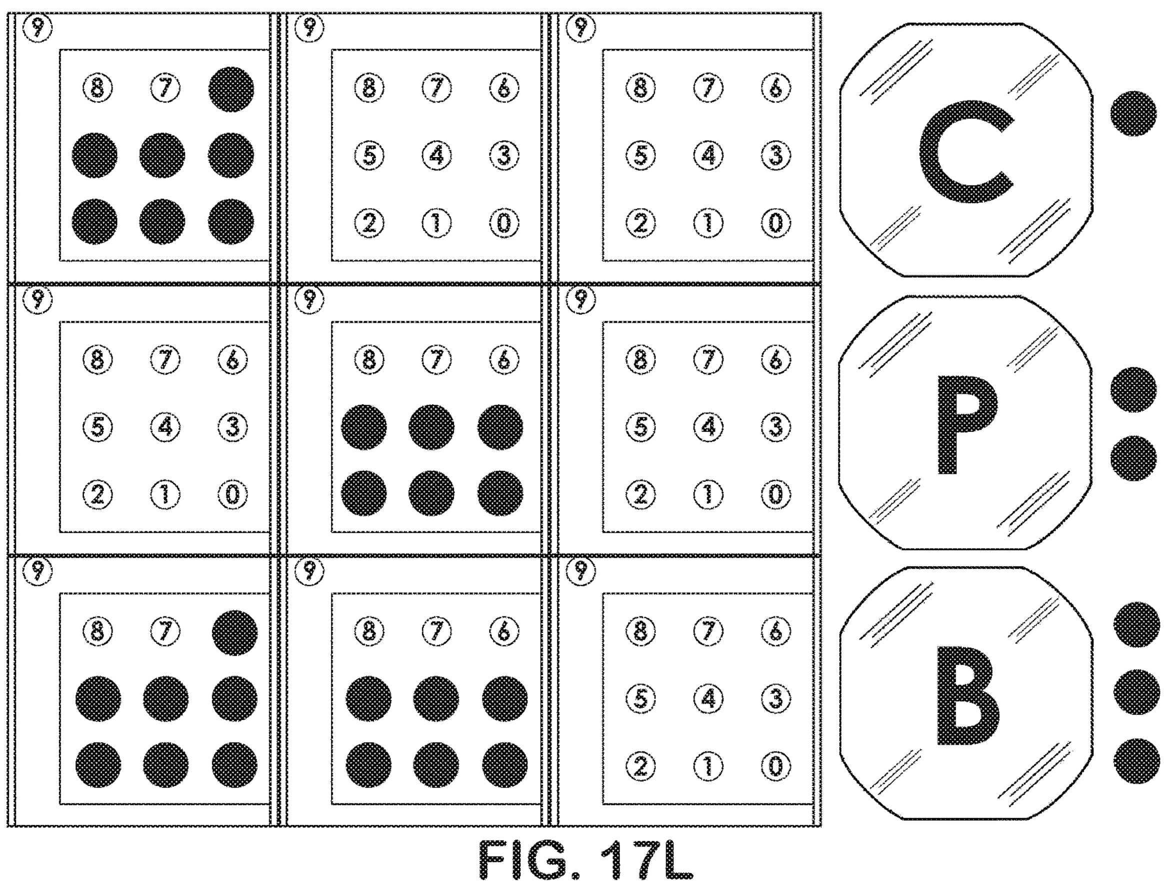

Focus turns to the Bag-Rank. Daddy brought home 4 Bags which got added to the pantry creating a total of 7 Bags. The child might see the solution because he has applied it to solve the Packet mystery. One by one, beads are added to the 4 Bags Daddy brought home, with another bead added on the right-side of the board, as depicted in FIG. 17J, until 3 beads are moved into the top row and it is now the same as the bottom row, as depicted in FIG. 17K, Hence, the pantry had 3 Bags originally. So, the [B] guide chip is removed from the board and placed to the right-side along with the three beads, as depicted in FIG. 17L. The [B] mystery is solved.

Unlike prior art, such games are possible on the Candy Board because rigor is enforceable. From time to time, the parent should shepherd the child on an adventure in BPC algebra, so the child understands many mysteries are not as intractable as they first appear. Also, the child will start decoding the basis behind algebraic reasoning whenever the storyline has a mystery element. The desired goal of the Game of BPC is for the child to play out his reasoned hunches on the Candy Board. There is no wrong answer, just an immersive learning experience. The element of intrigue and surprise at a solvable outcome becomes a huge part of the sense of accomplishment a child derives from the Game of BPC.

Lesson #6, Game of in-Situ Subtraction/Addition

In-situ games emulate a closed system where candy is conserved. Hence, a misbehaving child eating candy always creates incorrect results and unmasks cheating. Every game is end-capped by the use of plosive-state equilibration if normalizing the final value into canonical form is required.

Initial games should be single digit subtraction with no unpackaging. For example, on a two-row Candy Board the storyline states that Tommy possesses 6 candies in Tommy's row, the top row. The bottom row is Katie's and currently shows she has zero candies. However, Tommy owes Katie 4 candies. The storyline mystery is how many candies will Tommy have leftover when he gives 4 candies to Katie. Performing the story results in four candies sliding from Tommy's row into Katie's row. This leaves 2 candies in Tommy's row, i.e. the end result for Tommy after subtraction is done.

Figure 18A:
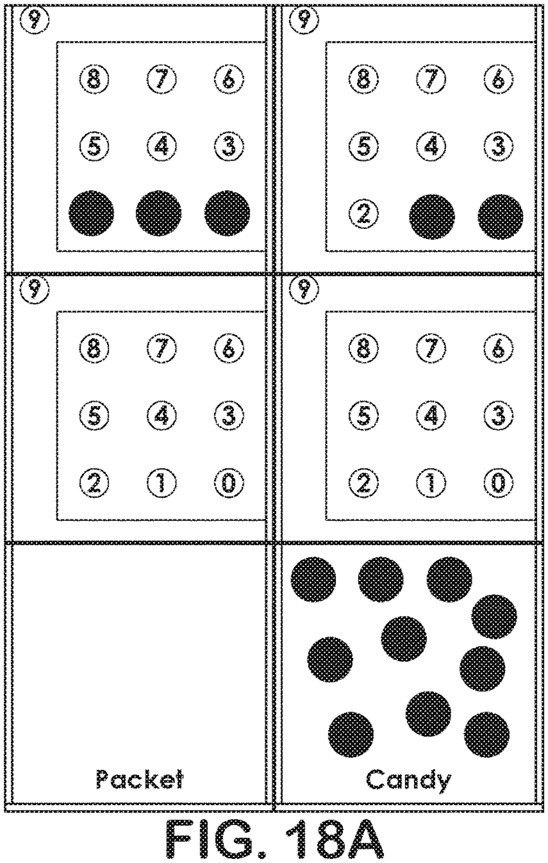
FIGS. 18A to 18D: Lesson #6. Game of In-Situ Subtraction/Addition, worked example.
Figure 18B:
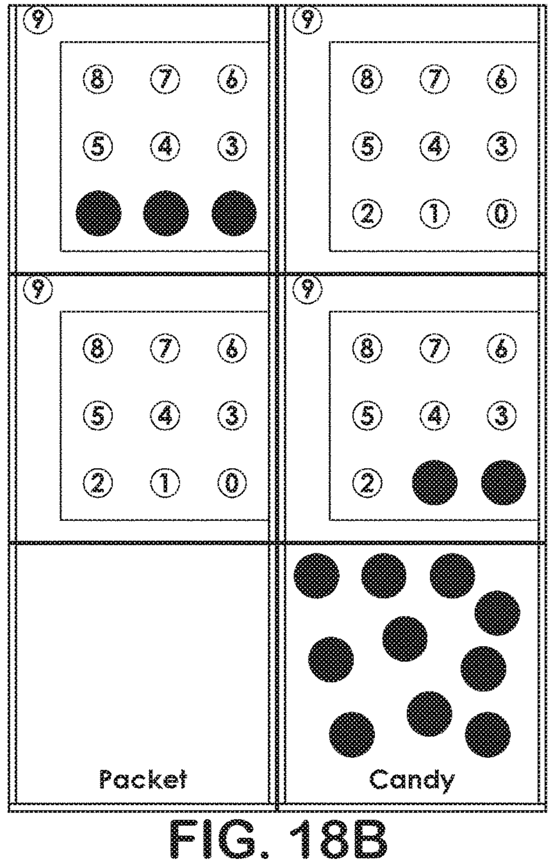
Figure 18C:
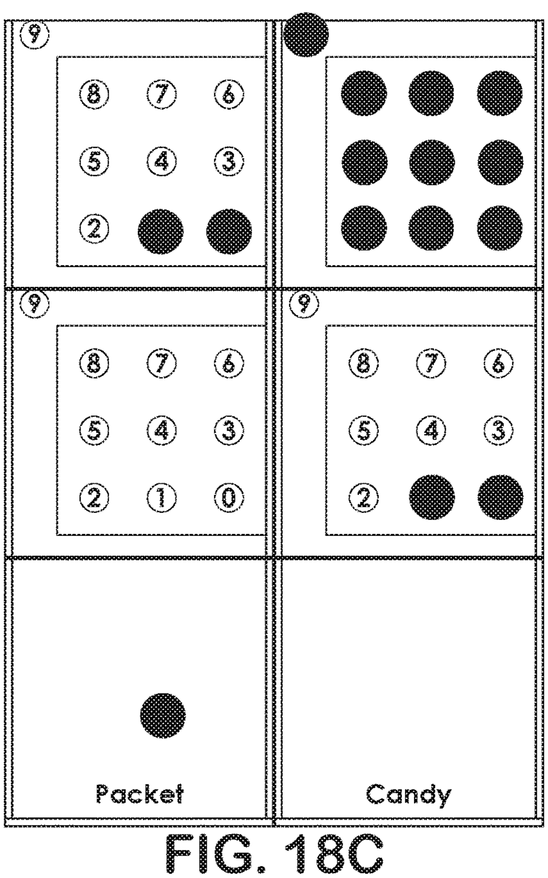
Figure 18D:
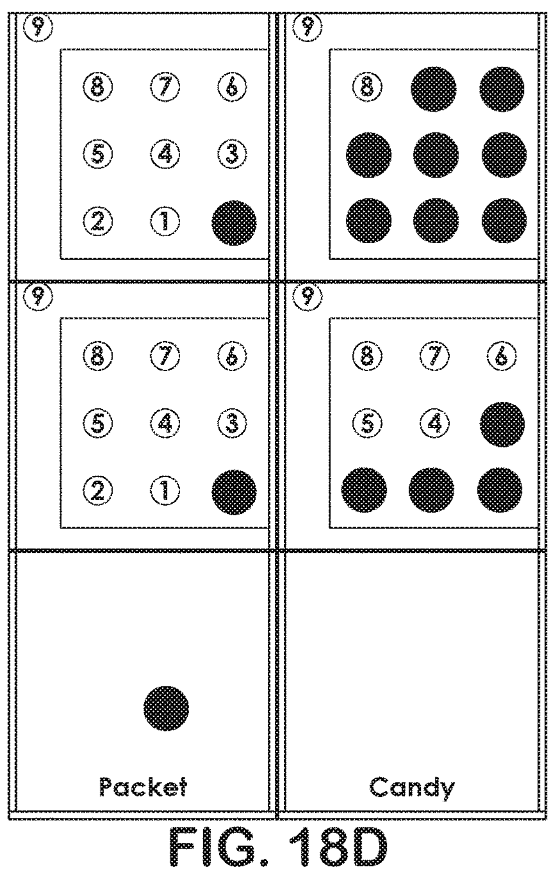

The need to apply the Unpackaging process comes into play when Tommy has 3 Packets, 2 Candies, as depicted in FIG. 18A, and he owes Katie 1 Packet, 4 Candies. The process is move Tommy's 2 Candy-Rank beads into Katie's Candy-Rank Digit-Square, as depicted in FIG. 18B. Tommy's Candy count now shows "0", i.e. a plosive-state under subtraction which triggers plosive-state equilibration. Unpackage one of Tommy's packets in the Packet-Rank, by removing a Packet Bead off the Digit-Square as a notional packet is opened and populates the Candy-Rank Digit-Square with ten beads from the Tray, as depicted in FIG. 18C, Next, two more beads are moved into Katie's Candy-Rank Digit-Square, bringing Katie's count to "4" Candies. Tommy also owes Katie a full packet, so the focus is set to the Packet-Rank. Slide one bead in this rank from Tommy's row into Katie's row, as depicted in FIG. 18D, Katie now has what she is owed from Tommy, 1 Packet, 4 Candies. As a result of this subtraction from his inventory of candy, Tommy has 1 Packet, 8 Candies remaining. Essentially, 32-14=18. Note that the total system bead value stays metrically invariant. In the Tray, there were ten candies at the start and one packet of ten at its conclusion.

The Game of In-Situ Addition is also playable in this format. For example, next scene in the story goes: Katie gives Tommy 6 Candies for his Birthday. And, backwards and forwards the storyline can go, and at every scene in the story the child is performing arithmetic, sometimes packaging and other times unpackaging.

In an enhanced version, a three-row in-situ game has Katie on the top row, Tommy on the bottom row and Mr. Timpkins, the grocer, on the middle row. Setup each row with a given number of candies and play the game of commerce between two customers and Timpkins Grocery Store.

Lesson #7, Game of Multi-Digit Subtraction

A two-row Candy Board configuration is the minimal layout for subtraction. Although either row can be subtracted from the other, the Minuend in the top row and Subtrahend in the bottom row convention not only mimics traditional pencil-on-paper layout, it is also the most efficient layout for the Game of Division, as detailed later in Lessons #11 and #14.

Whenever the Minuend is greater than the Subtrahend, a positive result remains in the top row when subtraction concludes. However, when the Minuend zeros out, the bottom row yields the result and means subtraction has generated a negative value. Thus, the two-row Candy Board acts like an accounting ledger, where negative numbers are recorded in the Debit register, i.e. what is owed, and positive numbers are recorded in the Credit register, i.e. what is left-over, namely the remainder.

After setting up two numbers in the two rows, subtraction entails sliding bead pairs of similar rank from both rows simultaneously. Technically, the subtraction process can proceed in any piecemeal rank/Digit-Square sequence, the only essential requirement is that every bead in either the Subtrahend, bottom row, or Minuend, top row, must be moved into the Tray until one row becomes completely zeroed out.

At the start of the training process for young children, parents should always focus on one Digit-Square subtraction, then two Digit-Squares. This should be done without the need for any Unpackaging operations, i.e. the Minuend digit is always bigger than the Subtrahend digit. Once the child has mastered three Digit-Squares, training should proceed with problems that include Unpackaging.

Traditional pencil-on-paper subtraction is limited to right to left processing, using the just-in-time borrow technique from accounting practice. Plosive-state equilibration provides the Candy Board with the flexibility to model four borrow techniques as well as deploying them in any rank order, not merely right to left. For a child, the preferred technique is always the simplest.

For example, consider the problem of a customer using a $100 note to pay a $83.53 debt. There are four distinct ways of handling what conventional arithmetic calls borrow when performing a subtraction operation.

Figure 19A:
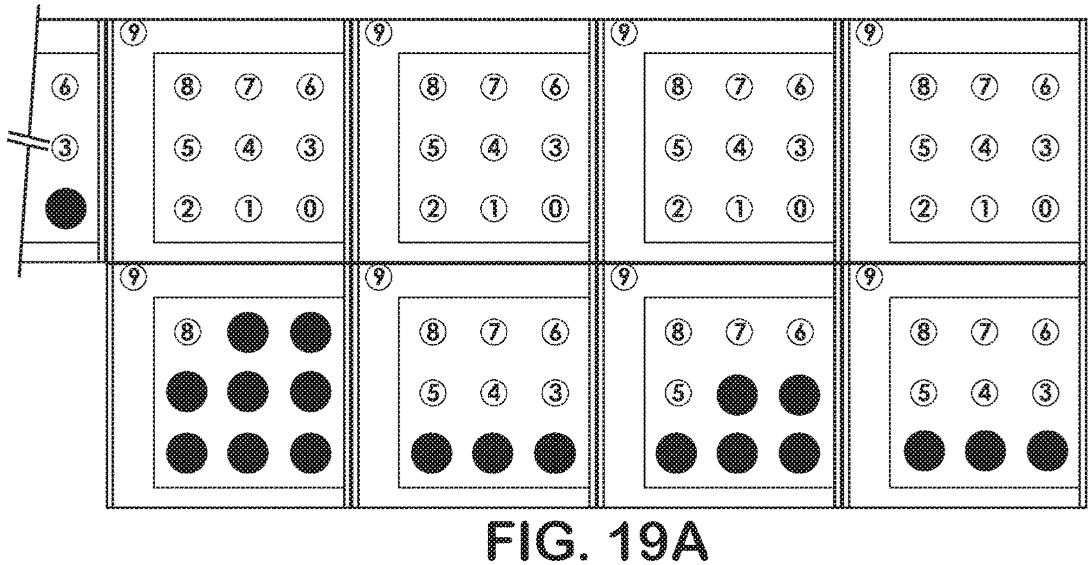
FIGS. 19A to 19K: Lesson #7. Cashier's full breakout convention, worked example.
Figure 19B:
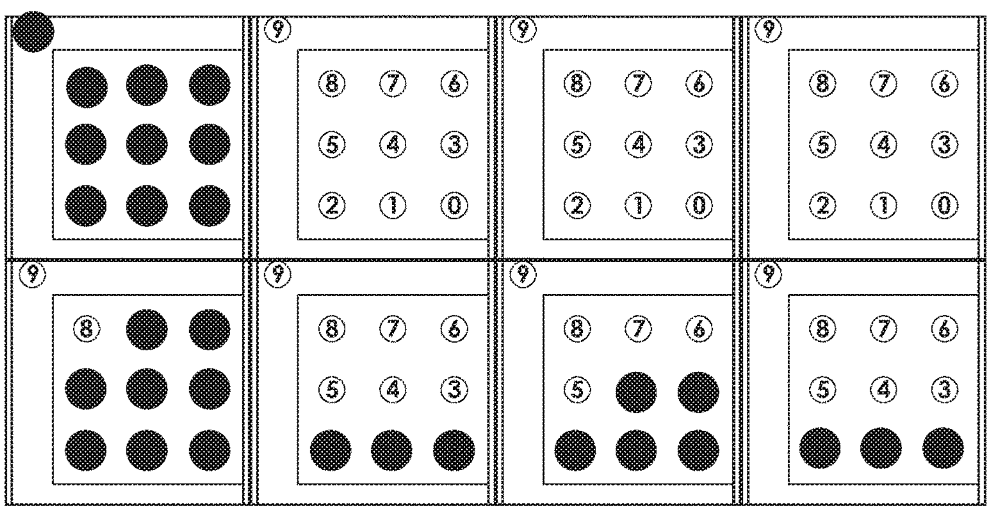
Figure 19C:
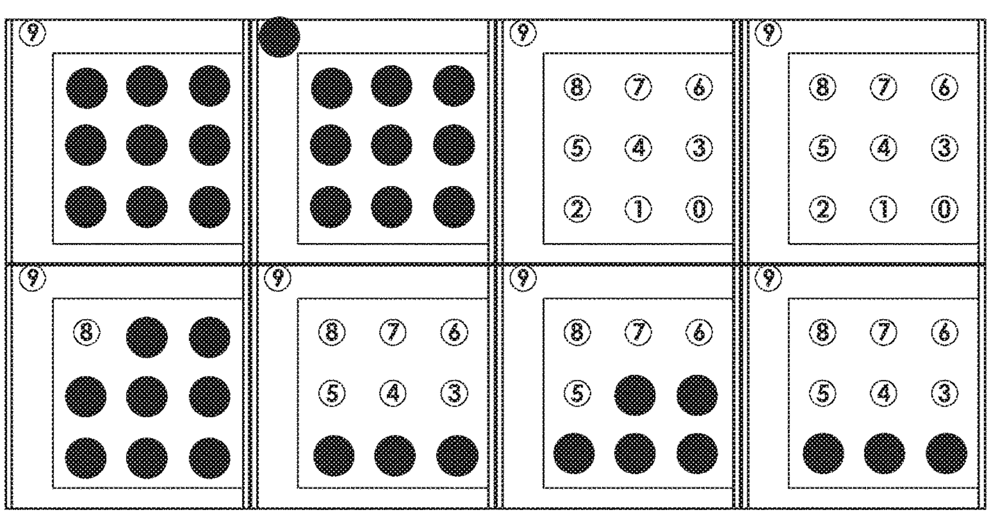
Figure 19D:
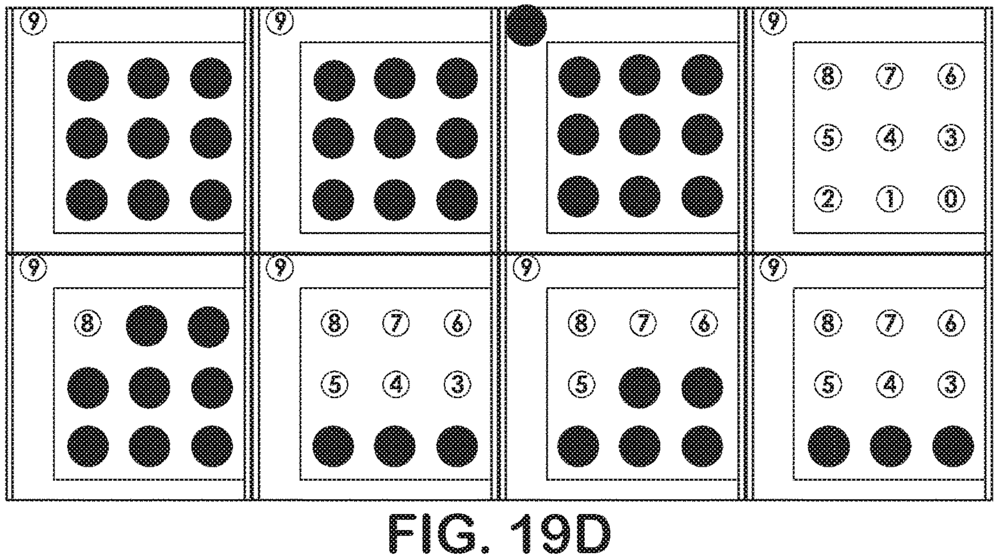
Figure 19E:
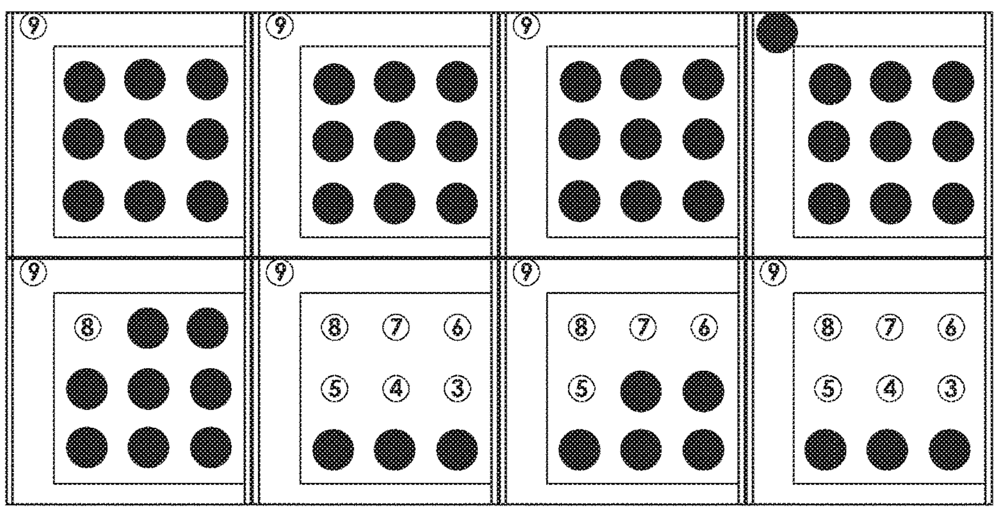
Figure 19F:
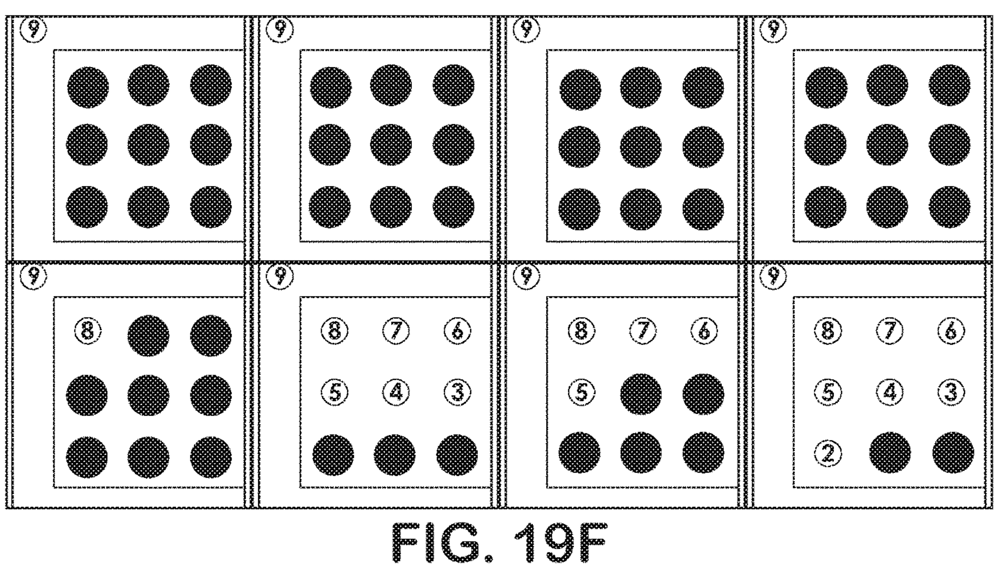
Figure 19G:
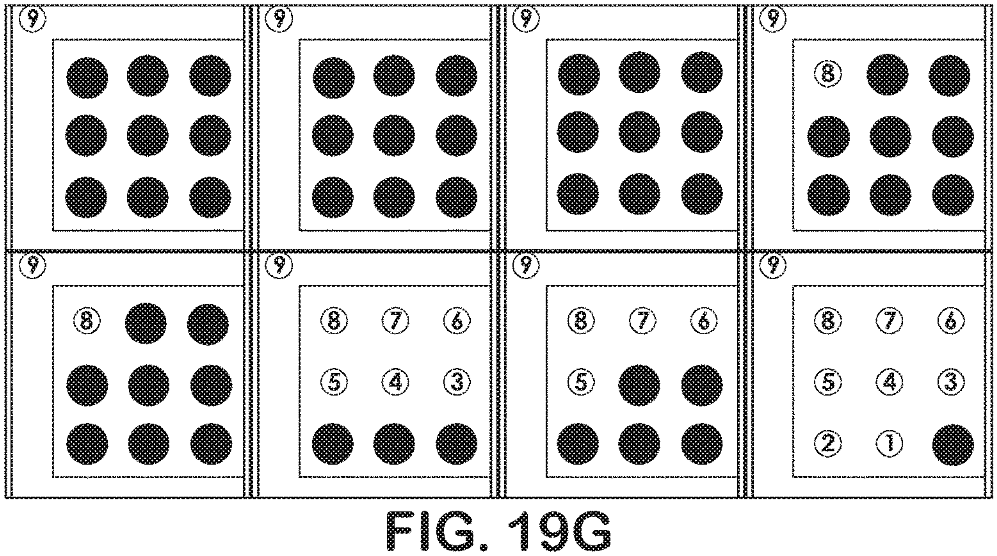
Figure 19H:
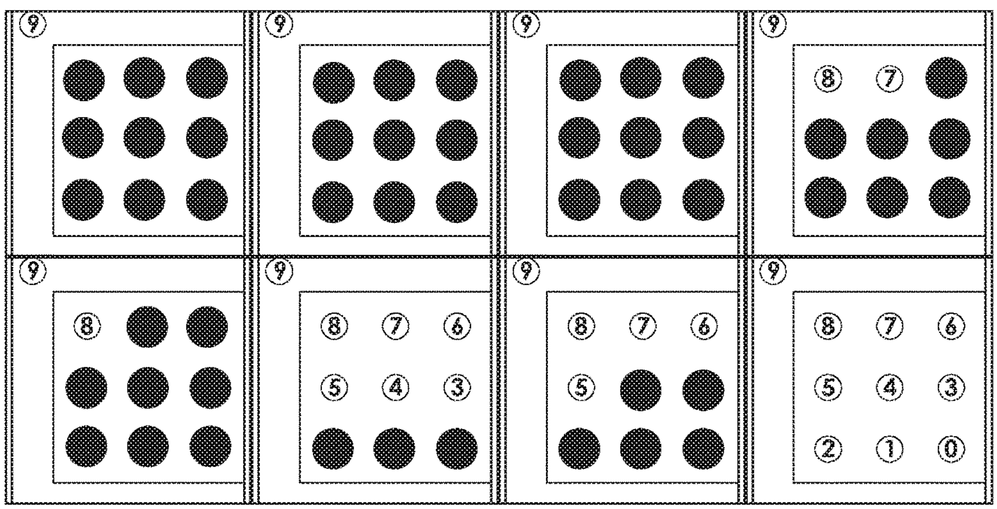
Figure 19I:
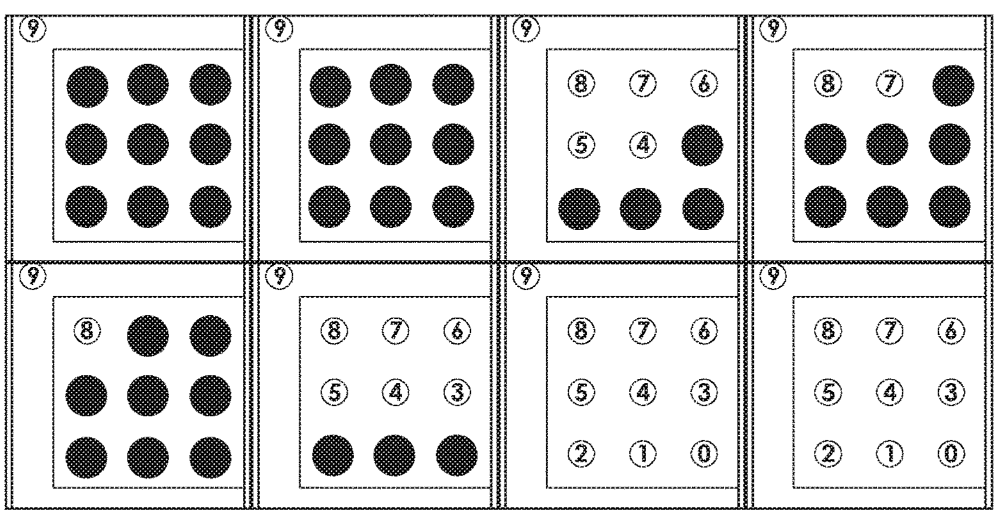
Figure 19J:
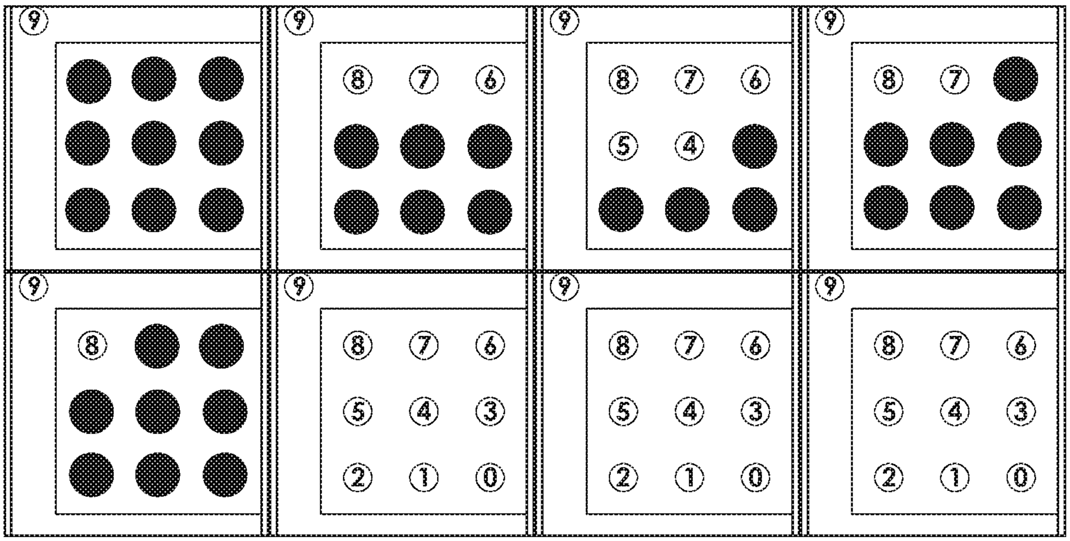
Figure 19K:
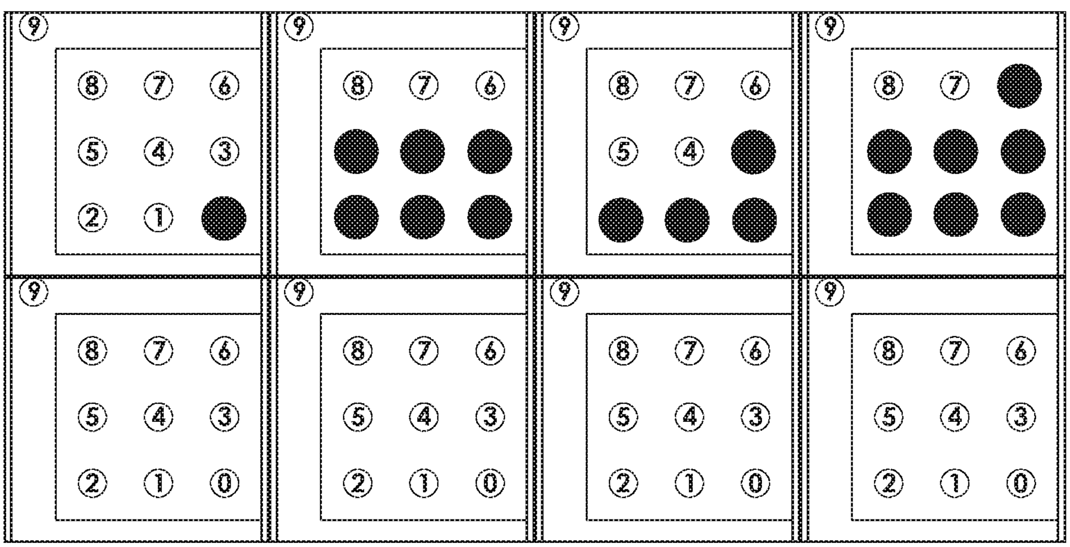

The first technique is the cashier's full breakout method for making change as depicted in FIGS. 19A through 19E. Most often the left rank Digit-Square is nonzero, so unpackaging proceeds without fuss. However, consider the canonical form of a $100 note, "10000" that must be fully broken down via a recursive sequence of plosive-state equilibrations into the "999TEN" form. If the goal is to mimic the conventions of pencil-on-paper subtraction, this full breakout unpackaging must be done all the way to the Cents-Rank. Thereafter, subtraction proceeds right to left, as depicted in FIGS. 19F through 191. Note that unlike a just-in-time form, in the cashier's full breakout method, plosive-state equilibration recursively proceeds up the Minuend from right to left before rippling back down.

Figure 20A:
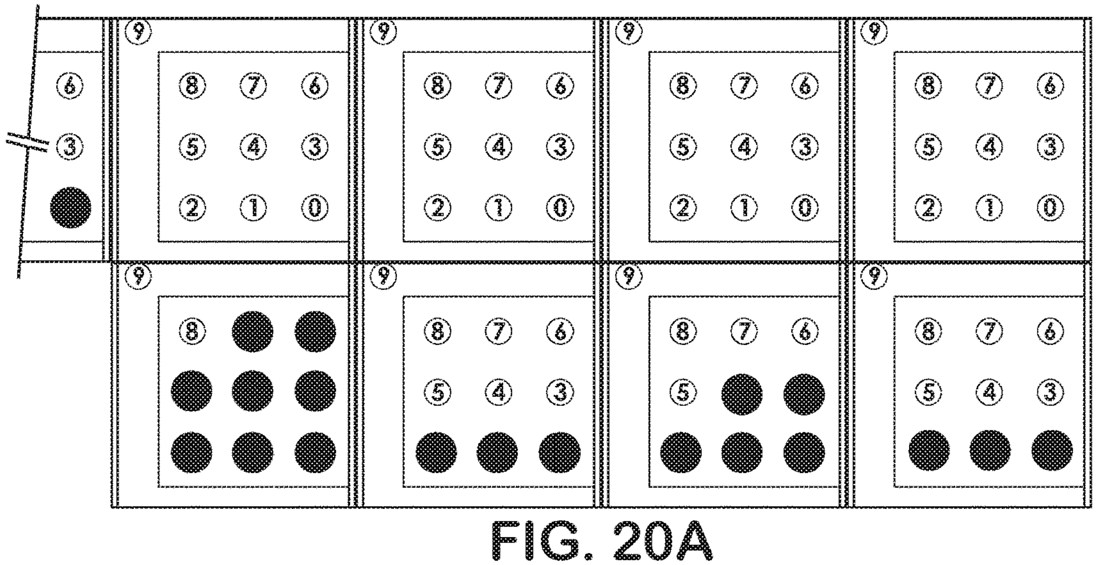
FIGS. 20A to 20I: Lesson #7. Cashier's just-in-time convention, worked example.
Figure 20B:
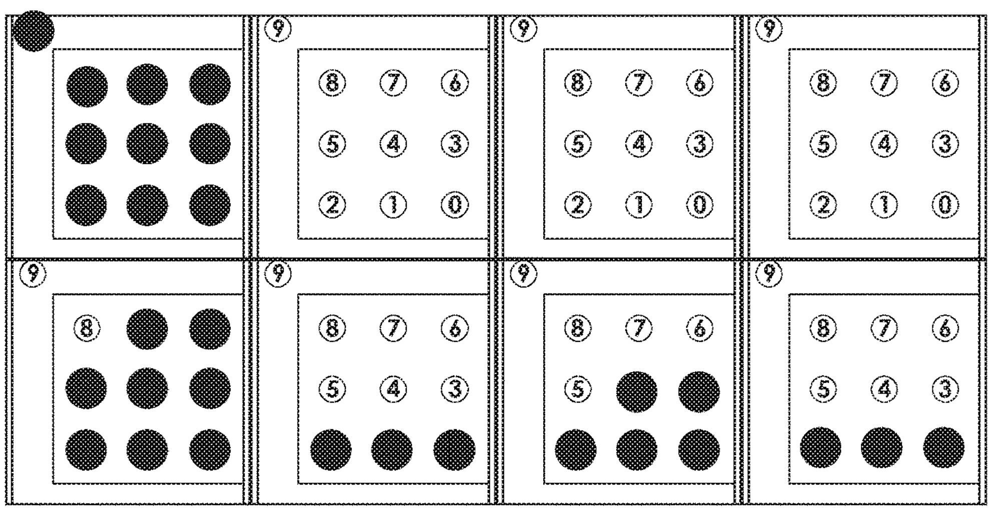
Figure 20C:
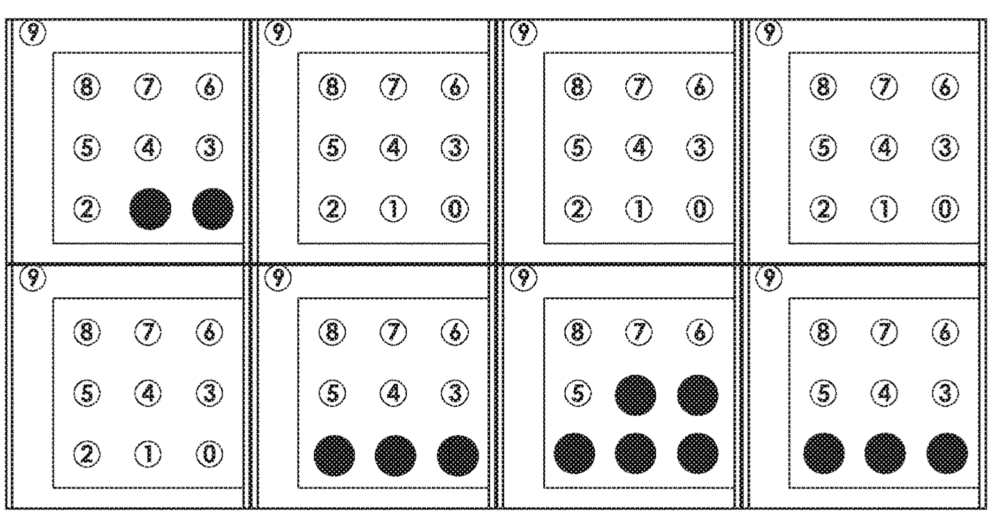
Figure 20D:
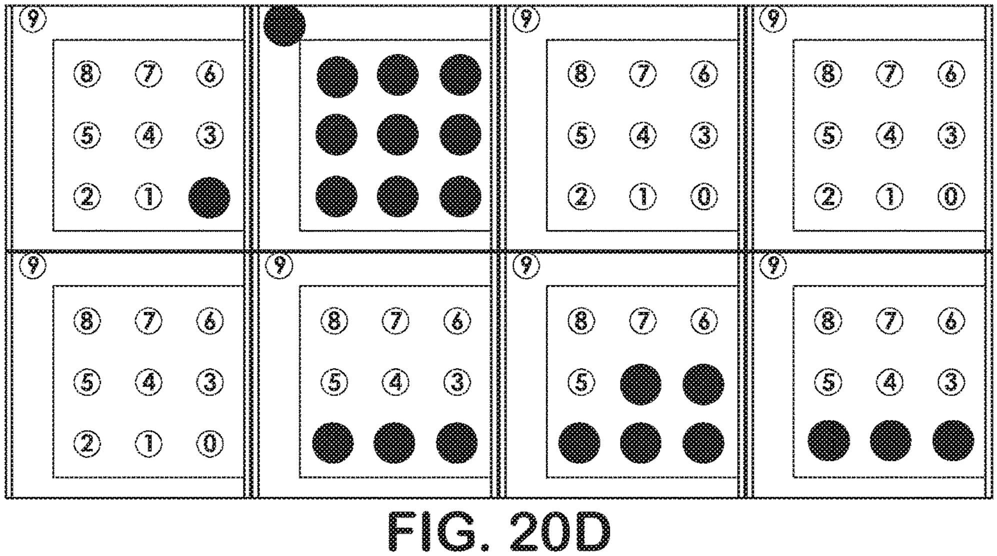
Figure 20E:
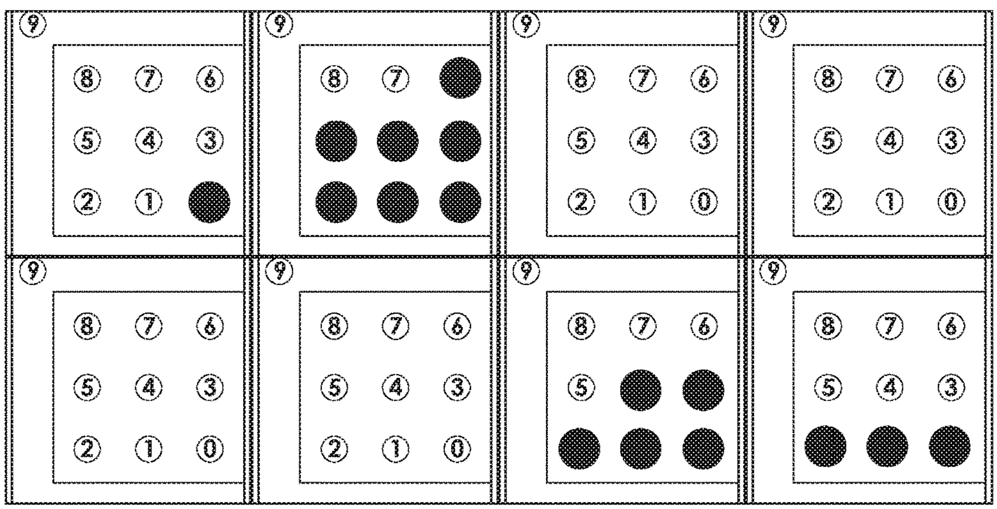
Figure 20F:
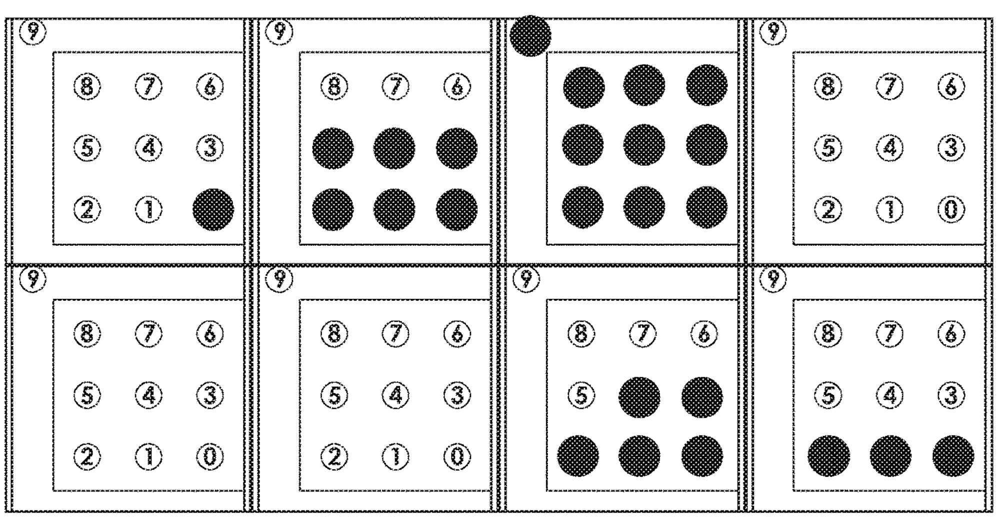
Figure 20G:
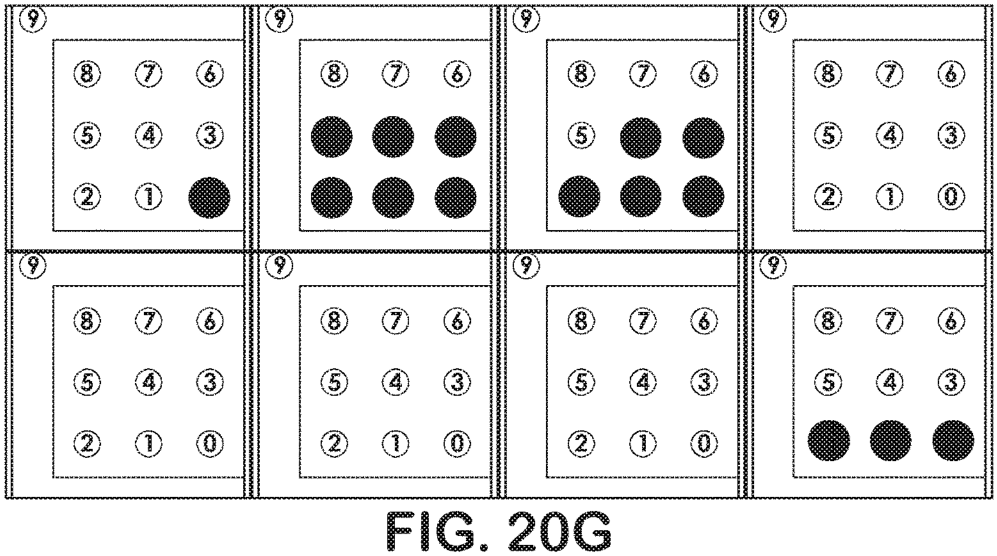
Figure 20H:
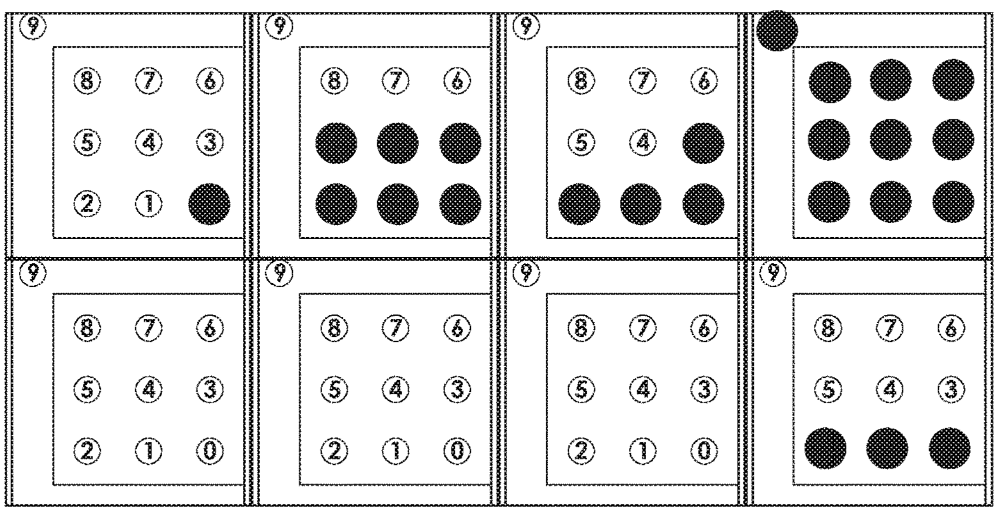
Figure 20I:
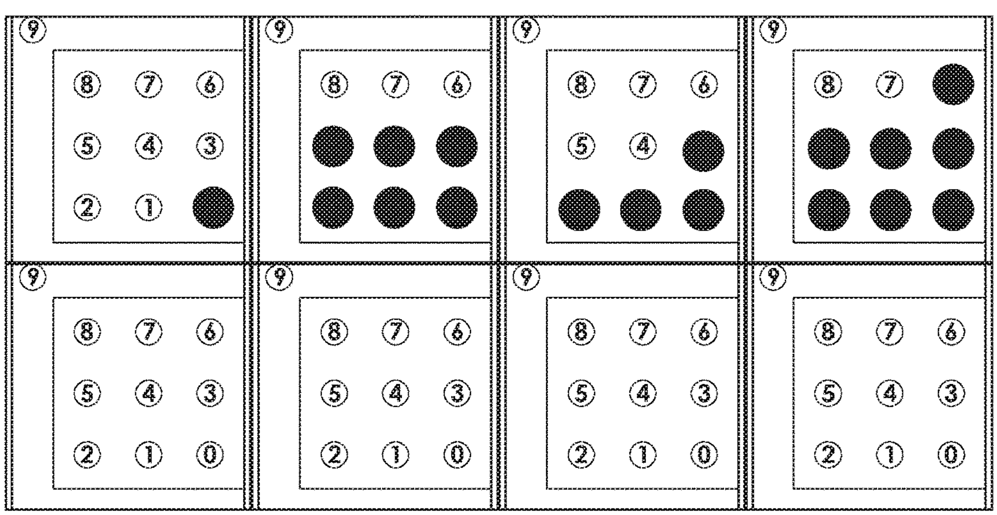

The second technique is the just-in-time version of the cashier's method, $100, as depicted in FIG. 20A, is broken into ten $10 notes in the Ten$-Rank, as depicted in FIG. 20B, which demonstrates how under a lock-up during subtraction the plosive-state equilibration method produces a Ten$-Rank equivalent, namely "0TEN000". Then, subtraction is immediately done on the Ten$-Rank which leaves the customer with two $10 notes, as depicted in FIG. 20C, Next, proceeding with the Dollar-Rank, one of the customer's $10 notes is unpackaged into ten $1 notes, namely "01TEN00", as depicted in FIG. 20D and so forth, going left to right, as depicted in FIGS. 20E through 20I. This illustrates the cashier's form of just-in-time plosive-state equilibration, and proceeds from high to low, the reverse of the pencil-on-paper convention.

Figure 21A:
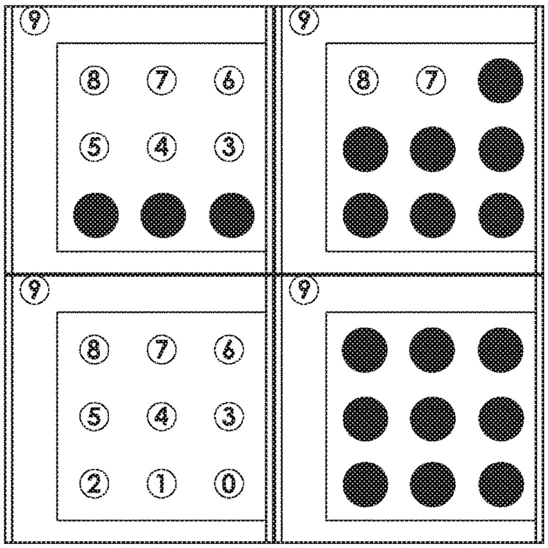
FIGS. 21A to 21D: Lesson #7. Accountant's Debit/Credit just-in-time borrow convention, worked example.
Figure 21B:
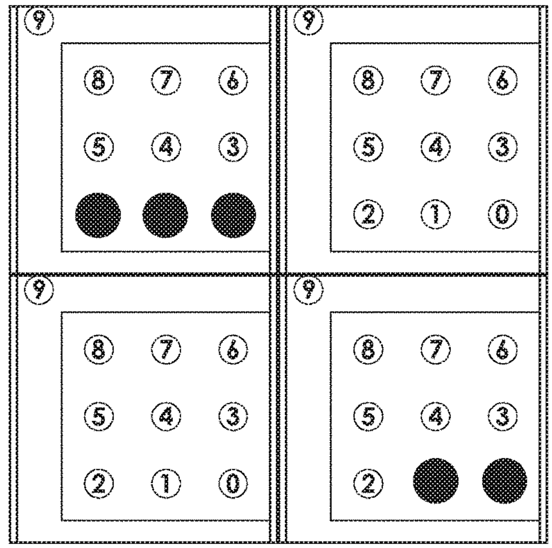
Figure 21C:
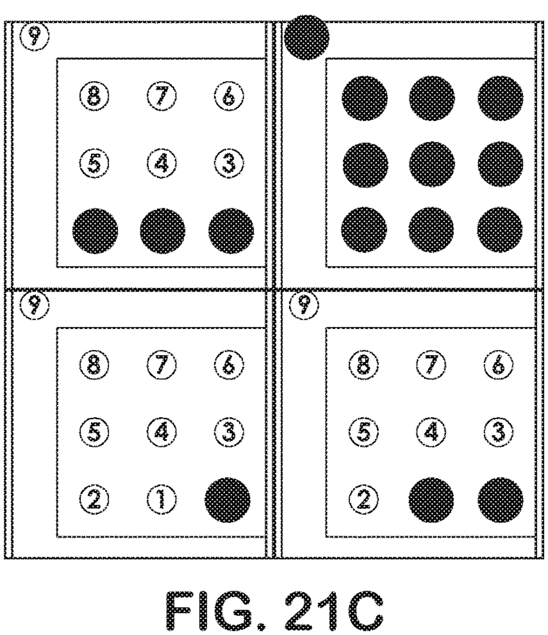
Figure 21D:
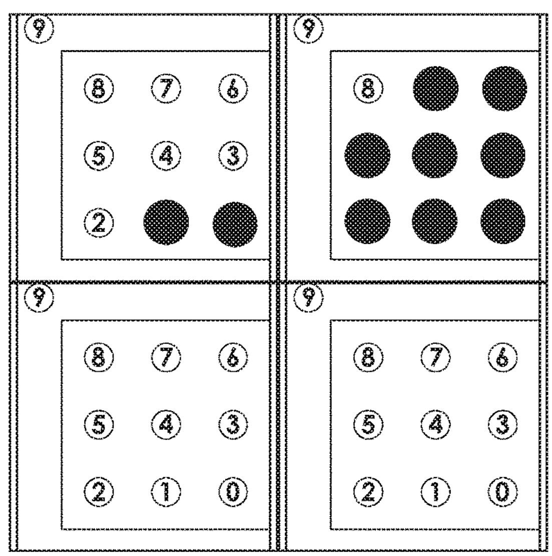

The third technique is the accountant's just-in-time borrow method as used in traditional pencil-on-paper subtraction. Consider "37" minus "9" emulated on the Candy Board, as setup in FIG. 21A. The accountant's just-in-time borrow proceeds right to left as follows. On the focus rank, subtraction is in progress but the Minuend zeros out, as depicted in FIG. 21B. A plosive-state lock-up under subtraction-in-progress has occurred and this triggers the method of plosive-state equilibration under subtraction. As a result, one bead is added to the Subtrahend one rank left, namely borrow creates a debit. In the focus Digit-Square of the Minuend, the borrowed bead shows as a credit, and is unpackaged as the TEN bead pattern, the plosive-state conjugate of "0" under subtraction. On the Candy Board, a child does this by sliding a bead from the Tray one rank left of the focus rank, sockets it into the Subtrahend Digit-Square, and setup a TEN bead pattern in the Minuend Digit-Square in the focus rank, as depicted in FIG. 21C. Thus, the problem becomes "3TEN" minus "12". Subtraction proceeds until the Subtrahend is completely zeroed out, which leaves the result in the Minuend, as depicted in FIG. 21D.

Once children understand Credit/Debit concepts, they can adopt the accountant's just-in-time borrow technique as an alternative to the process of unpackaging surplus which presumes the Minuend has surplus amounts and hence never takes on negative values. Caution is called for because one-sided-one-function candy can't model negative values, only dual Credit/Debit accounting columns can.

The fourth technique called gratuitous borrow is a tweak on the accountant's just-in-time borrow method. The gratuitous borrow process is as follows. Starting with the uppermost digit in the Minuend, in every Minuend Digit-Square where "0" appears add one bead to both Minuend and Subtrahend Digit-Squares, Repeat this, rank by rank going left until you hit the rightmost rank in which case processing stops. Thereafter, during right to left subtraction and in the event it is necessary, one bead in the top row can always be unpackaged into ten beads on the right. For pencil-on-paper use, this amounts to redundant work, and so never finds use. However, because of the Candy Board's multi-row architecture, gratuitous borrow is the simplest among all the borrow/unpackage methods. Consider the problem "1000" minus "0999". After applying gratuitous borrow, this becomes "1110" minus "0TENTEN9" something the Candy Board handles with ease, but which traditional mathematical techniques abhor because the TEN digit is stymied by a rigid pencil-on-paper, dual-digit "10" canonical form.

Figure 22A:
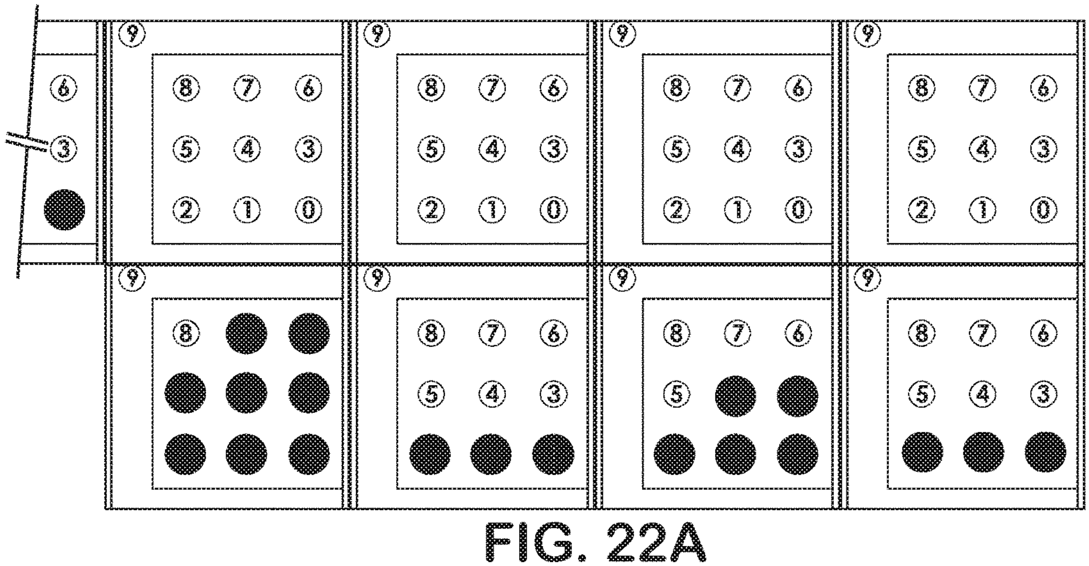
FIGS. 22A to 22J: Lesson #7. Gratuitous Borrow, worked example.
Figure 22B:
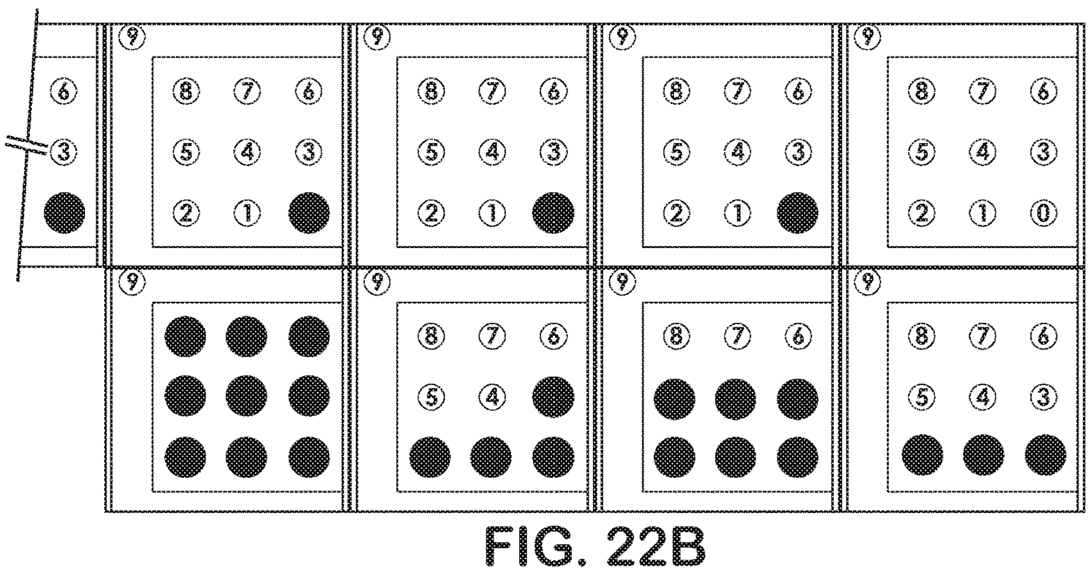
Figure 22C:
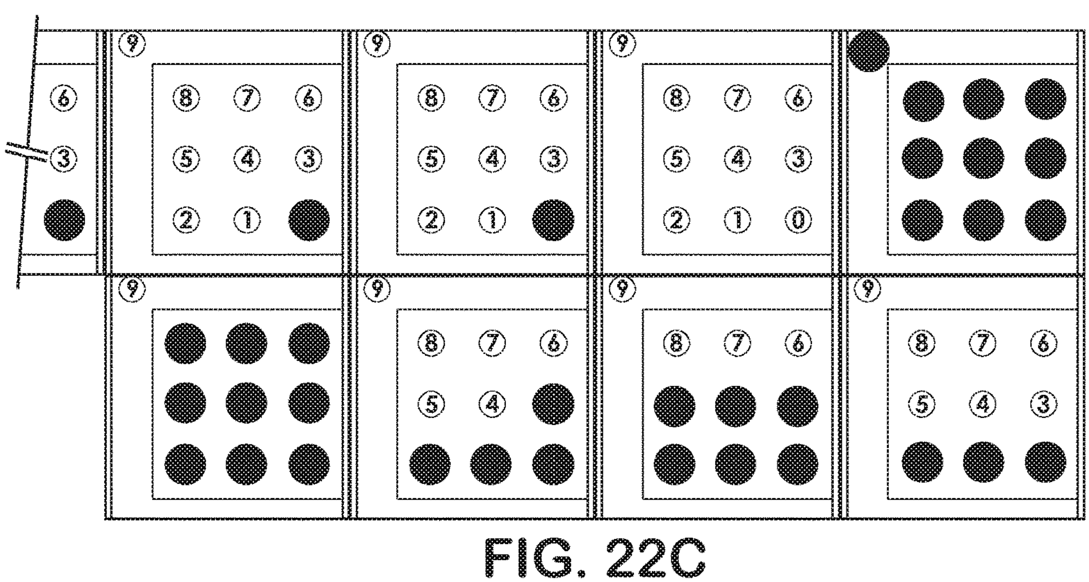
Figure 22D:
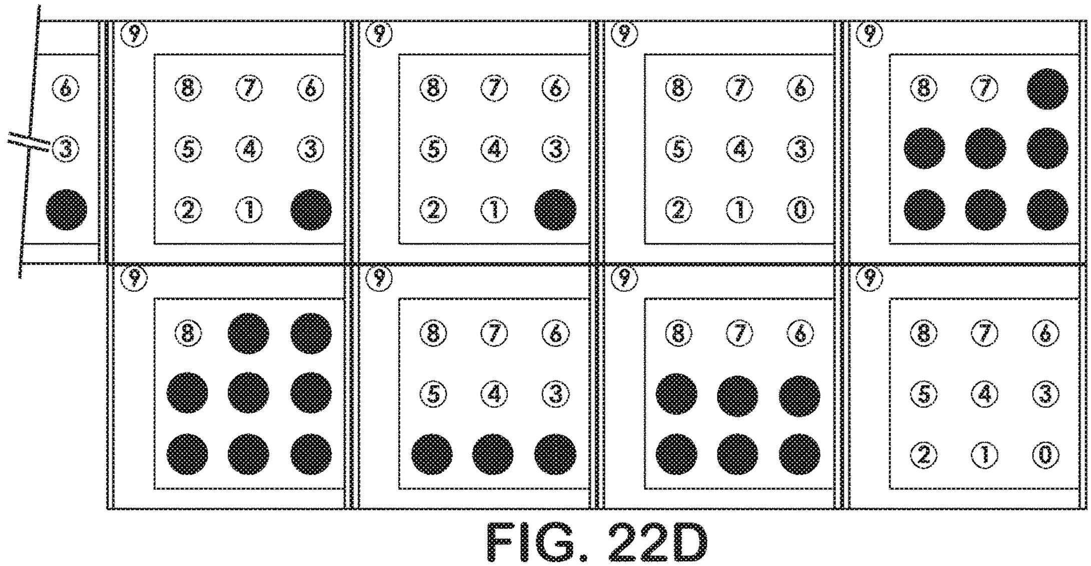
Figure 22E:
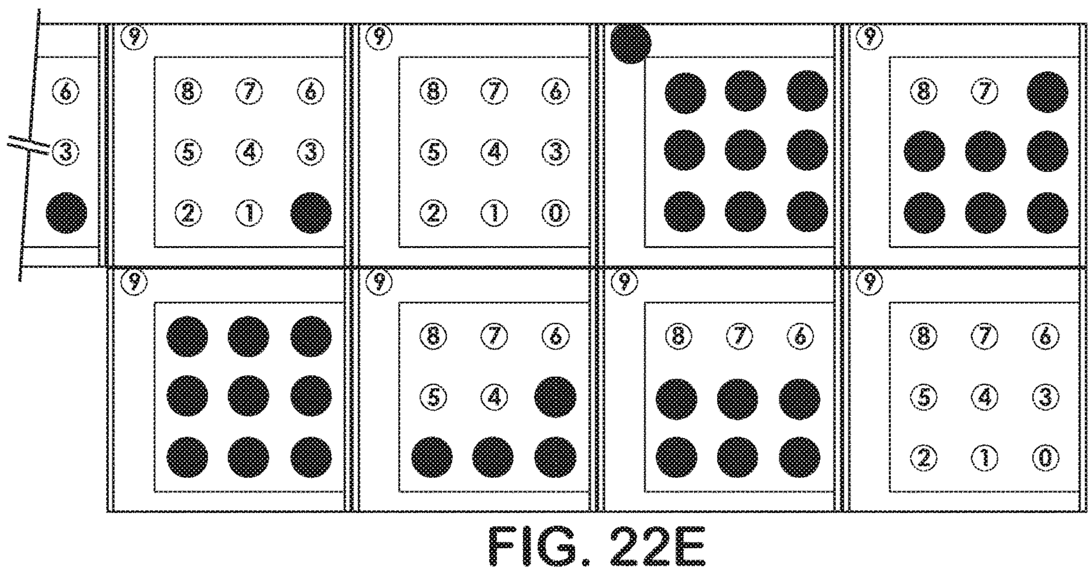
Figure 22F:
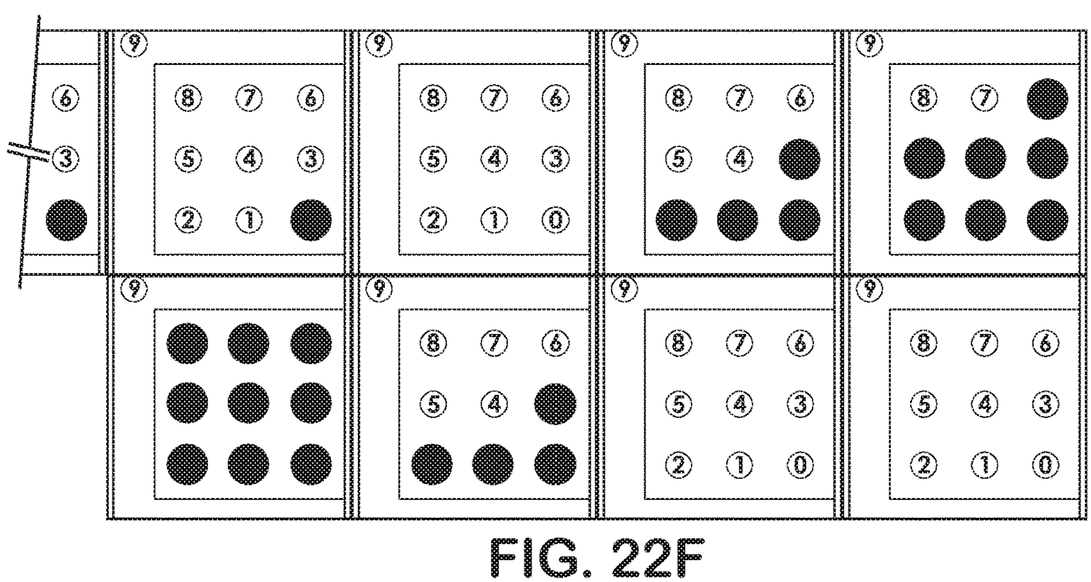
Figure 22G:
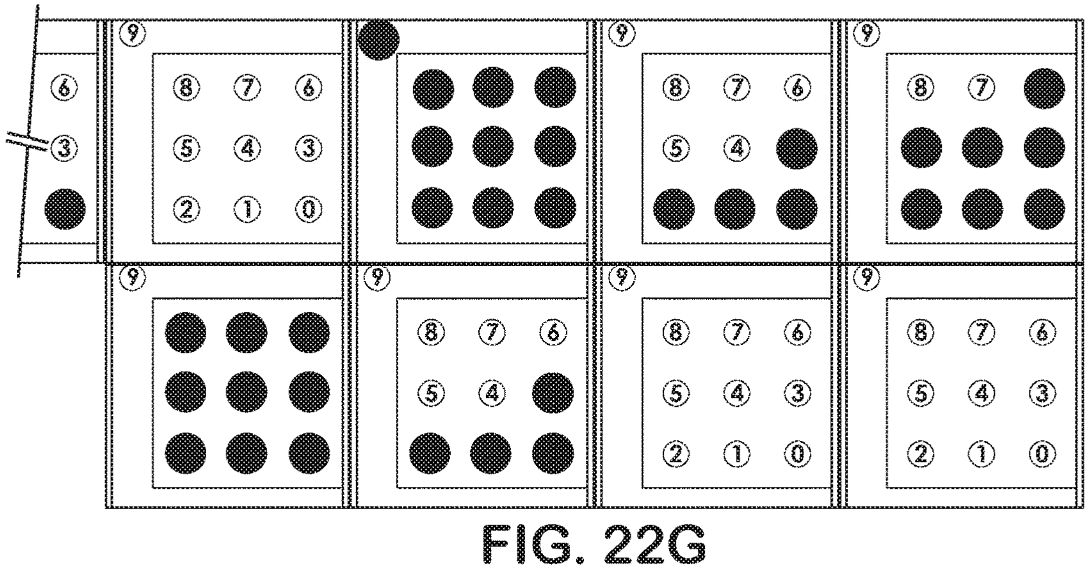
Figure 22H:
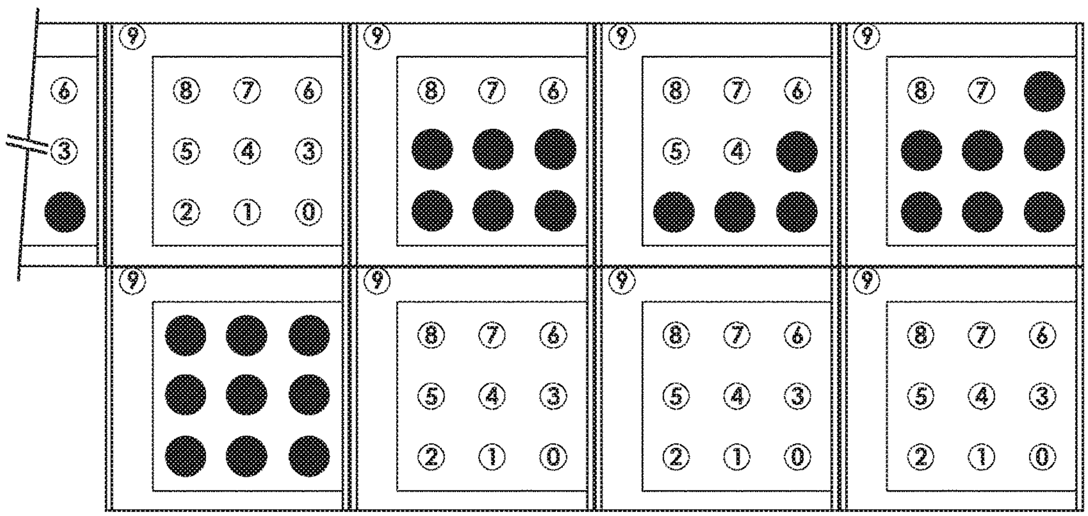
Figure 22I:
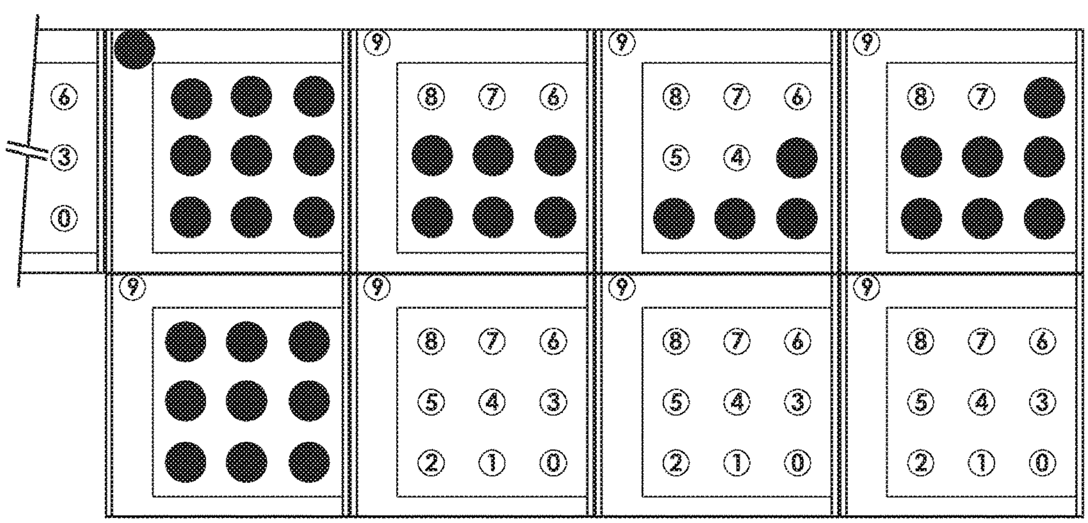
Figure 22J:
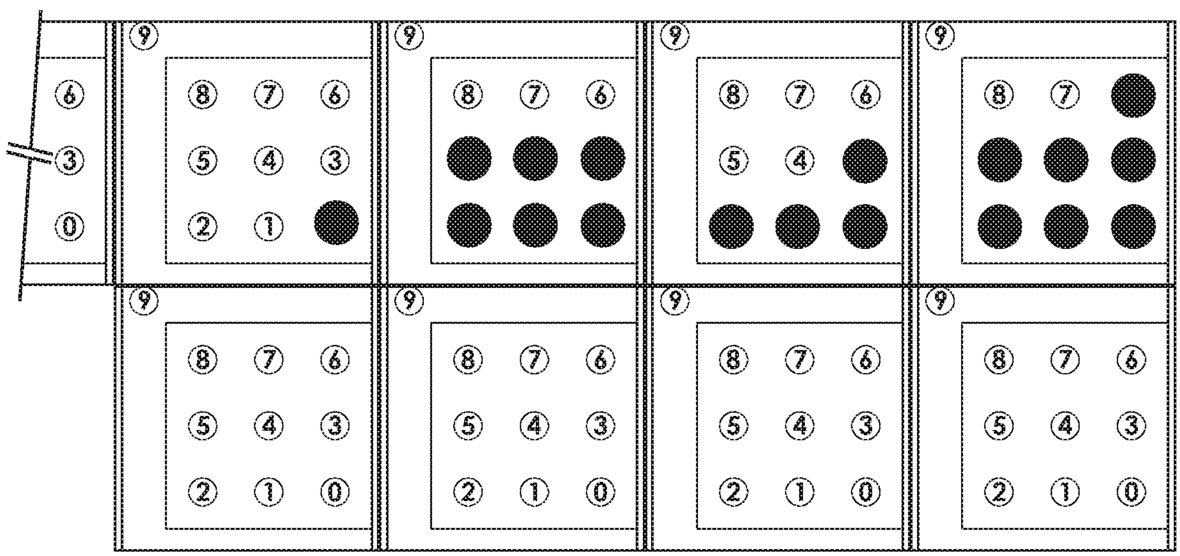

For example, consider the problem setout in FIG. 22A. After applying gratuitous borrow, "10000" minus "8353" becomes "11110" minus "9463" as depicted in FIG. 22B. Both yield the same result after subtraction, namely "1647". Essentially the accountant's borrow method has been applied gratuitously to every rank except the rightmost. Being unthinking, gratuitous borrow is the easiest way for children to resolve the "0" impasse and get subtraction under their belts before learning about other borrowing techniques.

Furthermore, using gratuitous borrow sets up the Candy Board so subtraction on each rank can proceed in any piecemeal sequence without qualm. FIGS. 22A through 22J illustrate the process. Step by step, gratuitous borrow subtraction executes as follows.

Step (A): Setup the Minuend value in the top row and the Subtrahend value in the bottom row.

Step (B): If the Subtrahend is completely zeroed out then stop, subtraction has finished.

Step (C): If the Minuend has completely zeroed out then stop, subtraction has finished and take note that the Subtrahend holds a negative value.

Step (D): Set the focus on the higher of the uppermost digit in the Minuend or the Subtrahend.

Step (E): Move the focus one rank to the right. If the focus rank is now the rightmost rank, then go to Step (F). Otherwise, if the Minuend focus Digit-Square is "0", then add one bead to both Minuend and Subtrahend Digit-Squares. Go to Step (E).

Step (F): if the Subtrahend focus Digit-Square is non-zero, then go to Step (H).

Step (G): Shift the focus one rank to the left. If the focus rank has run past the uppermost digit in both the Minuend and Subtrahend, or has run off the compute board then subtraction is complete, so stop. Otherwise, go to Step (F).

Step (H): In the focus rank, from both the Minuend and the Subtrahend, simultaneously slide one bead out of top and bottom Digit-Squares while beads remain in both Digit-Squares. If the Subtrahend Digit-Square becomes "0", go to Step (G).

Step (I): If the Minuend Digit-Square is "0", check the value of the Minuend Digit-Square left of the focus rank. If this value is "0" or the left rank has run off the board, then subtraction is complete so stop and note that the result is a negative number. Otherwise, in the Minuend, perform an Unpackaging operation from the rank left of the focus rank, thereby setting up a TEN bead pattern in the focus rank of the Minuend. Go to Step (H).

Once subtraction is mastered, the best games going forward involve storylines combining adding in and subtracting out, such as "Game of Add-up the Grocery List, Redeem Coupons and Pay the Bill," because this puts the whole process of Packaging, Unpackaging and right-to-left rank-wise bead processing into play. As the child's mastery improves the numbers should get larger as well.

Lesson #8, Introducing Symbol Chips into Calculations

Once the child has mastered the various Games of Addition and Subtraction, the digit glyphs "0" through "9" would have been subitized into his mind as proxies for the bead pattern and bead count. As age and maturity dictate, a reboot of the Game of Adding up the Grocery List using the numeric chips, as depicted in FIGS. 23A through 23F, is advised. The benefit of this game is to reinforce the subitization necessary to recognize digit glyphs at a glance.

Figure 23A:
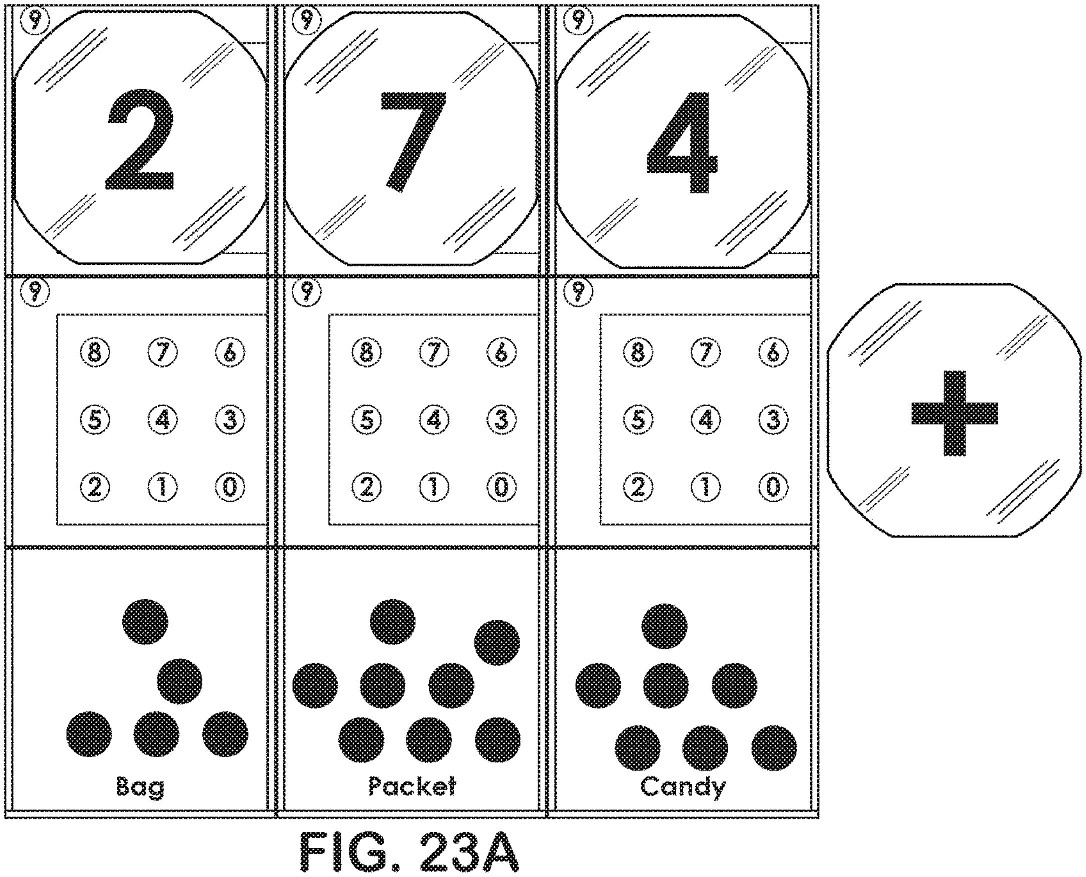
FIGS. 23A to 23F: Lesson #8. Transition to Numerical Symbols.
Figure 23B:
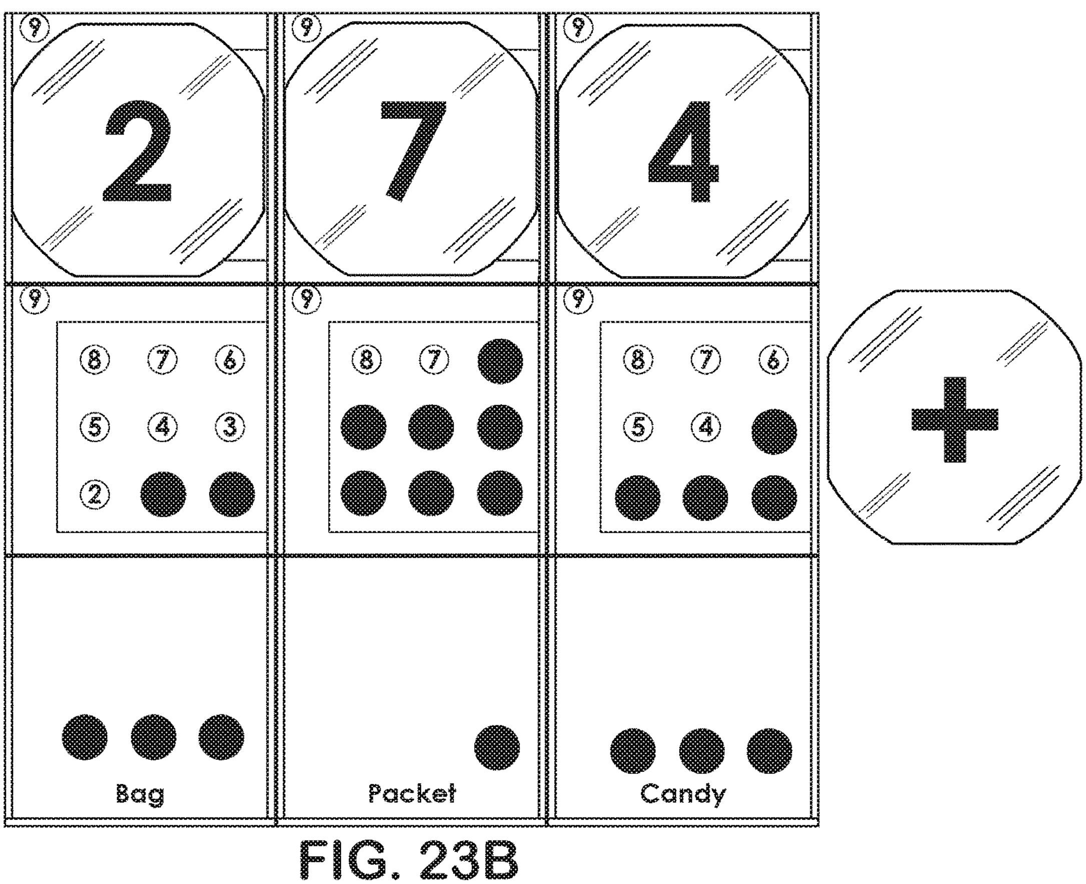
Figure 23C:
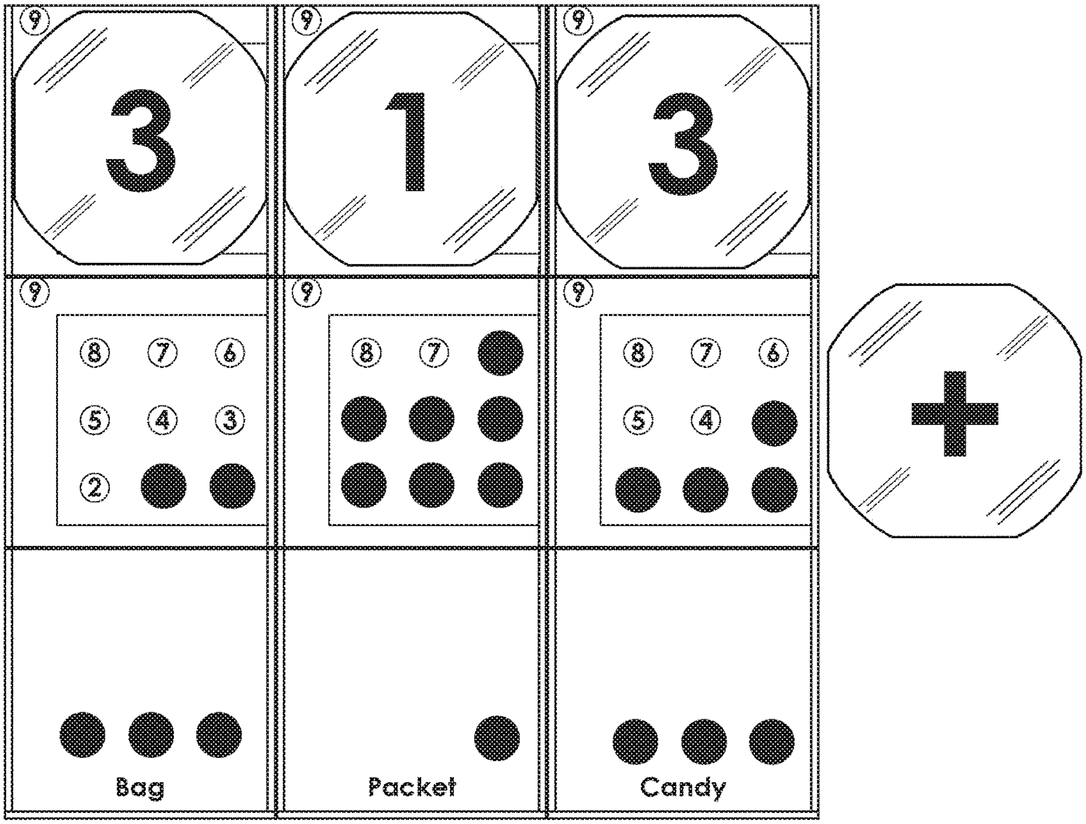
Figure 23D:
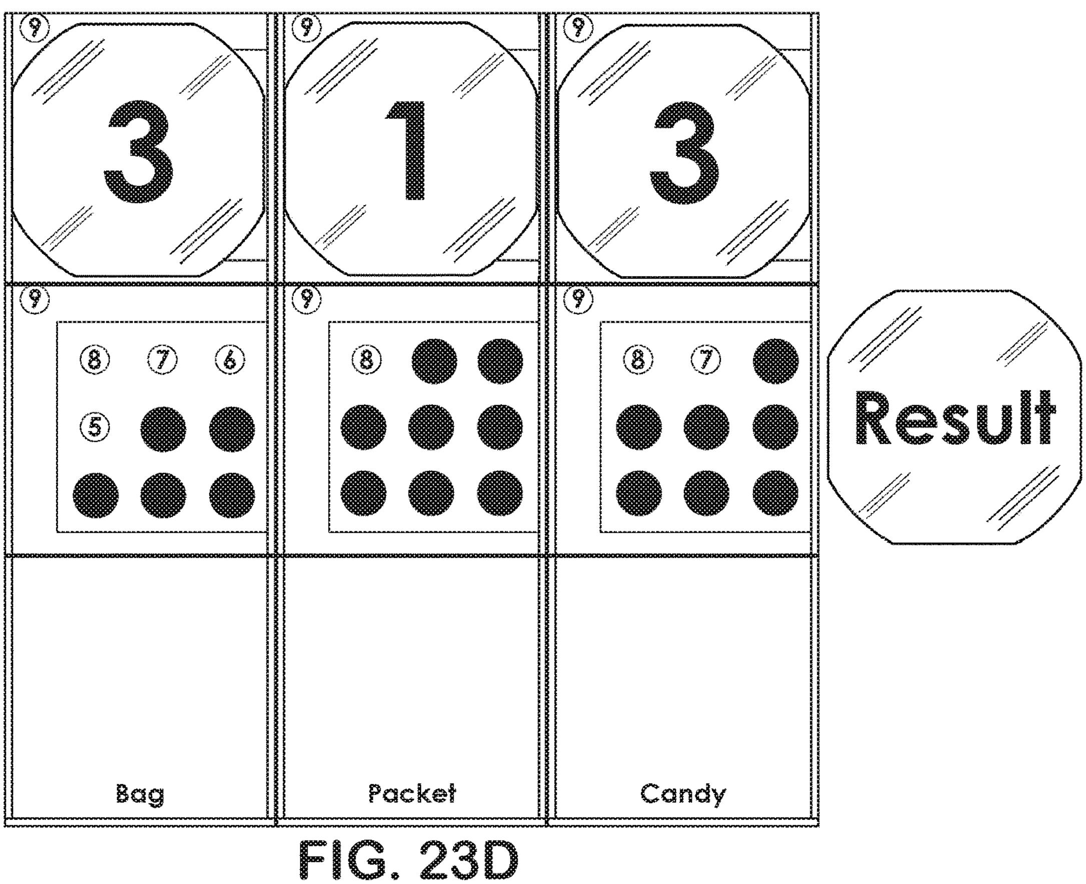

For example, $2.74, the first number on the grocery list, is placed in the top row as a sequence of numeric chips and off to the rightside of the bottom row, the [+] guide chip is placed, as depicted in FIG. 23A. The child must setup the bottom row with the numbers shown on the top row chips, as depicted in FIG. 23B. Next, the second item on the grocery list $3.13 is setup as a numeric chip sequence in the top row, as depicted in FIG. 23C. The child adds the additional beads from the Tray to the bottom row as the number in the top row dictates, as depicted in FIG. 23D. At this point, the parent has the child to remove the chips in the top row and place chips that correspond to the number shown in the bottom row. When that is done, the child must speak the number, 5 Boxes, 8 Packets, 7 Candies, or in the alternative 5 Dollars, 8 Dimes, 7 Cents. When children mature sufficiently to count to one hundred, they should reply 5 Dollars, 87 Cents.

Figure 23E:
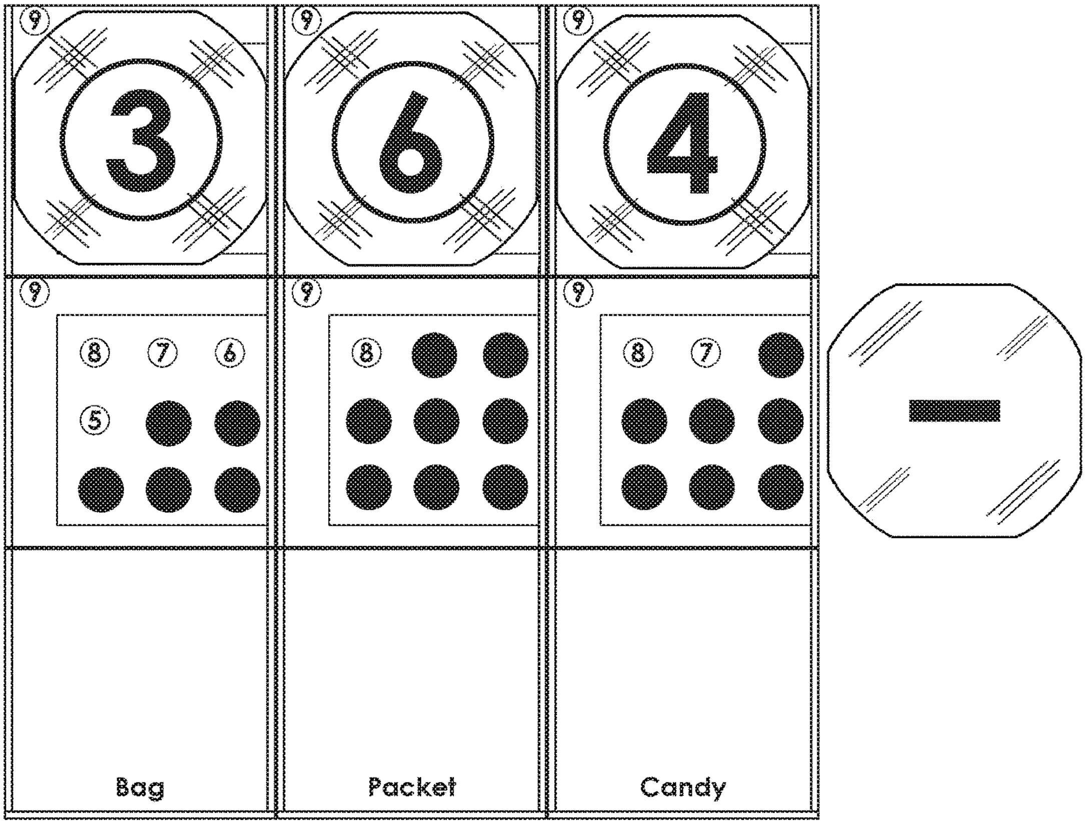
Figure 23F:
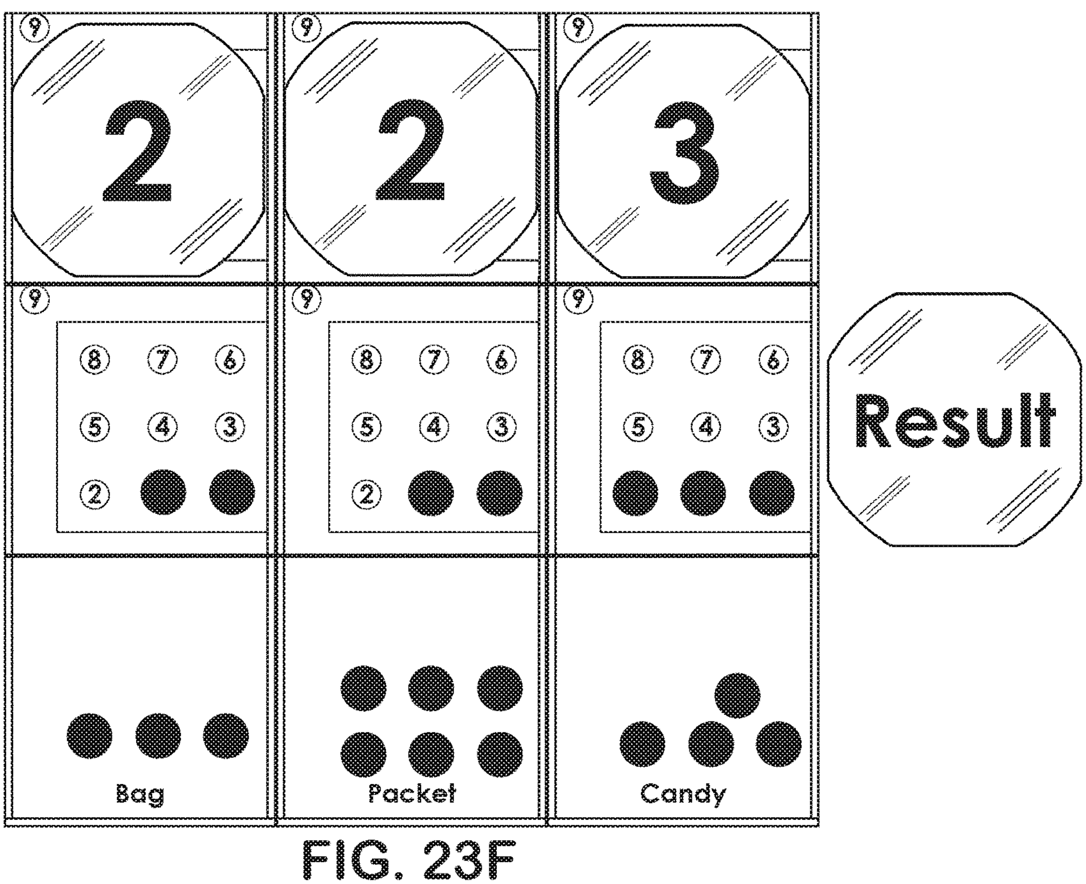

Using red-circle chips and the [−] guide chip, subtraction can be performed. As depicted in FIG. 23E, a $3.64 coupon redemption is incorporated into the story. The bead slide-off process of subtraction only involves one row, so the child must count as he slides beads off, using subitized awareness, which is the primary learning experience for playing this game. The bead slide-off yields the bead pattern "223" in the bottom row, and the parent asks the child to change the chips in the top row to reflect the value of the bottom row, as depicted in FIG. 23F. After doing so, the child speaks aloud the value shown in the top row. The game proceeds with another item to either add or subtract, and so on.

Lesson #9, Game of Algebra

Encouraging the child to think and reason plays a huge part in self-learning and cultivating mastery and accomplishment. Once adept at the Game of Subtraction, the child should be more astute about the ins and outs of what he is doing on the Candy Board, and so should be better equipped to decode the mystery behind algebraic reasoning.

Consider the algebraic scenario, 743 minus 5PC equals B21, as depicted in FIGS. 24A through 24J. This is a triple mystery with three variables, so it requires a Candy Board with at least three ranks and three rows, corresponding to Minuend, Subtrahend and Result from top to bottom.

Figure 24A:
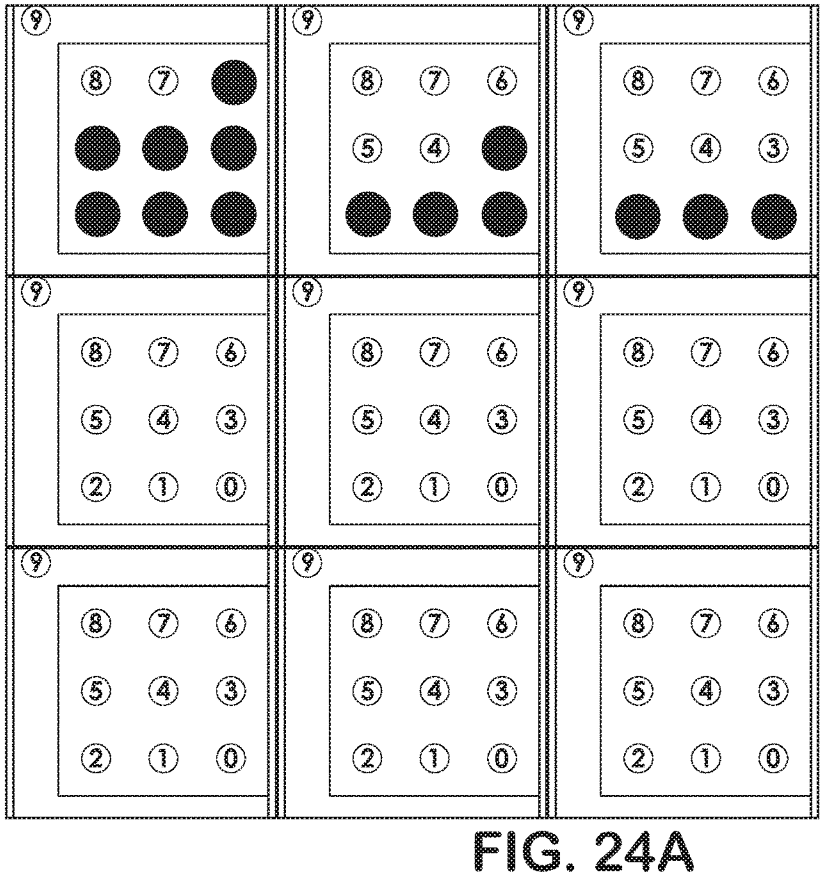
FIGS. 24A to 24J: Lesson #9. Game of Algebra, worked example.
Figure 24B:
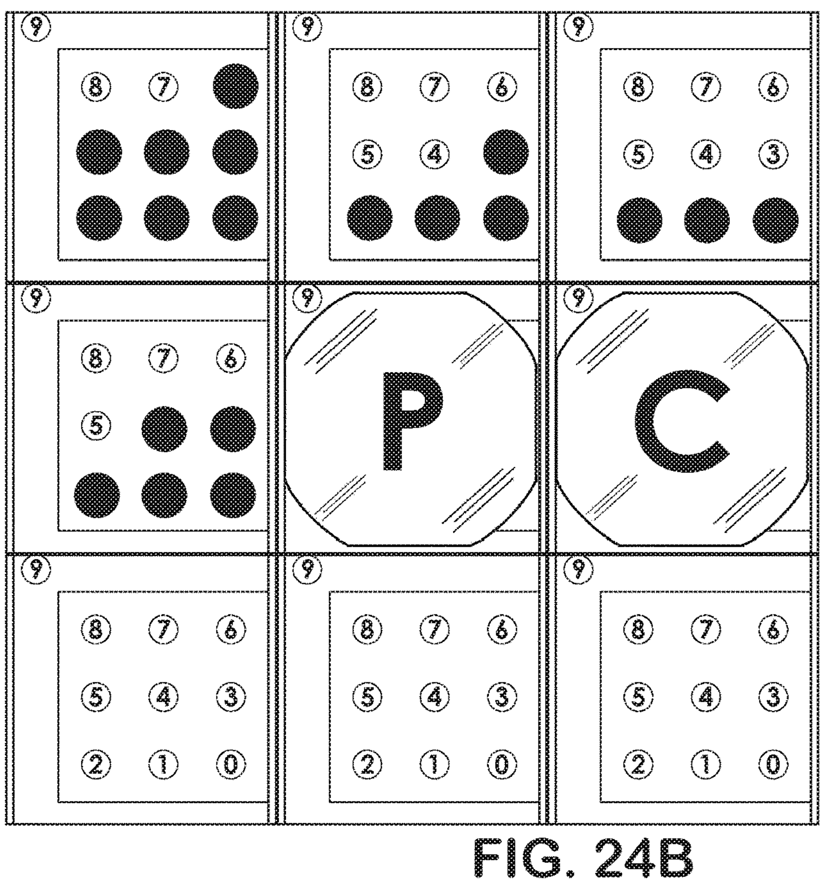
Figure 24C:
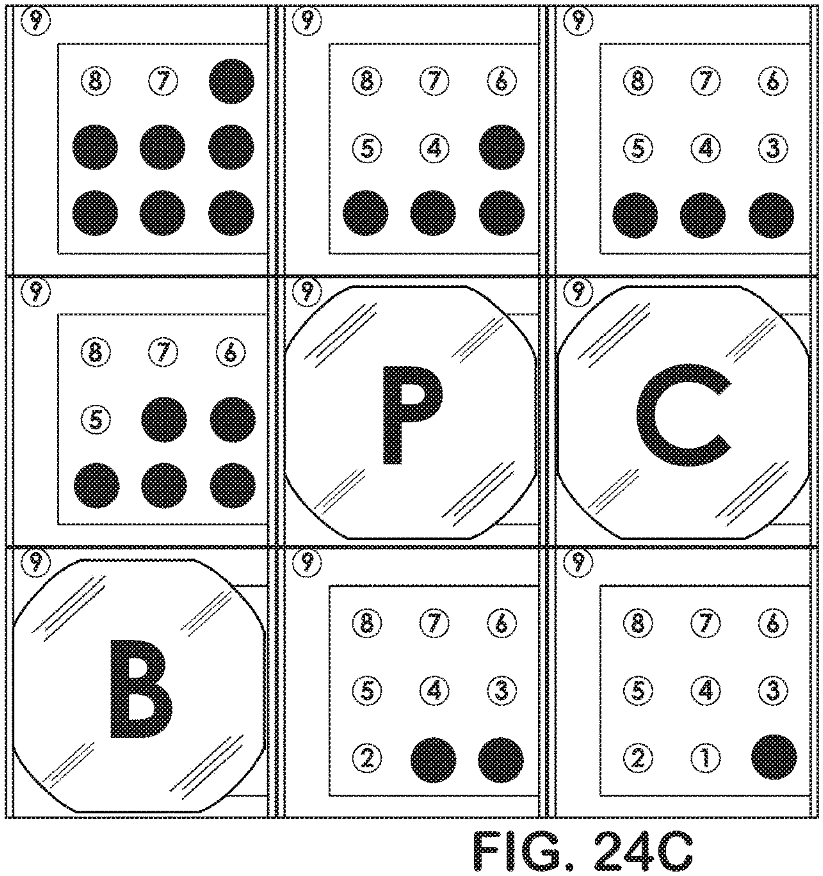

The storyline is as follows. The Smith pantry initially contains 7 Bags, 4 Packets, 3 Candies. The child places the pantry inventory setup in the top row, as depicted in FIG. 24A, Mommy saw Daddy carrying 5 Bags with him as he left for work, but she could not see if he took any Packets and Candies. The child sets up the state of candy removal as "5PC", using the [P] and [C] guide chips in place of beads in the Packet-Rank and Candy-Rank Digit-Squares on the middle row, as depicted in FIG. 24B. The [P] and [C] chips represent the mystery of how many packets and candies Daddy took with him, if any. A few minutes later, Uncle Fred leaves for work and tells Mommy he took all the Bags. Mommy checks the pantry and finds only 2 Packets and 1 Candy. The parent asks the child to load "21" into the Packet-Rank and Candy-Rank Digit-Squares on the bottom row to indicate what is left over after Uncle Fred grabbed all the Bags in the pantry. Next, the child places a [B] guide chip on the bottom row in the Bag-Rank Digit-Square to indicate the mystery of how many bags were in the pantry before Uncle Fred removed them, as depicted in FIG. 24C. The child is thus confronted with a variant of Lesson #8, except instead of digits the chips have letters. Algebraic bead play is similar but not rote as it is in Lesson #8. The child must reason this through and understand he is hunting for the correct bead pattern and bead count which the letters on the chips represent. The child is not exercising subitization, but the power to find bead state equalization.

Figure 24D:
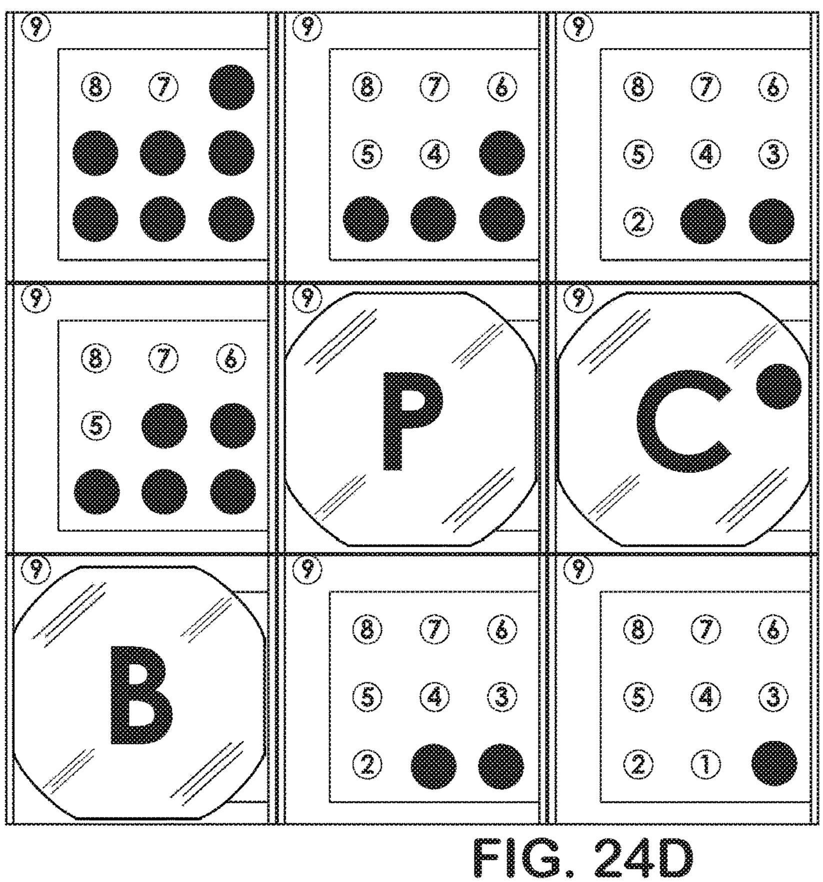
Figure 24E:
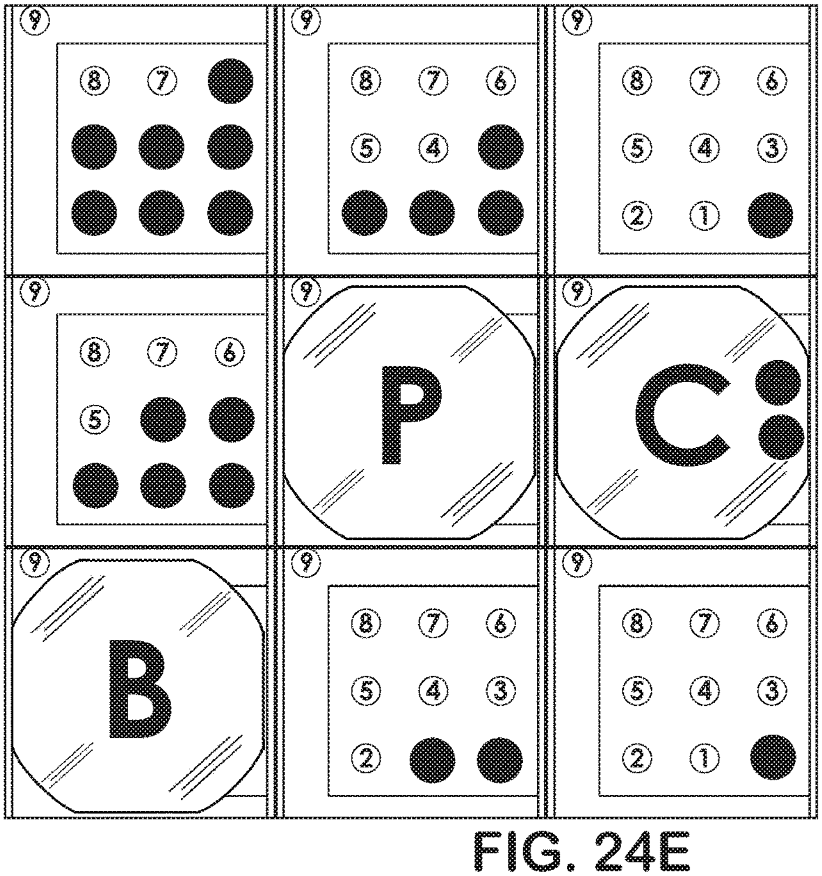
Figure 24F:
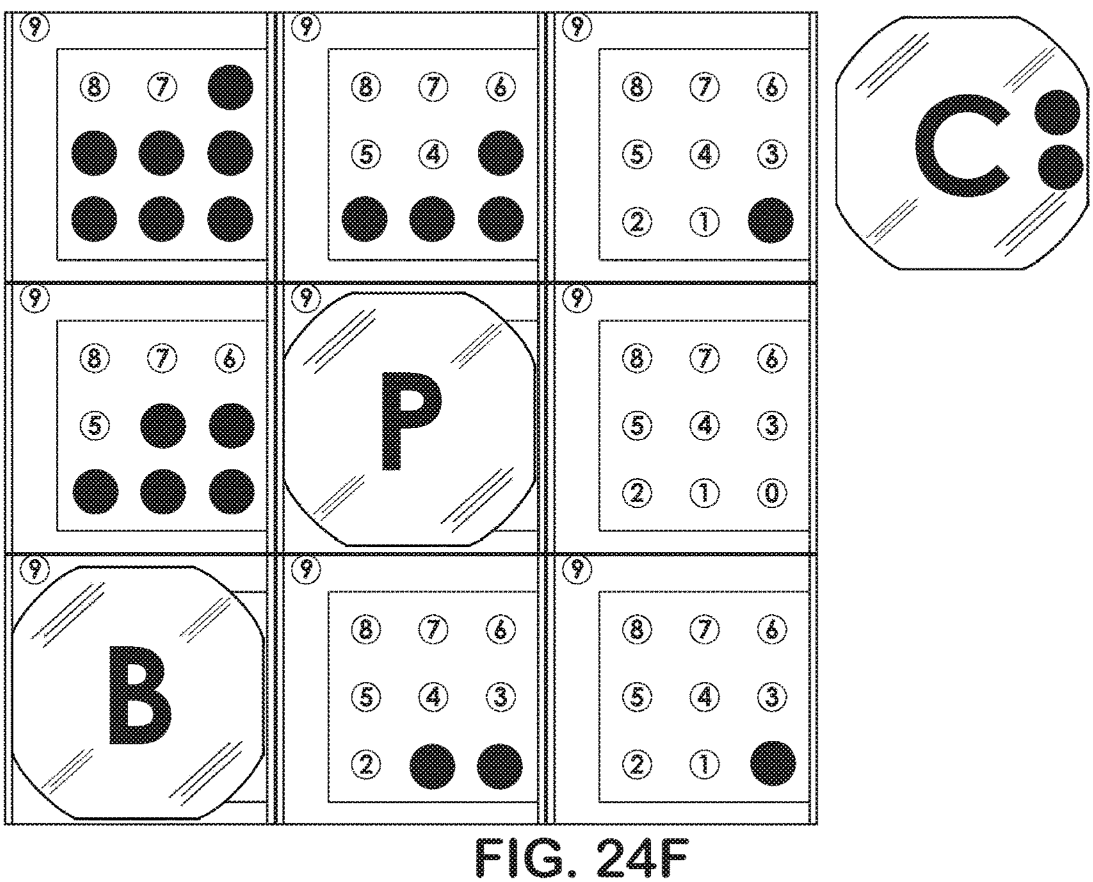

Once the Game of Algebra is setup, the parent shows the child how the beads on the Candy Board can solve these three mysteries. Starting with the Candy-Rank, the parent removes candy from the top row one by one, and deposits it into the middle row atop the [C] guide chip, as depicted in FIGS. 24D and 24E. This is equivalent to subtraction except the [C] guide chip acts as the discard. Tray, a proxy for Daddy's pocket. When there is one bead left in the top row, this matches the "1" Candy left in the bottom row, the final inventory. Bead equalization has been established. The mystery is solved. Daddy took 2 Candies. The parent picks up the [C] guide chip and places it to the right of the Candy Board along with the 2 beads it represents, as depicted in FIG. 24F.

Figure 24G:
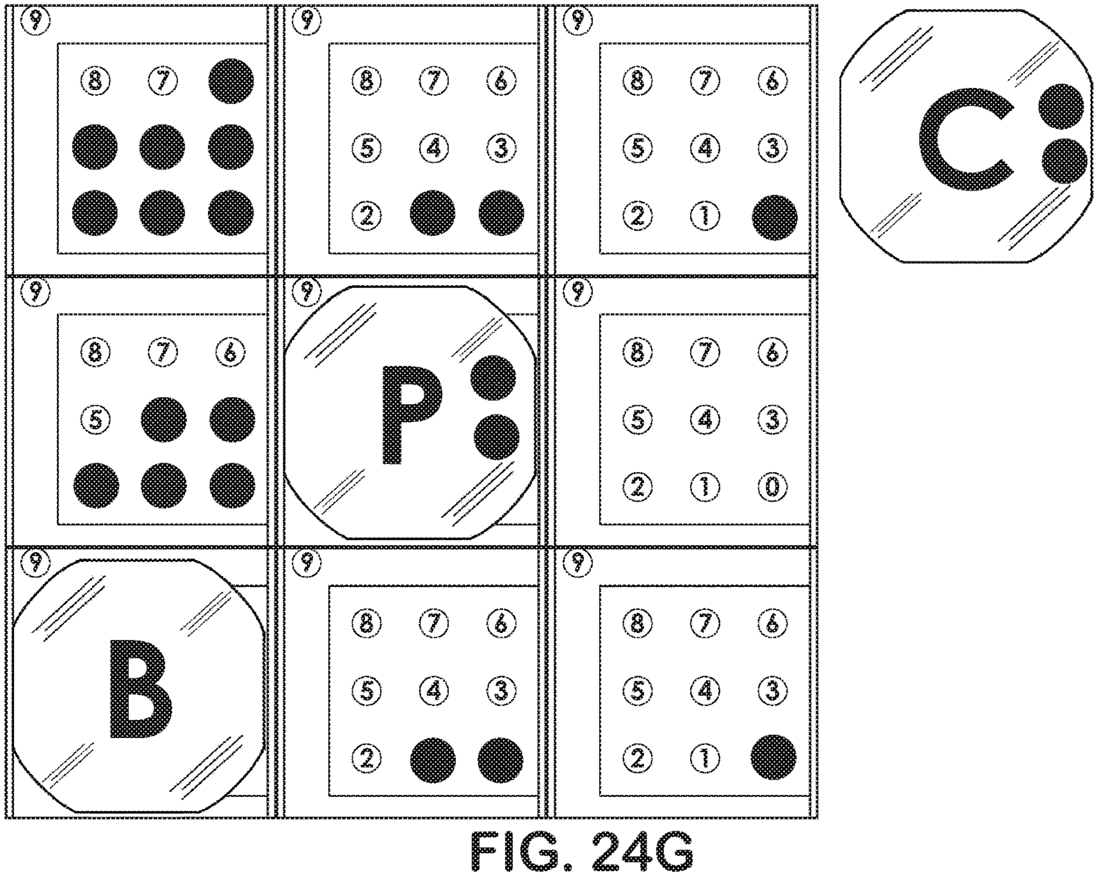
Figure 24H:
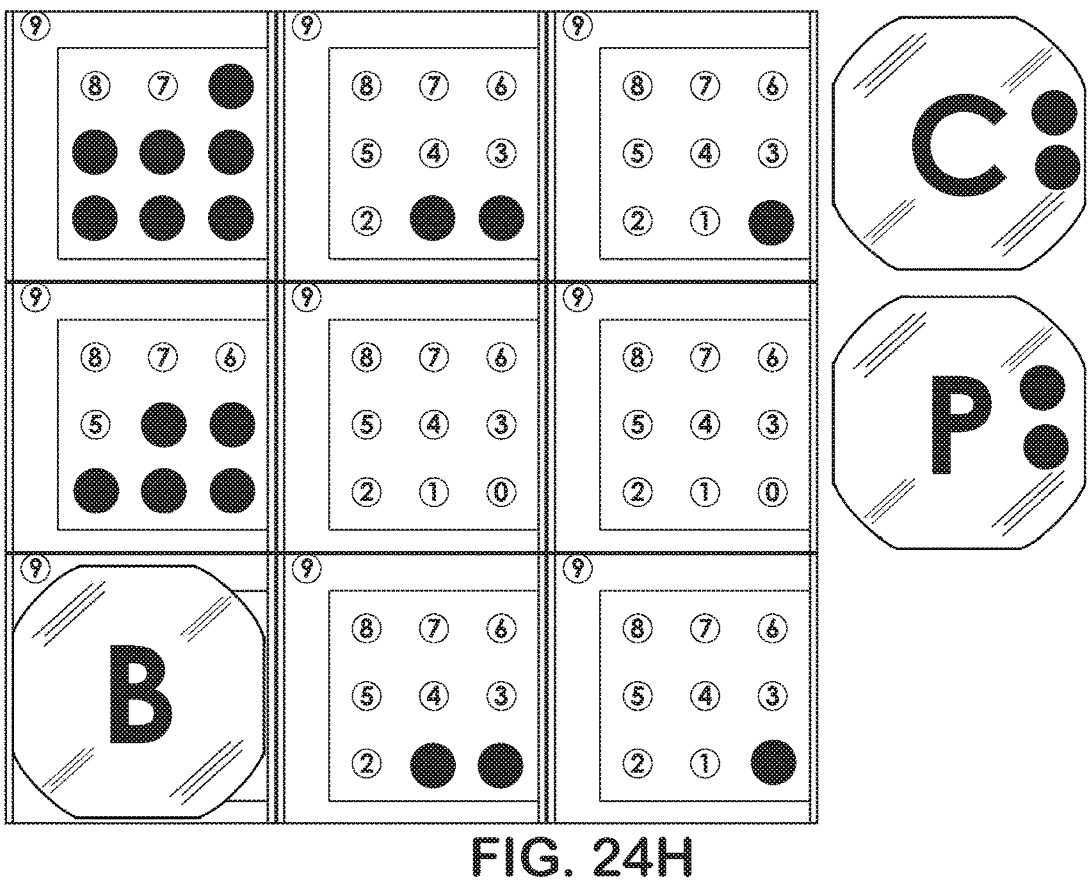

The focus turns to the [P] guide chip in the Packet-Rank. The process the parent uses for the [P] guide chip is exactly the same line of reasoning that solved the problem of the [C] guide chip. Once two beads are moved from the top row into the middle row atop the [P] guide chip, the child should observe that the top and bottom rows now have matched up number of packets, as depicted in FIG. 24G. The mystery is solved because bead equalization has been established. Daddy took 2 Packets. The parent picks up the [P] guide chip and places it to the right of the Candy Board along with the 2 beads it represents, as depicted in FIG. 24H.

Figure 24I:
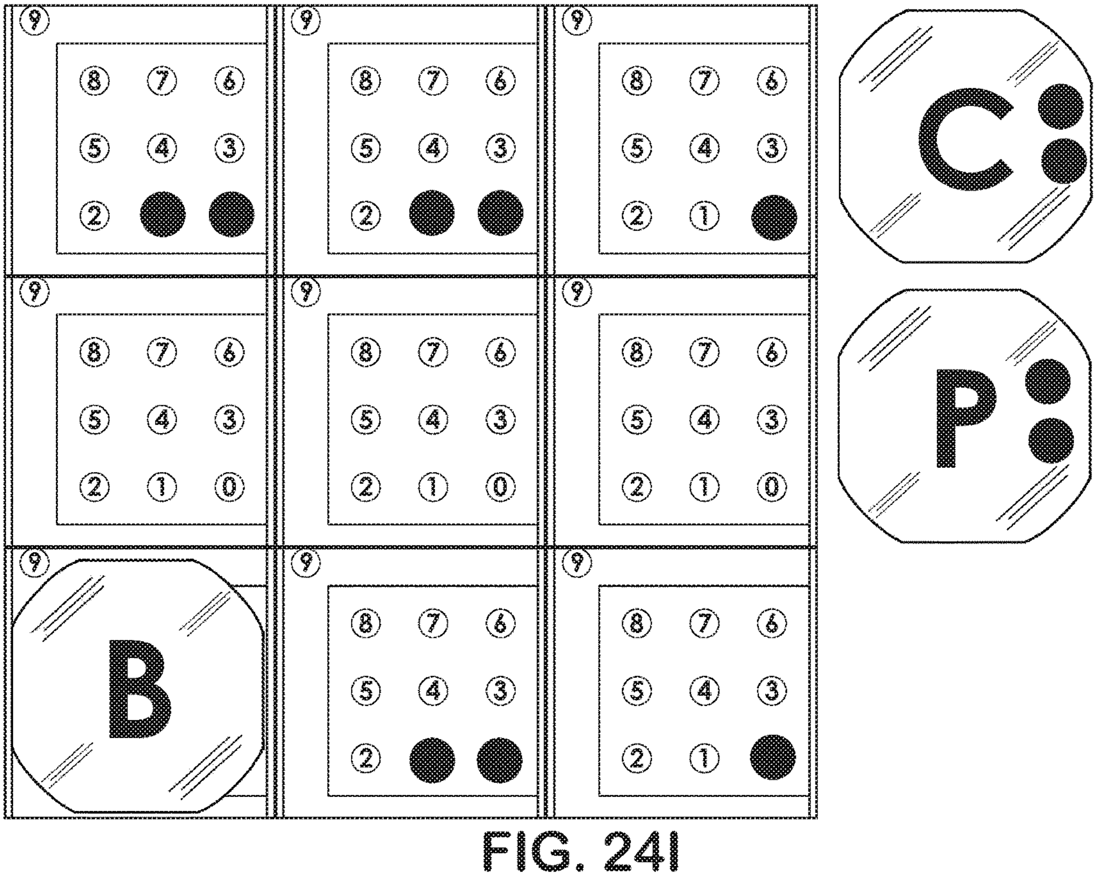
Figure 24J:
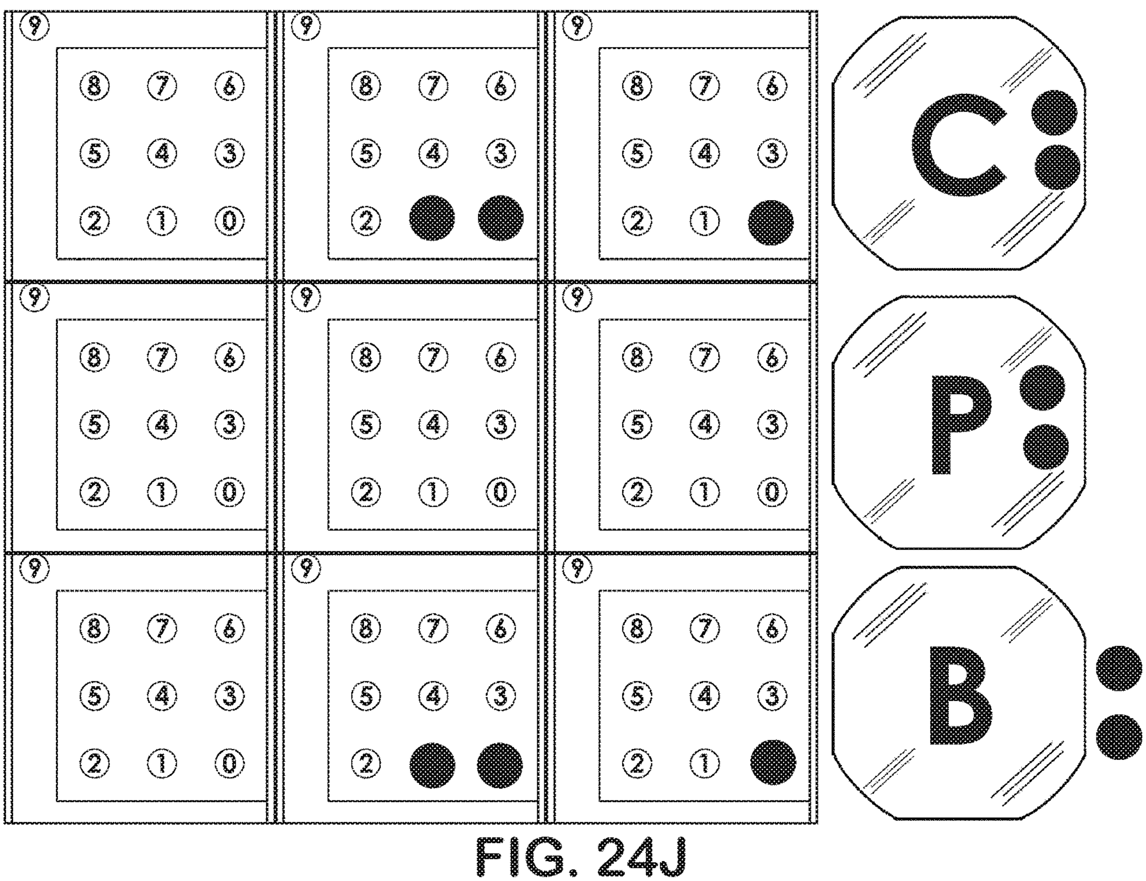

The focus turns to the [B] guide chip in the Bag-Rank, bottom row. The child should be able to solve this without much prompting because it entails direct subtraction of the middle row from the top row. From the 7 beads in the top row and the 5 beads of the middle row, one by one beads are removed from the Candy Board. This countdown represents the 5 Bags Daddy took to work. As depicted in FIG. 24I, on the top row, 2 beads are left. Since Uncle Fred took all the Bags left over, the mystery is solved. The parent picks up the [B] guide chip and places it to the right of the Candy Board and puts the 2 beads beside it, as depicted in FIG. 24J, which shows that the pantry has no Bags left. Top and bottom rows are now completely equalized, as algebra requires.

Lesson #10, Game of Doubling and Sharing

The Game of Doubling is best played on a one-row Candy Board because it compels the child to in-situ add an equal number of beads into the Digit-Squares as were originally there before doubling. This exercises the child's power of memory and subitization. Mimicking multiplication, the Game of Doubling proceeds right to left. As an equal number of beads are slid into the focus Digit-Square, packaging operations may be triggered that require resolution before more beads can be slid into the focus Digit-Square. This game is the lead in for children to recognize how "5 plus 5 equals 0, package 1", "6 plus 6 equals 2, package 1", and so forth.

The Game of Sharing is played on a multi-row Candy Board that reflects the number of batches that will be created. For example, dividing candy among two people requires a two-row Candy Board, for three people, a three-row board, and so forth.

Figure 25A:
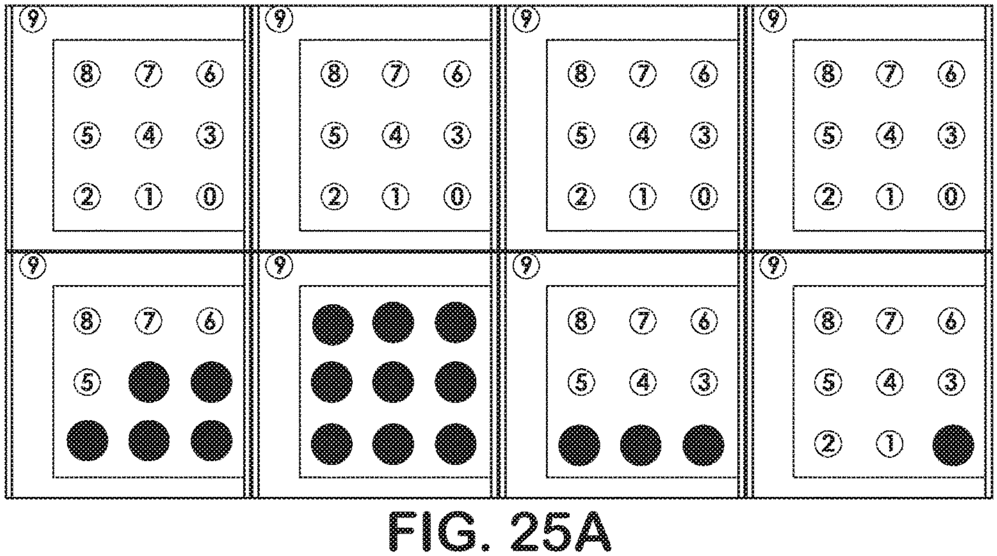
FIGS. 25A to 25I: Lesson #10. Game of Sharing, worked example.
Figure 25B:
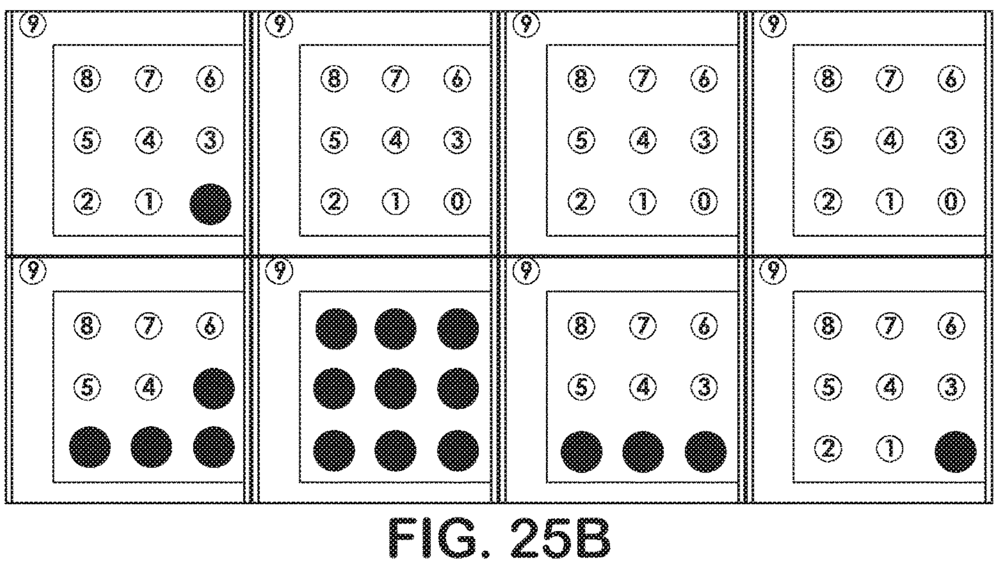
Figure 25C:
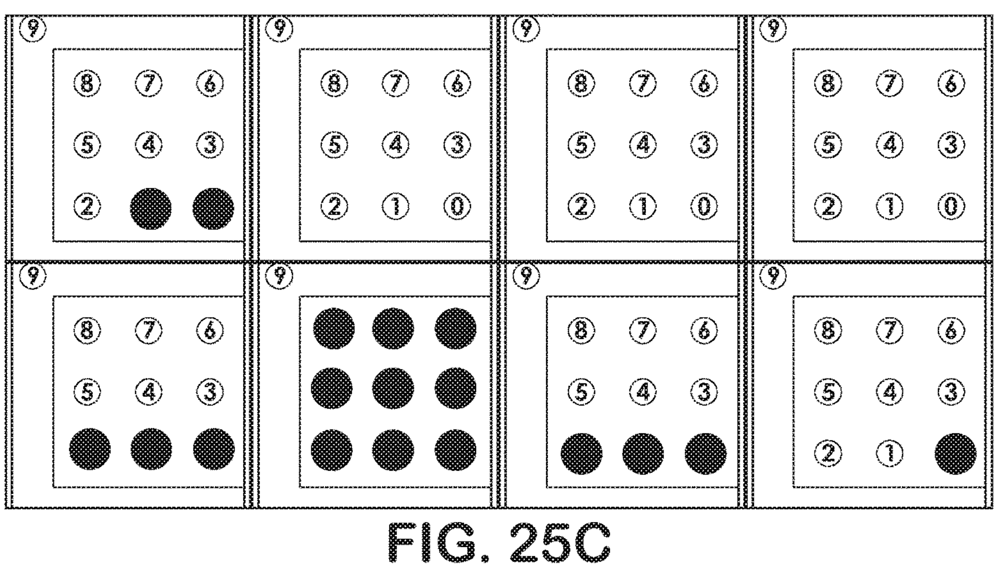

Consider the Game of Sharing where a larder of candy must be divided between two people, as depicted in FIG. 25A, with the dividend value "5931" in the bottom row.

Mimicking division, the Game of Sharing always proceeds left to right, namely share the Boxes first, Bags second, Packets third, and the Candy last. During each step, a remainder of either zero or one bead is created. For example, 5 Boxes divides into 2 Boxes a piece with 1 Box remaining undivided. This remainder box can be unpackaged into TEN Bags, which can then be shared along with whatever Bags are already in the candy larder.

The Game of Sharing Executes as Follows.

Step (A): Setup the Dividend value in the bottom row and zero out the top row, as depicted in FIG. 25A. The focus rank is the leftmost non-zero Digit-Square of the Dividend.

Step (B): Slide beads from the bottom Digit-Square into the Digit-Square above until the bead pattern in the top Digit-Square is one bead greater than or equal to the bead pattern in the bottom Digit-Square, as depicted in FIGS. 25A through 25D.

Figure 25D:
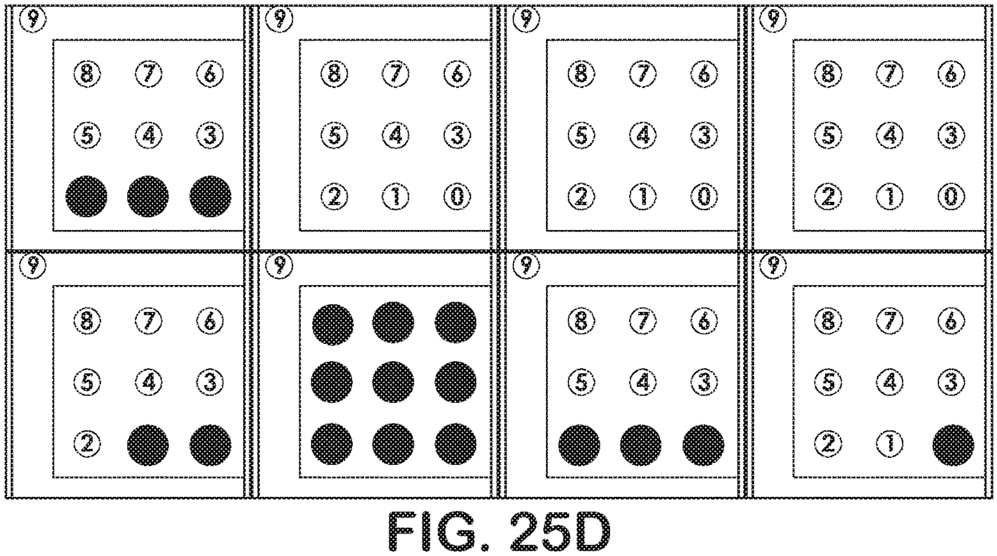
Figure 25E:
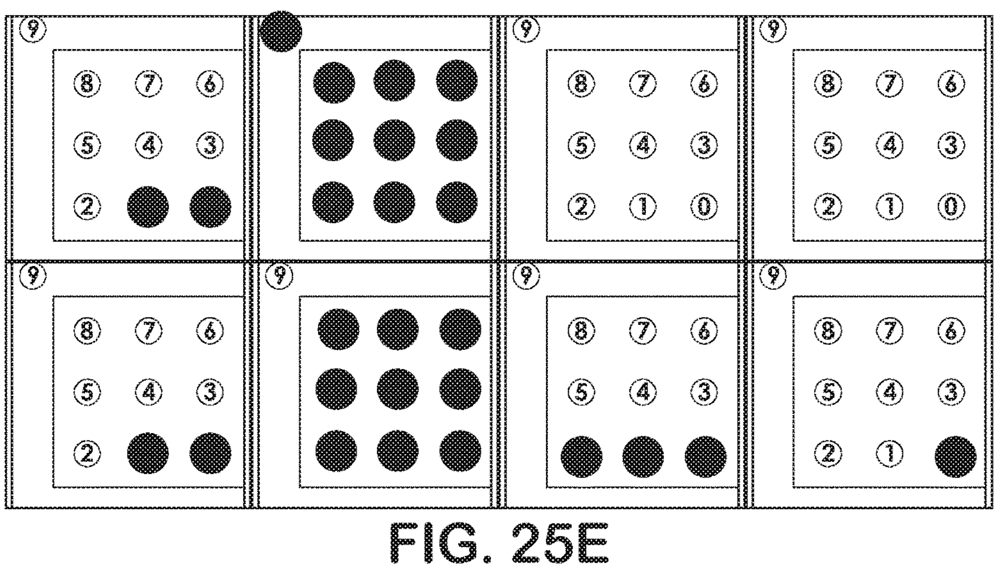
Figure 25F:
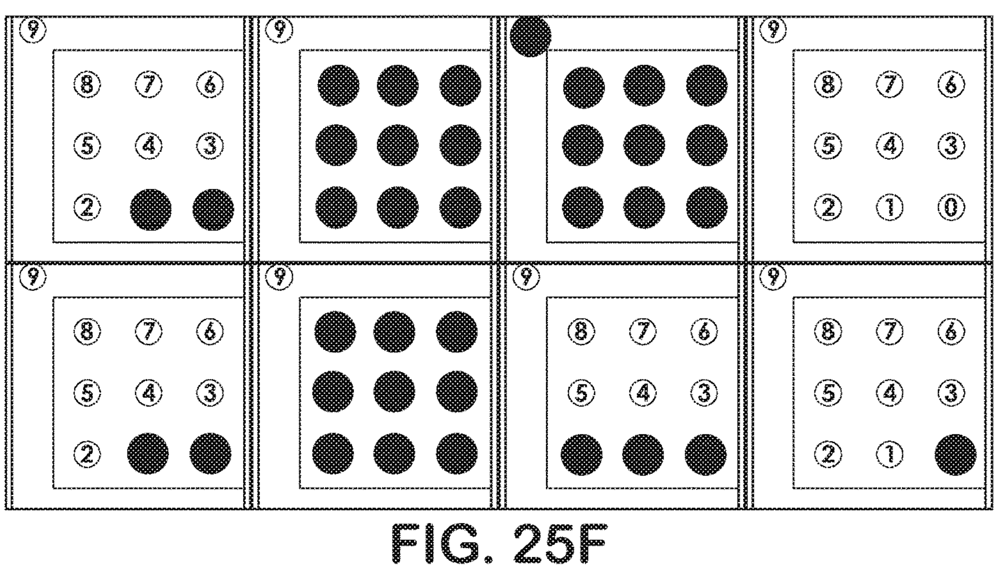
Figure 25G:
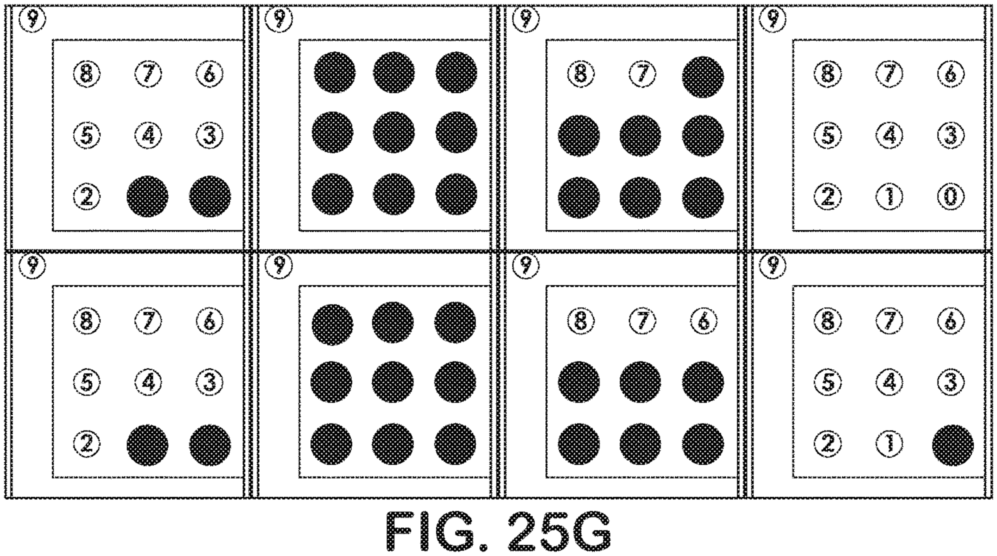
Figure 25H:
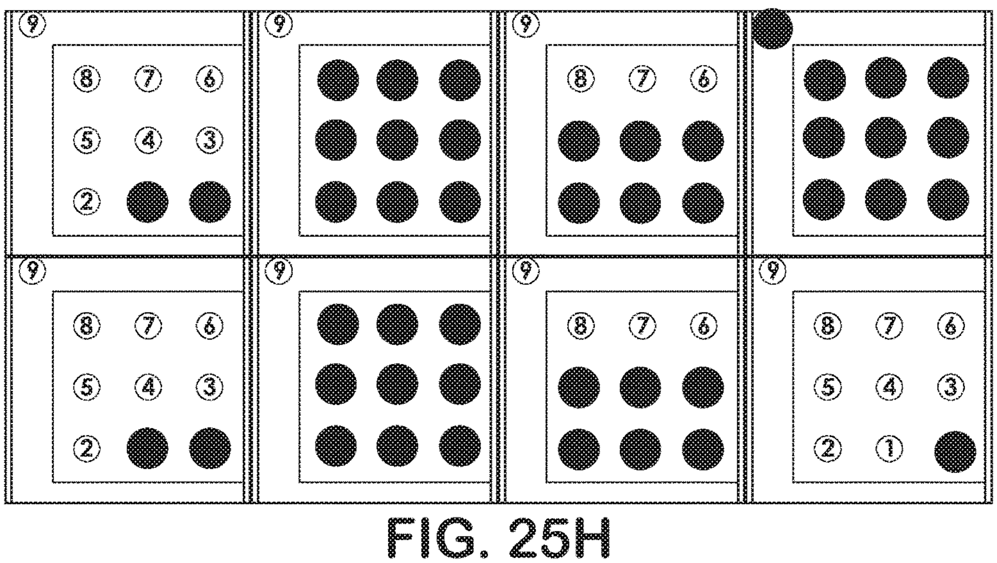
Figure 25I:
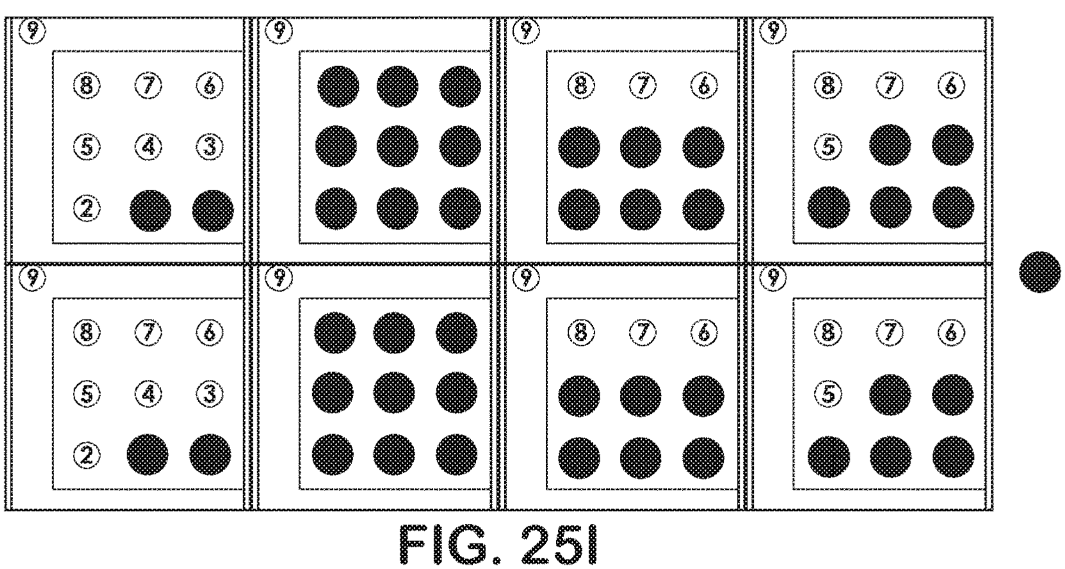

Step (C): If the bead pattern in the top Digit-Square is one bead greater than the bead pattern in the bottom Digit-Square, as depicted in FIGS. 25D, 25E, and 25G, for Box, Bag and Packet ranks respectively, then a Remainder bead has been created in the focus rank. If the focus rank is on the rightmost, place any Remainder beads to the right of the Candy Board and terminate, as depicted in FIG. 25I. Otherwise, wherever a Remainder bead exists apply plosive-state equilibration, namely slide the Remainder bead into the Tray and perform an Unpackaging operation into the empty Digit-Square one rank to the right, which creates the TEN bead pattern, as depicted in FIGS. 25E and 25F and 25H, for Bag, Packet and Candy ranks respectively. The rank focus now shifts one rank to the right.

Step (D): If the top row is less then the bottom row, then go to Step (B). Otherwise, slide beads from the top row into the Digit-Square on the bottom row until the Digit-Square in the top row has a bead pattern one bead greater than or is otherwise equal to the Digit-Square in the bottom row, as depicted in FIG. 25G. Go to Step (C).

Once the child has mastered the concept of divvying by two, he should tackle sharing among three on a three-row Candy Board. The process is similar to division by two, except there are two upper rows. Similar to the divide by two rule, all three rows must show the same bead pattern. With three-way division, remainders of zero, one or two beads are created, which are subsequently unpackaged into the Digit-Squares right of the focus rank in one or both the top and middle rows as the circumstances dictate.

Divide by ten is demonstrated to the child as the right to left process of shifting all the beads right by one rank. Divide by five should also be mastered, namely in-situ double the bead pattern, or in the alternative duplicate the bead pattern into the top row and then add the top row into the bottom row. Thereafter, divide the doubled-up value by ten. These divide by five and divide by ten skills are used to calculate square roots via iterative improvement in Lesson #15, Game of Magic Twins.

Lesson #11, Game of Simplified Division

The Game of Simplified Division involves repetitive subtraction of the divisor, and is best played with problems where individual digit values in a quotient don't exceed four.

Using super-subitization alone, division requires a child to recognize by inspection when a Digit-Square's bead pattern in the top row is numerically greater than or equal to the bead pattern in the bottom row. If the child shows any hesitation, several games involving the question of which is greater, top or bottom Digit-Square should be played, as covered in Lesson #1, the Stencil Game. The Game of Divide by Two Sharing where beads are slid into the top row until they are greater than or equal to the bottom row, trains a child to compare by inspection, namely super-subitize, when top is greater or equal to the bottom.

Figure 26A:
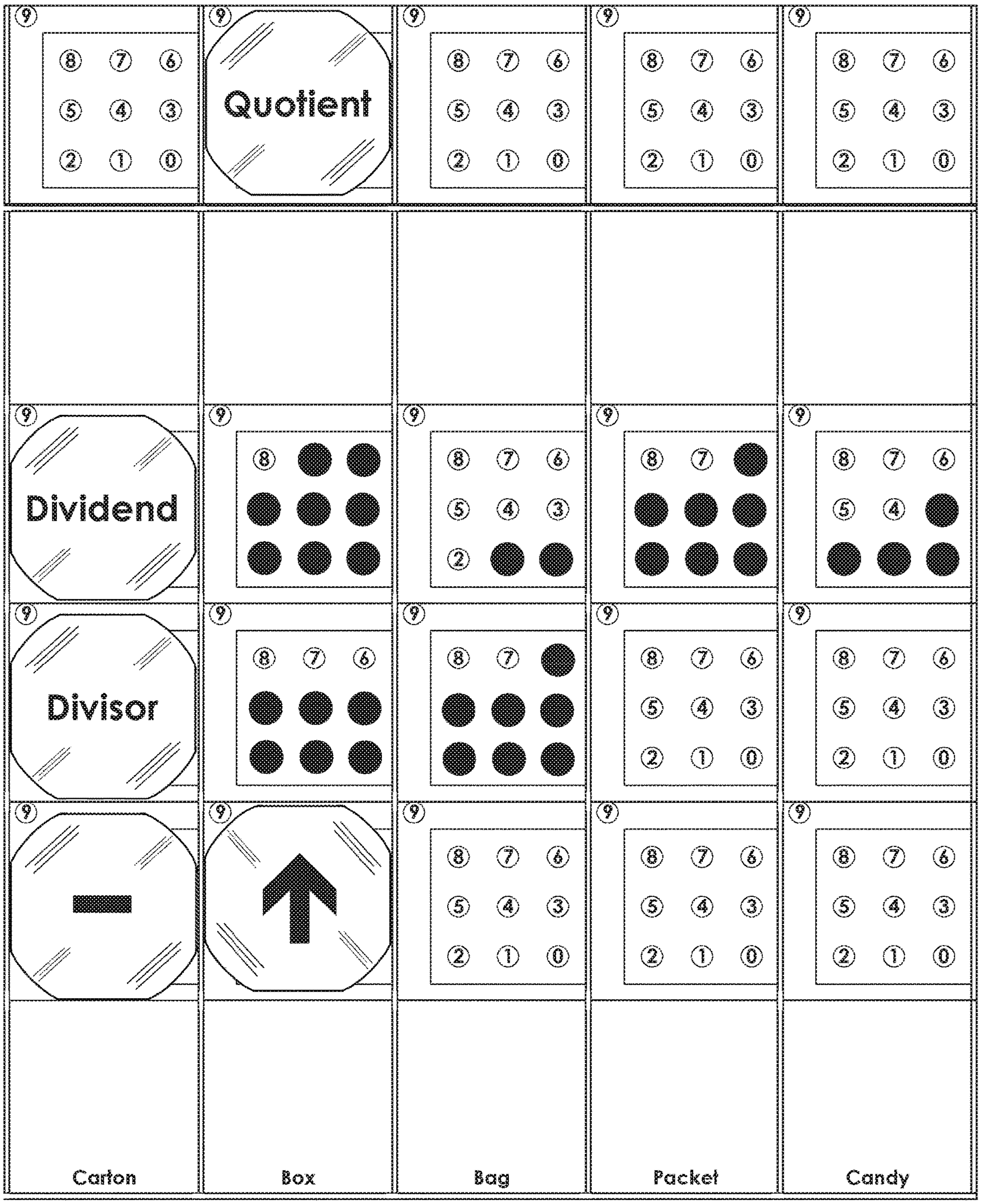
FIGS. 26A to 26P: Lesson #11. Game of Simple Division, worked example.
Figure 26B:
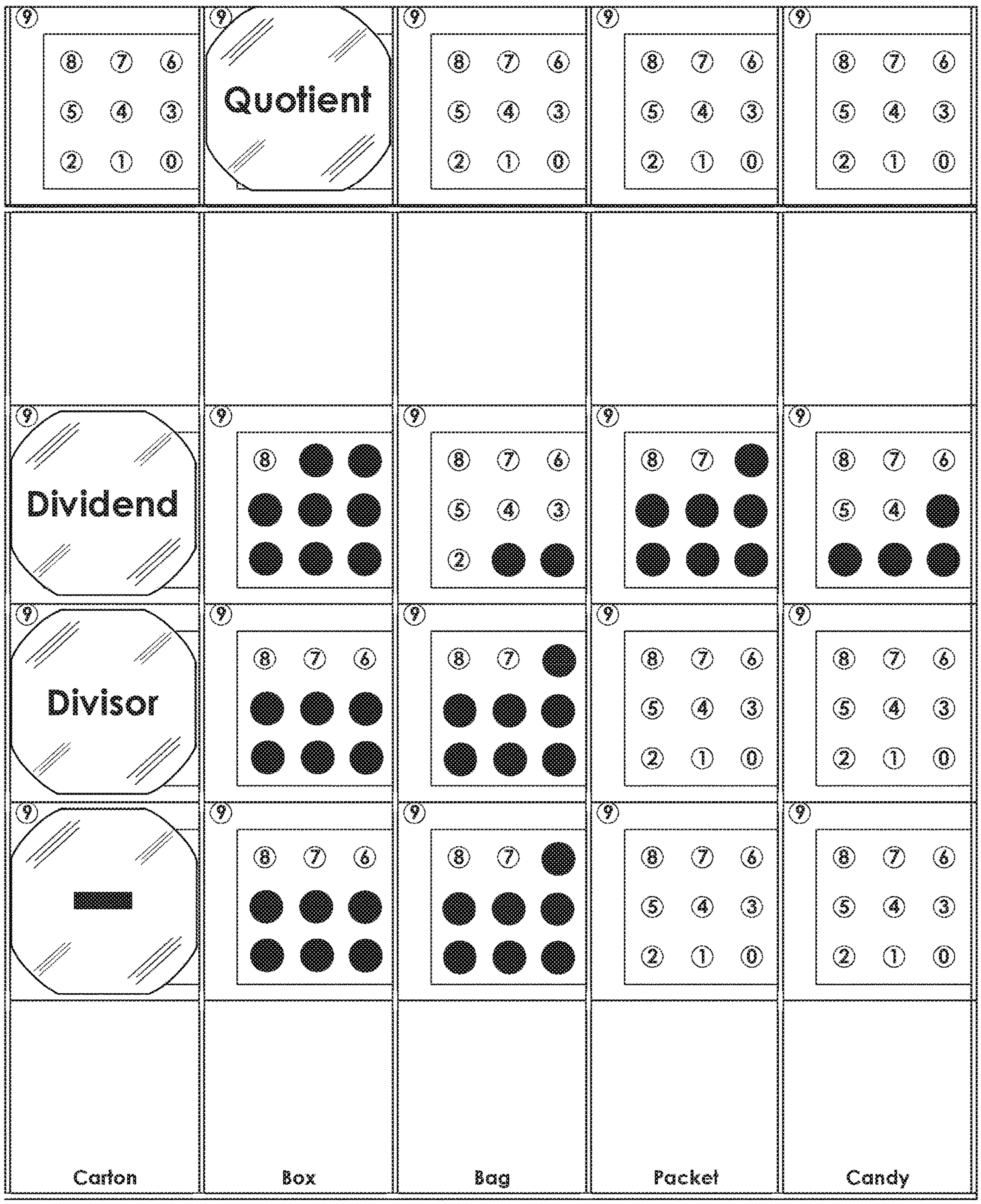

The Game of Simplified Division uses a three-plus-one row Candy Board, as depicted in FIG. 26A and uses various guide chips to enforce which ranks are actively in play. The row holding the Quotient is located above the top Tray. Below this Tray, the top row is the Dividend row. The middle row is the Divisor row, in which the divisor stays unchanged but gets shifted from left to right as the Game of Simplified Division proceeds. The bottom row is the Subtrahend row. Active subtraction occurs in the top and bottom rows, where beads are discarded into their respective Trays.

In Division, the rule of deciding to do a subtraction is contingent on making a proper comparison where the partial dividend in the top row must always be greater than or equal to the divisor. If the child botches the comparison and subtracts the divisor from the partial dividend, the dividend is prematurely zeroed out while beads remain in the bottom row, i.e. the subtrahend. On the Candy Board this error is detected and easily rectified, as follows. Reduce the quotient by one bead, duplicate the divisor into the zeroed-out partial dividend and subtract the remaining beads in the bottom row from the top row.

The Quotient is an incremental count of the number of times the Dividend minus Divisor operation has been performed before the comparison step indicates the partial dividend in the top row is less than the Divisor in the middle row.

Figure 26C:
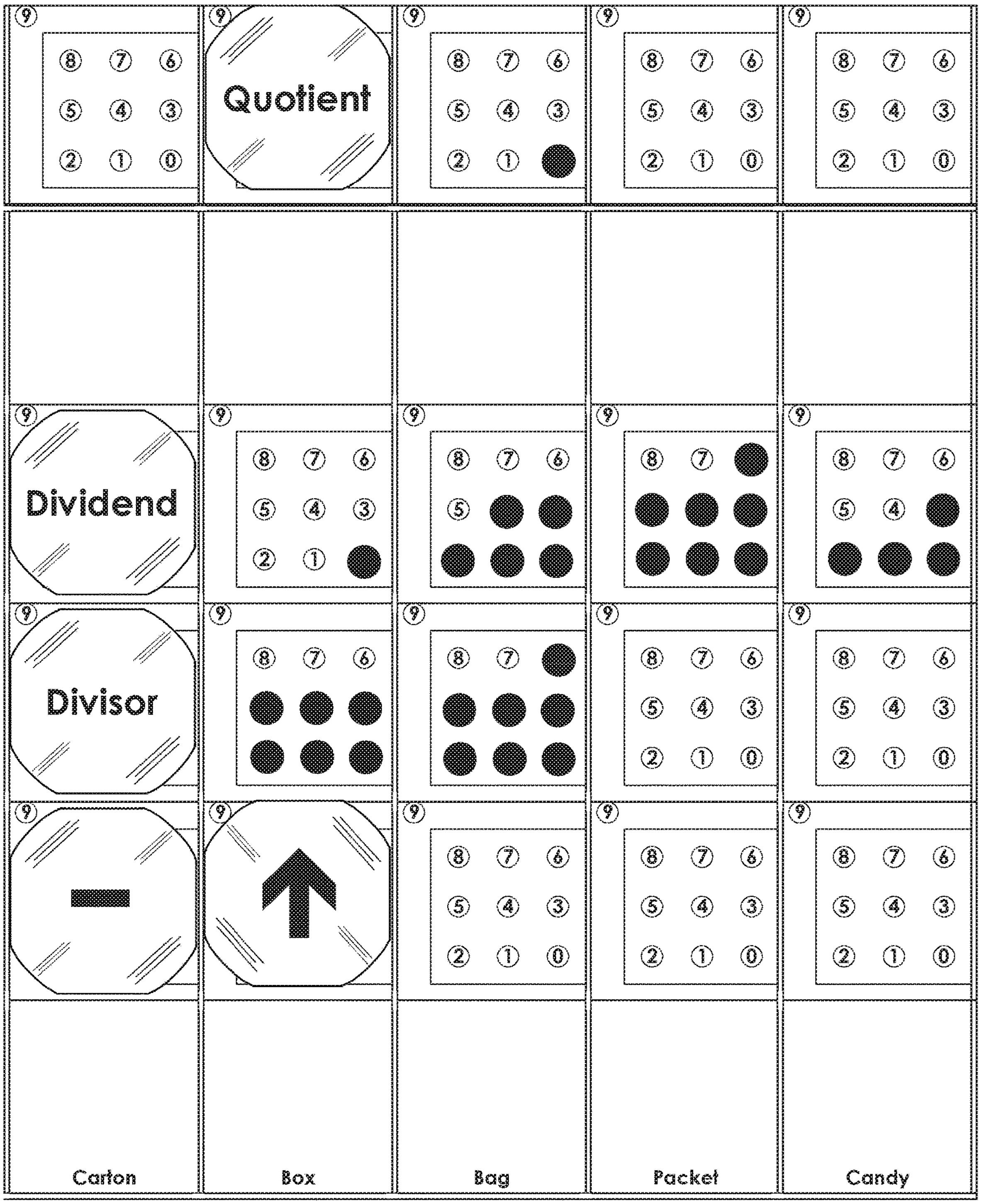
Figure 26D:
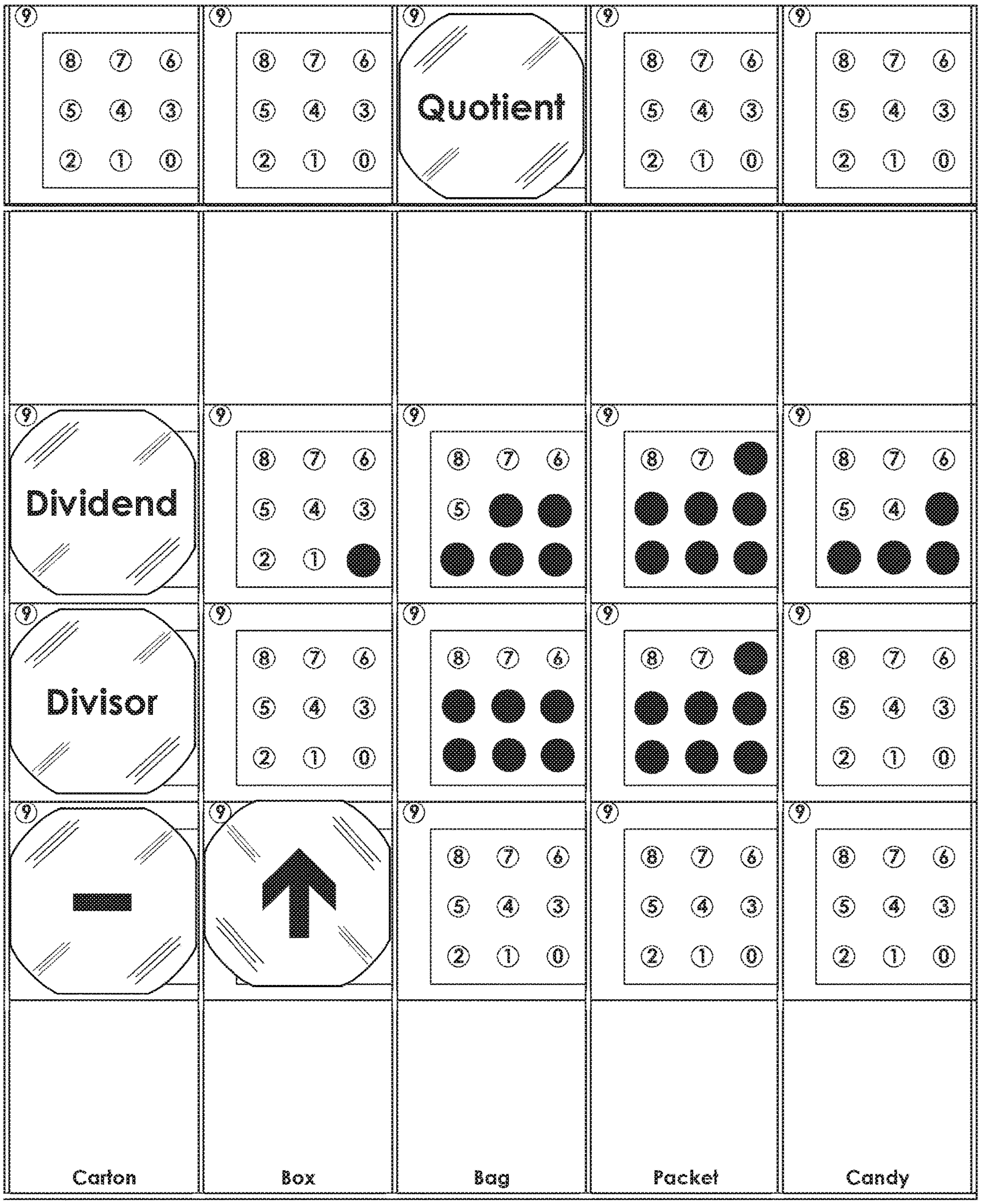
Figure 26E:
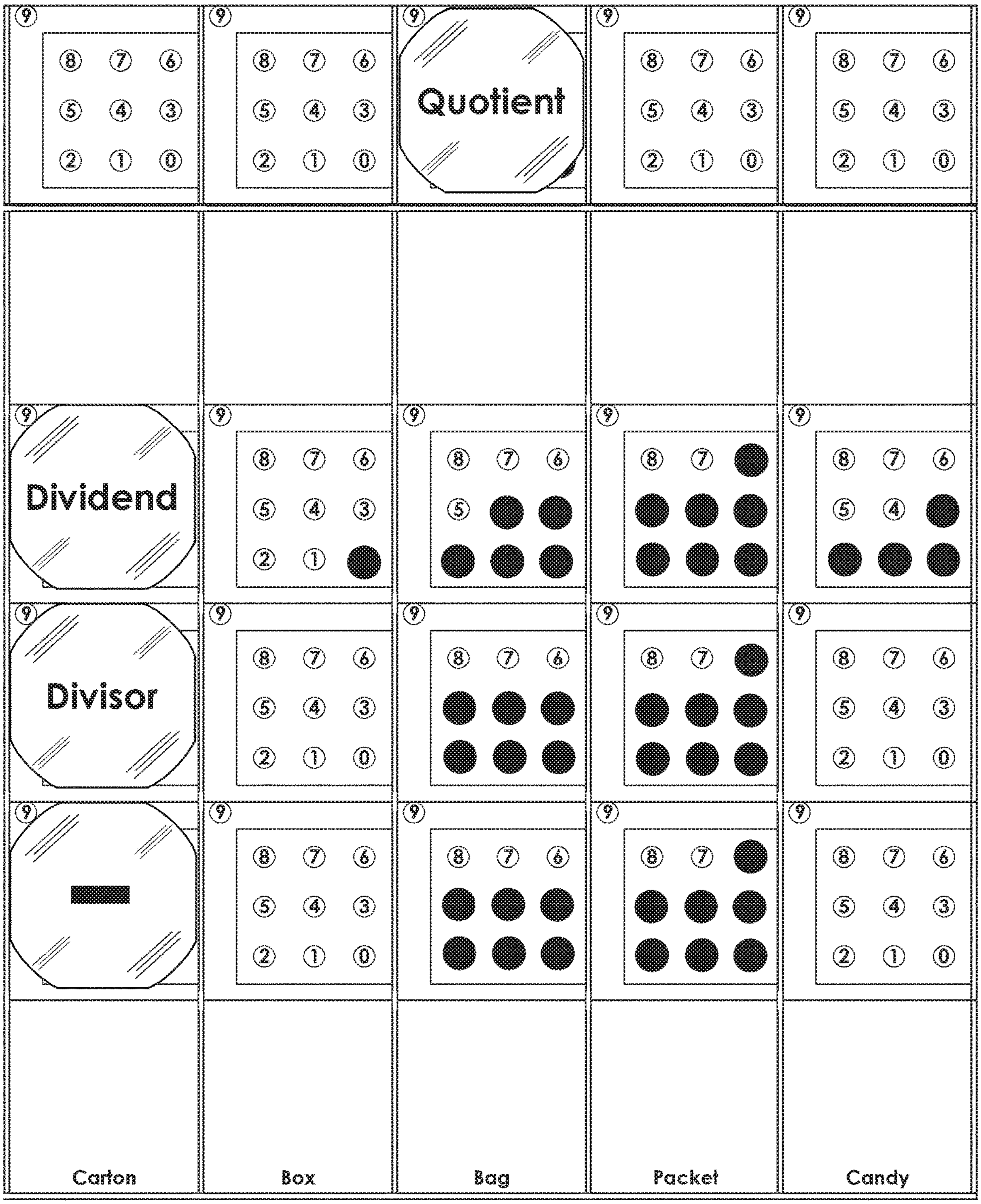
Figure 26F:
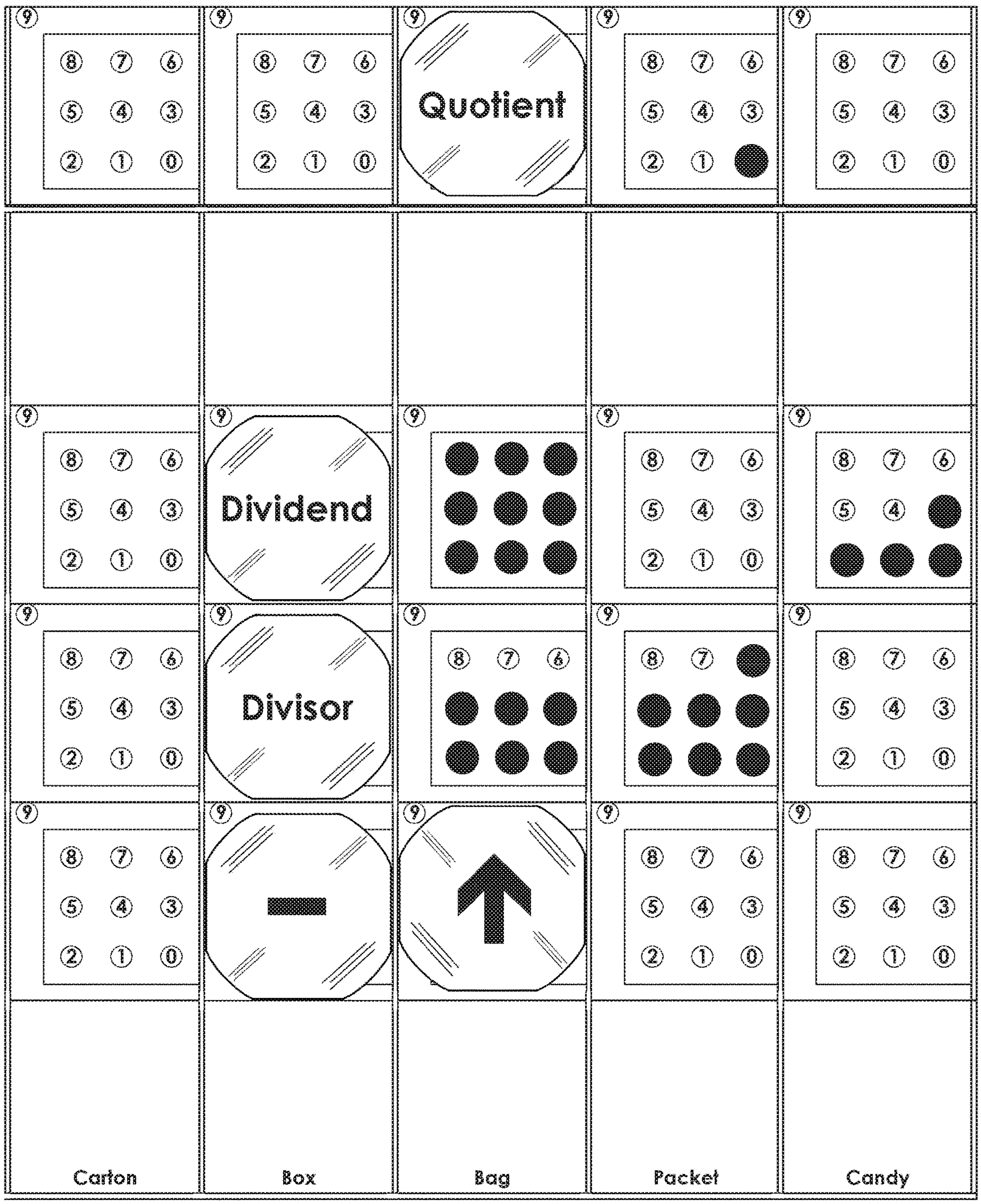
Figure 26G:
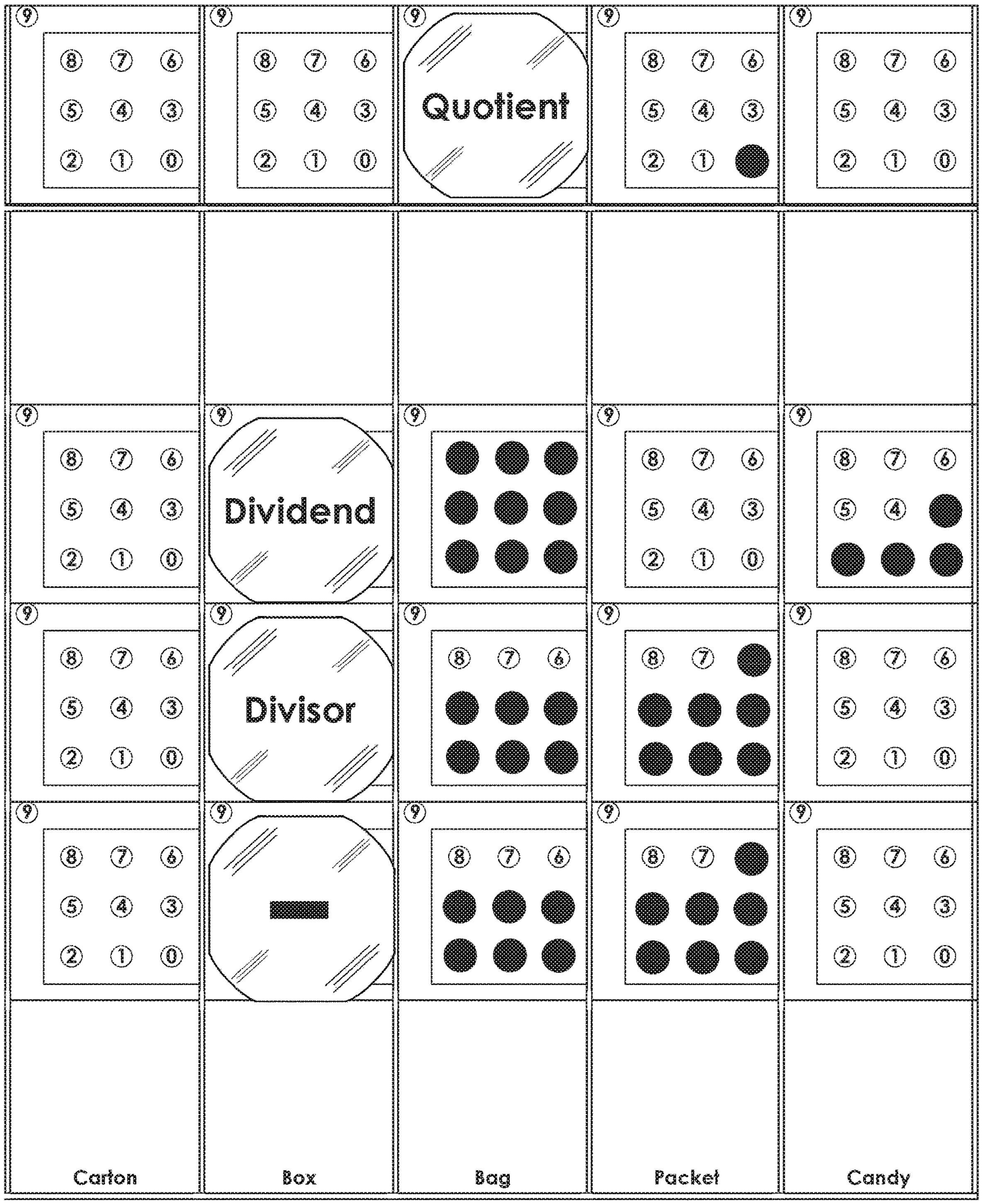
Figure 26H:
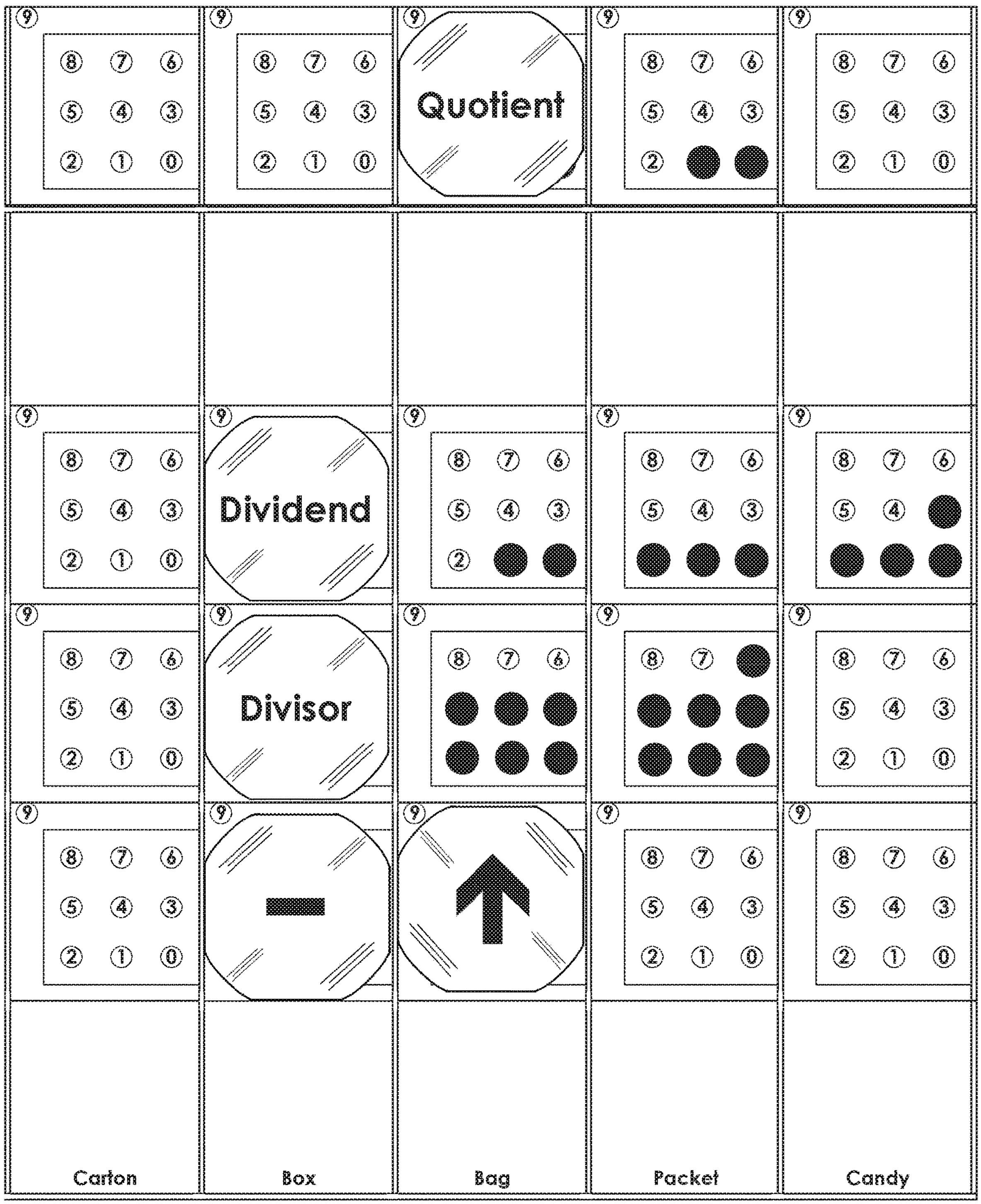
Figure 26I:
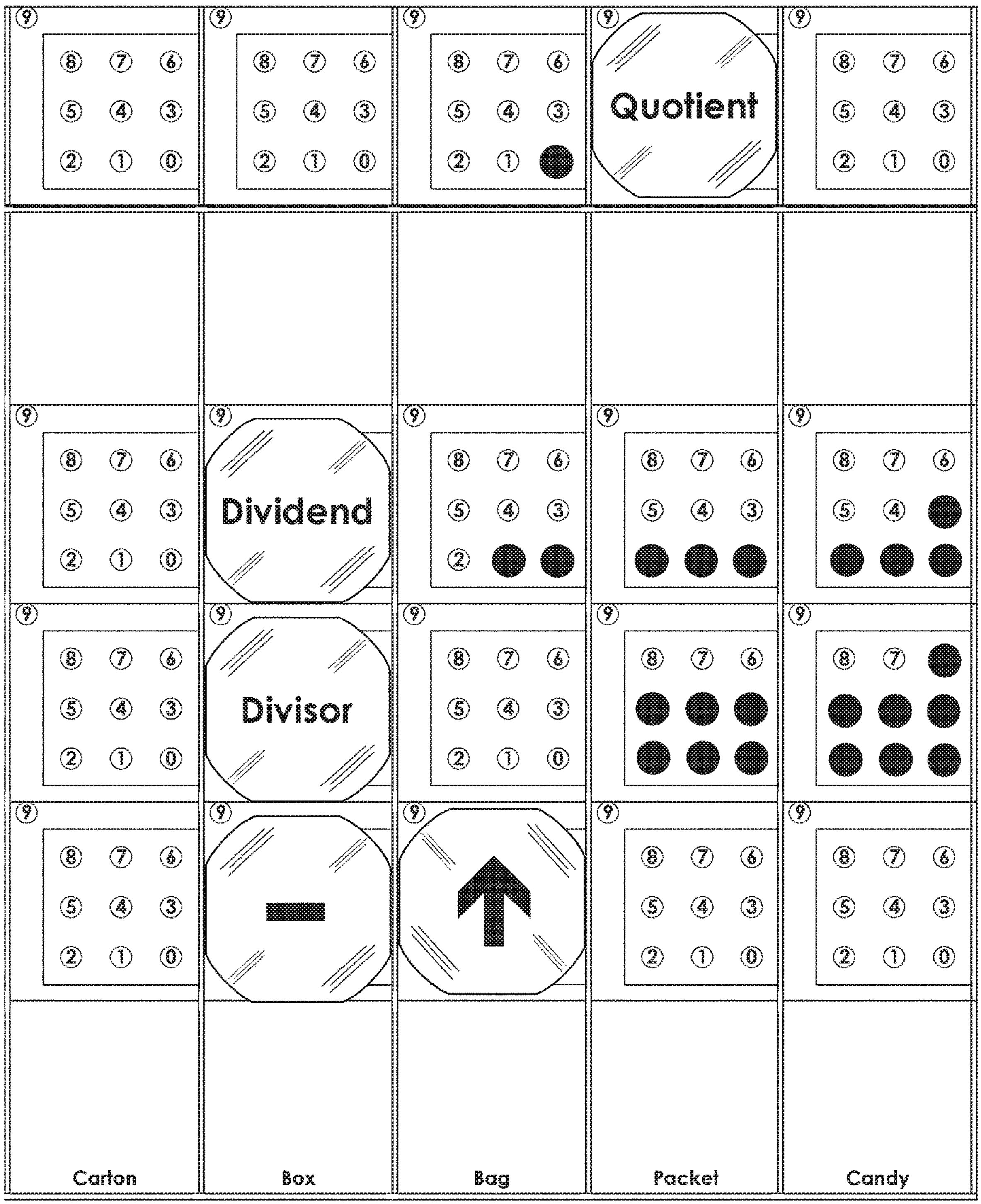
Figure 26J:
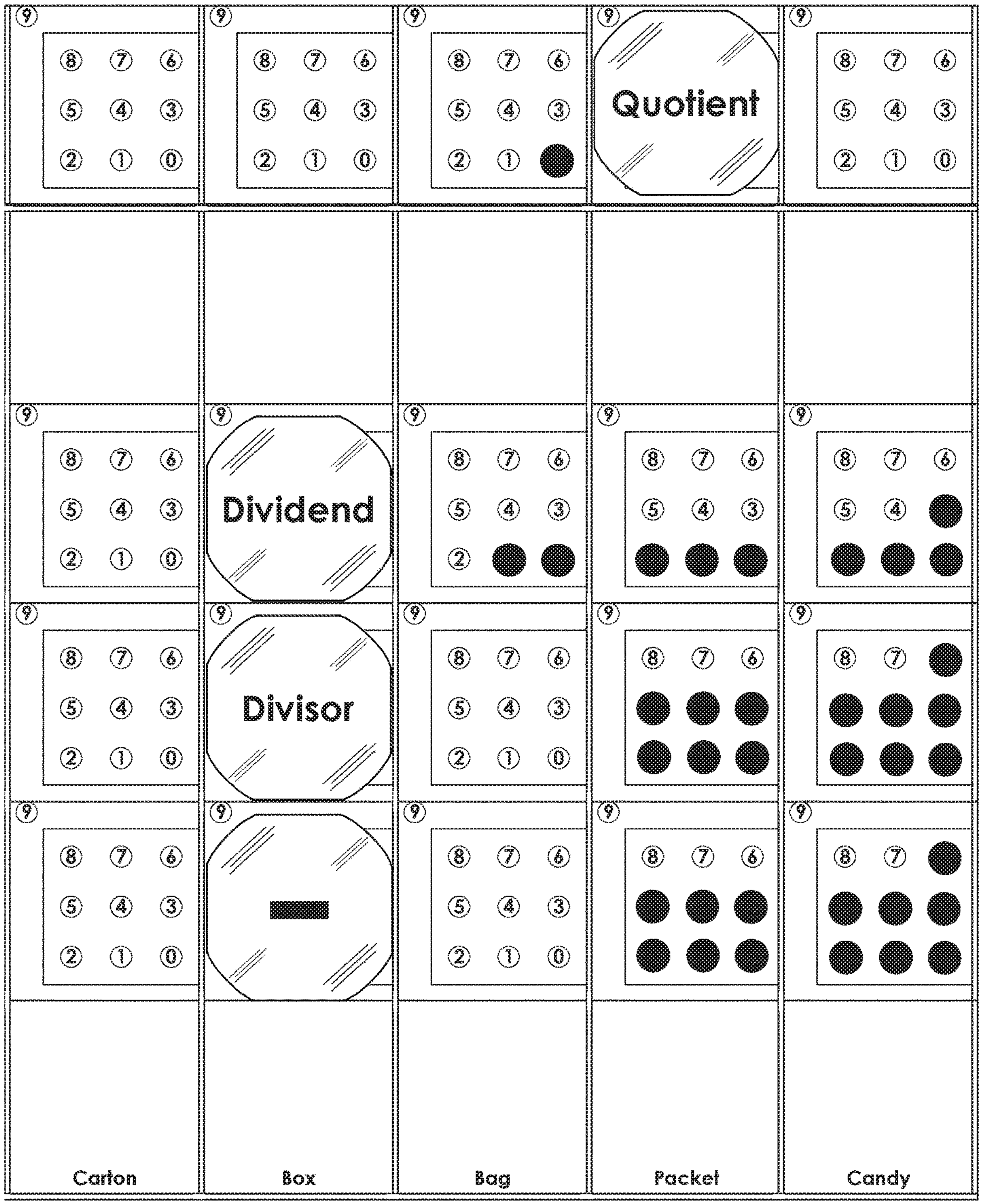
Figure 26K:
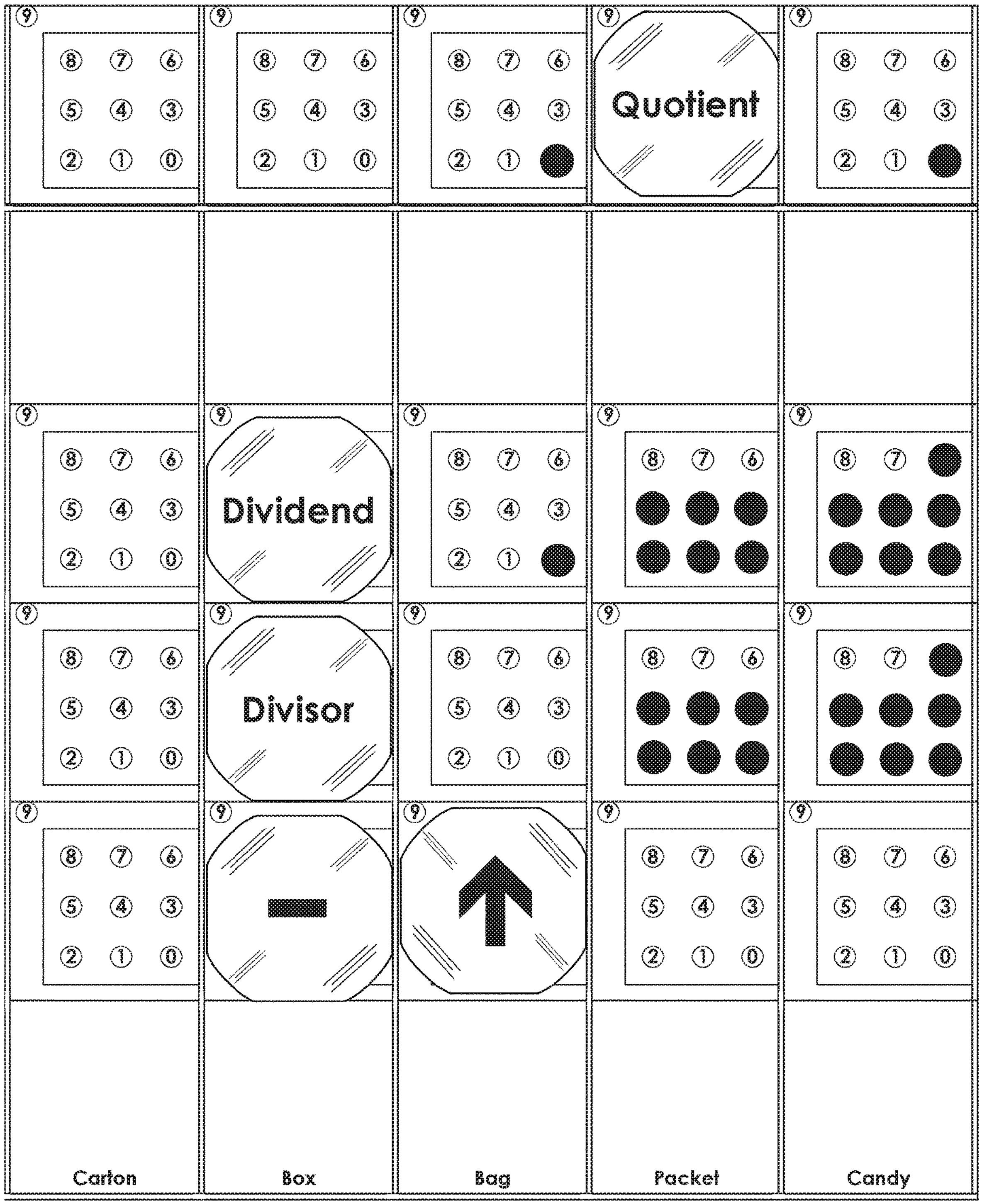
Figure 26L:
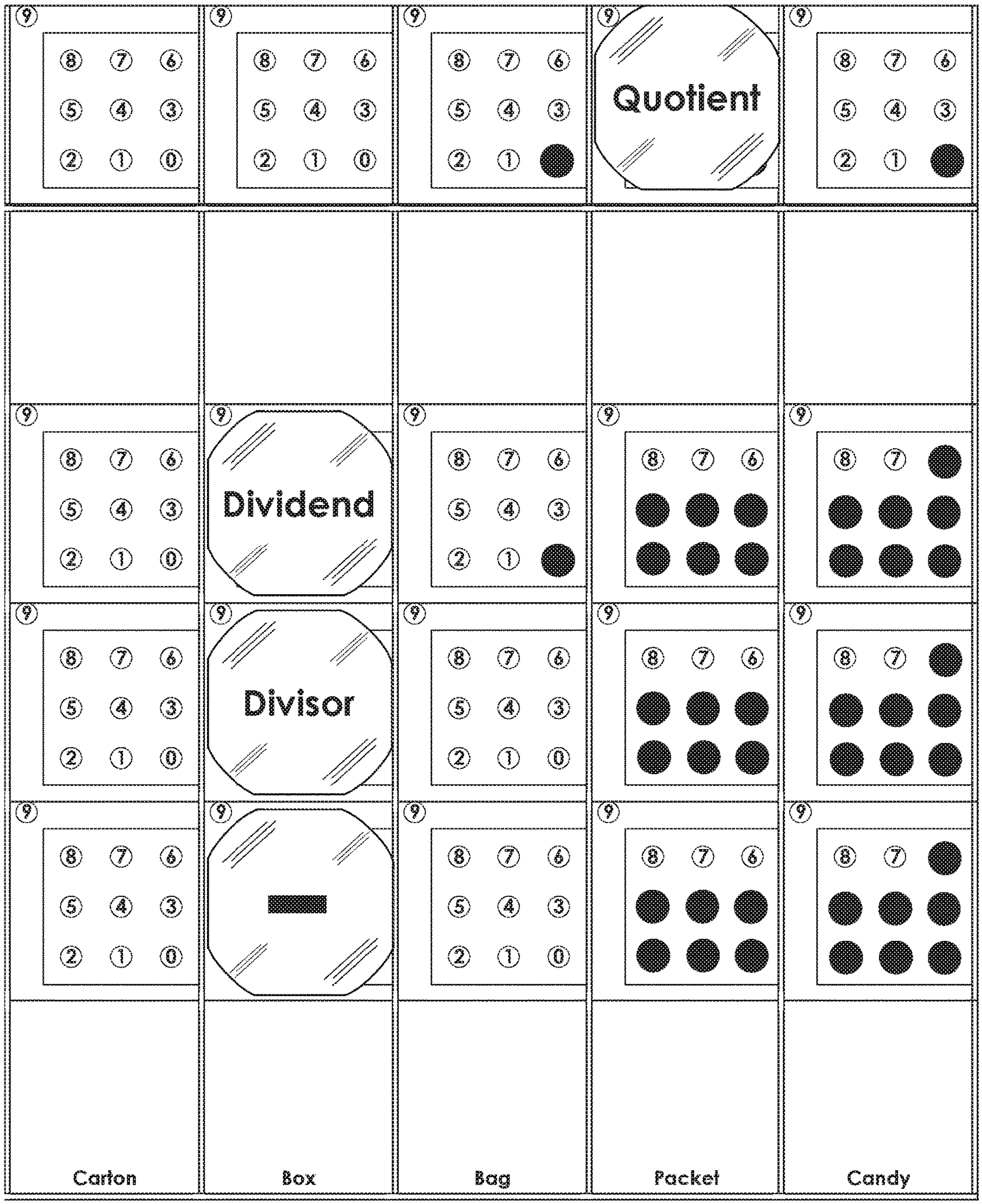
Figure 26M:
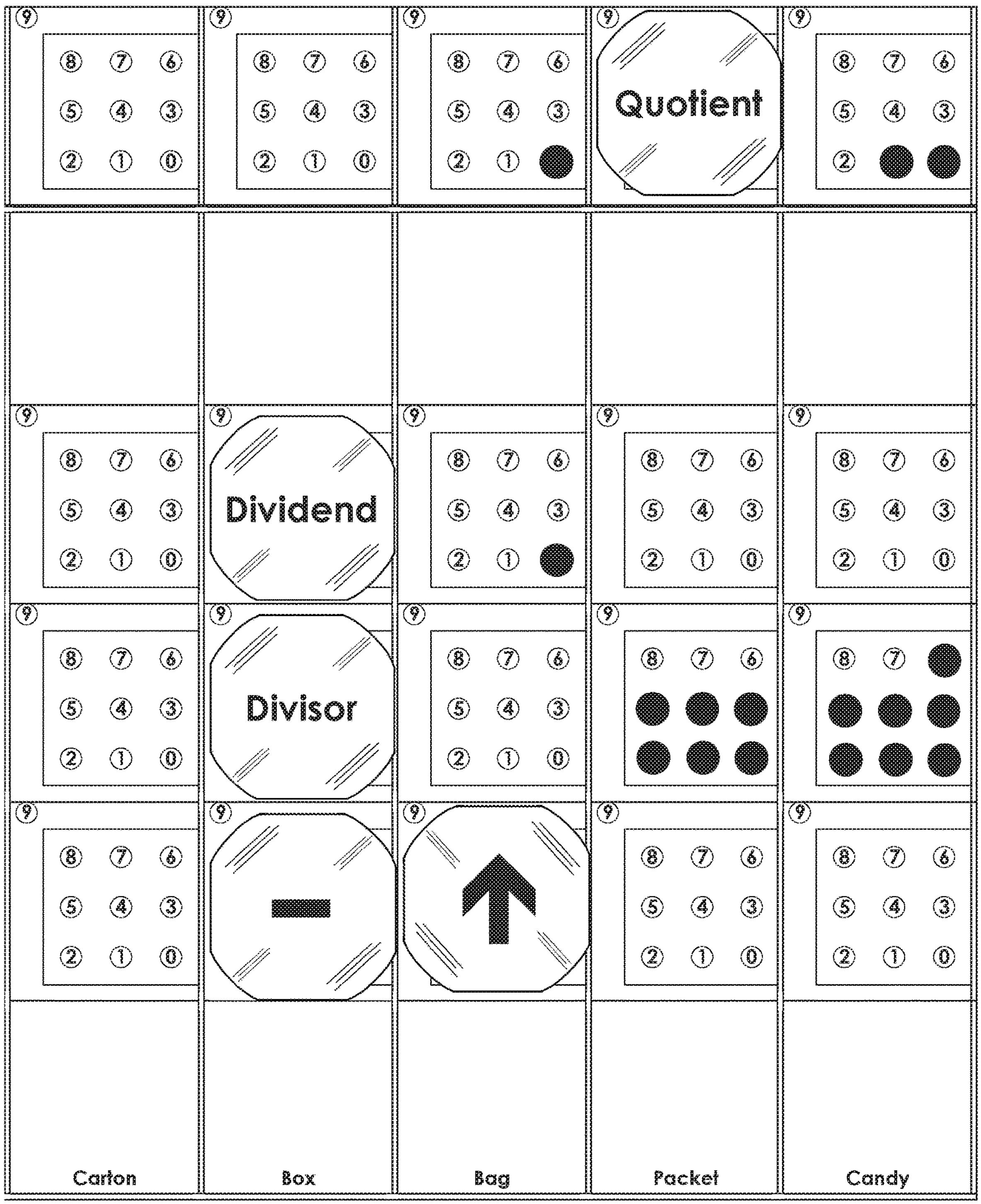
Figure 26N:
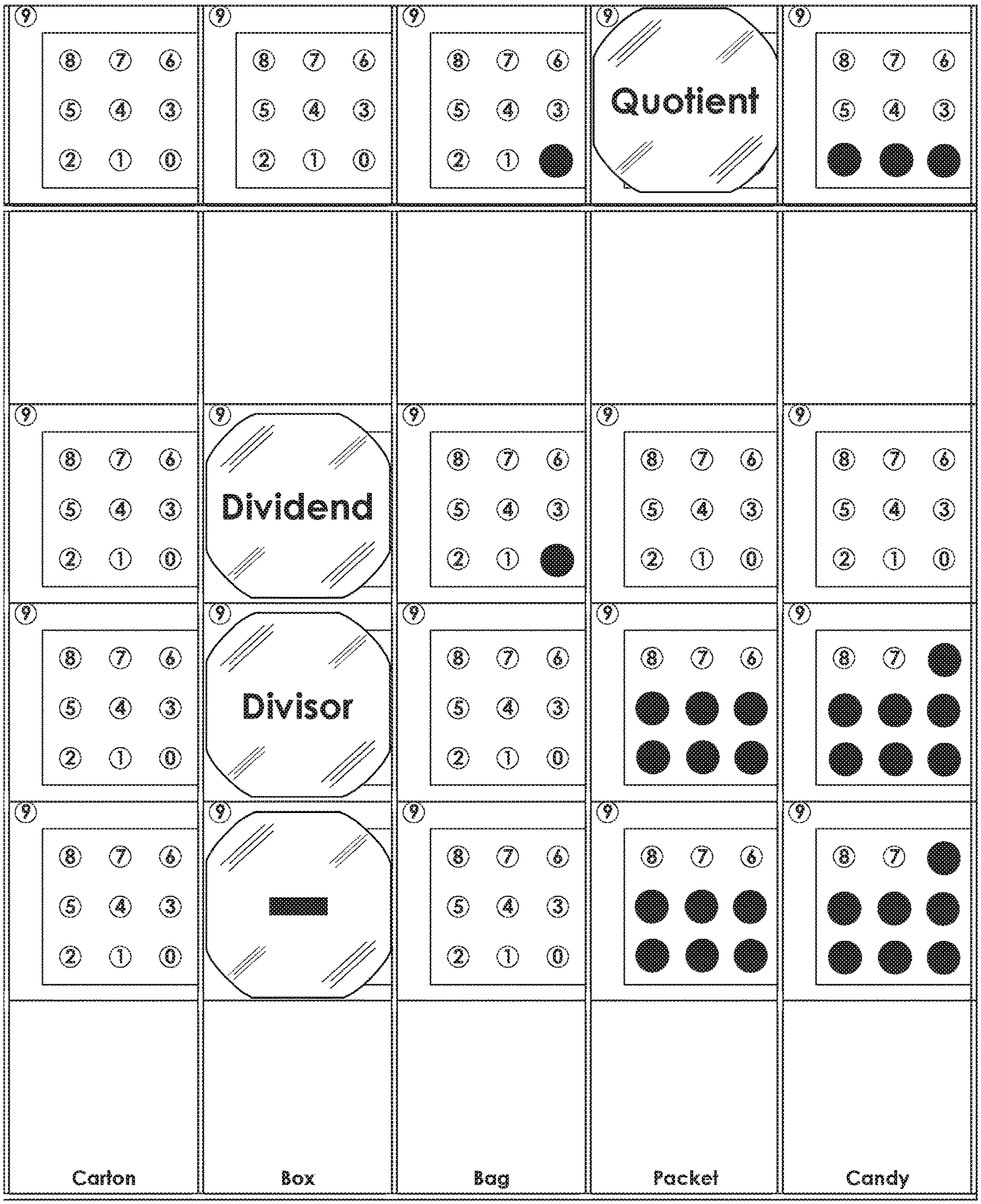
Figure 26O:
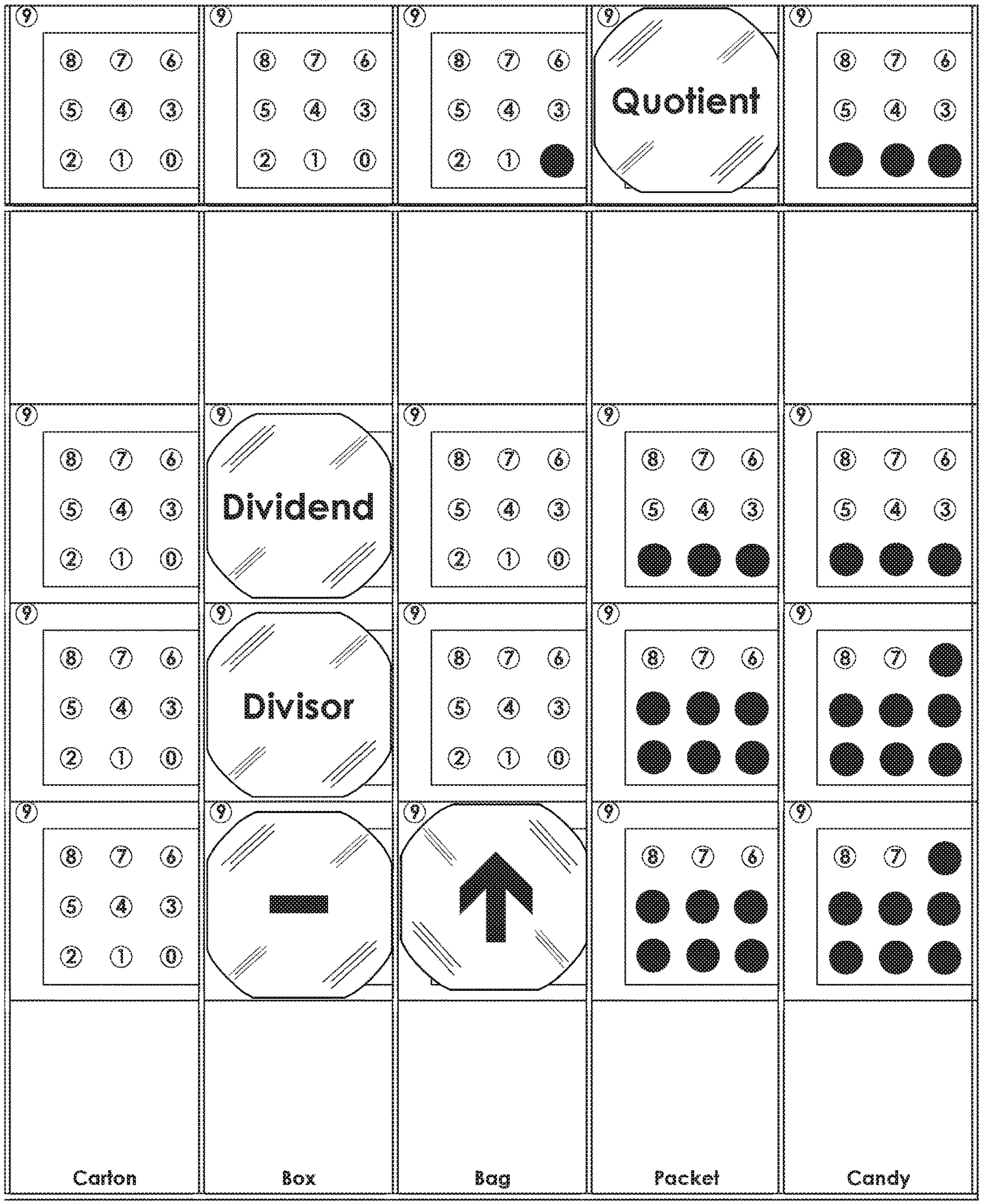
Figure 26P:
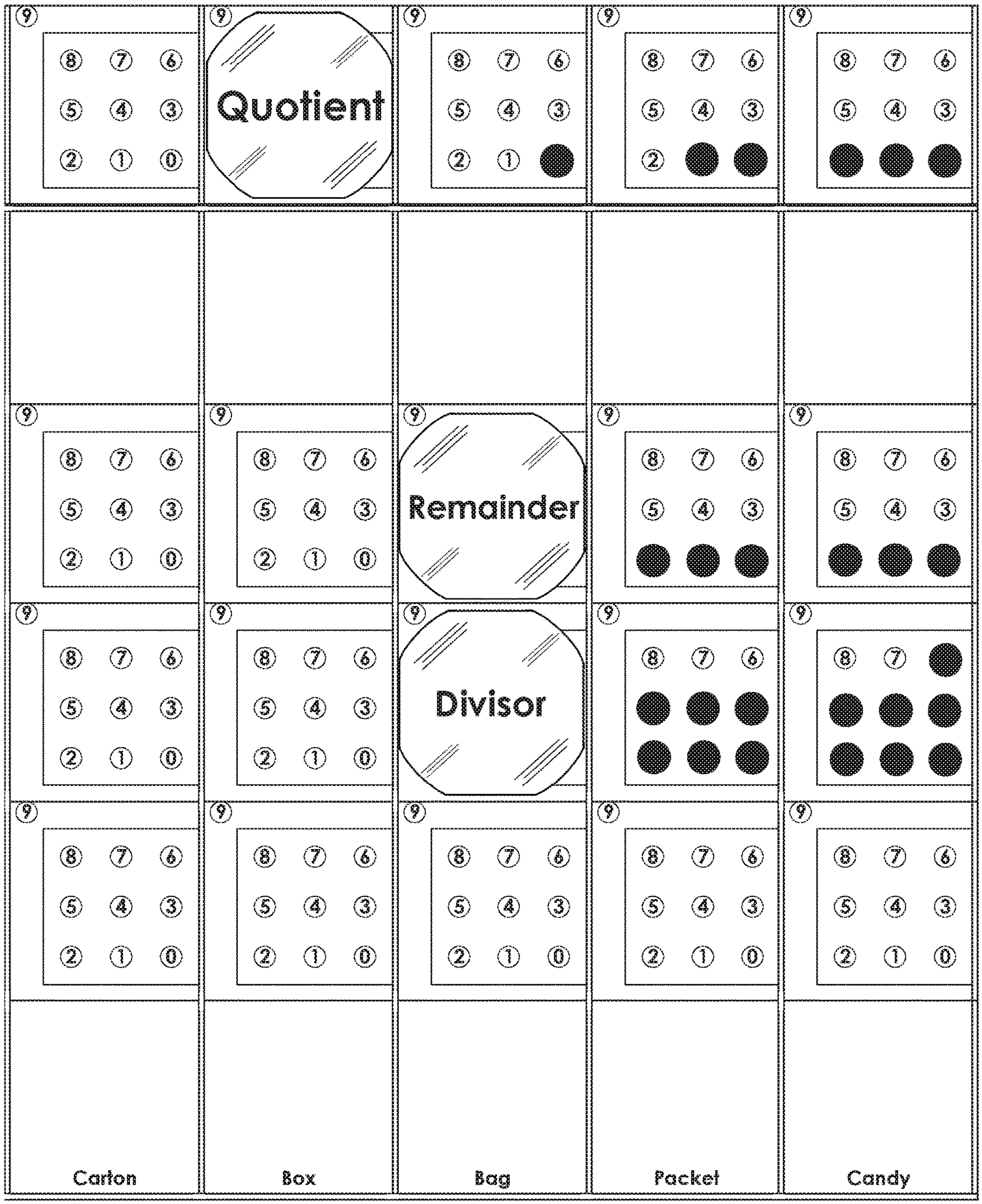

The Game of Simplified Division is best illustrated to a child through the vehicle of a storyline. The Game of Church Christmas Pantry storyline in Lesson #4 concluded with twelve months of repeated additions that yielded 8 Boxes, 2 Bags, 7 Packets, 4 Candies in the Church's pantry on Christmas Day. The day after Christmas, the Church has the tradition of Alms Giving, namely providing candy to needy people. Reverend Michaels has all the candy stores in the Church pantry brought to the front of the Church and asks Katie to calculate how many Boxes, Bags, Packet and Candies are to be given to each of the 67 needy people, so that every person receives an equal share. FIGS. 26A through 26P illustrate this example.

The Game of Simplified Division Executes as Follows.

Step (A): Setup the Dividend in the top row, the Divisor in the middle row and zero out the bottom and Quotient rows. The leftmost non-zero rank of the Dividend row is the focus rank. Place [Dividend], [Divisor] and [−] guide chips one rank left of the leftmost digit of the Dividend, and place the [Quotient] guide chip one rank to the left of the lowest ranked digit of the Divisor, as depicted in FIG. 26A.

Step (B): Comparison. Left to right, one rank/Digit-Square at a time perform a comparison. If the top row Digit-Square is greater than the middle row Digit-Square, as depicted in FIGS. 26A, 26D, 26F, 26I, 26K and 26M, go to Step (C) because subtraction is required. If the top row Digit-Square is less than the middle row Digit-Square, as depicted in FIGS. 26C, 26H and 26O then immediately go to Step (D) because all subtractions are exhausted on this Quotient rank. If the focus has exhausted, namely is on the lowest Digit-Square in the Divisor value, then go to Step (C) because the Dividend and Divisor are exactly equal so subtraction is required. Otherwise, the focus of comparison shifts one rank right, and the comparison between the top and middle row Digit-Squares resumes again, as above. An [Up-Arrow] guide chip, designating the focus rank, placed in the bottom row can be used to guide the child through this digit by digit comparison between top and middle rows if need be. If the top and middle rows are exactly equal then Step (B) falls through the Step (C), next.

Step (C): Subtraction. Duplicate the middle row into the bottom row aligned just right of the [−] guide chip, as depicted in FIGS. 26B, 26E, 26G, 26J, 26L and 26N. Slide one bead into the Quotient Digit-Square to the right of the [Quotient] guide chip. Subtract the bottom row from the top row, leaving the bottom row zeroed out once more, as depicted in FIGS. 26C, 26F, 26H, 26K and 26M. If the Dividend zeros out and beads remain in the bottom row, go to Step (E).

Step (D): Shift Right. The focus of division shifts one rank to the right. Move the [Quotient] guide chip in the Quotient row one rank right. If the [Quotient] guide chip is now in the rightmost rank, reset the [Quotient] guide chip left of the leftmost digit in the Quotient row, as depicted in FIG. 26P, and terminate. Otherwise, starting with the rightmost Digit-Square and going left, shift all beads in the middle row one rank to the right, as depicted in FIGS. 26D and 26I. While a rank of zeros occurs to the right of the [Dividend], [Divisor] and [−] guide chips, move these guide chips rightwards as a unity. Go to Step (B).

Step (E): Underflow Error Rectification: Subtract one bead from the Quotient. Duplicate the Divisor into the zeroed out top row and subtract the remaining beads in the bottom row from the top row Go to Step (D).

Doing simple division before multiplication ensures that the child will not be intimidated by multi-digit multipliers and the massive numbers multiplication creates. Division ensures that the child knows how every massive number can be smashed into smaller chunks.

Lesson #12, Game of Simplified Multiplication

Simplified multiplication comprises the repetitive addition of the Multiplicand by a count given in the Multiplier. To speedup the addition process, rank shifting comparable to the Game of Simplified Division is used, except the shift is from right to left. The Multiplier is the smaller of the two numbers. The best way to ease children into understanding the process is to begin with single digit numbers, preferably in the range zero to three.

Multiplication, as a practical tool, is best related to the child through hands-on examples.

Household bathroom tiles provide a visual way of explaining how multiplying one length of tiles by another length of tiles quantifies the total tile count inside a rectangular area. Hence, the Game of Tiles makes a good vehicle for animating multiplication. Money also provides solid examples, and should be explained in terms of dollars and decimal units of the dollar which appear as metallic disks called coins, namely dimes/deci and cents/centi. Money introduces a child to the concept of thousands and hundreds, and counting from zero to ninety-nine rather than “9 Tens, 9” or “9 Packets, 9 Candies”.

The Game of Simple Multiplication is best played on a four-row Candy Board. The smaller of the two numbers is the Multiplier, and it is setup on the top row because the beads on this row will be discarded into the top Tray one by one as multiplication unfolds. The Multiplicand is setup on the second row from the top because this number remains unchanged and is duplicated into the third row in the appropriate right rank. Initially zeroed out, the third row holds a duplicate of the Multiplicand shifted left as multiplication unfolds. Initially zeroed out, the bottom row holds the accumulated partial products and the final Product, once the Multiplier has zeroed out.

Figure 27A:
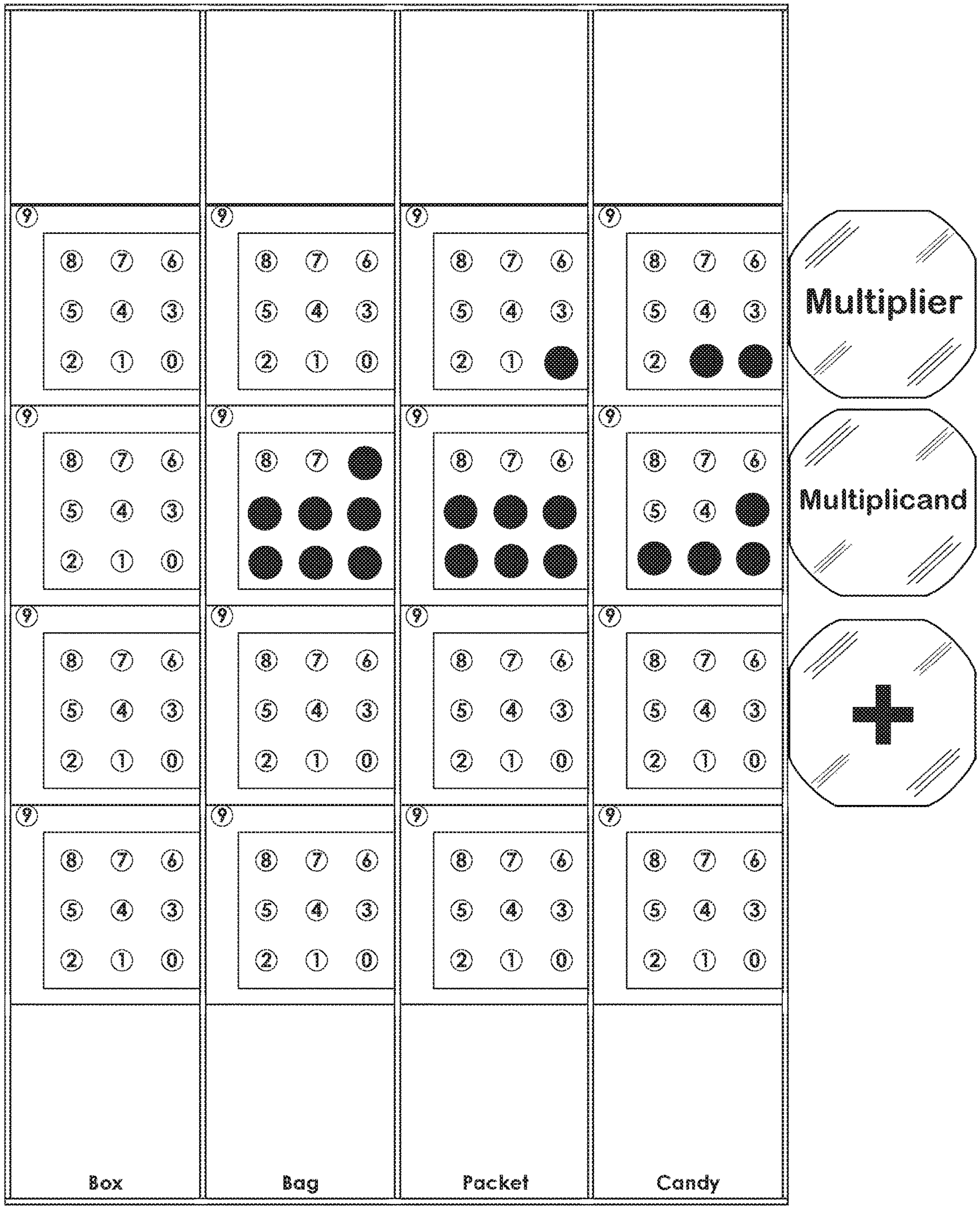
FIGS. 27A to 27H: Lesson #12. Game of Simple Multiplication, worked example.

Consider the storyline. In the Smith home, if a new kitchen countertop requires 3 times 4 granite tiles with each tile costing $7.64, how much money will Mrs. Smith be spending? FIG. 27A depicts the setup for 12 tiles times $7.64, namely, the story dilemma of the cost of a new counter in the Smith kitchen.

The Game of Simple Multiplication Executes as Follows.

Step (A): Setup the Multiplier on the top row and the Multiplicand on the second row. Place [Multiplier] and [Multiplicand] guide chips to their immediate right, off the board. Zero out the third row and place an [+] guide chip to its immediate right, off the board. Zero out the bottom row. The [+] and [Multiplier] guide chips mark the focus rank to their left and these chips shift left as the higher ranks of the Multiplier are processed. The focus begins in the rightmost rank of the top row. FIG. 27A depicts the completed setup.

Figure 27B:
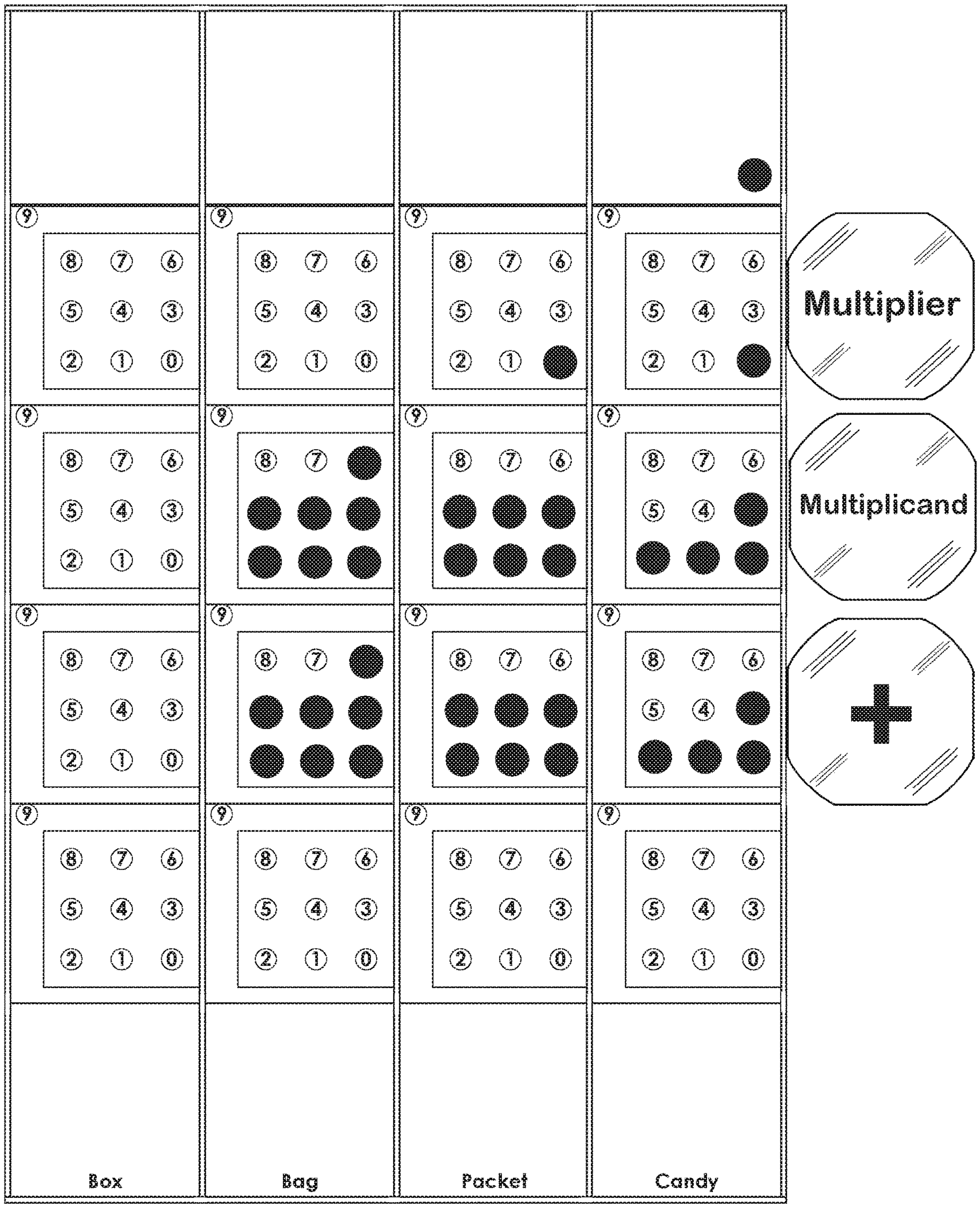
Figure 27C:
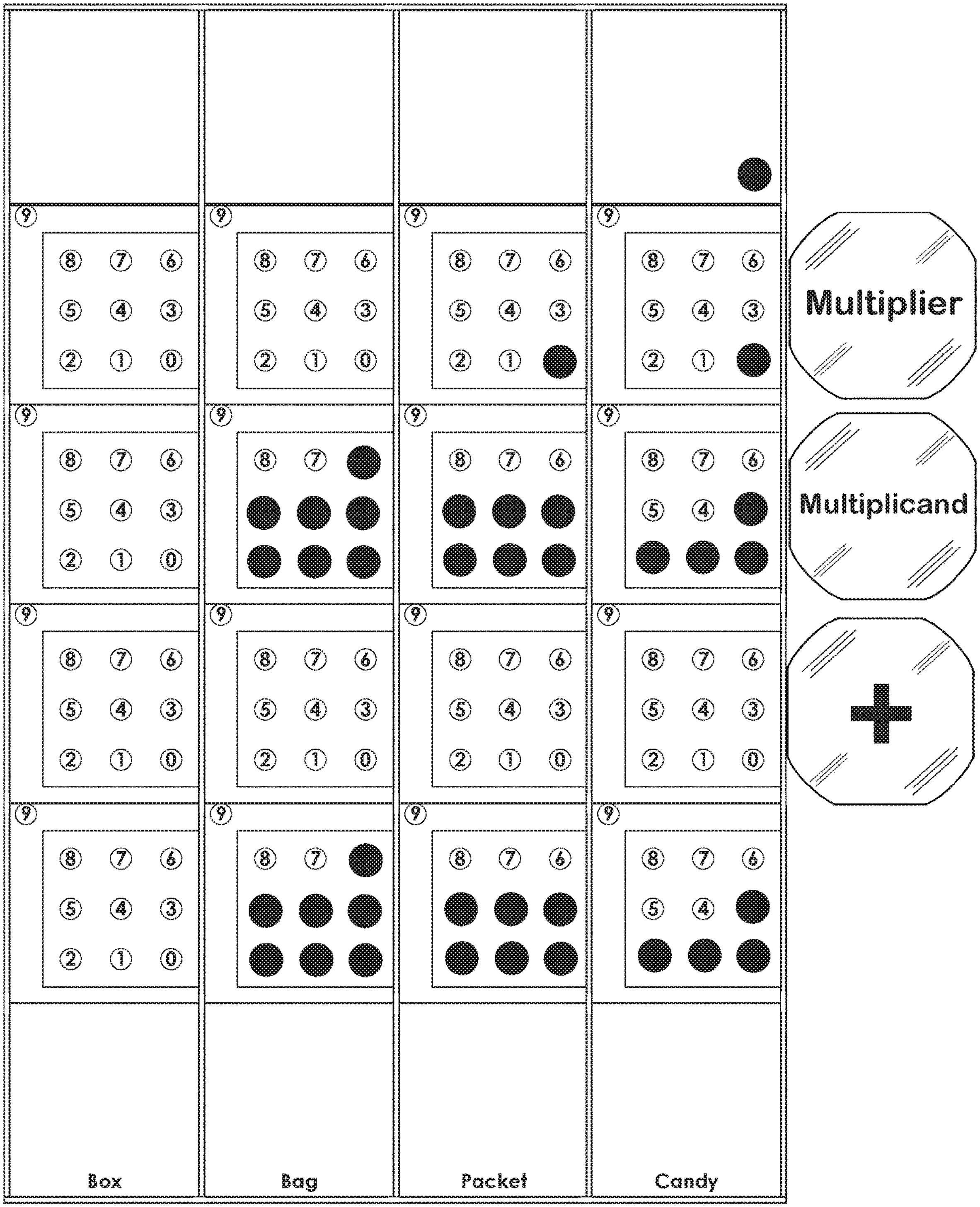
Figure 27D:
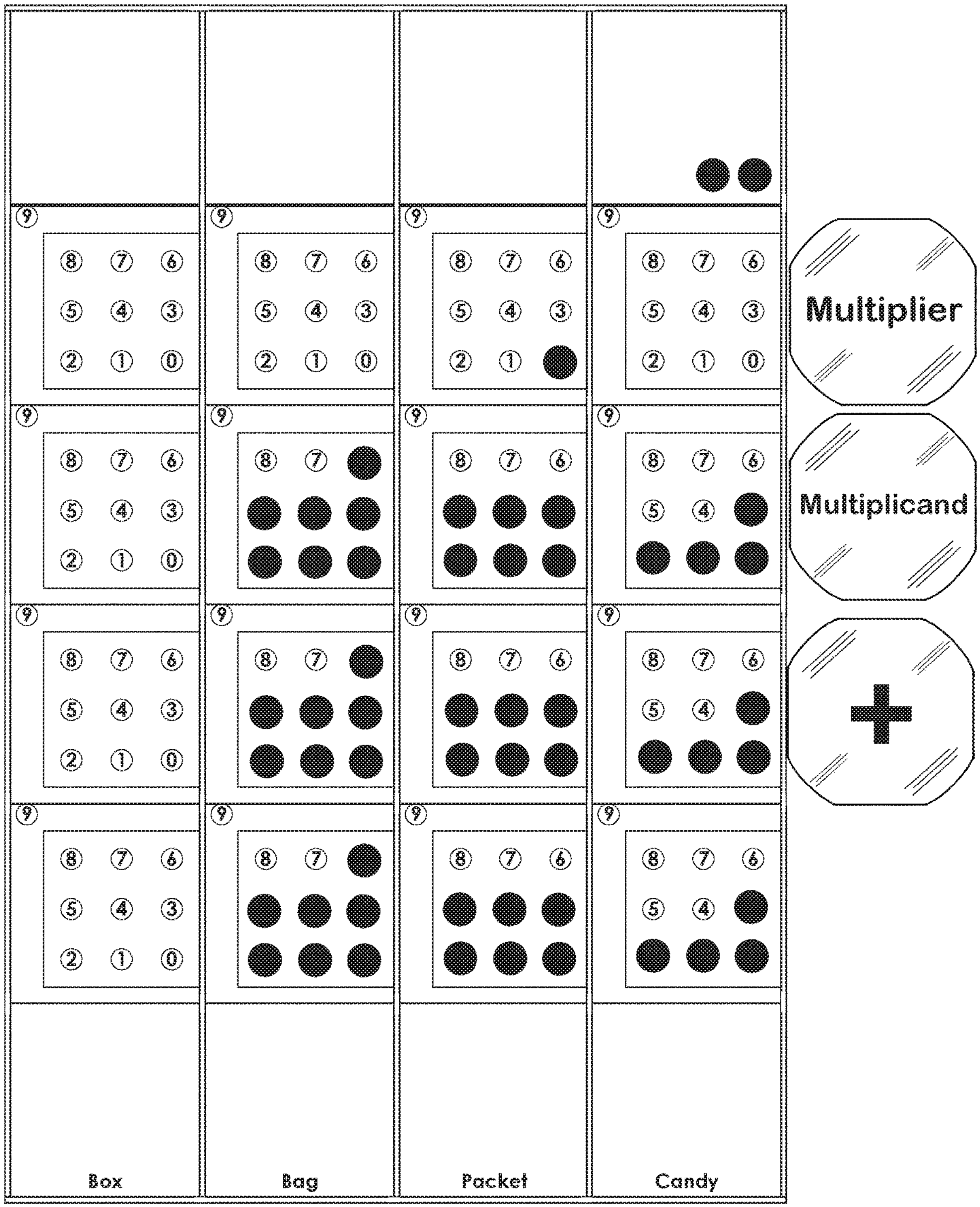
Figure 27E:
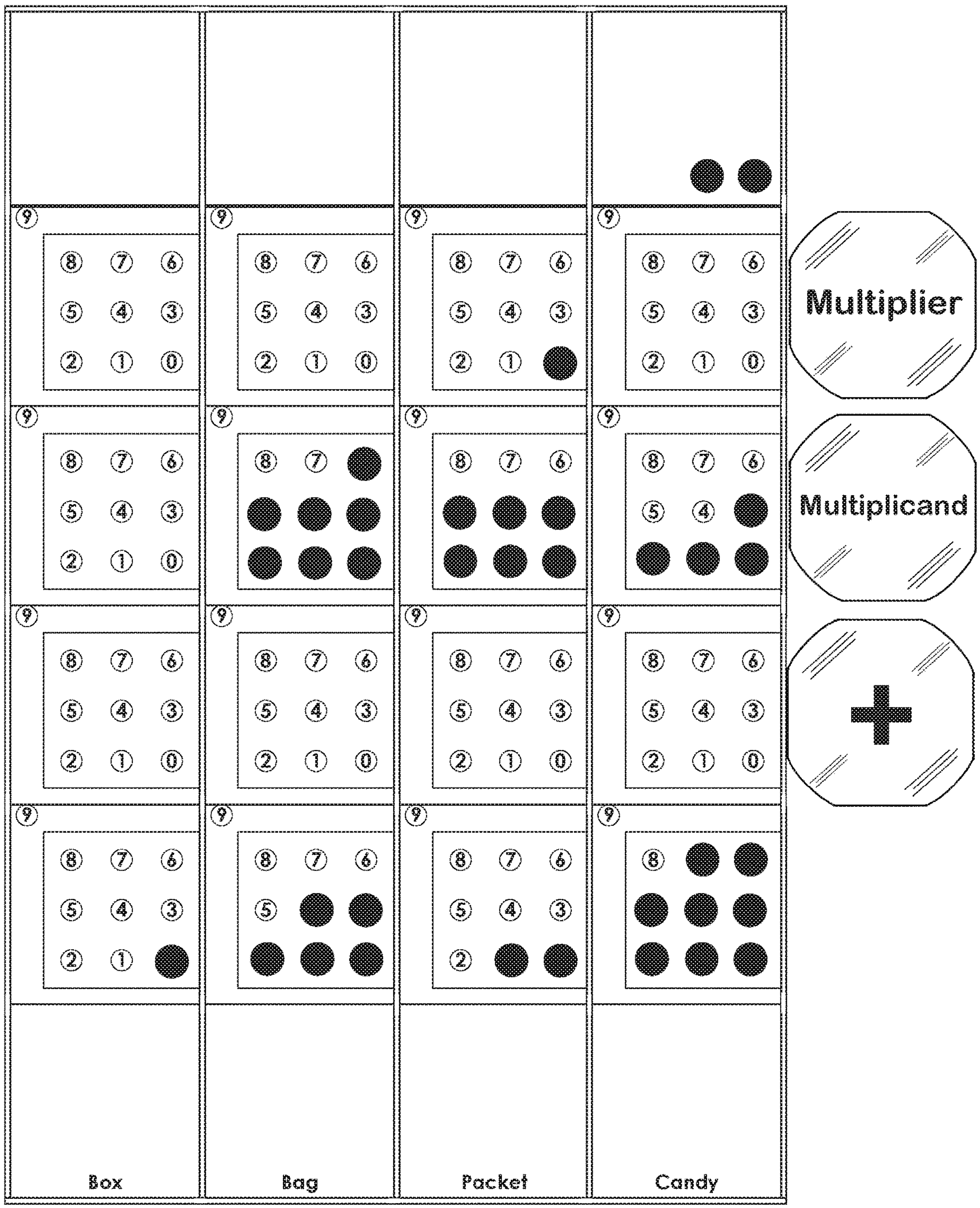
Figure 27F:
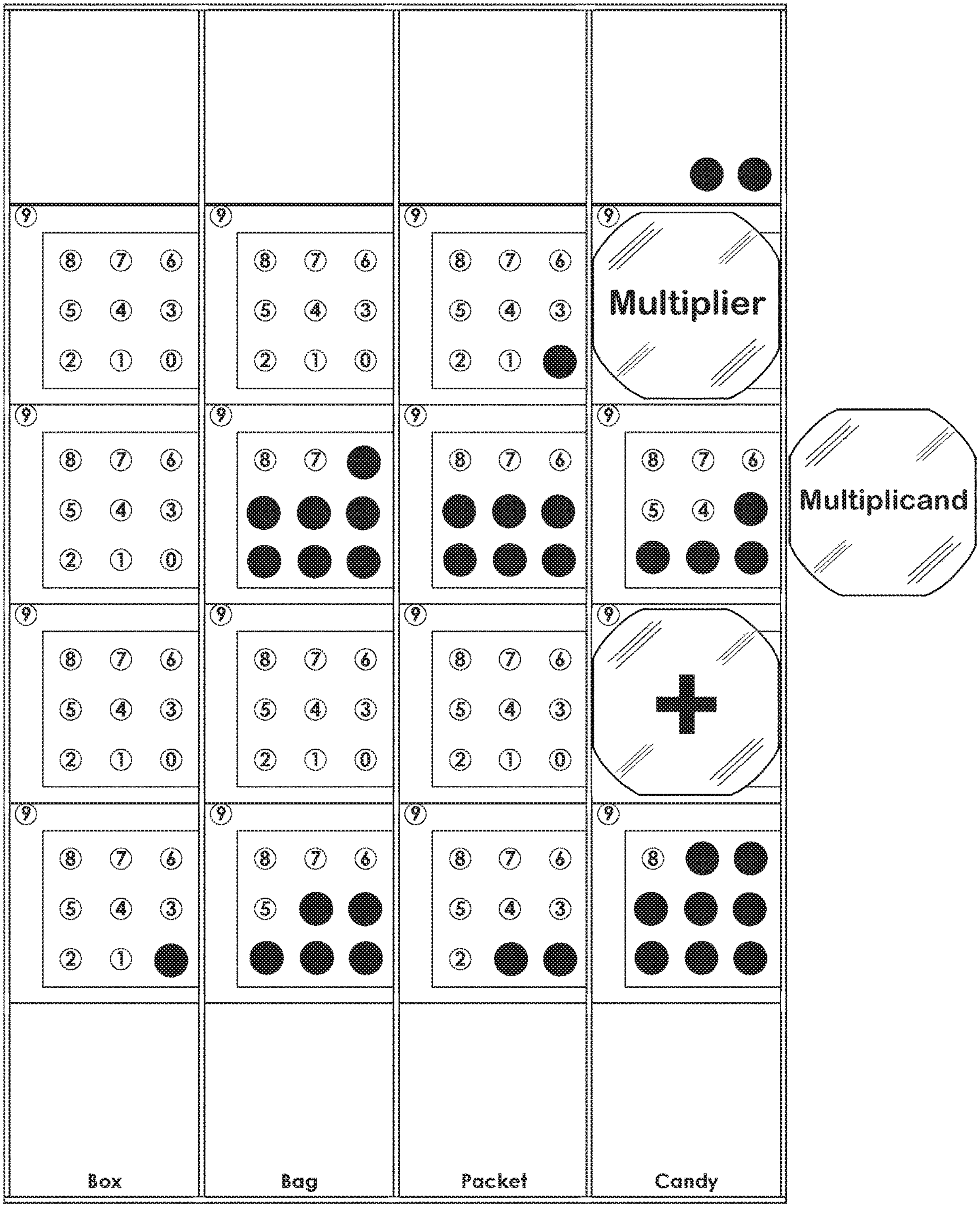
Figure 27G:
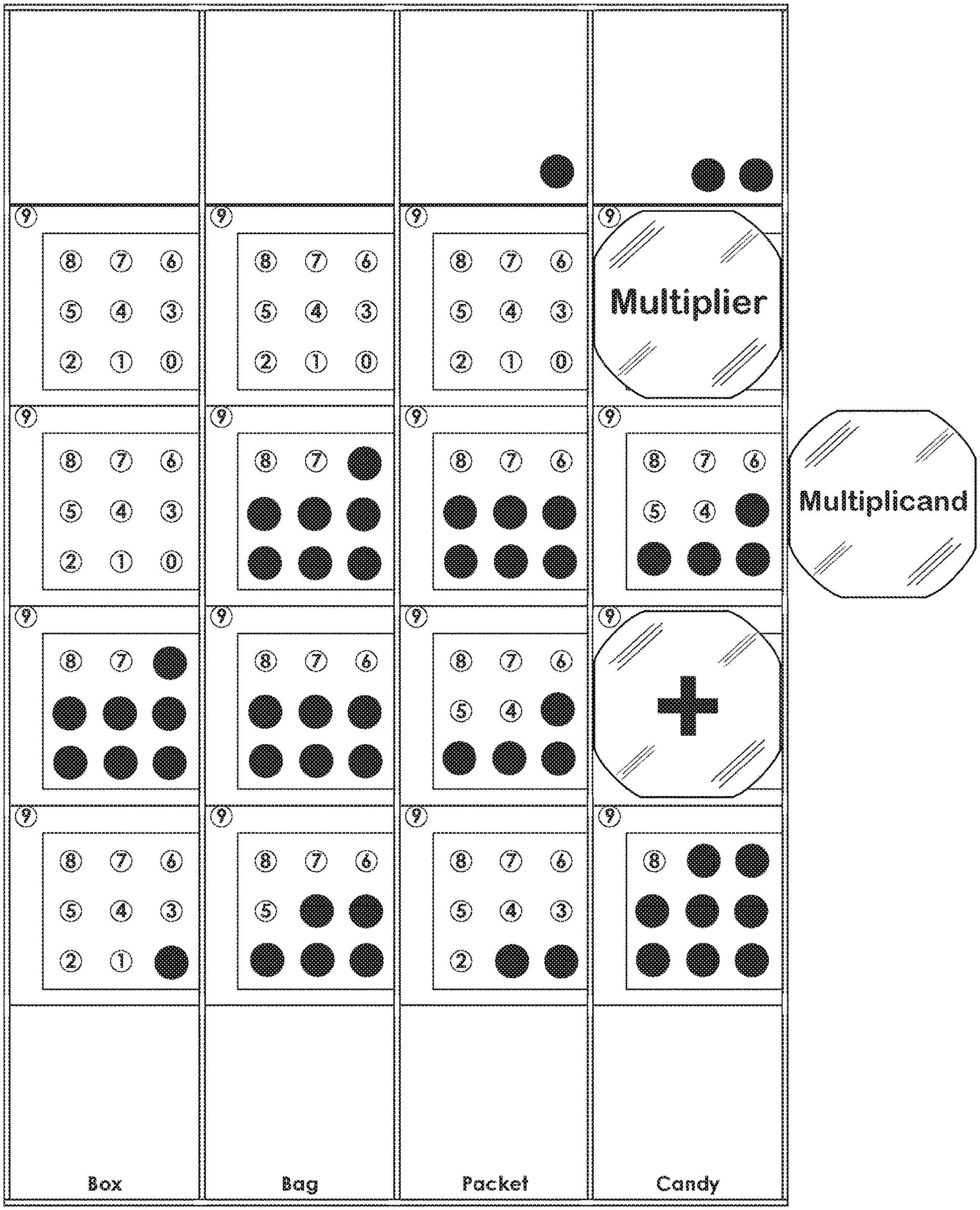
Figure 27H:
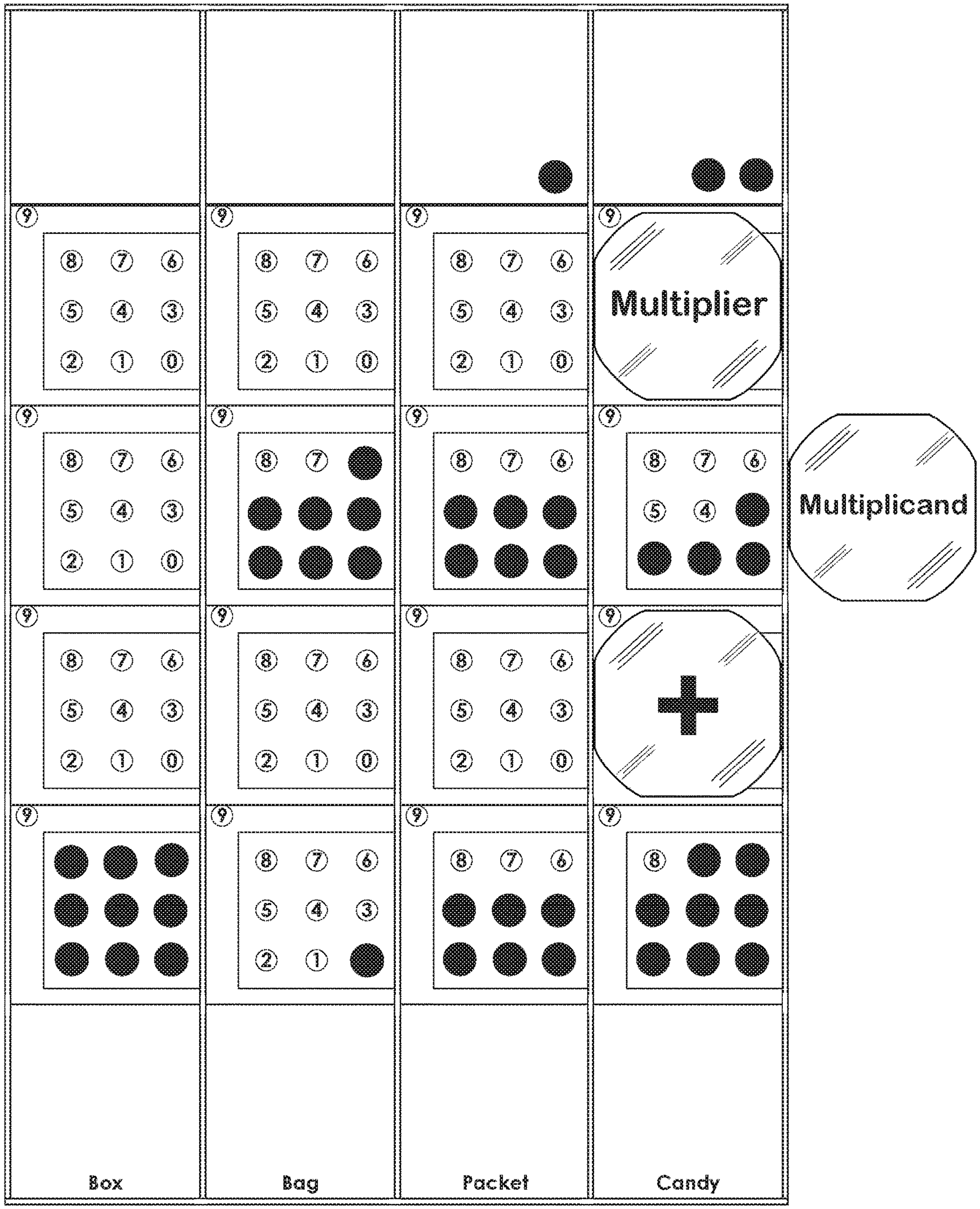

Step (B): If the top row is completely zeroed out, as depicted in FIG. 27H, then stop, the final Product is in the bottom row.

Step (C): If the Multiplier Digit-Square in the focus rank is “0”, as depicted in FIG. 27E, then move both the [Multiplier] and [+] guide chips left one rank, as depicted in FIG. 27F. Go to Step (B).

Step (I)): Slide one bead from the Multiplier Digit-Square into the Tray. Adhering to right to left Digit-Square order, duplicate the Multiplicand from the second row into the third row starting on the Digit-Square to the immediate left of the [+] guide chip, as depicted in FIGS. 27B, 27D and 27G.

Step (E): Add the third row to the bottom row, as depicted in FIGS. 27C, 27E and 27H. Go to Step (B).

Setting Up the 632M-Board

The synonymous terms 632M-Board and 632M-Table are used interchangeably. Radix-10 numeric representation will be the vehicle for describing the method, which finds generalized use in any desired radix system.

Figure 11:
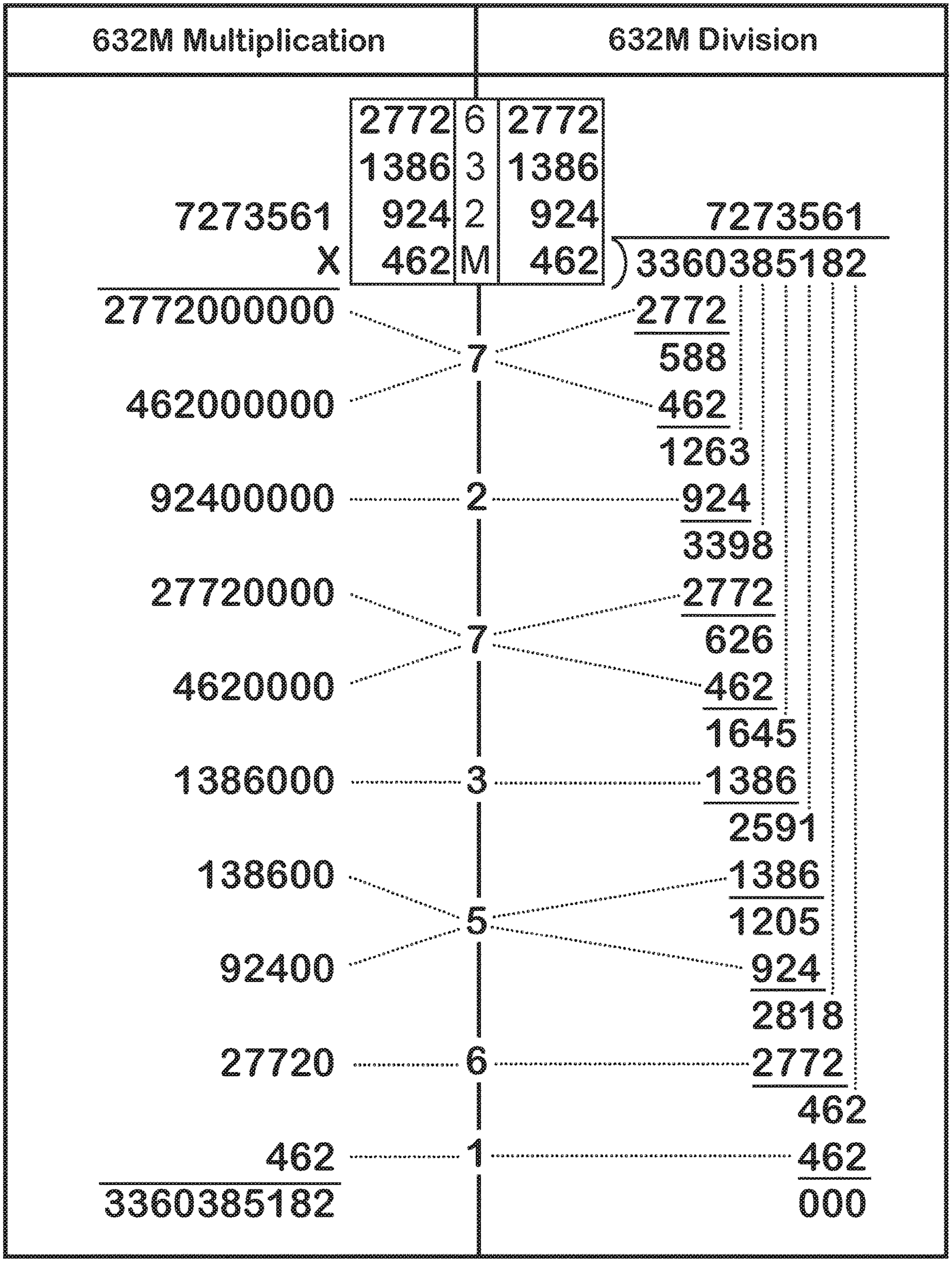
FIG. 11: Sample table of the 632M method expressed in scribe form showing symmetry and simplicity.

Illustrating a pencil-on-paper breakdown of the 632M method, FIG. 11 highlights the symmetry inherent to multiplication and division when dissected through the lens of super-subitization. With an M value of 462, the 632M-Table appears as dual, side by side 632M tables in the top/center of FIG. 11. The S-values appearing in the center vertical column 6, 3, 2, 1 (or M), denote multiples of the baseline multiplicand or the divisor values, as the case may be. S-values are used in an automated version of the cascade process, called While-loop Cascading, whereby the 632M method and the 632M-Table can be generalized for operations in radix systems other than radix-10. The detailed descriptions of Lessons #13 and #14 use a hardwired cascade because it is easier for children to understand.

The 632M method is efficient because it uses rote additions/subtractions operations where the net speed penalty is 1.4 operations per step, on average, and never exceeds 2 operations. In FIG. 13A, the speed penalty for generating a partial product in one's head is 1.5 relative to the cost of a rote addition operation. In FIG. 13B, for division, where the quotient is guess-estimated, the speed penalty is 2.0, relative to the cost of a rote subtraction operation. Based on these values, the speed improvement factor of the 632M method is tabulated in FIG. 13A for various multi-digit multipliers, multiplicands, and FIG. 13B for various multi-digit divisors and dividends.

Multiplication can be reduced to 1.2 additions per step if the tweaks detailed in the description of Lesson 413, Game of 632M Multiplication, are applied. Furthermore, the method of 632M is open to obvious adaptation. Certain digits repeated in a multiplier may give a better M-value selection, such as 532M, for example, whenever 5's outnumber 6's by two to one and 9's are scarce. Similarly, for 742M and 732M, which have an overhead of four additions to setup the M-Table, but otherwise super-subitize over radix-10 as well as 632M does, and are optimal for radix-11, as well. Similar extensions of the method apply to other radixes. For example, using a nine M-value 50/40/30/20/10/632M-Table with its setup overhead of nine additions, radix-60 arithmetic requires no more than 3 operations per step. Similarly, for radix-100, with its overhead setup cost of thirteen rote additions, a thirteen M-value SM-table requires no more than 1.5 operations per radix-10 digit step with an average of 1.15, making it a better means for slaying huge numbers. Similarly, radix-1000 reduces the average to 1.07 operations per radix-10 digit.

Figure 28A:
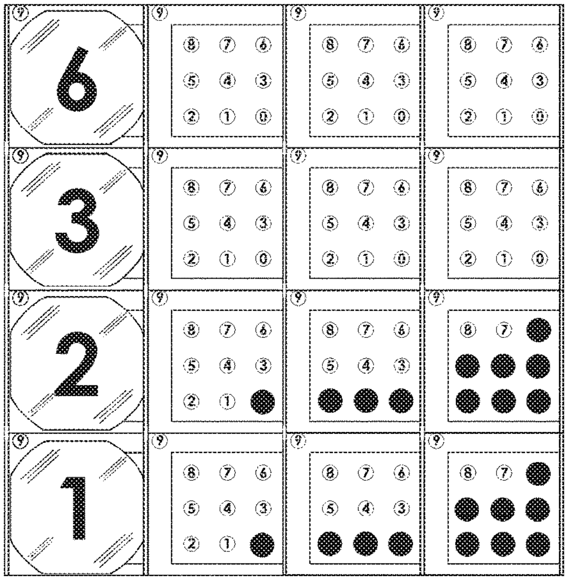
FIGS. 28A to 28G: Lesson #13. 632M M-Board setup process, worked example.

The 632M-Board preferably has an S-value field, as depicted in FIG. 28A in the leftmost column of tiles using guide chips, for example. The S-values are used in the customizable “While-loop Cascade” sub-process, as covered in the method claims, rather than a derived version of the method such as the hardwired cascade more appropriate for children, as covered in Lessons #13 and #14.

The NI-value field is mandatory and the width of the NI-value fields of the 632M-Board ought to be one rank wider than the 1M value to accommodate all potential 6M values, not depicted in the FIG. 28 series. Setting up the four-row 632M-Board introduces a fixed overhead of three additions to derive the M-values, 6M, 3M and 2M from 1M. FIGS. 28A through 28G illustrate the Candy Board method for generating a 632M-Board where the M-value 1M is 137.

The Setup of the 632M-Board Executes as Follows.

Step (A): Setup a series of S-values from top to bottom rows, namely 6, 3, 2, 1 in the S-value field of the M-Table. FIG. 28A depicts this in the form of chips in the leftmost tile of the M-Table.

Step (B): Setup the 1M value on both the bottom and next row up, as depicted in FIG. 28A.

Figure 28B:
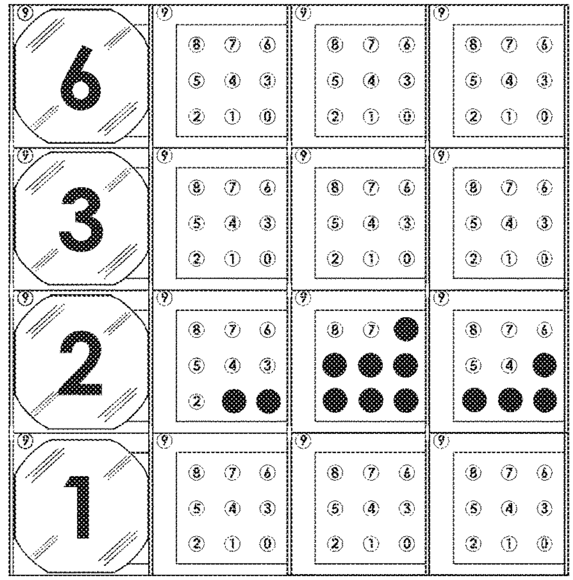

Step (C): Add the bottom row into the next row up, which yields 2M, as depicted in FIG. 28B.

Figure 28C:
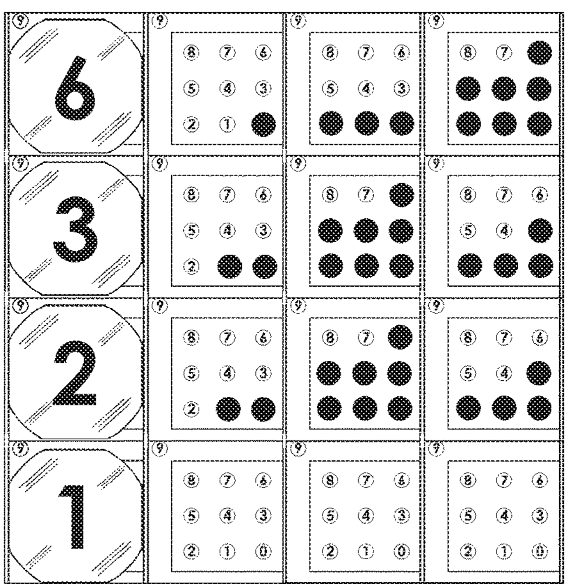

Step (D): Duplicate the 2M value into the row above it, and duplicate 1M into the top row, as depicted in FIG. 28C.

Figure 28D:
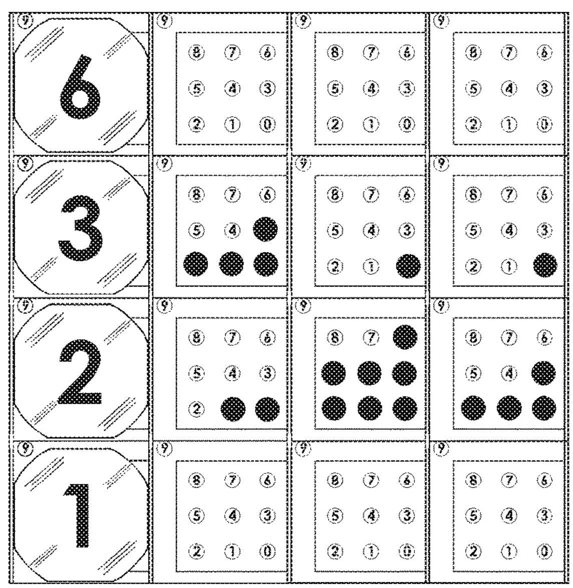

Step (E): Add the top row downwards into the row beneath, which yields 3M in that row, as depicted in FIG. 28D.

Figure 28E:
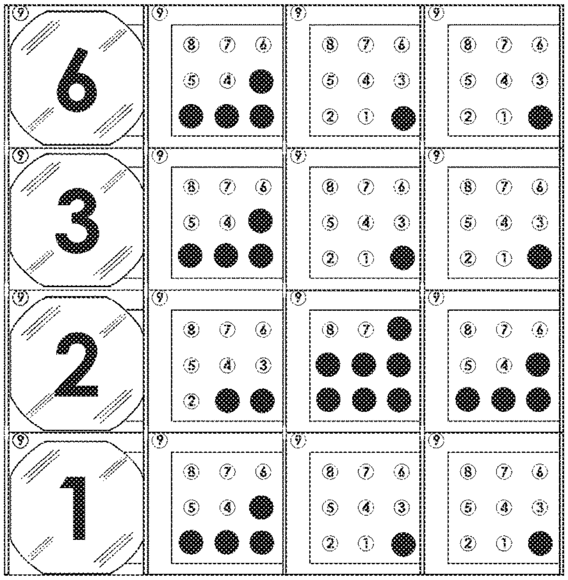

Step (F): Duplicate the 3M value into the top row and the bottom row, as depicted in FIG. 28E.

Figure 28F:
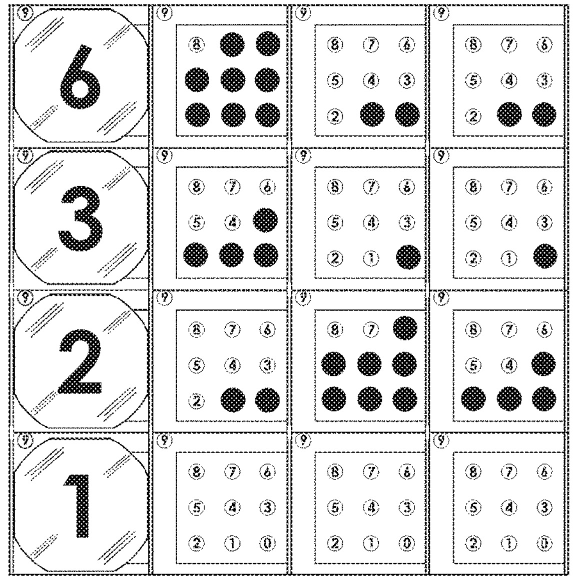

Step (G): Add the bottom row into the top row, which yields 6M in the top row, as depicted in FIG. 28F. As an alternative, covered in Lesson #10, Game of Doubling, double the top row in-situ, which makes needless the Step (F) process of duplicating 3M into the bottom row.

Figure 28G:
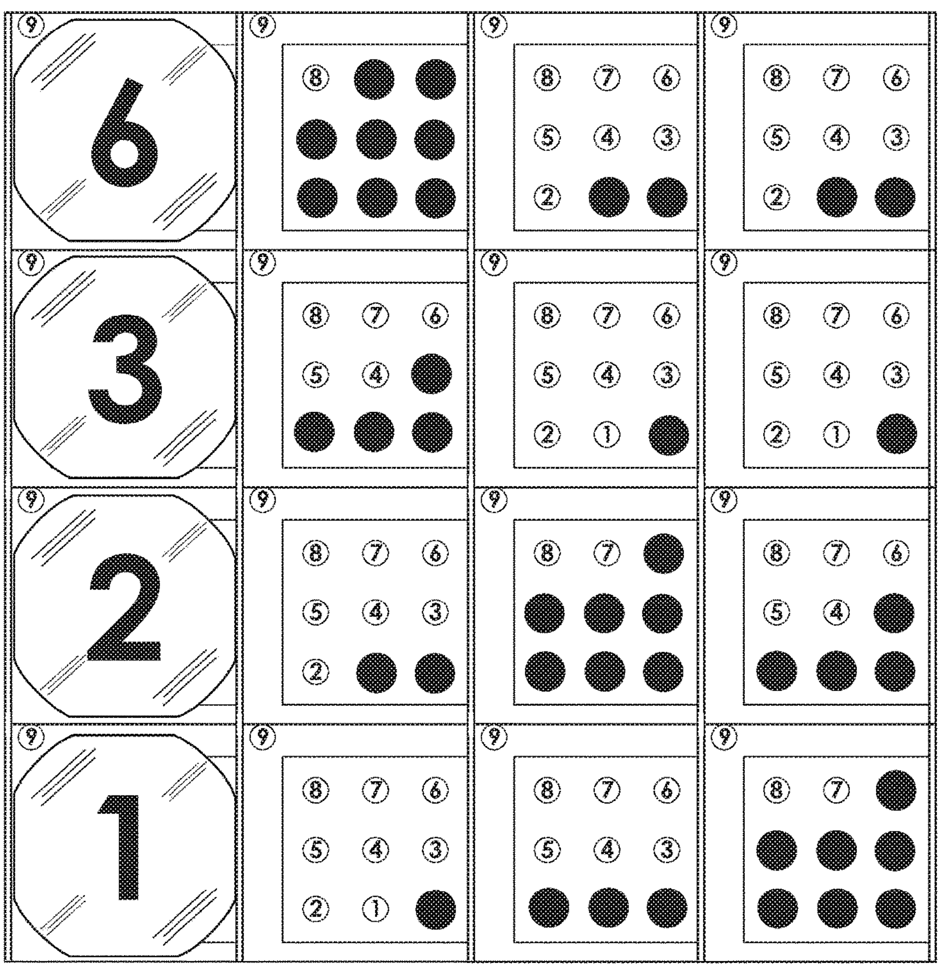

Step (H): Finally, Setup the 1M Value in the Bottom Row, as Depicted in FIG. 28G.

As will become clear from Lessons #13 and #14, detailed below, an 632M-Board detached from the Candy Board facilitates both rank shifting and duplication of M-value presets onto the Candy Board in the partial product row during multiplication and divisor/subtrahend row during division.

Figure 31A:
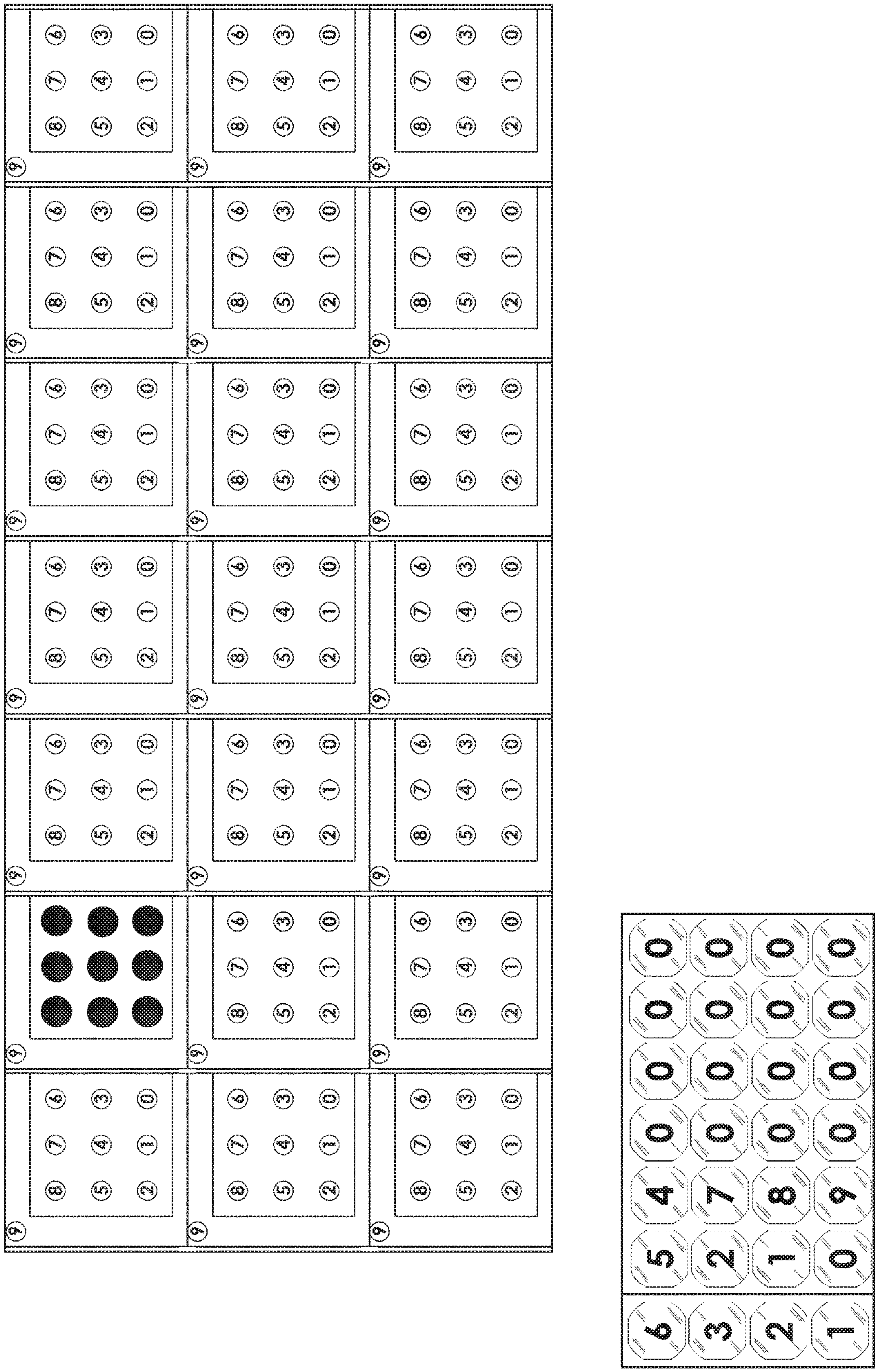
FIGS. 31A to 31L: Lesson #15. Game of Magic Twins, worked example.
Figure 31B:
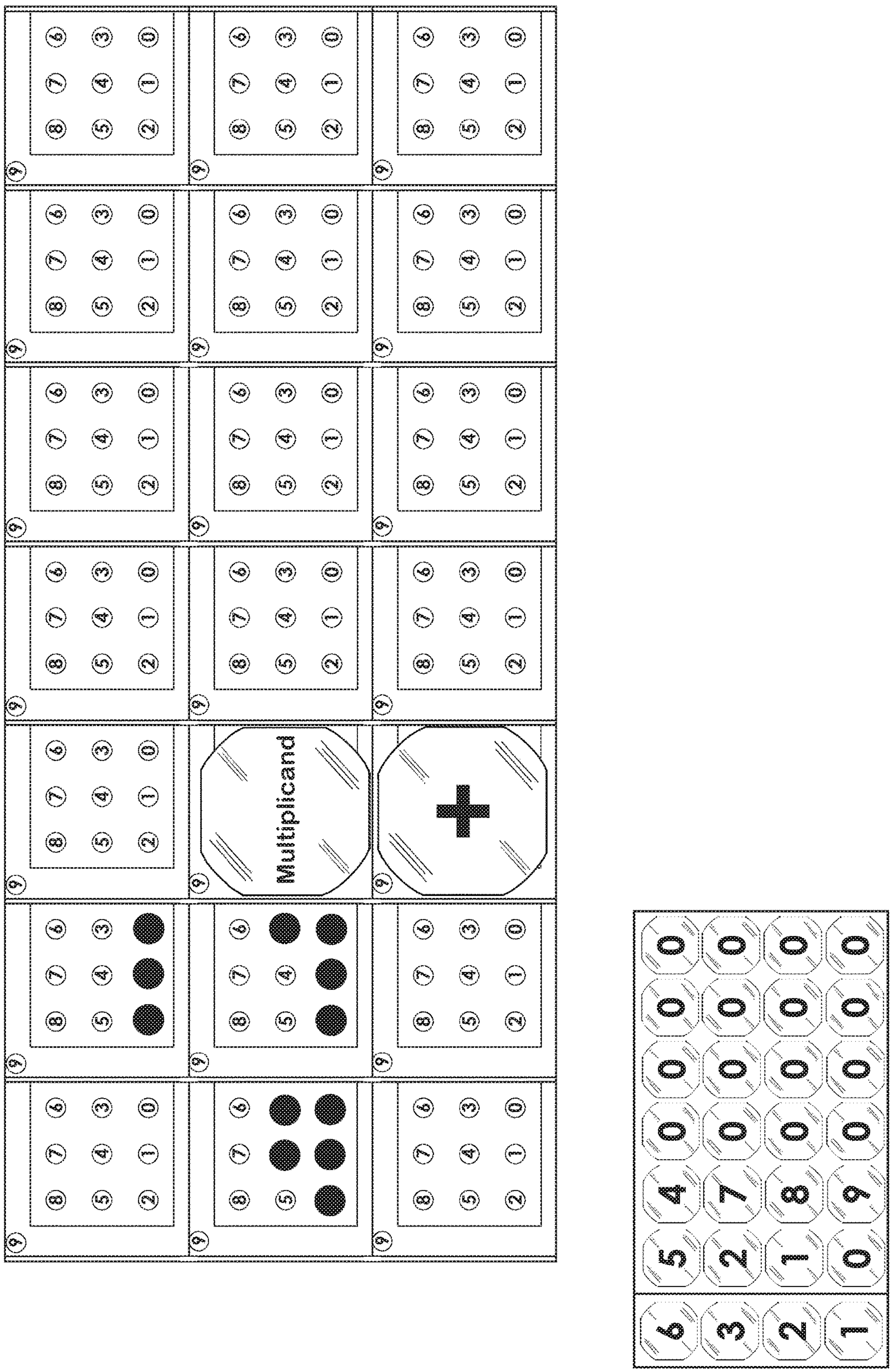
Figure 31C:
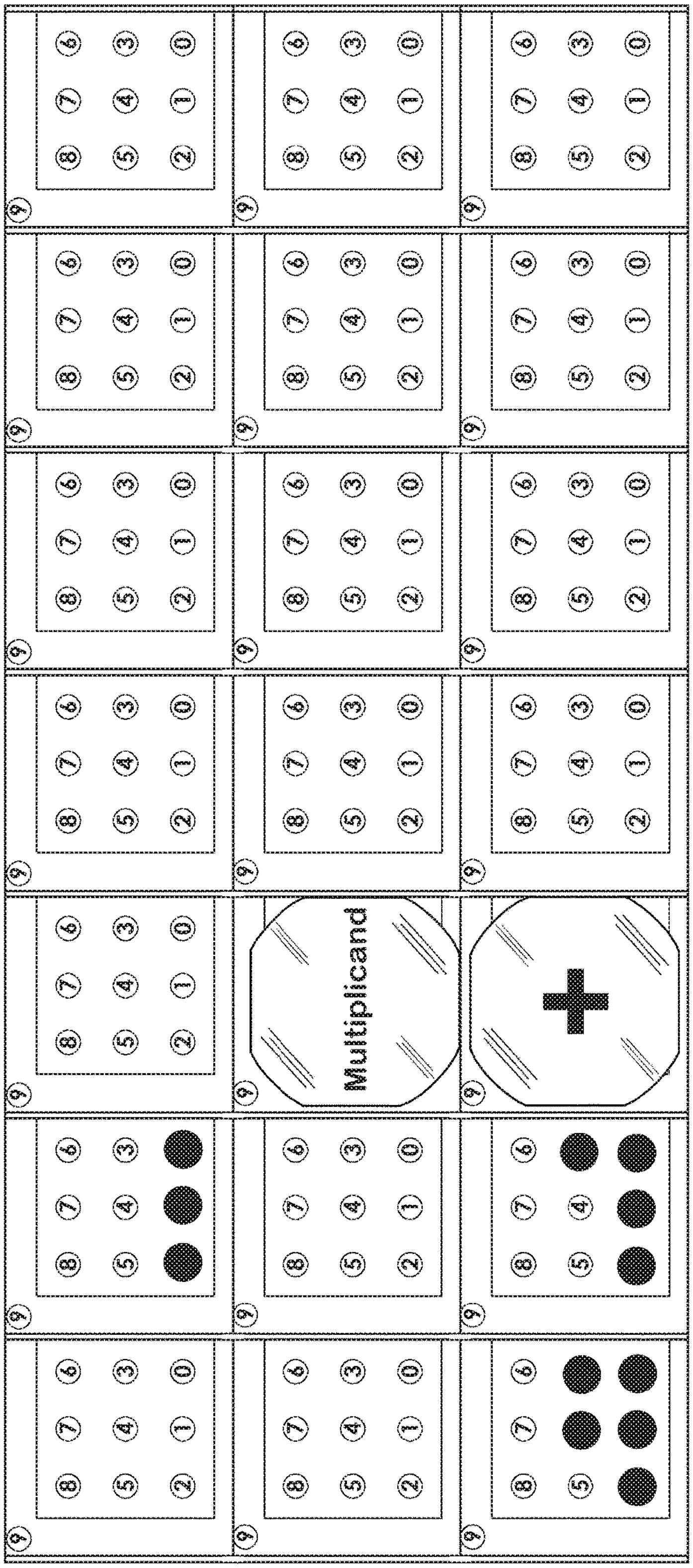
Figure 31C:
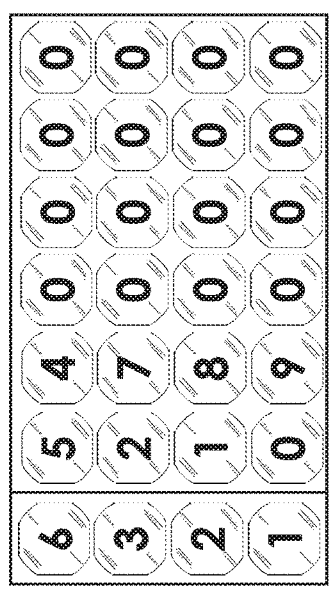
Figure 31D:
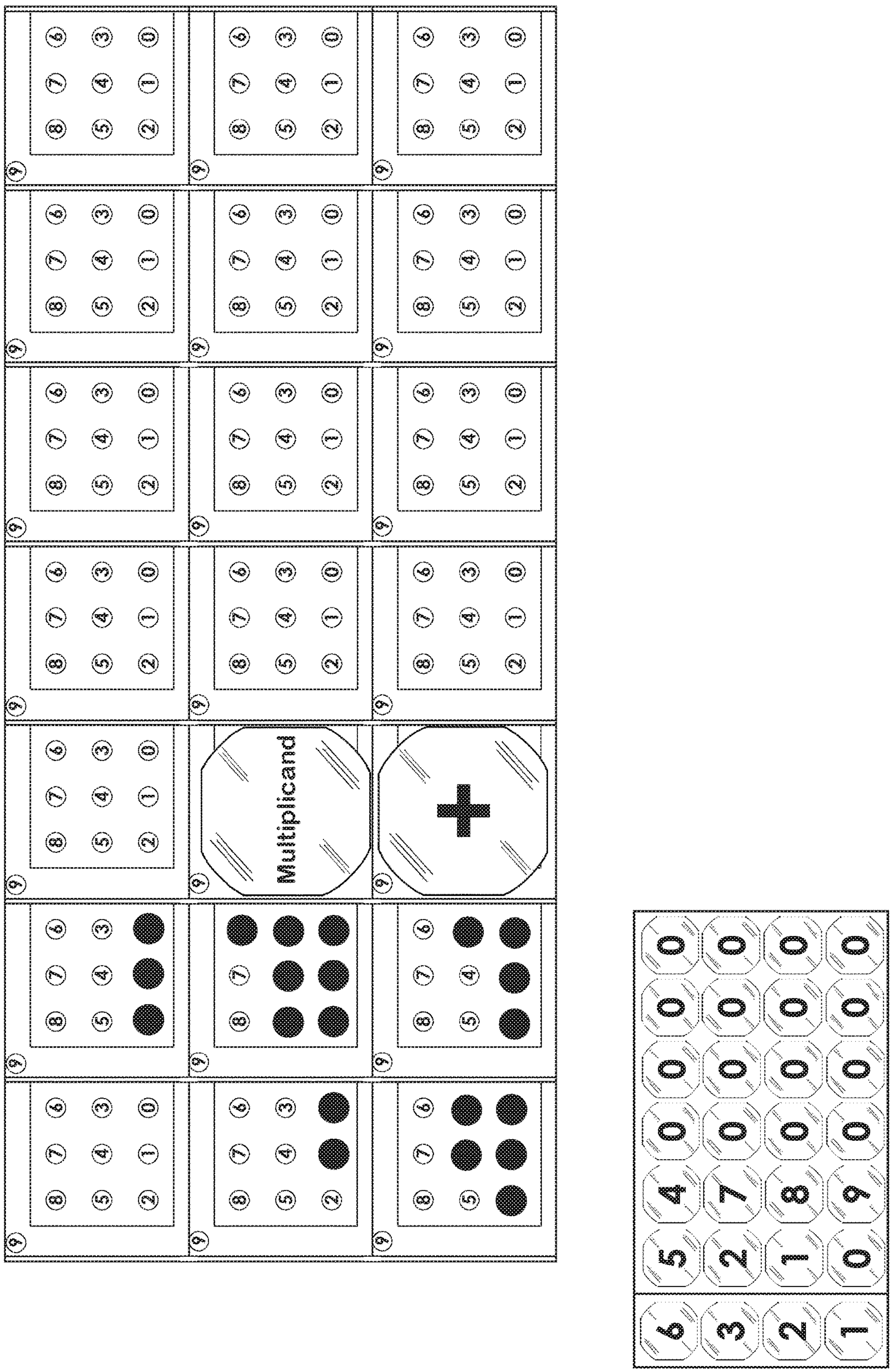
Figure 31E:
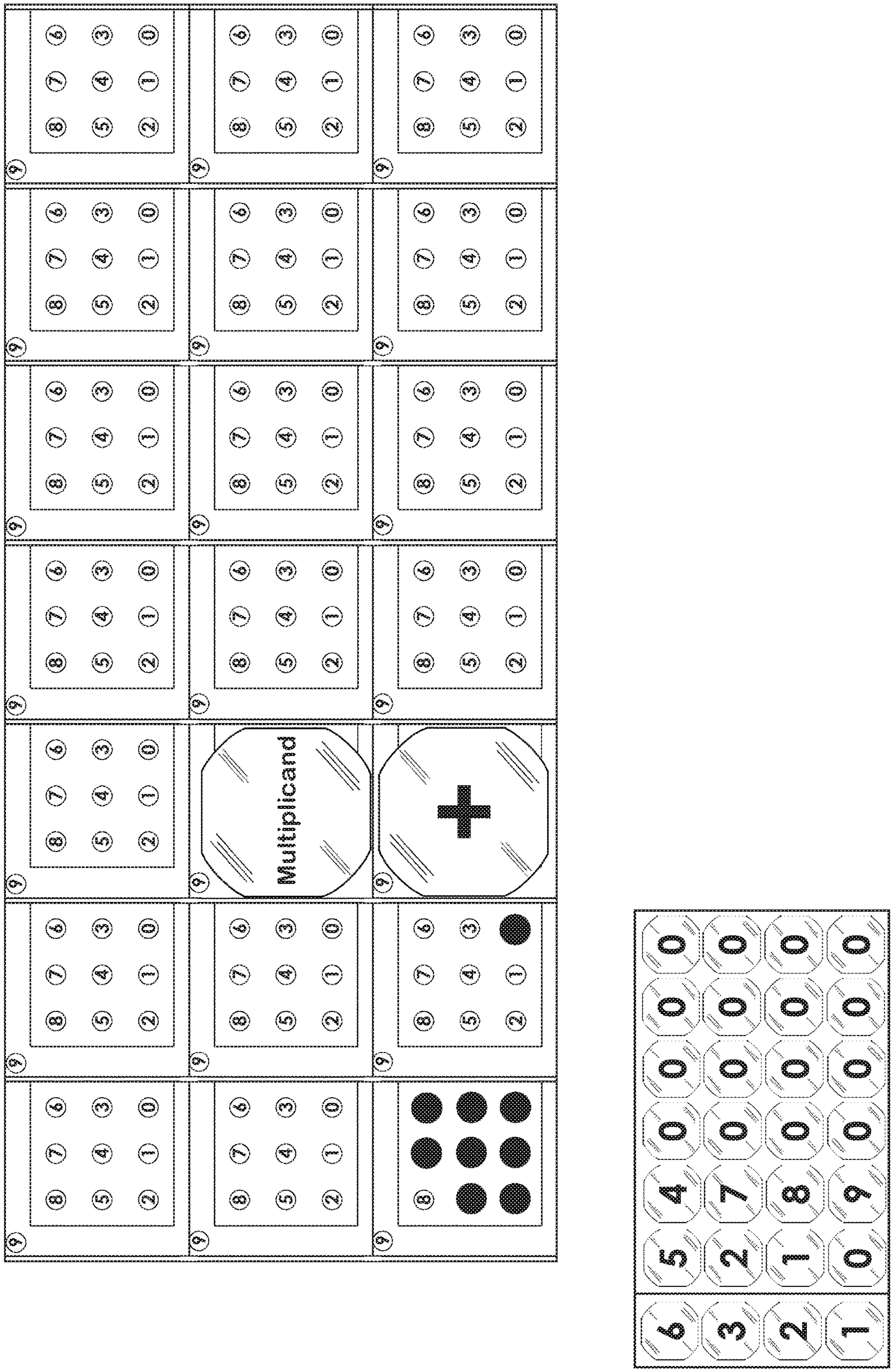

Once the child has mastered digit glyphs, numeric chips can be substituted for the Digit-Square bead patterns on the 632M-Board, as depicted in FIG. 31A. In addition, the four M-values can be written on, or using magnetic chips affixed to, a four-sided rectangular prism. Using this 632M-Board prism, the child can rotate it and make comparisons during the 632M method of division. In the alternative, four independent single row M-Boards can also be used.

Lesson #13, Game of 632M Multiplication

Figure 29A:
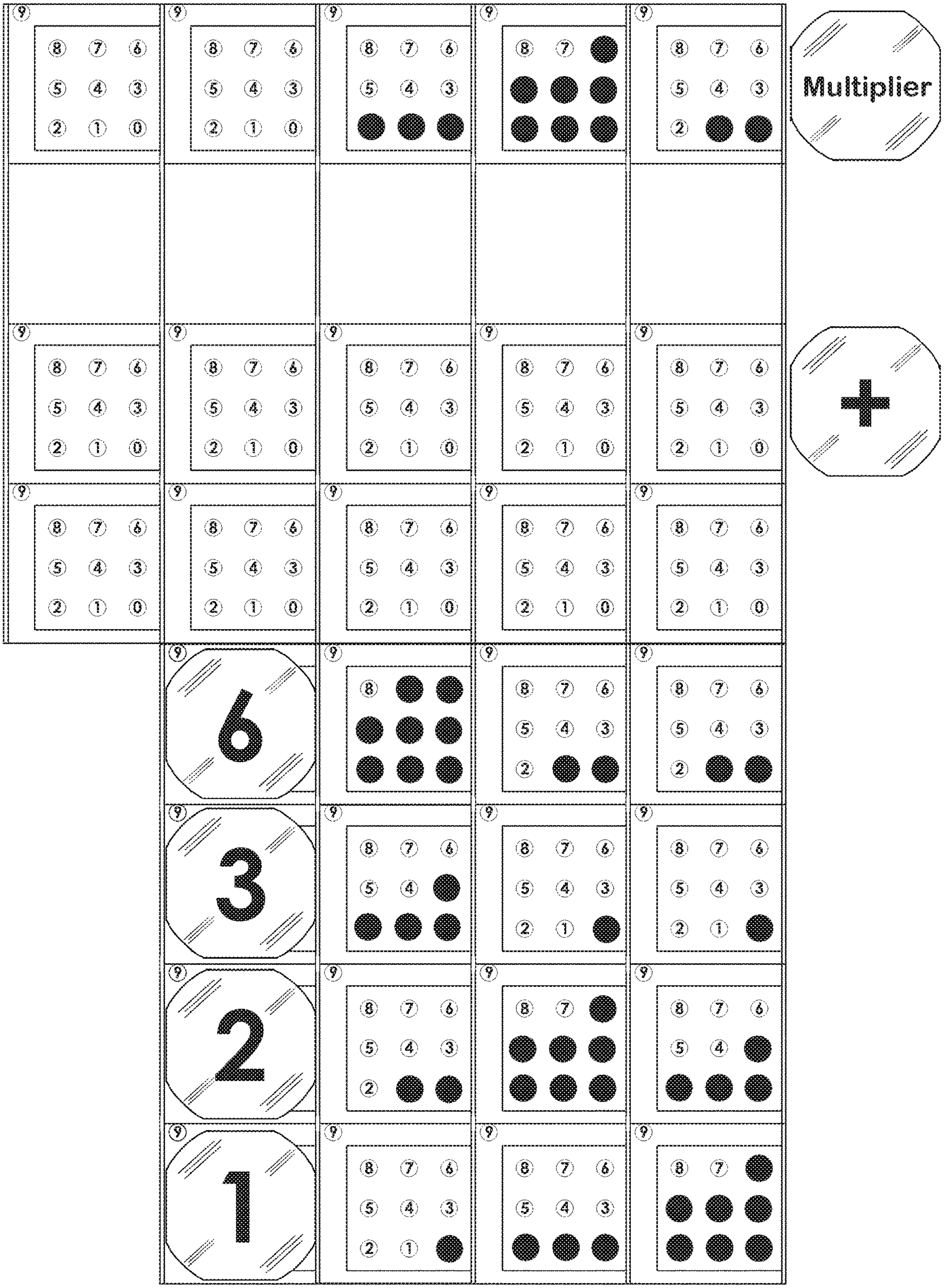
FIGS. 29A to 29K: Lesson #13. Game of 632M Multiplication, worked example.

For the Game of 632M Multiplication, the Candy Board is configured as two central rows with dual Trays top and bottom, with guides chips and the 632M-Board positioned, as depicted in FIG. 29A. The bottom tray is not depicted in FIGS. 29A through 29K. Above the top Tray is the row containing the Multiplier. Below the top Tray, the top row holds M-values that will be duplicated from the 632M-Board, which the child has preset with four M-values based on the Multiplicand value. In this example 1M is 137, as depicted in FIG. 28G. Initially zeroed out, the bottom row holds all accumulating partial products, and the final Product when multiplication terminates.

Technically, because addition is commutative, rank-wise repetitive additions of 632M based multiplication can proceed in any Digit-Square sequence. However, to mimic pencil-on-paper arithmetic conventions, a right to left process is used.

The solution for 372 times 137 is depicted in FIGS. 29A through 29K. Note that because Multiplicand processing is 6M, 3M, 2M, 1M, the figures are cited out of order in the hardwired 6321 cascade version of the 632M process, as explained in Steps (C) through (F). At a maximum, only two additions are done per multiplier digit, so the process outlined below can be optimized via a cascade decrement to zero.

The Game of 632M Multiplication Executes as Follows.

Step (A): Setup the Multiplier in the row above the Tray. Zero out the top and bottom rows below the Tray. Setup the four 632M Multiplicand M-values on the 632M-Board, and the S-values 6, 3, 2, 1 using guide chips. Align the rightmost rank of the 632M-Board with the rightmost rank of the Candy Board. On the right edge of the Candy Board, setup the [Multiplier] and [+] guide chips for the Multiplier row and top row respectively, as depicted in FIG. 29A.

Figure 29B:
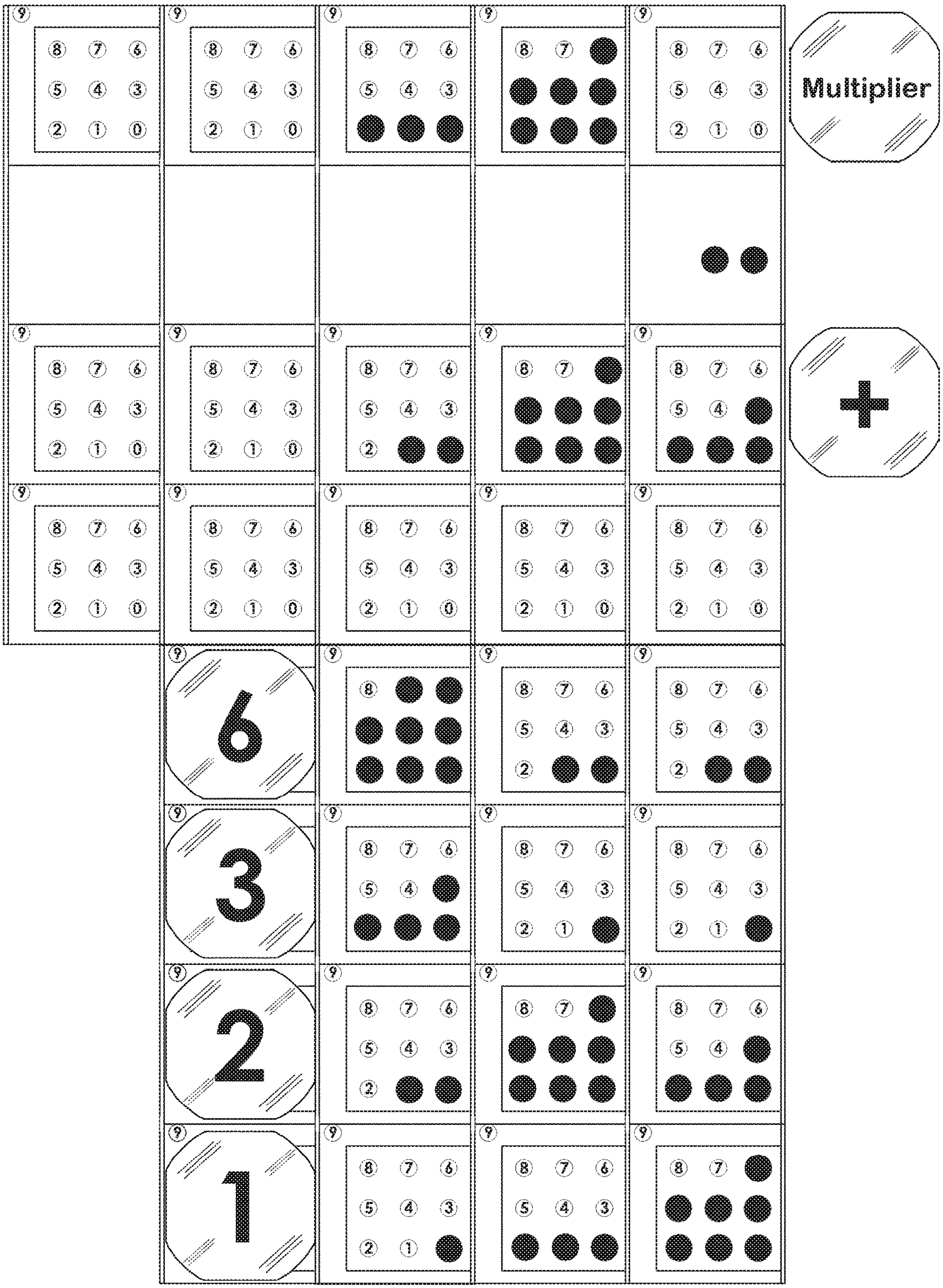
Figure 29C:
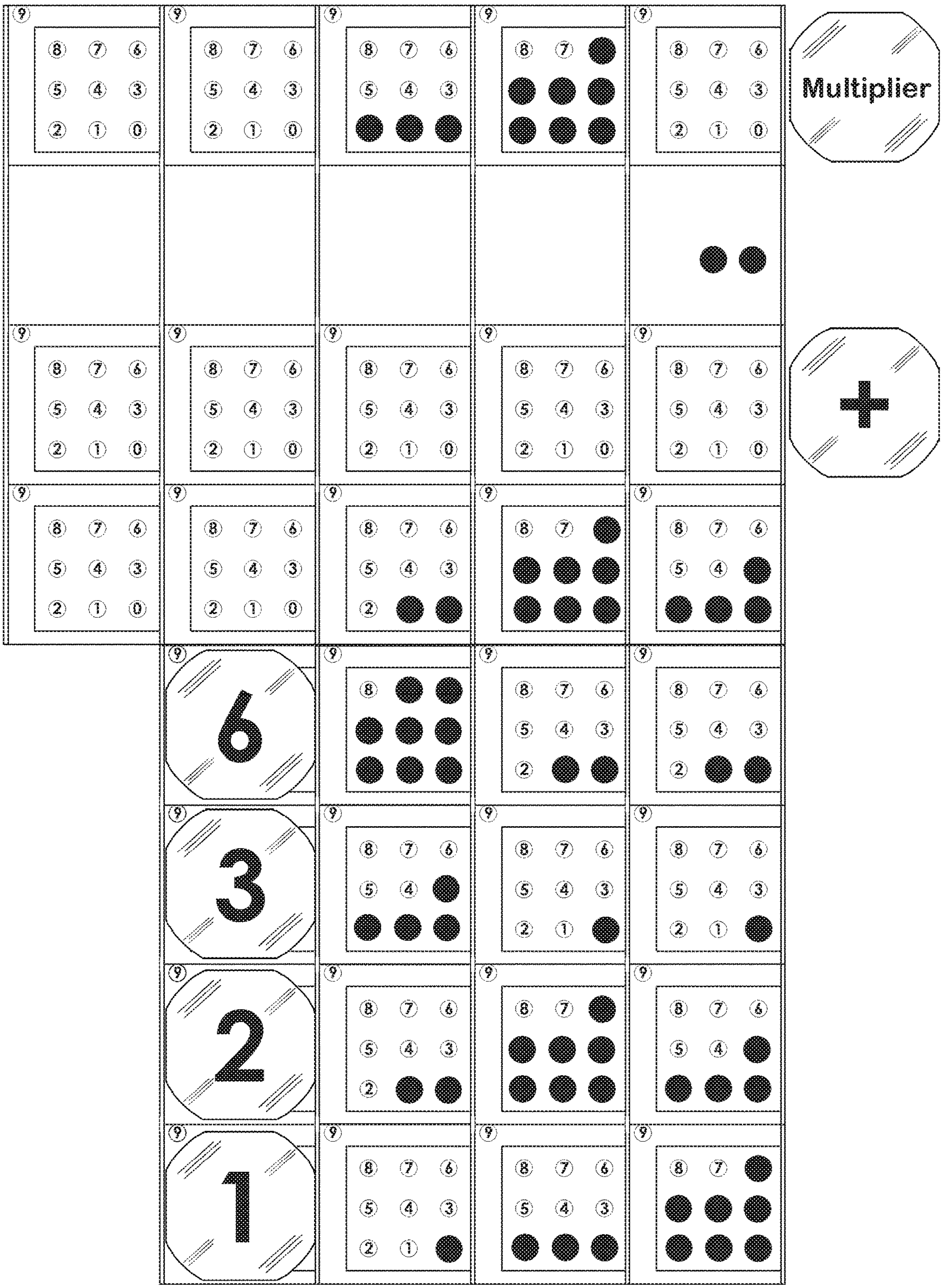
Figure 29D:
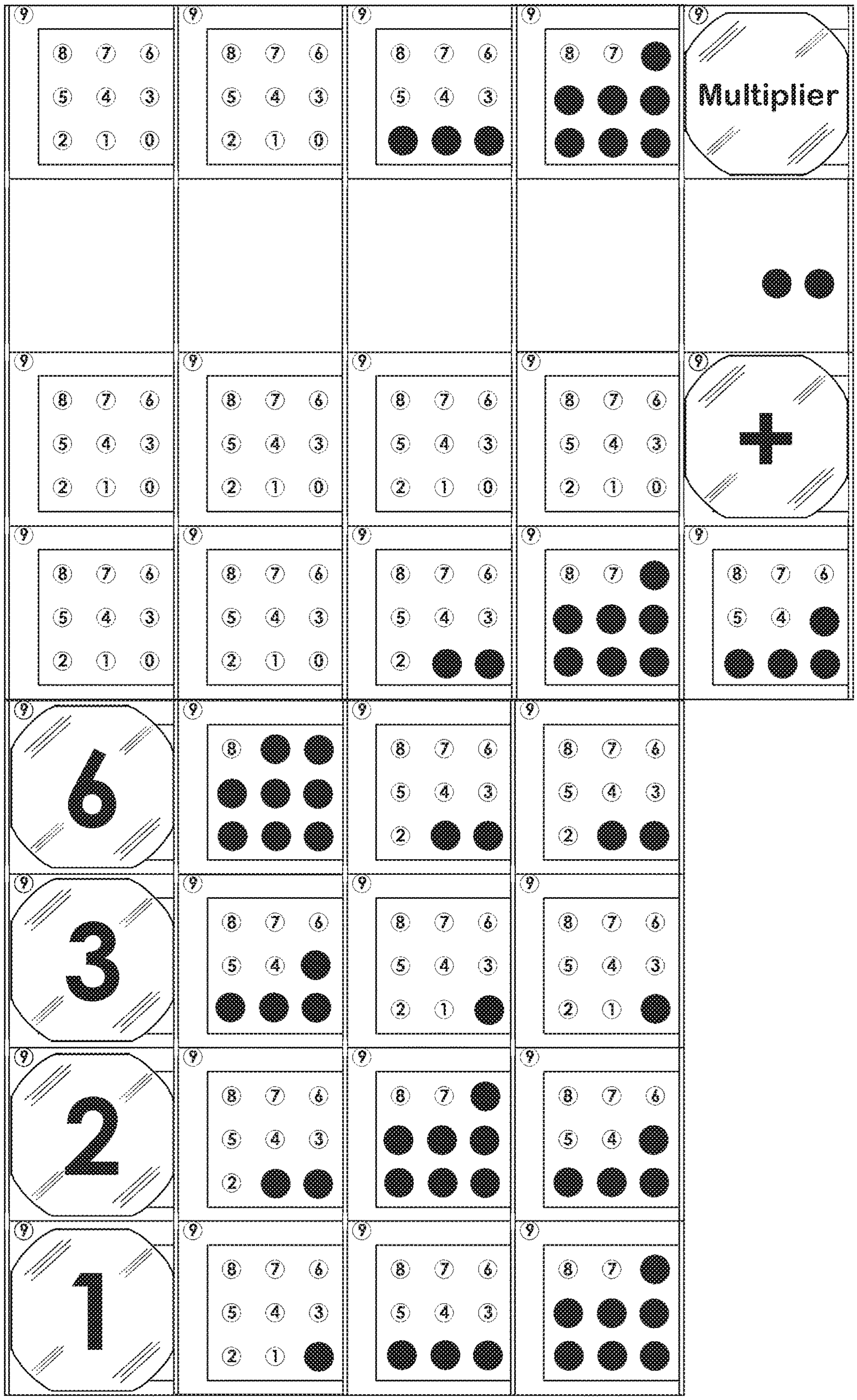
Figure 29E:
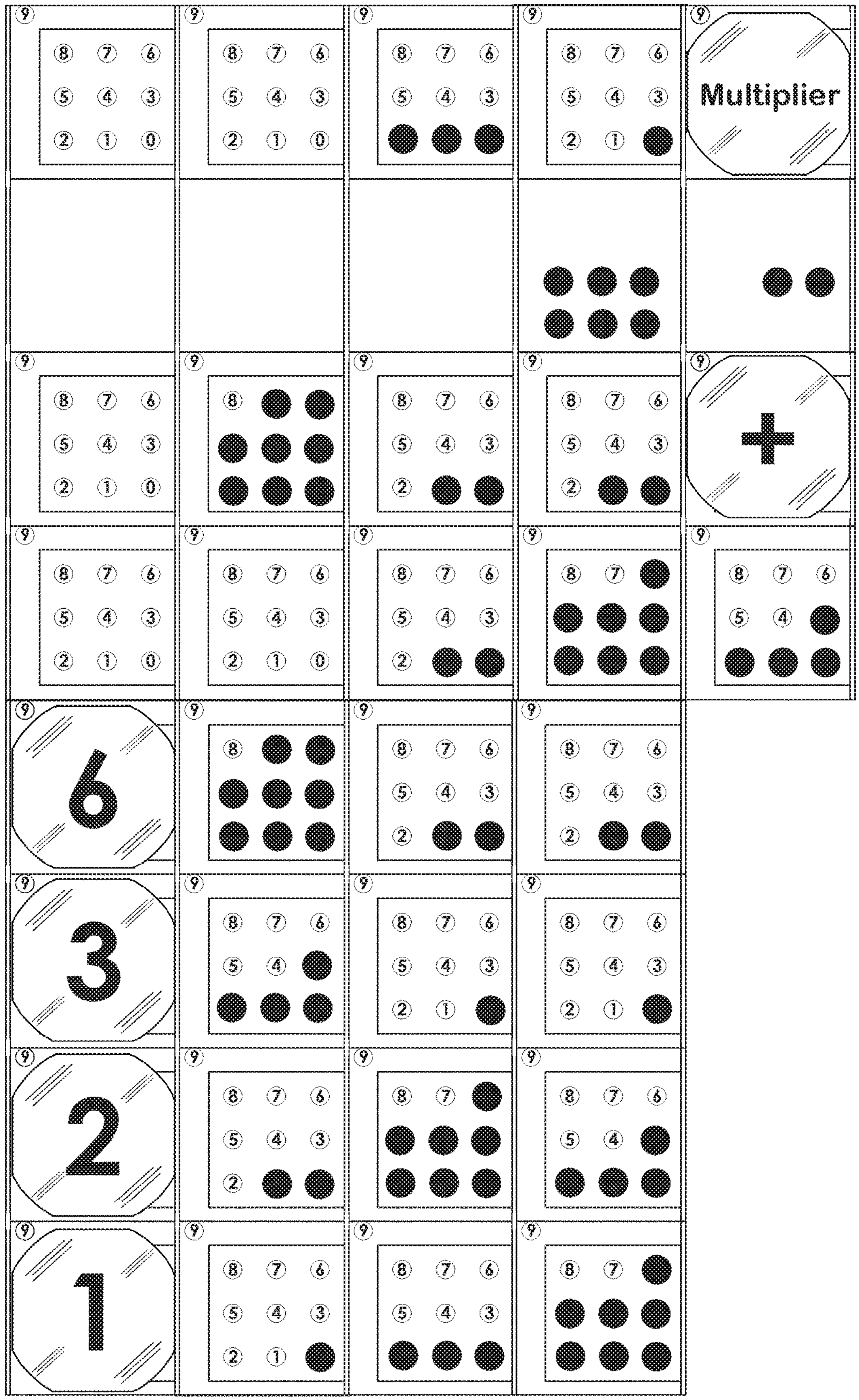
Figure 29F:
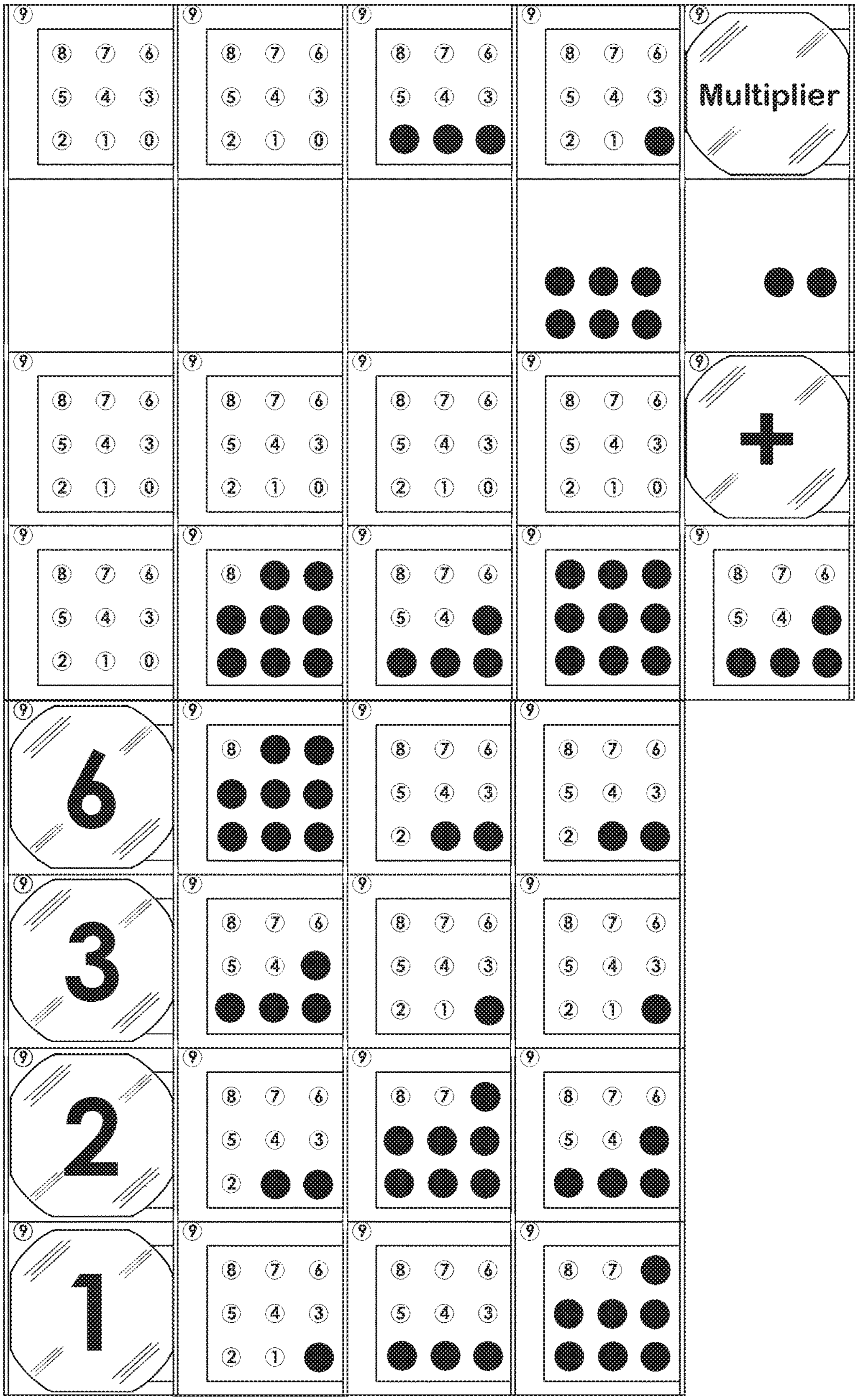
Figure 29G:
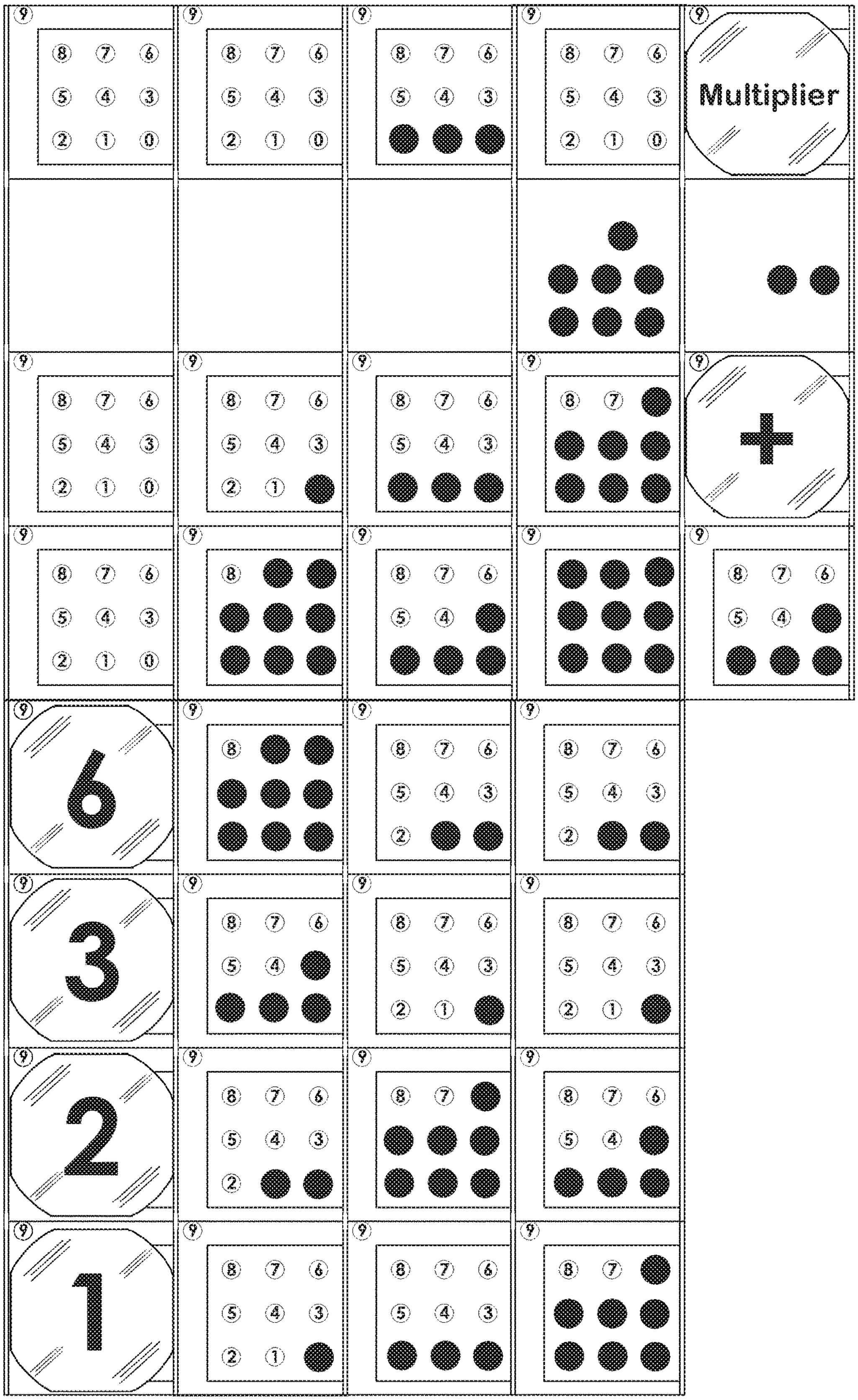
Figure 29H:
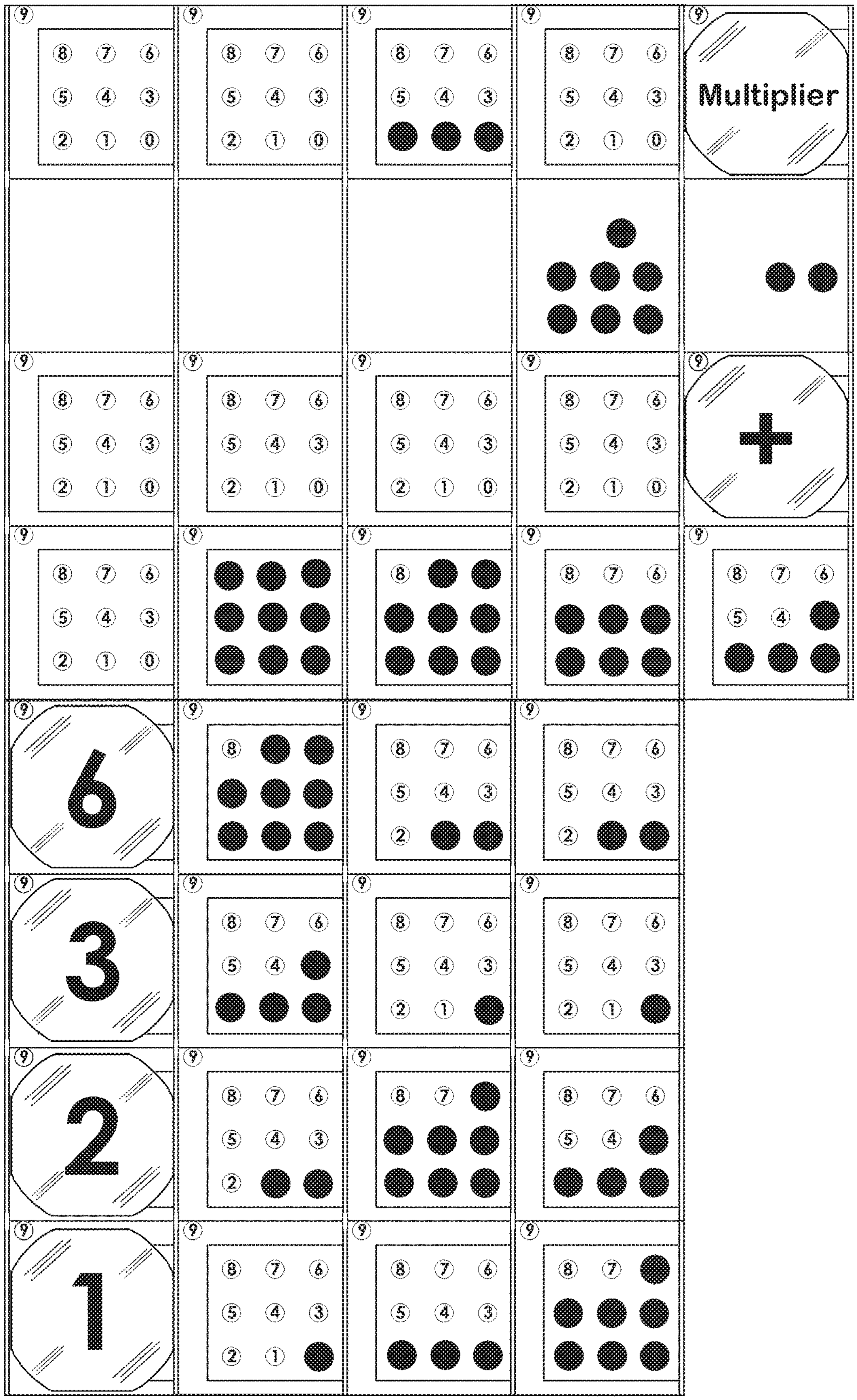
Figure 29I:
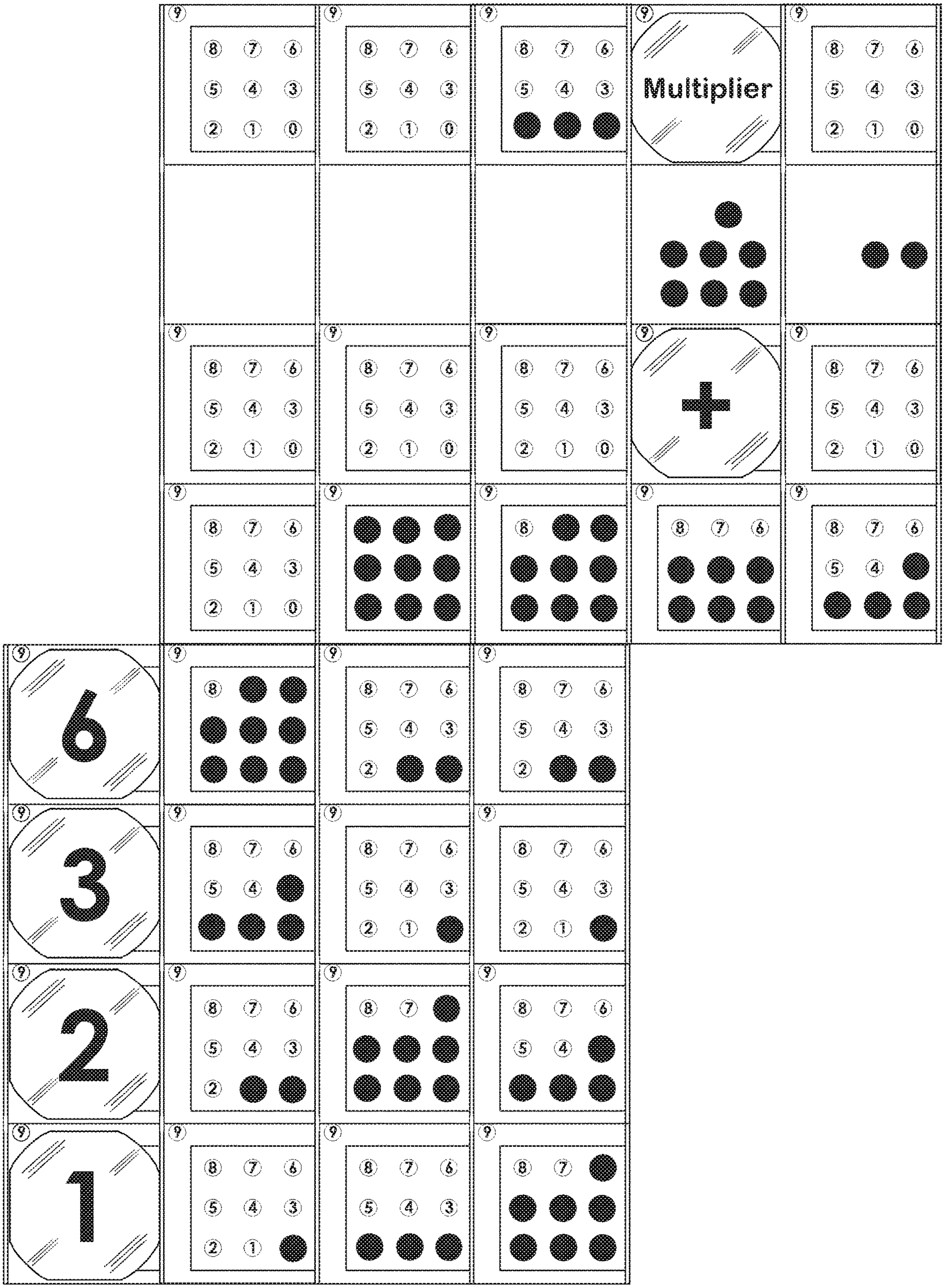
Figure 29J:
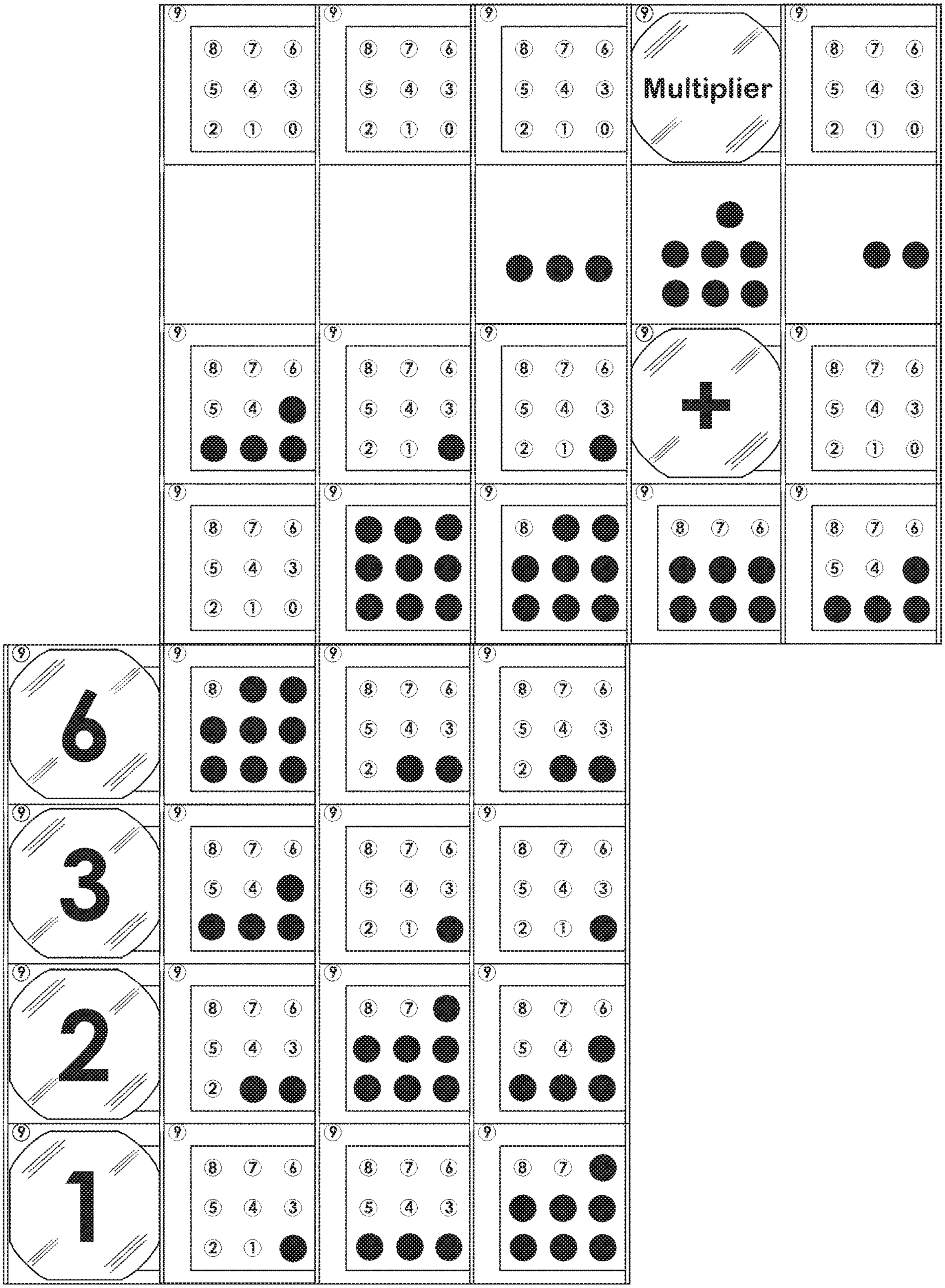
Figure 29K:
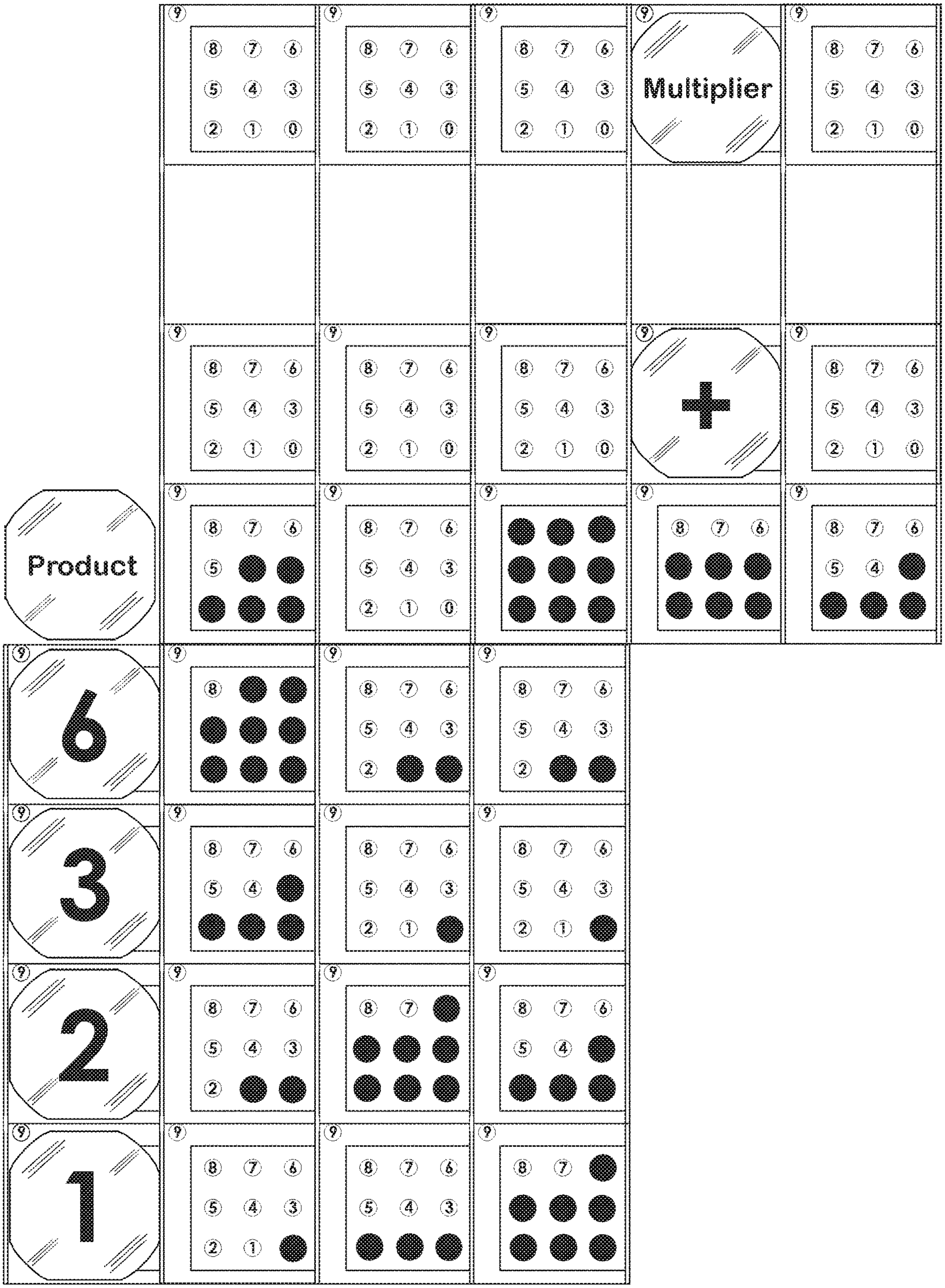

Step (B): If the Multiplier row is completely zeroed out, the Game of Multiplication has concluded. As depicted in FIG. 29K, the final Product is in the bottom row.

Step (C): 6S/6M Step. If the Multiplier Digit-Square bead pattern is "6" or greater, as depicted in FIG. 29D, remove 6 beads from the Multiplier Digit-Square and duplicate the M-value 6M from the 632M-Board into the top row, as depicted in FIG. 29E. Next, add the top row into the bottom row, as depicted in FIG. 29F.

Step (D): 3S/3M Step. If the Digit-Square bead pattern is "3" or greater, as depicted in FIG. 29I, remove 3 beads from the top row Multiplier Digit-Square and duplicate the M-value 3M from the 632M-Board into the top row, as depicted in FIG. 29J. Next, add the top row into the bottom row, as depicted in FIG. 29K.

Step (E): 2S/2M Step. If the Digit-Square bead pattern is "2" or greater, as depicted in FIG. 29A, remove 2 beads from the top row Multiplier Digit-Square and duplicate the M-value 2M from the 632M-Board into the top row, as depicted in FIG. 29B. Next, add the top row into the bottom row, as depicted in FIG. 29C.

Step (F): 1S/1M Step. If the Digit-Square bead pattern is "1", as depicted in FIG. 29F, remove 1 bead from the top row Multiplier Digit-Square and duplicate the M-value 1M from the 632M-Board into the top row; as depicted in FIG. 29G. Next, add the top row into the bottom row, as depicted in FIG. 29H.

Step (G): If one or more beads remain in the Multiplier focus Digit-Square to the immediate left of the [Multiplier] guide chip, then an error has occurred and the game needs to start afresh because it is possible not enough beads were slid off during 632M processing. Otherwise, shift the [Multiplier] and [+] guide chips and the 632M-Board one rank to the left, as depicted in FIGS. 29D and 29I. Go to Step (B).

An alternative means of error correction is one where after each Digit-Square of the Multiplier is zeroed, the child duplicates a backup value of the bottom row, which can be used to reboot the process in the event the child makes an error later in the multiplication process chain.

One optimization tweak occurs when no digit in the multiplier exceeds five. In such a case, the 6M value is never used, and so never needs to be added onto the 632M-Board. Rather, it might make more sense to create a 4M or 5M value depending on which digit occurs with greater frequency in the multiplier. In fact, if the multiplier is a long digit sequence, creating every pertinent M-value above 3M on-the-fly makes sense because each in-situ added NI-value to a just-in-time 98765432M-Board involves no burdensome overhead, and reduces every step to one rote addition.

Optimization of the Multiplier row includes four tweaks called "10-1", "10-2", "10-3" and "10-6". These substitute for multiplier digit values 9, 8, 7 and 4 respectively, and only make sense when the multiplier two-digit pattern reduces the overall number of steps. This occurs for "x9", "x8", "x7" and "x4" patterns where x=1, 2, 5 and 9. For "x8", "x7" and "x4", four steps reduce to two steps, and in the case of the "x9" pattern one step. For example, "99", "59", "29" or "19" are the two digit patterns that make the "10-1" tweak optimal.

With "x9" pattern, the "10-1" tweak proceeds as follows. Add one bead to the Digit-Square left of the [Multiplier] guide chip. For x=1, 2, 5, and 9, the x-value "1" becomes "2", "2" becomes "3", "5" becomes "6" and "9" becomes TEN, respectively. Next, 1M is placed in the top row and subtraction is performed. In the "99" scenario, "TEN0" is generated, the only operation is to ripple the Packaging operation up the Multiplier row.

With the "x8" pattern, the "10-2" tweak mimics the "10-1" tweak except 2M is placed in the top row and a 2M subtraction is done.

With the "x7" pattern, the "10-3" tweak mimics the "10-1" tweak except 3M is placed in the top row and a 3M subtraction is done.

With the "x4" pattern, the "10-6" tweak mimics the "10-1" tweak except 6M is placed in the top row and a 6M subtraction is done.

Figure 30A:
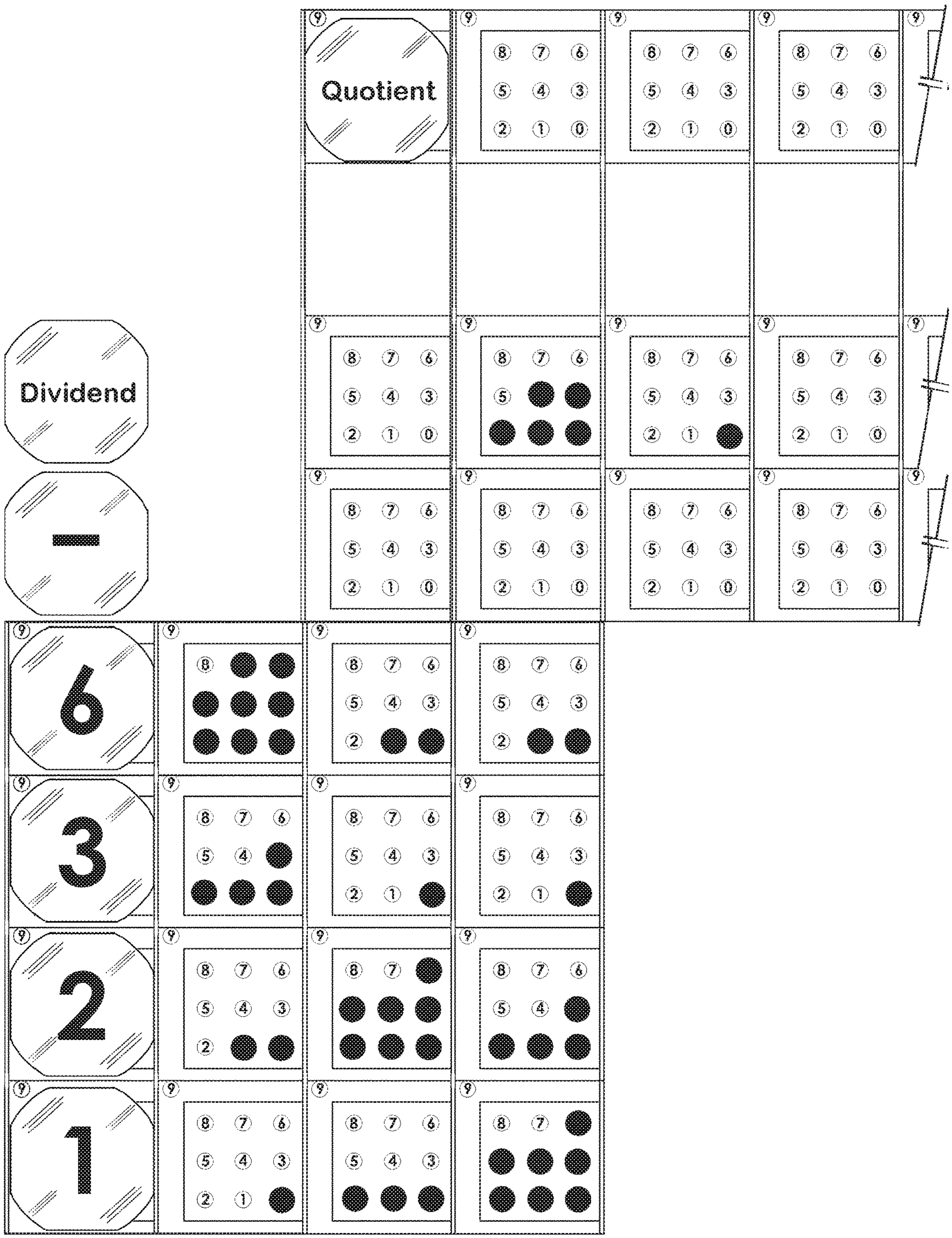
FIGS. 30A to 30N: Lesson #14. Game of 632M Division, worked example.

These optimal two-digit patterns occur 16% of the time and reduce the average operations per multiplier digit from 1.4 to 1.2. However, at the start of game play, if the rightmost Multiplier Digit-Square shows "9" "8", "7" or "4", as will happen 40% of the time, then zero out the rightmost Multiplier Digit-Square, duplicate the 1M value into the bottom row but shifted left one rank, namely multiply by ten, and proceed with the 1M, 2M, 3M or 6M subtraction pertinent to "9" "8", "7" or "4", respectively. This execution sequence avoids generating a negative number at the start. Tweaks add speed but can make for errors. Every game is end-capped by the use of plosive-state equilibration if normalizing the final value into canonical form is required Lesson #14, Game of 632M Division The Game of 632M Division uses a two-plus-one row Candy Board with Trays including guides chips and the 632M-Board positioned, as depicted in FIG. 30A. The bottom tray is not depicted in FIGS. 30A through 30N. In its own row above the top Tray is the row containing the Quotient. Below this Tray, the top row holds the Dividend, and the Remainder when division terminates. The bottom row holds M-values that will be duplicated from the 632M-Board and subtracted from the Dividend in the row above.

The [Quotient] guide chip prevents focus-rank errors. The [Dividend] and [−] guide chips aid the digit comparison and M-value duplication processes. These guide chips shift right as division unfolds. The 632M-Board is setup based on the Divisor value, in this example 1M is 137, as depicted in FIG. 28G.

Figure 30B:
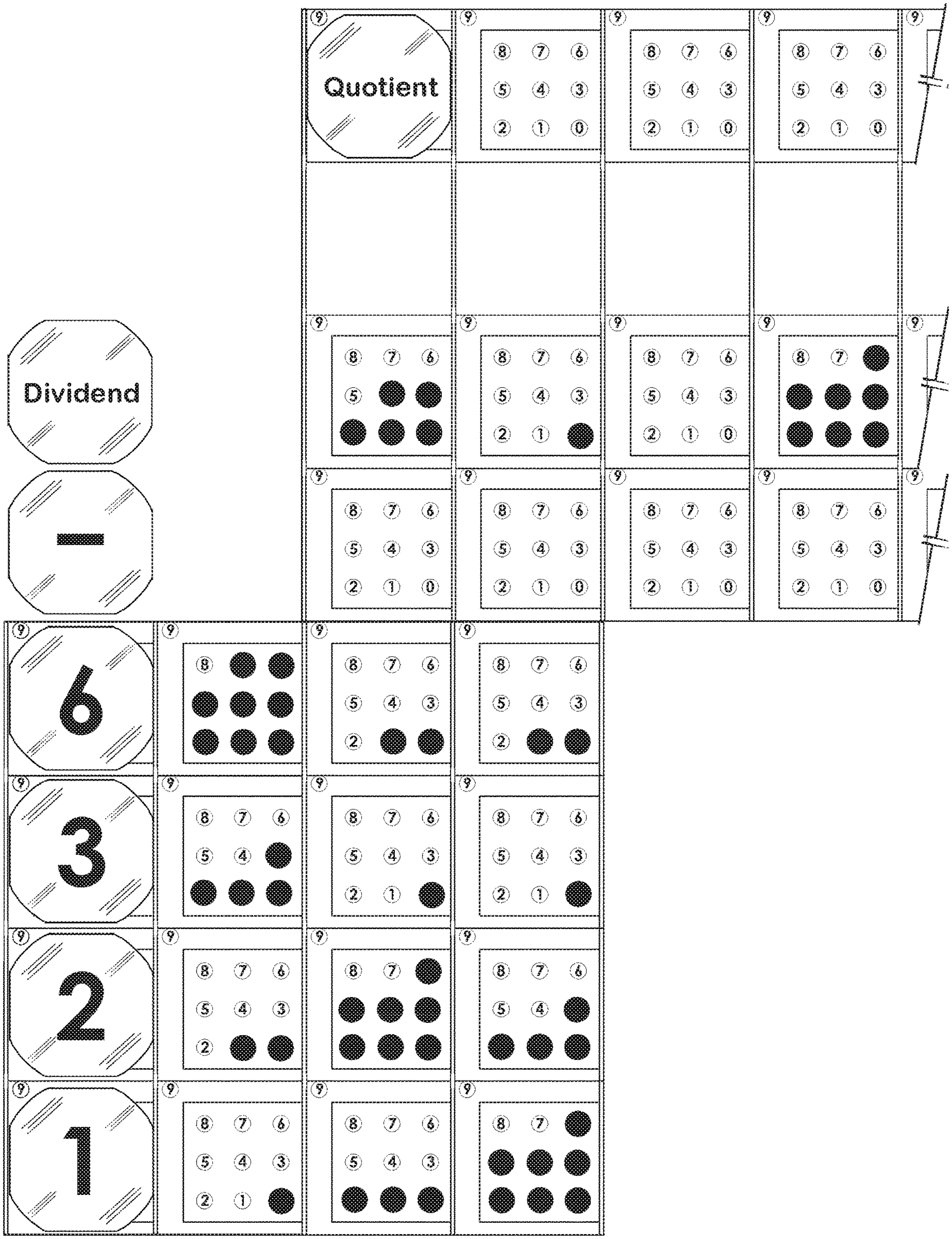
Figure 30C:
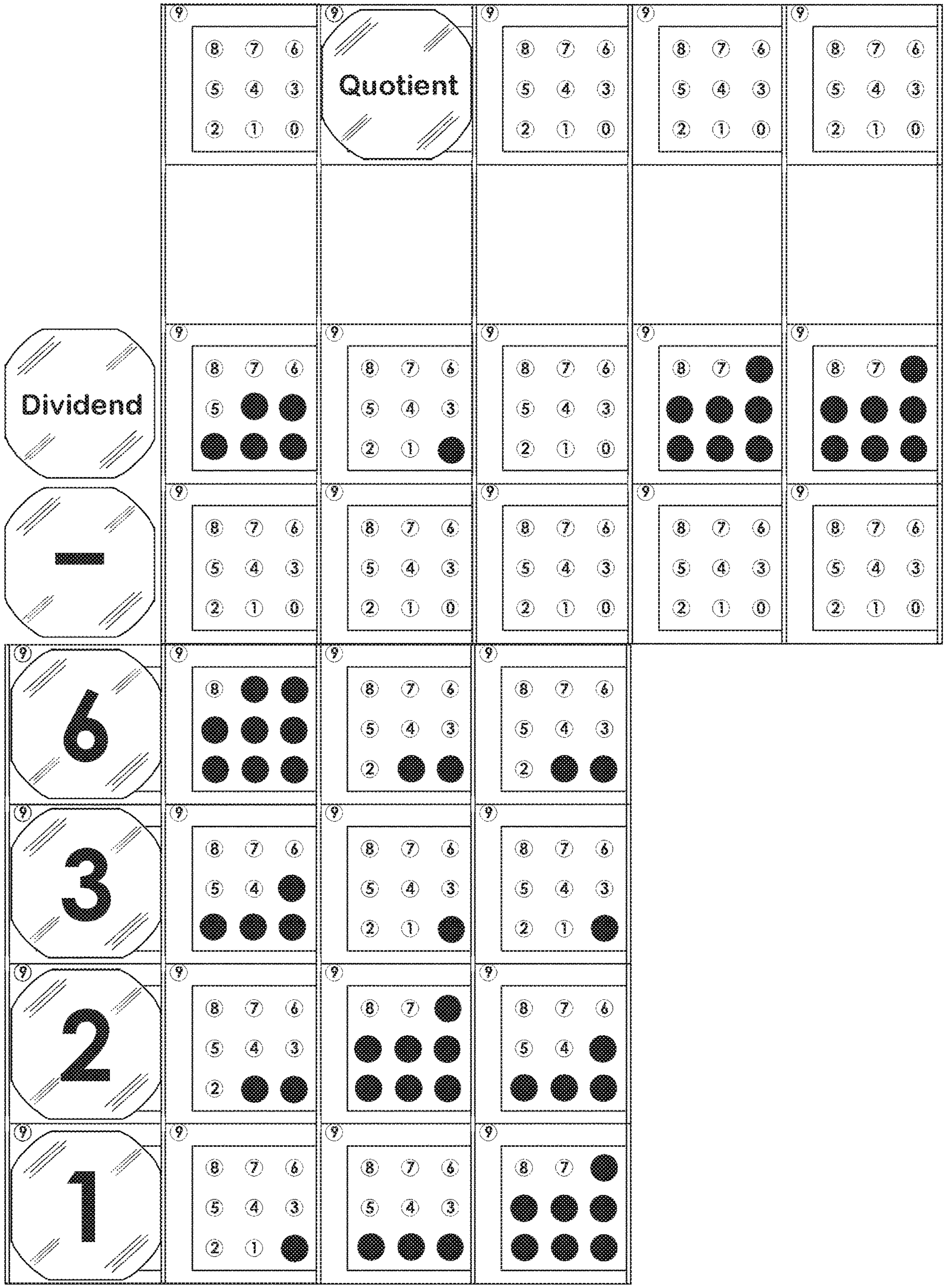
Figure 30D:
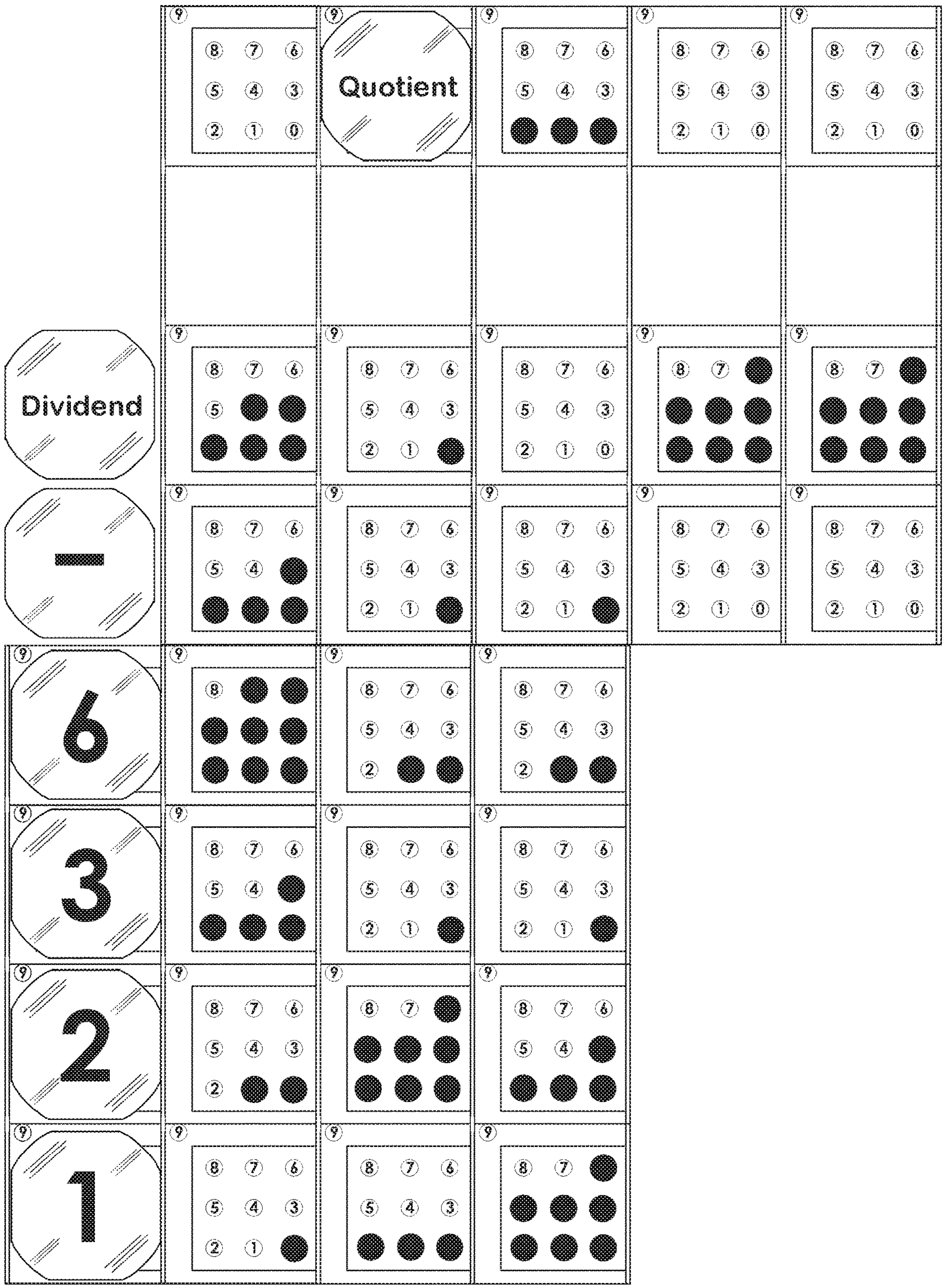
Figure 30E:
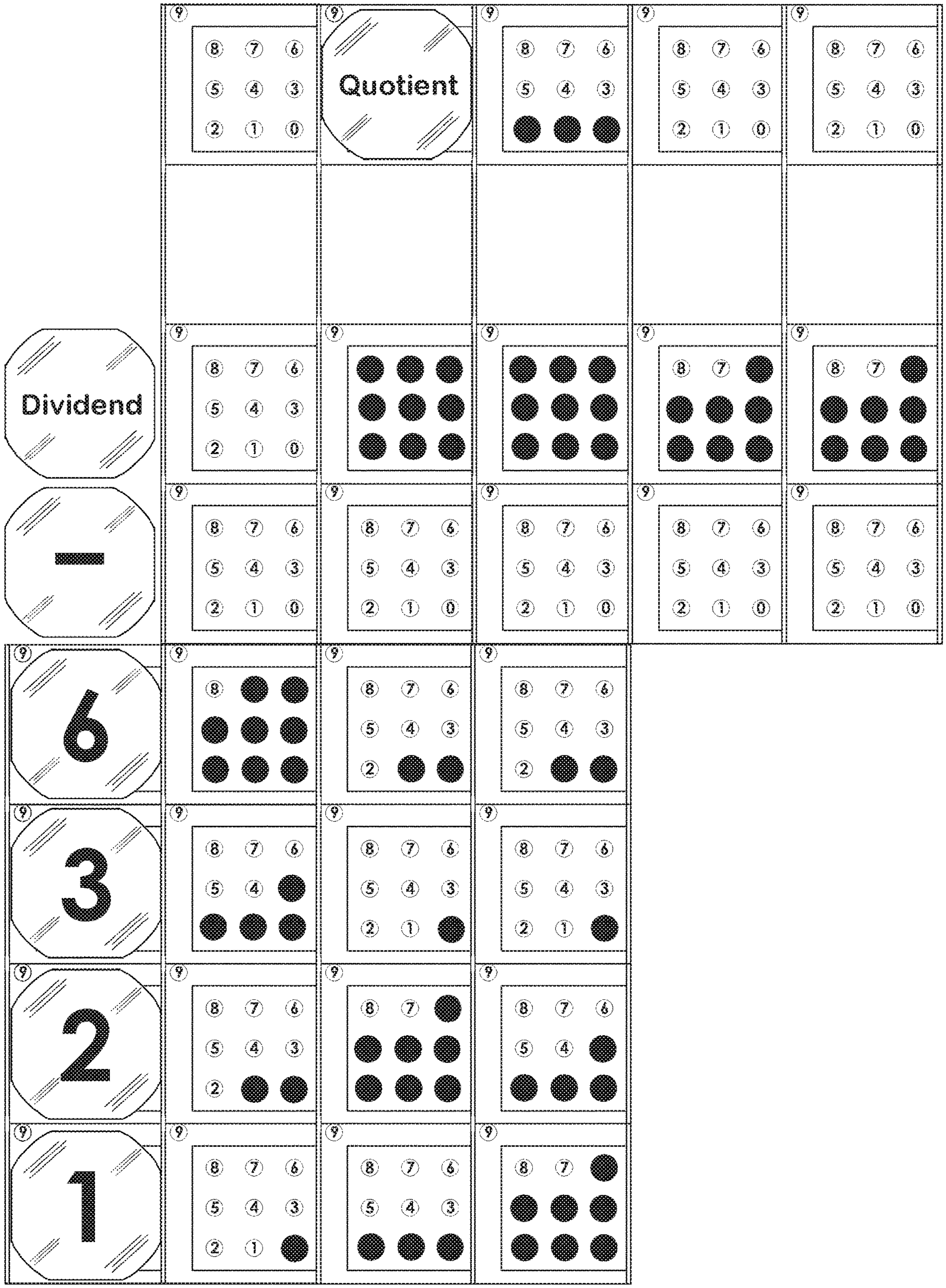
Figure 30F:
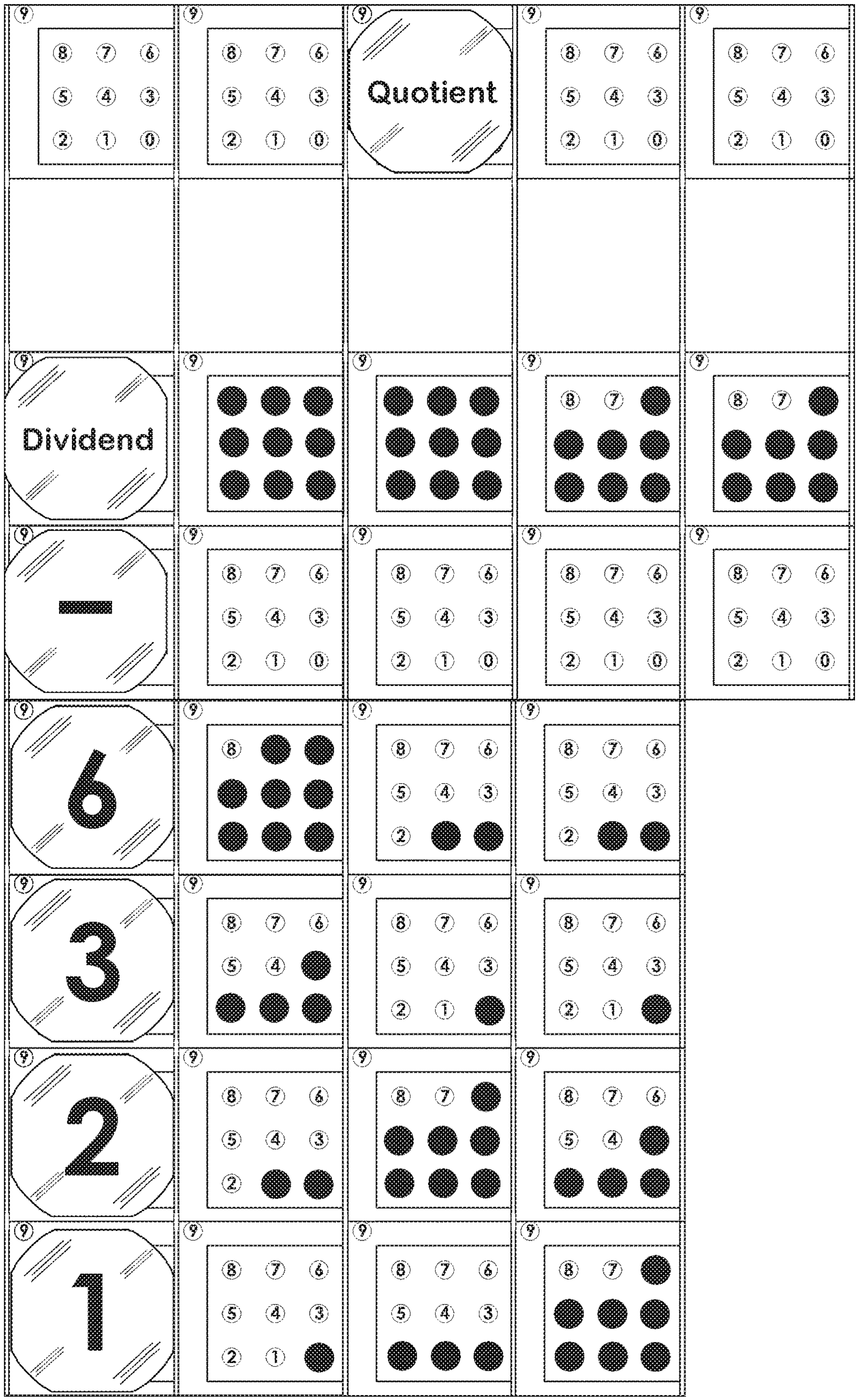
Figure 30G:
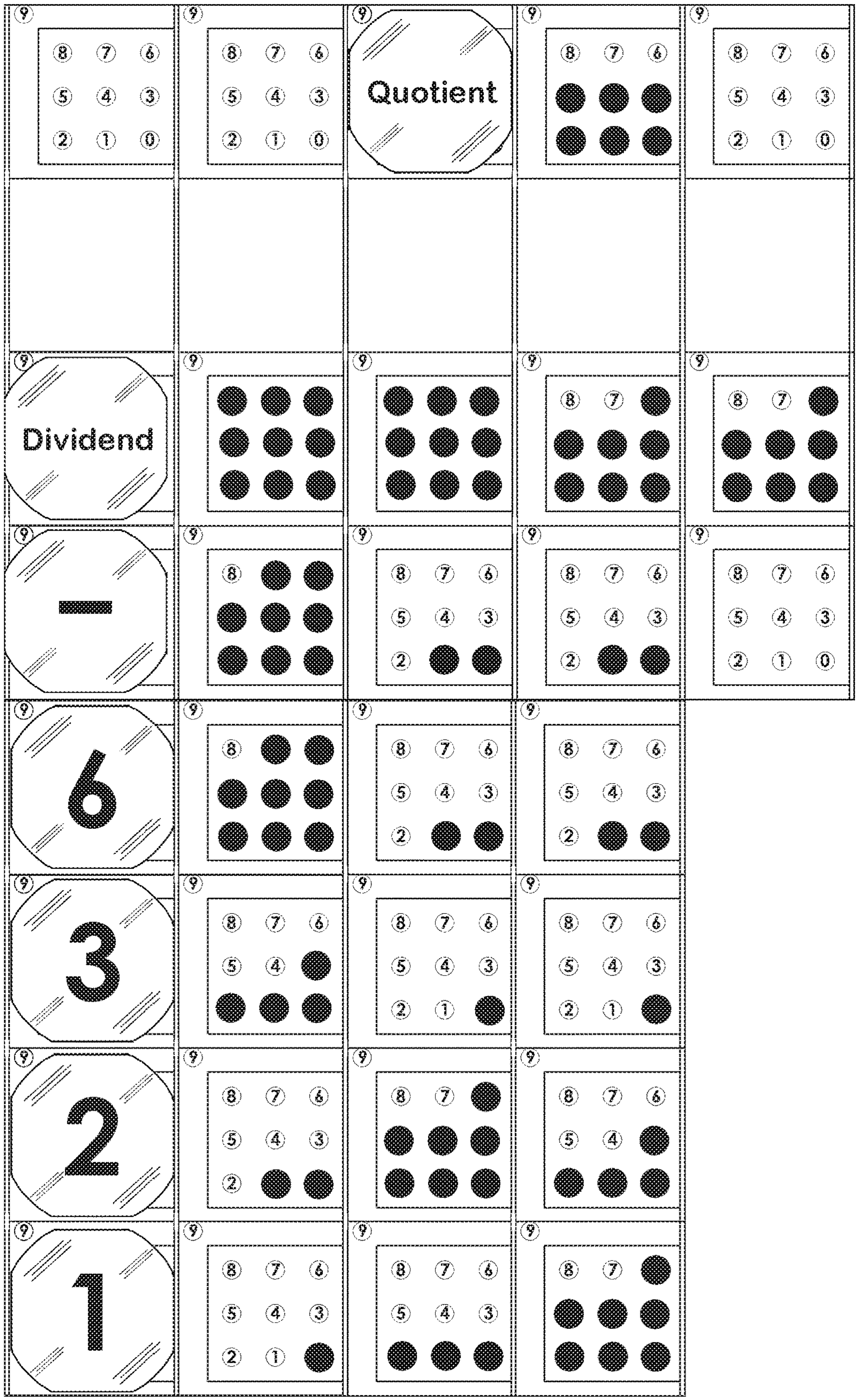
Figure 30H:
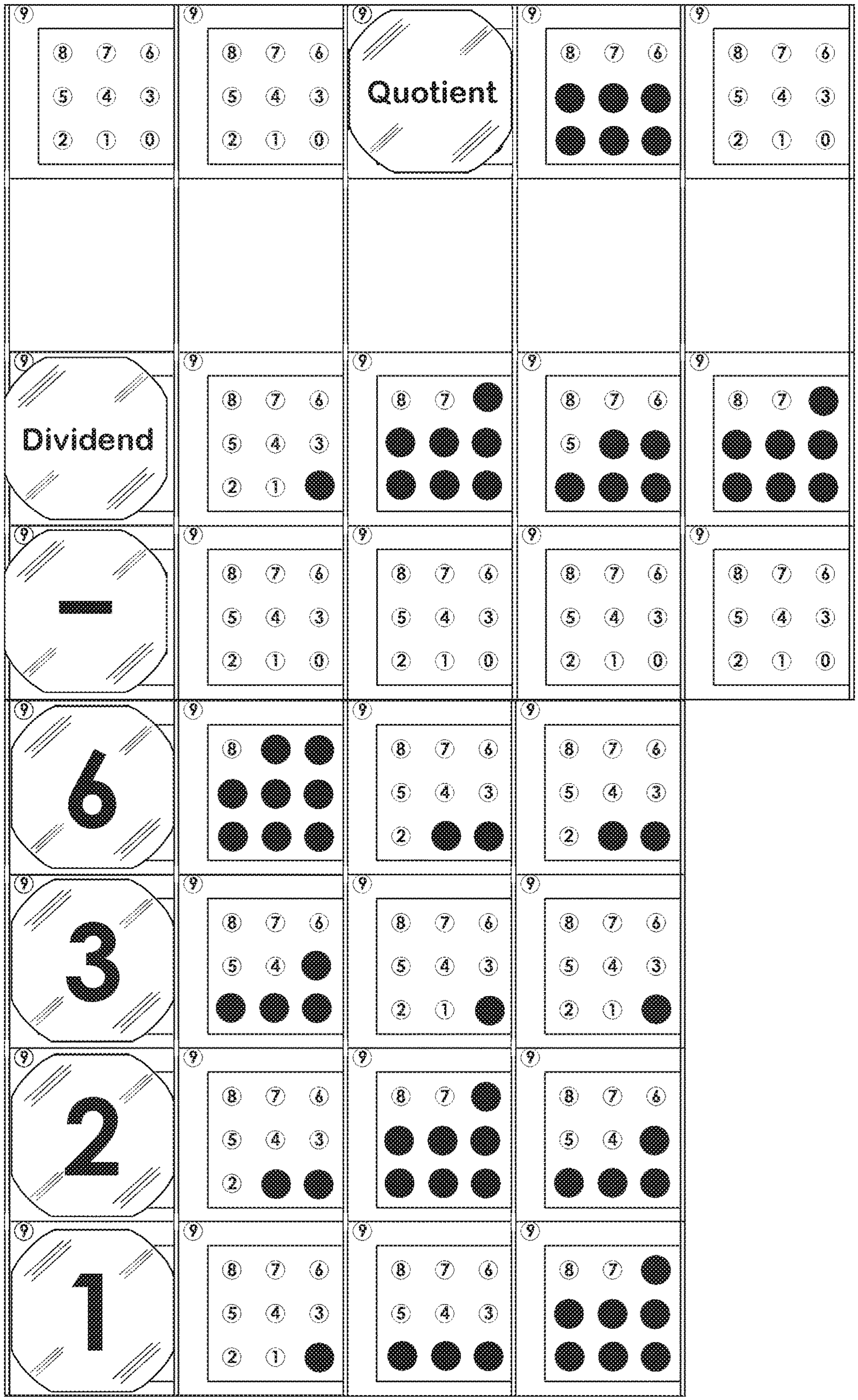
Figure 30I:
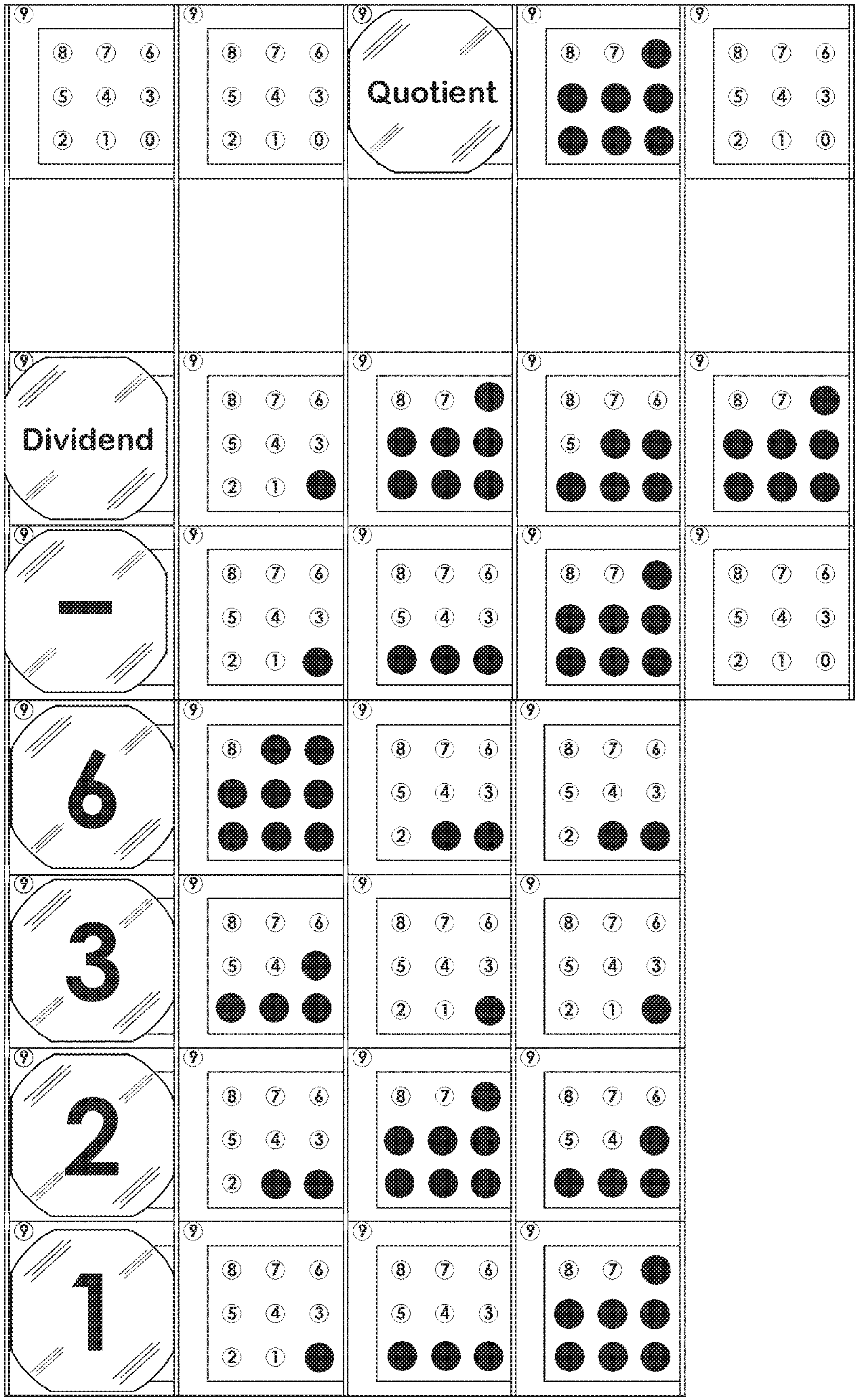
Figure 30J:
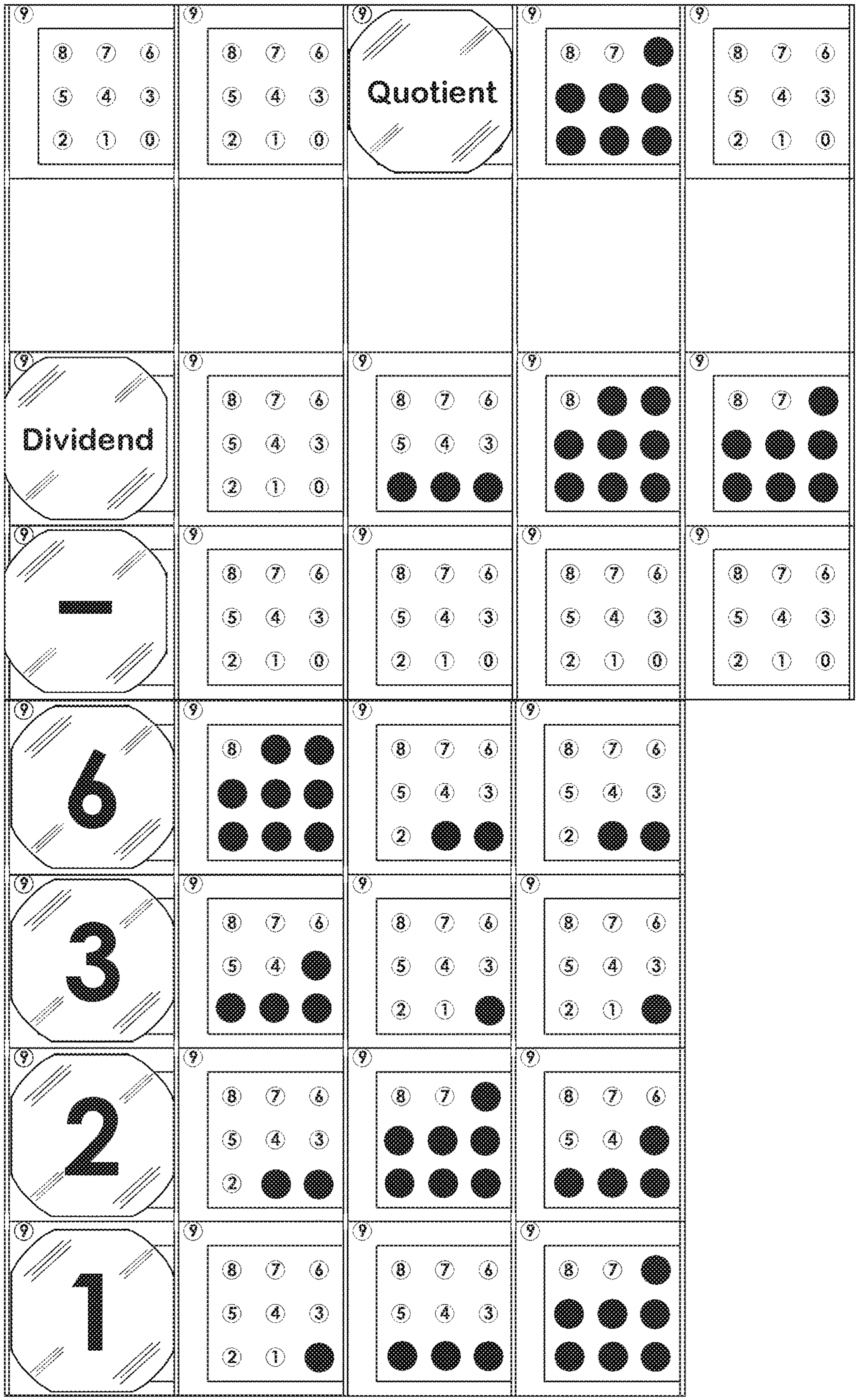
Figure 30K:
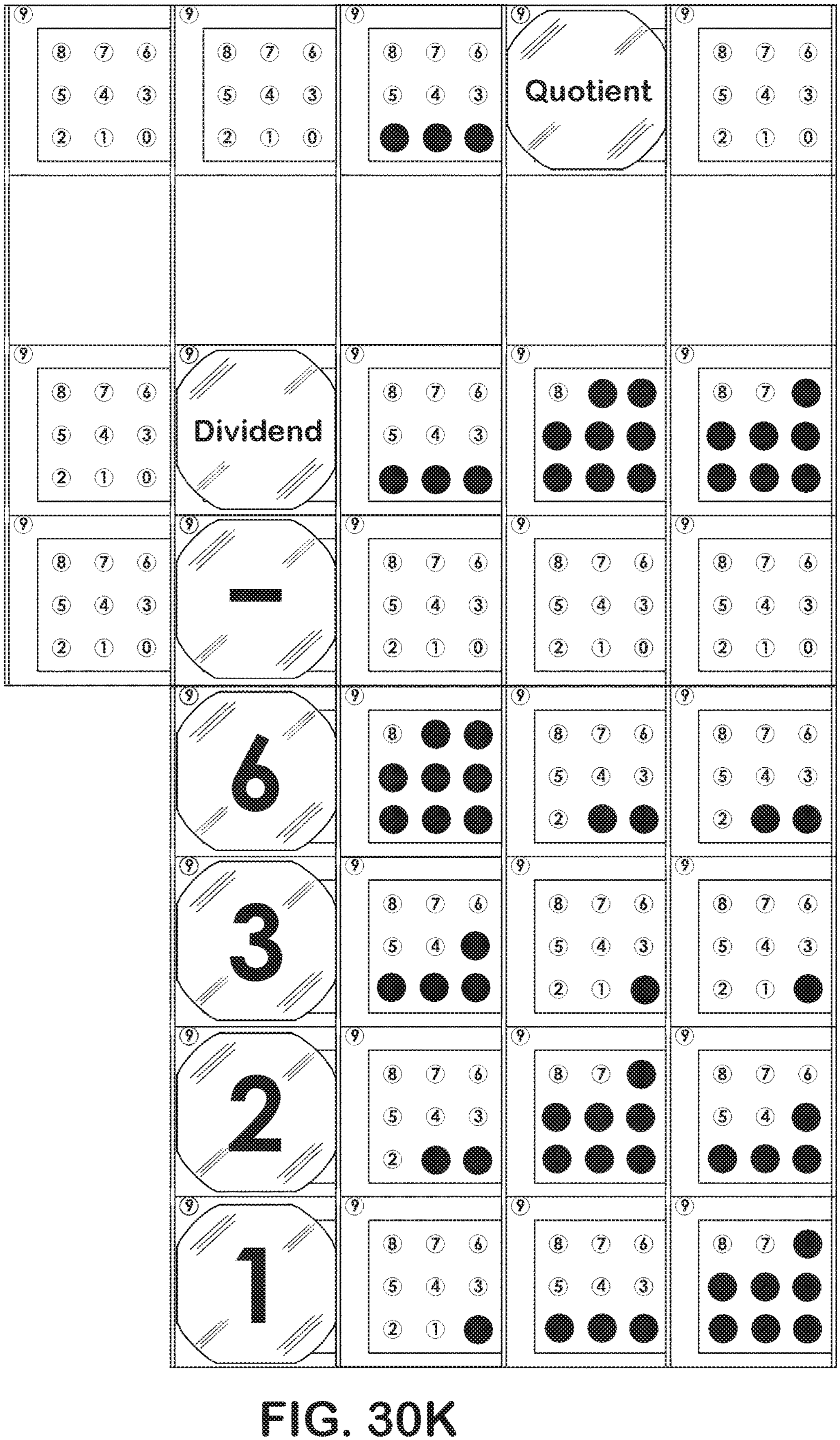
Figure 30L:
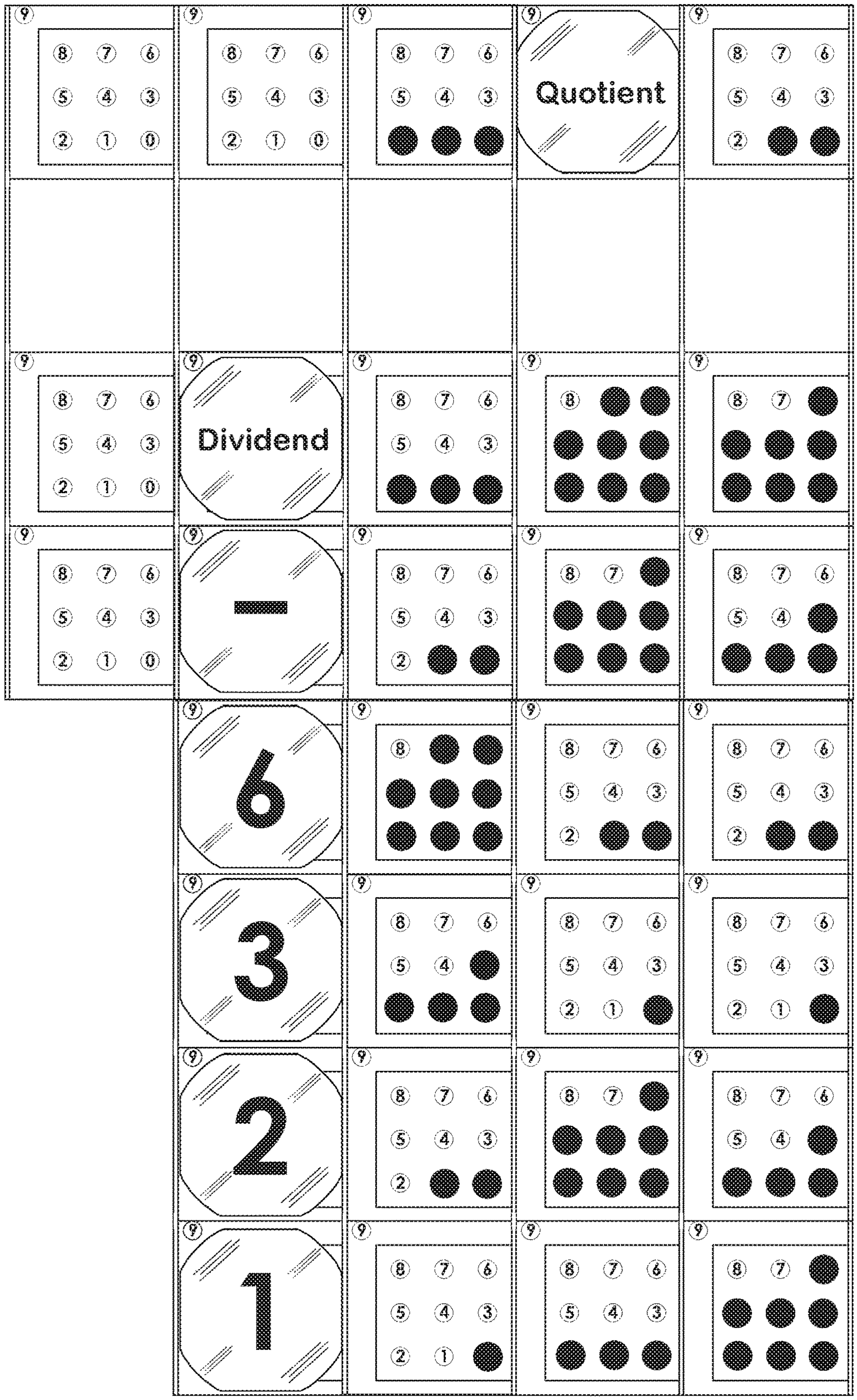
Figure 30M:
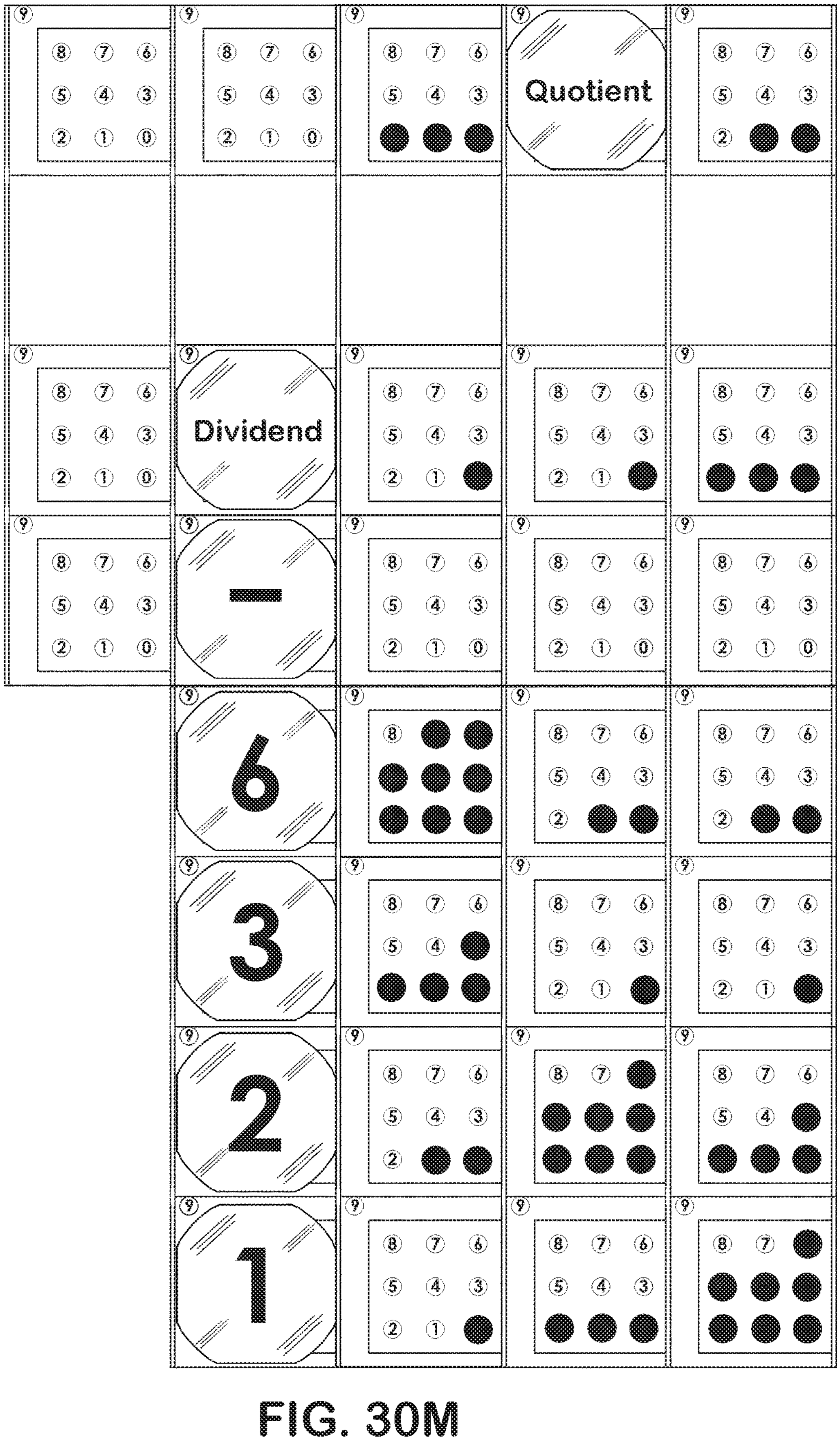
Figure 30N:
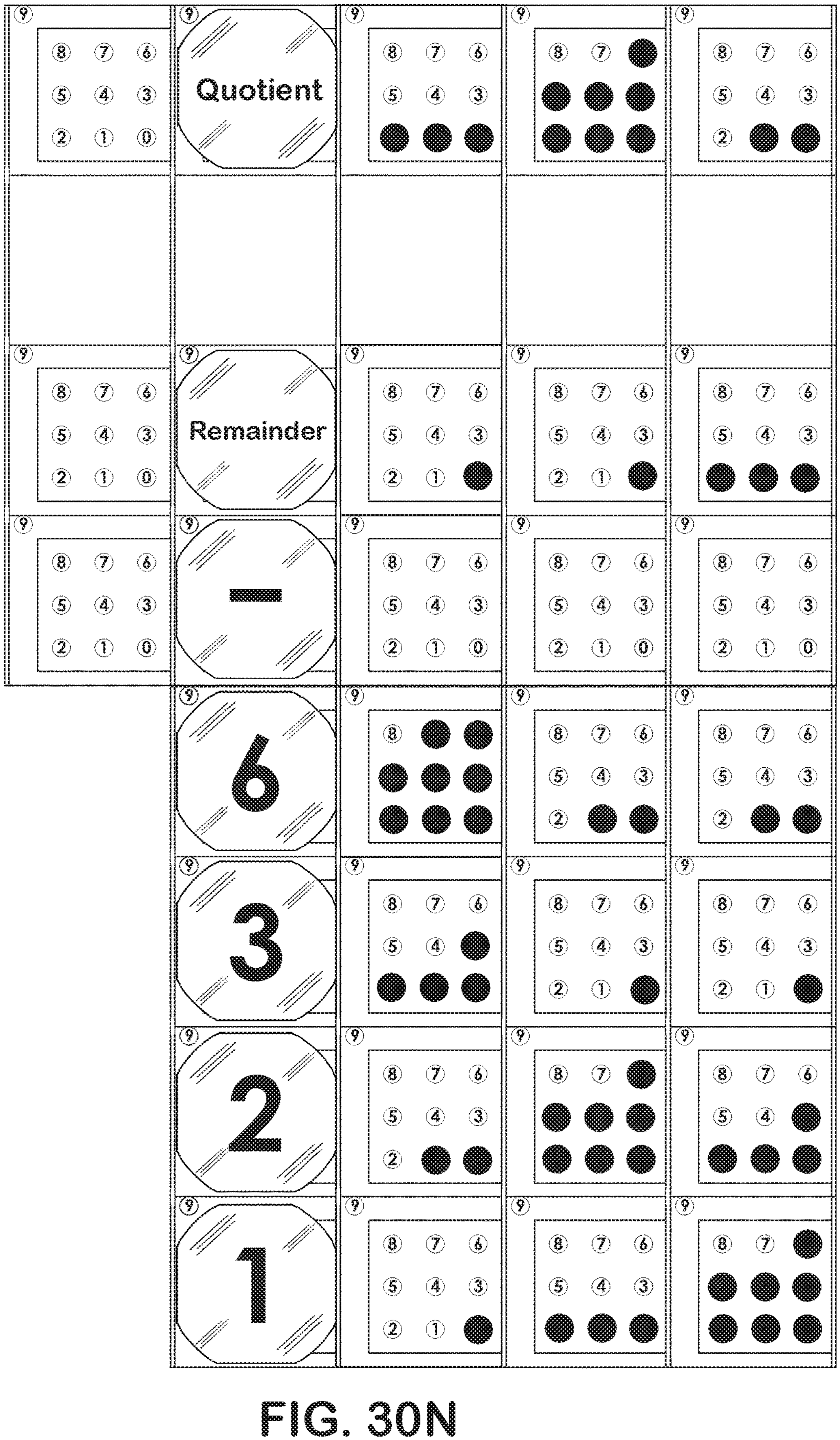

The solution for 51,077 divided by 137 is depicted in FIGS. 30A through 30N, and noting that because Divisor processing is 6M, 3M, 2M, 1M, the figures are cited out of order in the hardwired 6321 cascade version of the 632M process, as explained in Steps (B) through (E). At a maximum, only two subtractions are done per quotient digit, so the process outlined below can be optimized via a cascade decrement to zero.

The Game of 632M Division executes as follows.

Step (A): Zero out the Quotient in the row above the Tray. Setup the Dividend in the top row below the Tray, and zero out the bottom row. Setup the four 632M Divisor M-values on the 632M-Board, along with the S-values, depicted as chips. Align the rightmost rank of the 632M-Board with the rank of the uppermost digit in the Dividend on the Candy Board. This is the initial focus rank, so set the [Quotient] guide chip one rank left of the focus rank. Rank-align the [Dividend] and [−] guide chips with the 6, 3, 2, 1 S-value chips on the 632M-Board. FIG. 30A depicts the completed setup, excluding the use of the numerical precision option. If a numerical precision value is provided, setup the value on its own row of tiles, otherwise the division process ends when the Remainder is less than the Divisor, as is customary. Go to Step (F) to finalize setting up the alignment in preparation for Steps (B) through (E).

Step (B): 6S/6M Step. Visually inspect the Dividend Digit-Square sequence with the 6M value on the 632M-Board. If the Dividend Digit-Square bead pattern is greater than or equal to the 6M bead pattern then slide 6 beads into the Quotient Digit-Square to the right of the [Quotient] guide chip and duplicate the 6M bead pattern on the bottom row, as depicted in FIG. 30G, Next, subtract the bottom row from the Dividend, as depicted in FIG. 30H, leaving the bottom row zeroed out. If non-zero, repair the underflow error as follows. Remove 6 beads from the Quotient. Duplicate the 6M bead pattern into the Dividend and continue subtracting beads until the bottom row is zeroed out.

Step (C): 3S/3M Step. Visually inspect the Dividend Digit-Square sequence with the 3M value on the 632M-Board. If the Dividend Digit-Square bead pattern is greater than or equal to the 3M bead pattern then slide 3 beads into the Quotient Digit-Square to the right of the [Quotient] guide chip and duplicate the 3M bead pattern on the bottom row, as depicted in FIG. 30D. Next, subtract the bottom row from the Dividend row, as depicted in FIG. 30E, leaving the bottom row zeroed out. If non-zero, repair the underflow error as follows. Remove 3 beads from the Quotient. Duplicate the 3M bead pattern into the Dividend and continue subtracting beads until the bottom row is zeroed out.

Step (D): 2S/2M Step. Visually inspect the Dividend Digit-Square sequence with the 2M value on the 632M-Board. If the Dividend Digit-Square bead pattern is greater than or equal to the 2M bead pattern then slide 2 beads into the Quotient Digit-Square to the right of the [Quotient] guide chip and duplicate the 2M bead pattern on the bottom row, as depicted in FIG. 30L. Next, subtract the bottom row from the Dividend row, as depicted in FIG. 30M, leaving the bottom row zeroed out. If non-zero, repair the underflow error as follows. Remove 2 beads from the Quotient. Duplicate the 2M bead pattern into the Dividend and continue subtracting beads until the bottom row is zeroed out.

Step (E): 1S/1M Step. Visually inspect the Dividend. Digit-Square sequence with the 1M value on the 632M-Board. If the Dividend Digit-Square bead pattern is greater than or equal to the 1M bead pattern then slide 1 bead into the Quotient Digit-Square to the right of the [Quotient] guide chip and duplicate the 1M bead pattern on the bottom row, as depicted in FIG. 30I. Next, subtract the bottom row from the Dividend row, as depicted in FIG. 30J, leaving the bottom row zeroed out. If non-zero, repair the underflow error as follows. Remove 1 bead from the Quotient. Duplicate the 1M bead pattern into the Dividend and continue subtracting beads until the bottom row is zeroed out.

Step (F): Alignment. Assuming the above 632M compare and subtract steps (B) through (E) have been done, rather than Step (A), at this point the Dividend value should be less than 1M. If it is not, what has happened is a comparison was botched. For example, 2M was possible but not done. In this event, alignment, as below, will immediately bounce the process back to Step (B), the hardwired 632M compare and subtract cascade, namely Steps (B) through (E). Expect the TEN pattern to occur as the Quotient Digit-Square is filled with more beads, and hence, a Packaging operation on the Quotient row is triggered. Otherwise, an "Alignment While-loop" executes as follows. While Dividend Digit-Square bead pattern is less than the 1M bead pattern on the 632M-Board, shift the focus rank, all guide chips, and the 632M-Board one rank to the right. If right edge of the Candy Board is left of the right edge of the 632M-Board, then division is complete, so reset the guide chips, as depicted in FIG. 30N, and stop. Once the "Alignment While" loop completes, go to Step (G). The initial setup alignment is depicted in FIG. 30A, next FIG. 30B and ready for Step (B) as depicted in FIG. 30C. FIG. 30F and FIG. 30K depict the alignment process after the Steps (B) through (E) compare and subtract pipeline has executed.

Step (G): Precision step. If a numerical precision is specified and the partial dividend is greater than or equal to that required precision, then go to Step (B). Otherwise, division is complete.

Once the game is complete, as depicted in FIG. 30N, the value in the top row is the Remainder, and the value in the Quotient row is the Quotient. This process handily slays any size problem in any radix system using a radix appropriate SM-Board.

Once the child understands division, the parent should show how the remainder in whole numbers can be further processed into its decimal fraction form. This is accomplished by re-initializing the division process as follows. Move the remainder value all the way up to the leftmost rank of the top row and restart the division process. Being sure to account for zero formation right of the decimal point, i.e. for small remainders like 2/2385. The new Quotient contains the decimal fraction right of the decimal point. For example, based on the problem depicted in FIG. 30A, this produces 824817 with another remainder that can likewise be decimalized.

Storylines performed on the Candy Board make arithmetic a living art, not merely a rote do-the-process discipline. For example, stories can insert modifications on-the-fly. Consider the church Christmas pantry division story of Lesson #11. Suddenly, Mrs. Michaels calls out "Stop the division. I have found eight bags of candy in the Deacon's Office. They need to be added to the inventory." The division process is currently at the Bag-Rank, so the extra "800" can be added-in, and division resumes without a hitch. No student ever encounters such dynamic, brain-training storyline intrusions in a formal mathematics class tackling static exercises in division.

Lesson #15, Game of Magic Twins

The Candy Board can solve problems using iterative improvement. Mastering division, the child has already used iterative improvement because the Remainder termination condition stops the iterative process to whatever level of decimation is desired.

The Game of Magic Twins introduces children to the overt process of iterative improvement for solving square root mysteries. and requires children to understand decimal fractions because solving the Magic Twin problem will throw numbers off to the right of the decimal point. Each iterative step yields a Magic-Twin correction value which gets smaller and smaller until a termination precision is reached.

Consider the storyline. For Uncle Fred's Birthday dinner, Mommy wants to put two ribbons from one corner of the dining room table to the opposite corner to create an X pattern. The table is 8 feet by 4 feet. Mr. Timpkins sells ribbon on a standard roll in 10-foot lengths for $32.50, but he also sells cut-to-length ribbon at $3.50 per foot. What is the length of ribbon Mommy needs to do the job? Can Mommy save money if she can avoid buying two 10-foot rolls of ribbon? If so, how much money? Katie's job is to help Mommy save money so she can spend the savings on candy instead.

In the storyline, Mr. Pythagoras tells Katie that the length of ribbon needed is a Magic Twin and she needs to multiply 8 by 8 and add this value to another multiple 4 times 4 to generate the target value, namely 80, so the Game of Magic Twins can begin.

The Game of Magic Twins uses a three-row Candy Board with the number of ranks two greater than the required precision. For example, if there are six Digit-Square ranks, and the square root of 26 is required, the initial guess will be "050000" and the process continues until "052915" is produced in the top row, namely the square root is estimated as 5.2915.

The top row holds the Multiplier. The Multiplicand and Multiplier are always equal because they are Magic Twins. The middle and bottom rows hold a variety of intermediate values.

All square roots can be mapped into the range 2-100 because all numbers equal or exceeding 100 are a factor of ten of some number in the range 2-100. The child should be shown 0 and 1 are the Magic Twin of themselves, and consequently, all target values in the range 0 to 2 should be scaled up by factors of ten until they exceed 2. Thereafter, the Magic Twins process solves all target values in the range 2 through 100.

The process uses divide by 2, doubling and shifting to calculate correction values. Worst case, it produces four significant decimal places within four iterations. A rule of thumb is used to establish the initial guess of the square root value. For generating the correction factor another rule of thumb applies. When the target value is less than 10, a correction divisor 5 is used. For 10 through 50, a correction divisor of 10 is used. And, if above 50, a correction divisor of 20 is used.

FIGS. 31A through 31L depict the processing sequence for the sample problem of estimating the square root of 80. The 632M-Board uses numeric chips, rather than beads. Multiplication can proceed left to right because addition commutes.

The Game of Magic Twins Executes as Follows.

Step (A): Setup initial guess. A rule of thumb establishes an initial estimate of the square root. If target value is less than 5 then 2. If less than 10 then 3. If less than 20 then 4. If less than 30 then 5. If less than 40 then 6. If less than 60 then 7. If less than 80 then 8. Otherwise, 9. Setup the initial estimate in the top row, one rank right of the leftmost Digit-Square, as depicted in FIG. 31A.

Figure 31F:
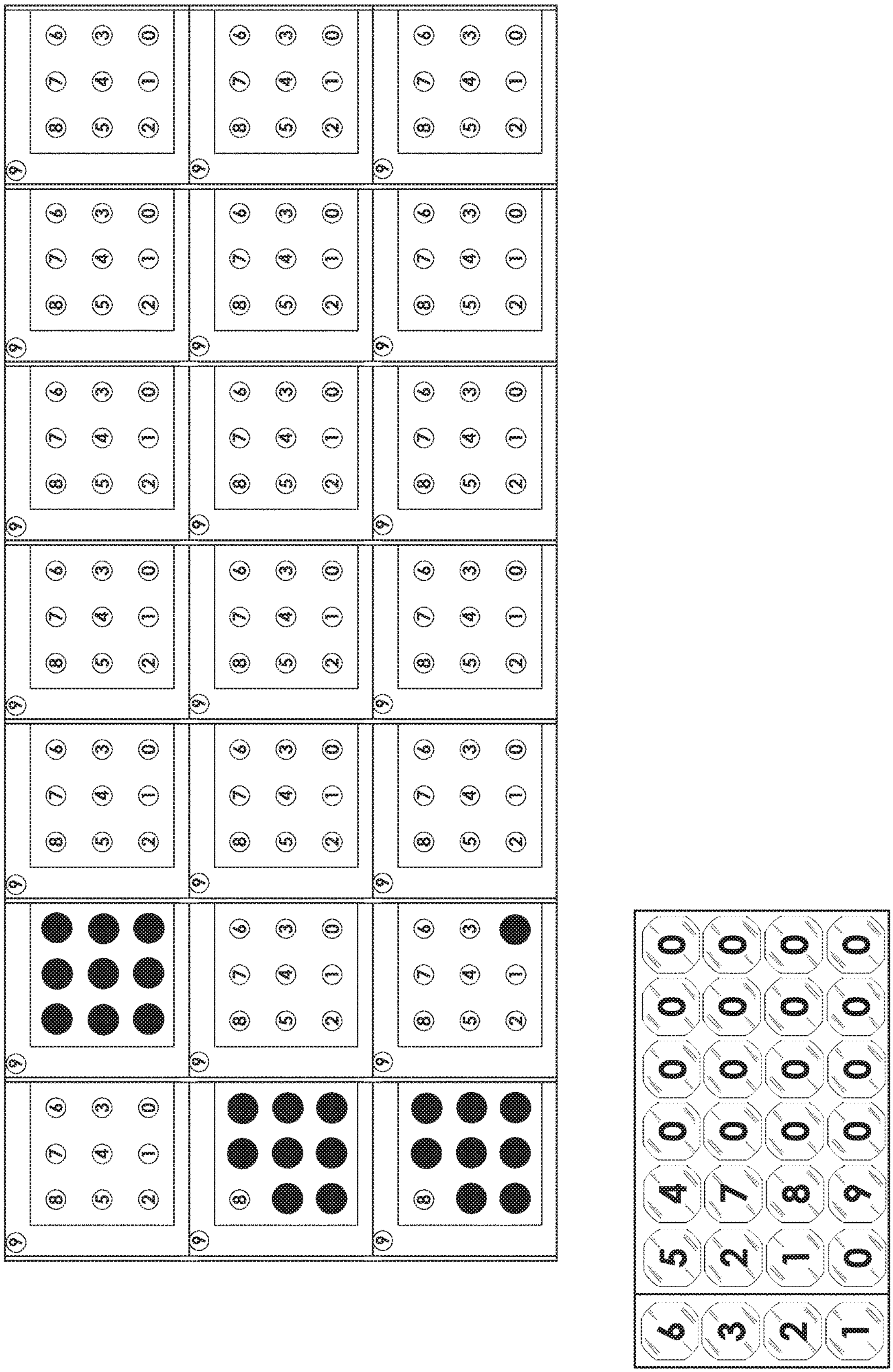

Step (B): Setup the 632M-Board using the value in the top row, as depicted in FIGS. 31A and 31K. The middle and bottom rows are zeroed out.

Step (C): Multiply the top row with itself using the M-values on the 632M-Board forming the Product in the bottom row, as depicted in FIGS. 31B through 31E. Use left to right multiplication, with guide chips if need be, until the digits in the top row run to zero or an acceptable precision error is satisfied.

Step (D): Duplicate the 1M value from the 632M-Board in the top row. Duplicate the target value, namely 80 in this example, into the middle row so it aligns with the uppermost digit of the value in the bottom row, as depicted in FIG. 31F, Next, subtract the middle from the bottom row until one of the two rows zeroes out. If zero on both rows then the top row holds the exact square root, so stop. Otherwise, a residual value for iterative correction will appear in either the middle row, whenever the estimated square root is less than the exact square root, or in the bottom row, whenever the estimated square root is greater than the exact square root, as depicted in FIG. 31G.

Figure 31G:
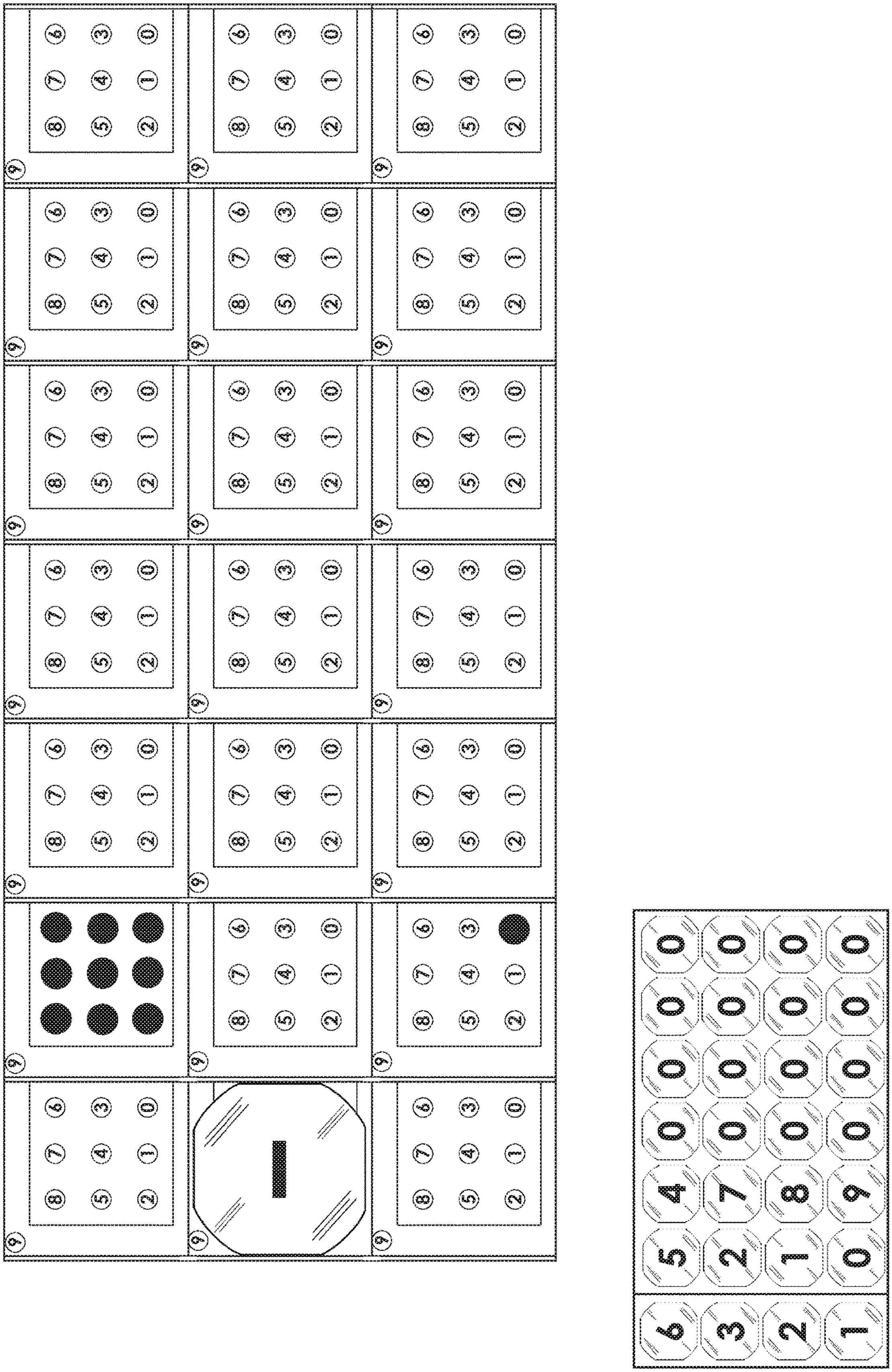

Step (E): if said residual value appears in the bottom row, place a [−] guide chip in the leftmost Digit-Square of the middle row, as depicted in FIG. 31G. Otherwise, place a [+] guide chip there, instead.

Figure 31H:
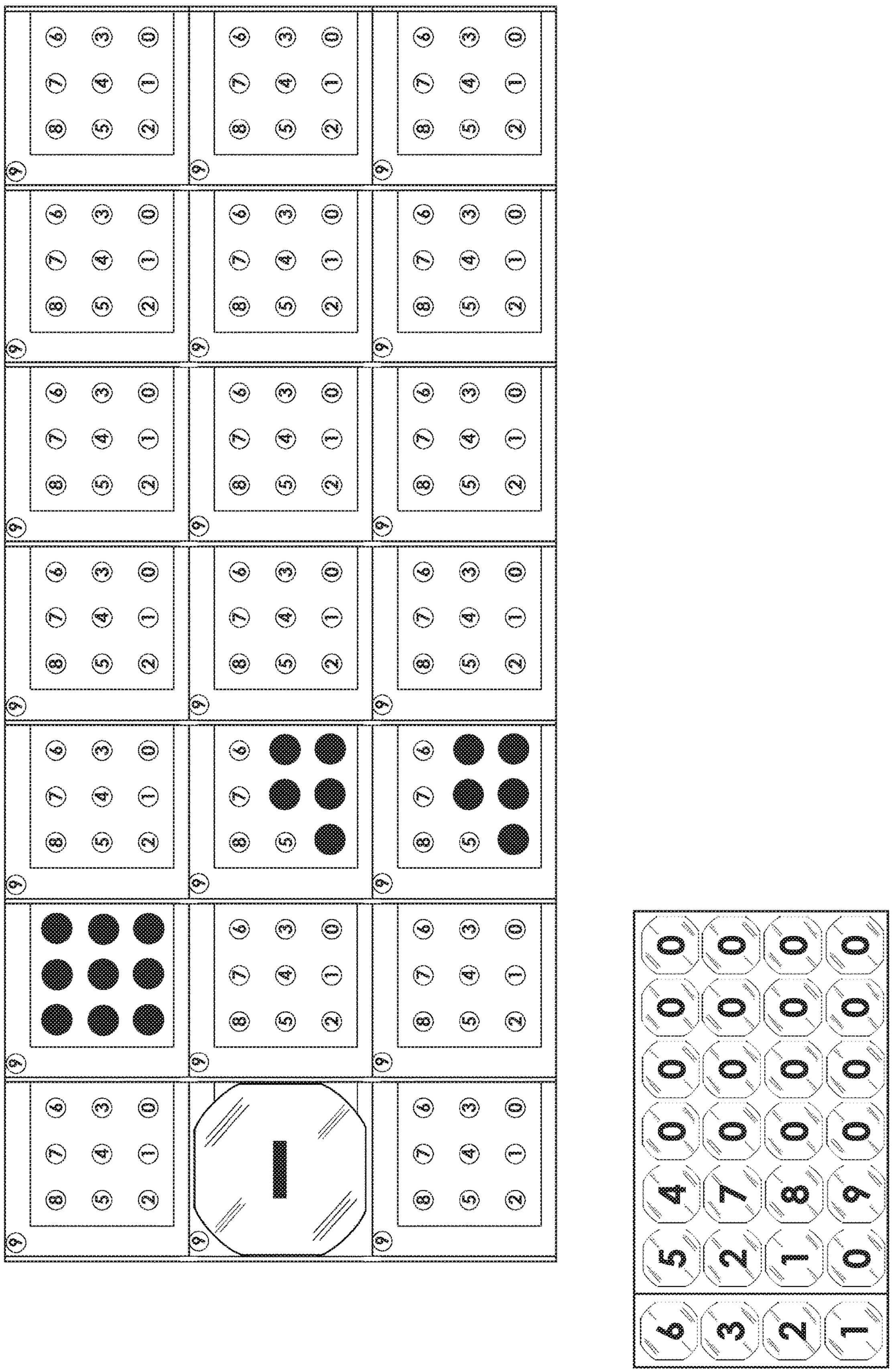
Figure 31I:
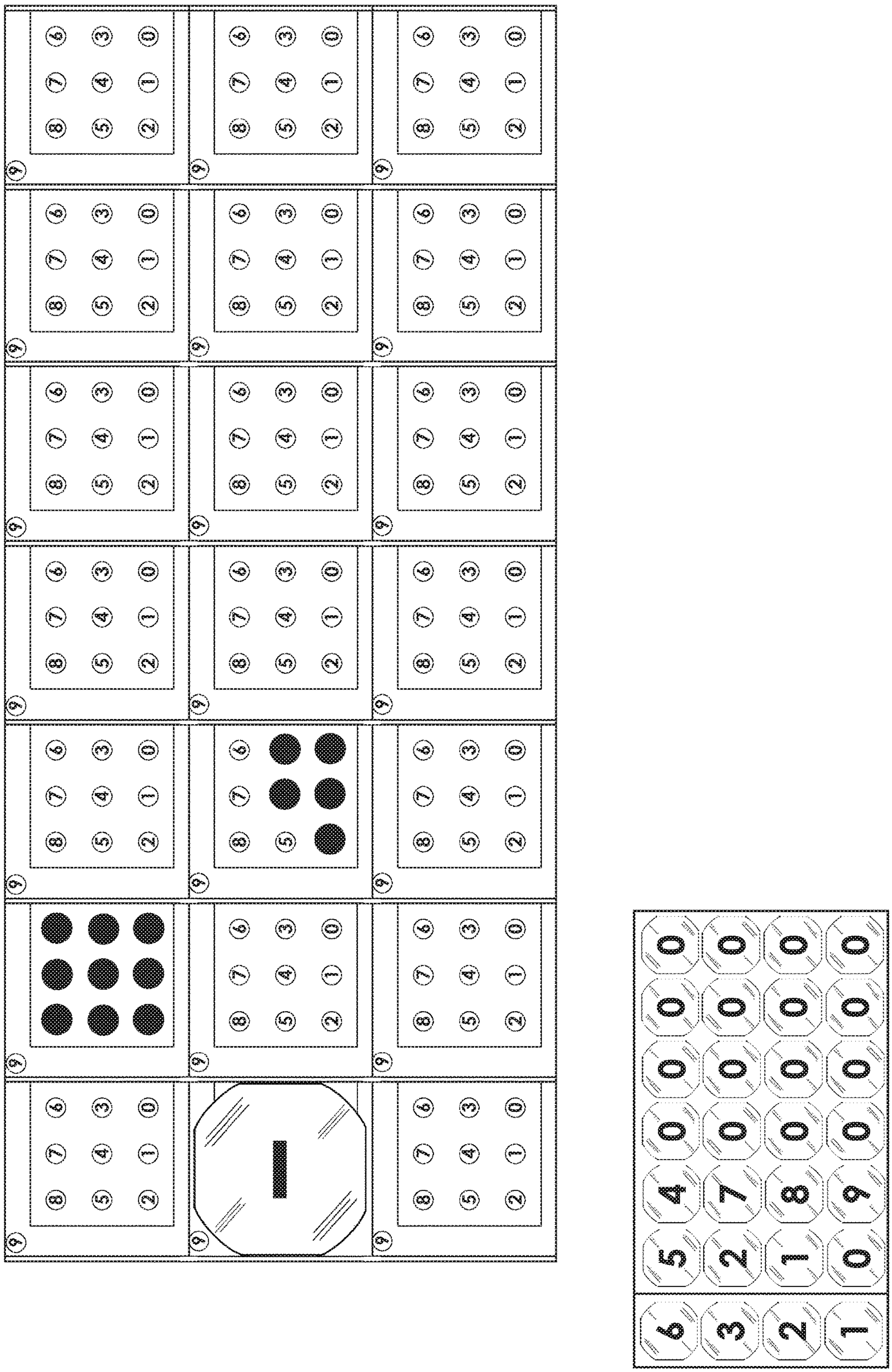

Step (F): If the target value is greater than 50, use the Game of Sharing division by two method, so that said residual value is split half in the middle row and half in the bottom row, as depicted in FIG. 31H. Discard all beads in the bottom row, as depicted in FIG. 31I. However, if the target number is less than 10, duplicate said residual value on both middle and bottom rows, and then add the bottom row to the top row, which yields double said residual value. Otherwise, said residual value remains unaltered, and if need be, move the value from the bottom row to the middle row for Step (G) processing.

Figure 31J:
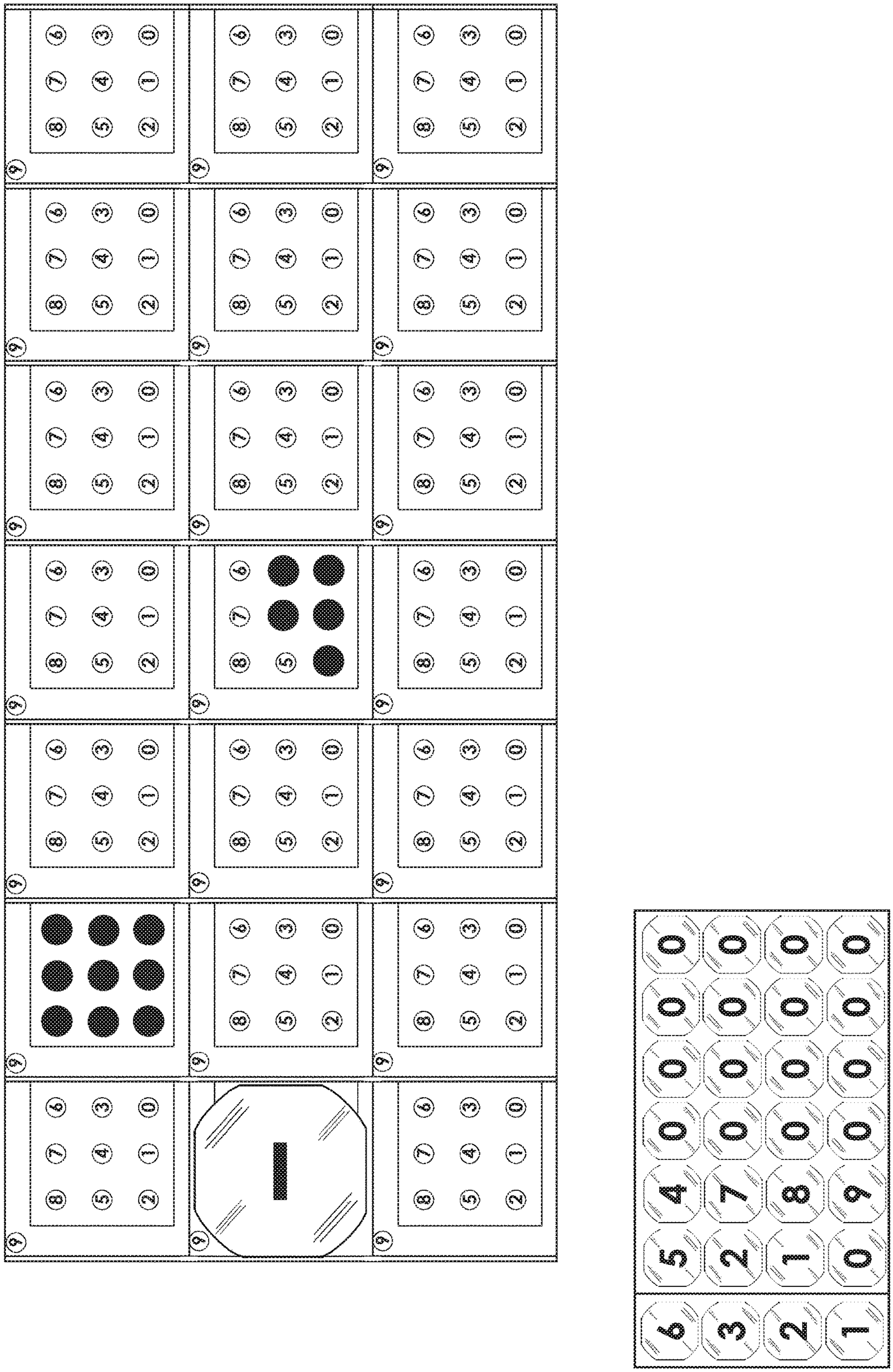
Figure 31K:
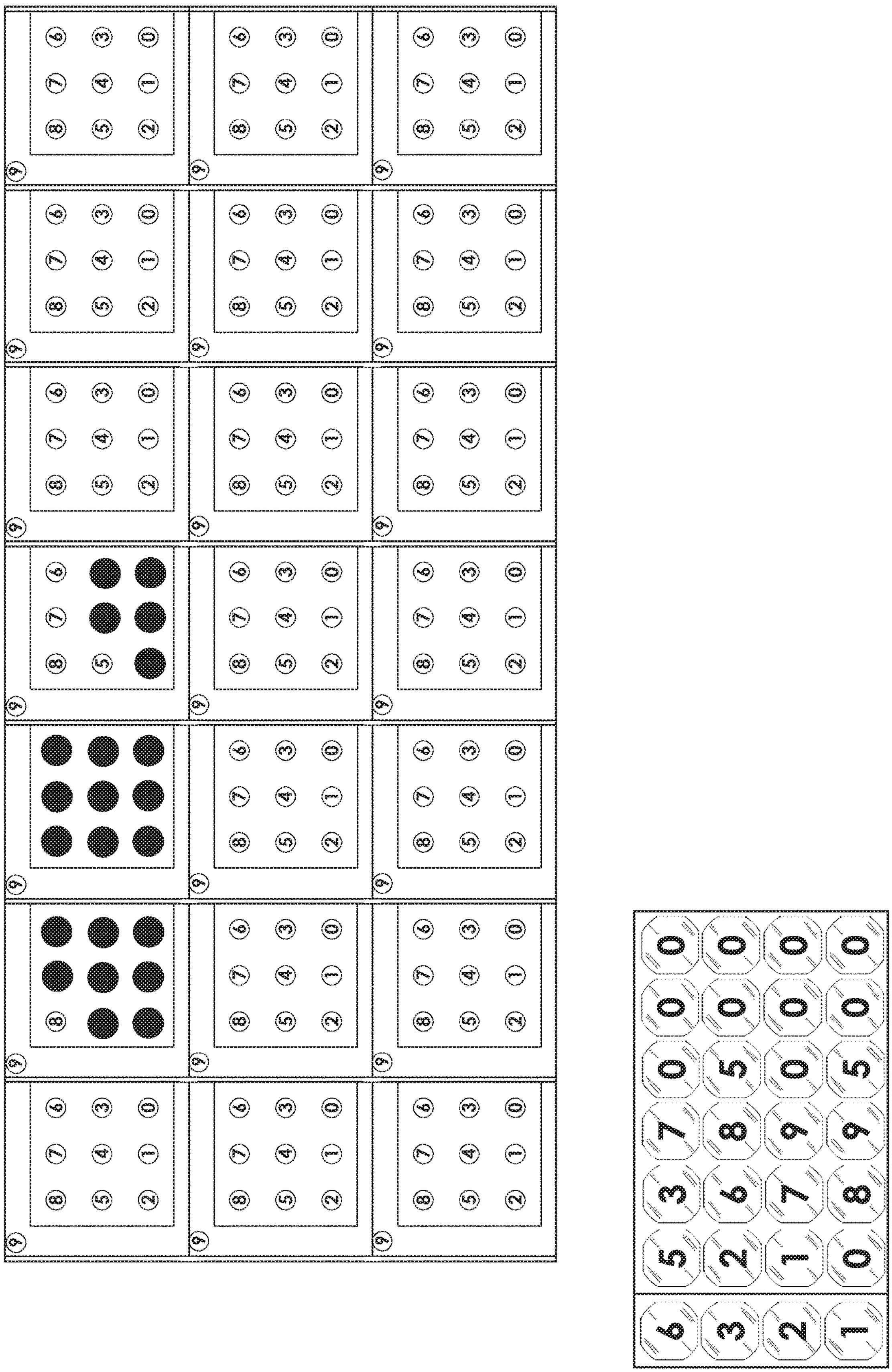

Step (G): The iteration correction value is generated by shifting all middle row of beads one rank to the right, namely divide by 10, as depicted in FIG. 31J. If said correction value is less than the precision required, then terminate after adding or subtracting this final correction to the top row. According to the [+] or [−] guide chip on the middle row, add or subtract the middle row from the top row. This yields a better estimate of the square root, as depicted in FIG. 31K. If the square root estimate needs improving go to Step (B) whereupon the 632M-Board is updated, as also depicted in FIG. 31K. Otherwise, terminate.

Figure 31L:
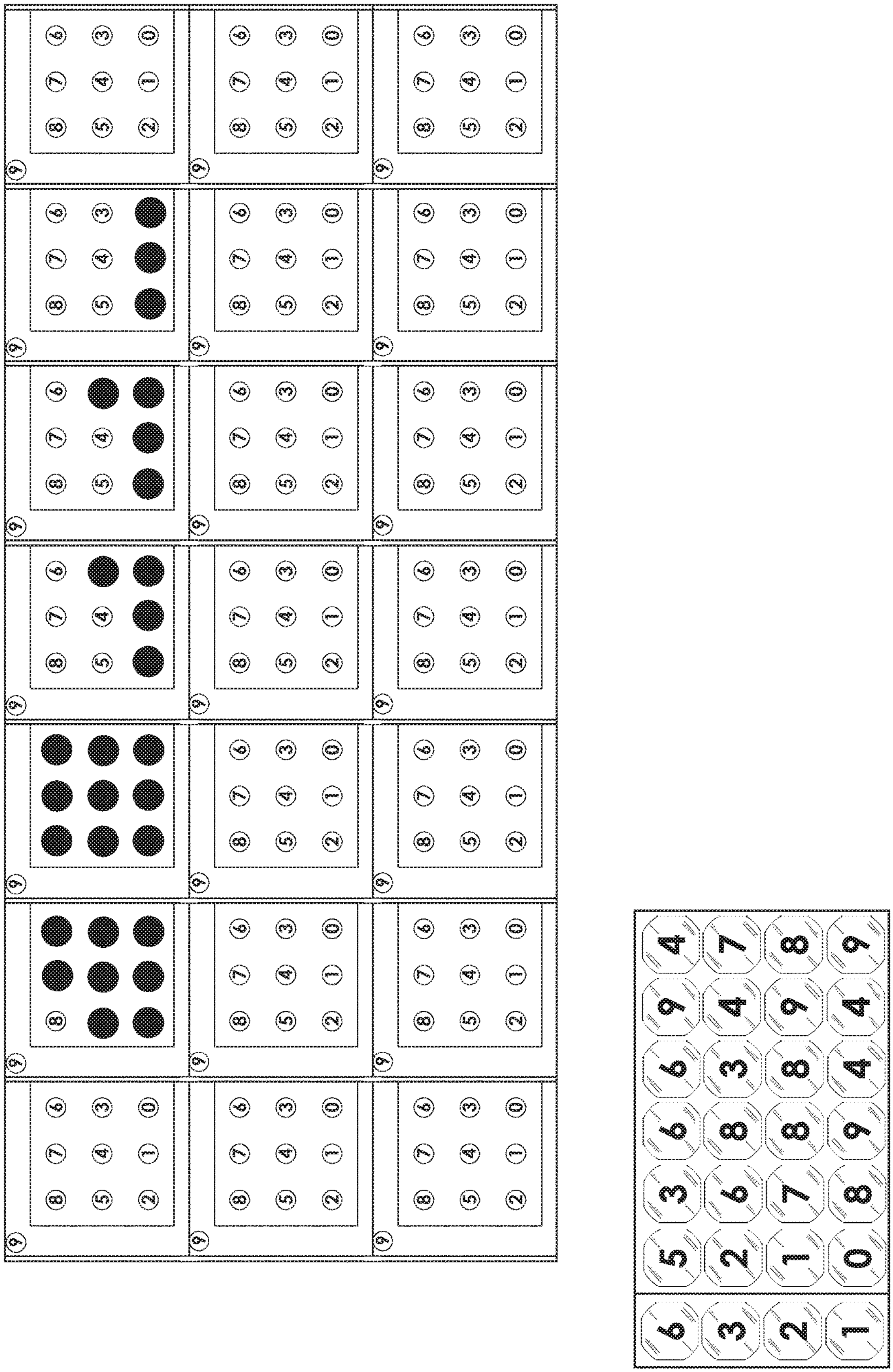
Figure 32A:
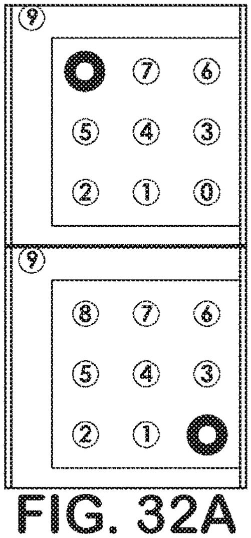
FIGS. 32A to 32J: Addition using two beads, worked example.
Figure 32B:
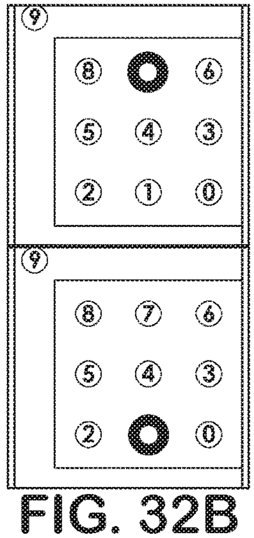
Figure 32C:
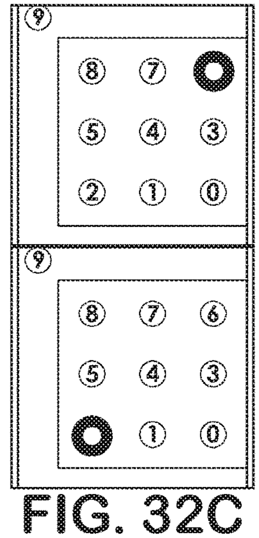
Figure 32D:
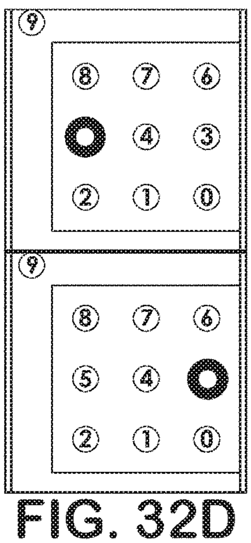
Figure 32E:
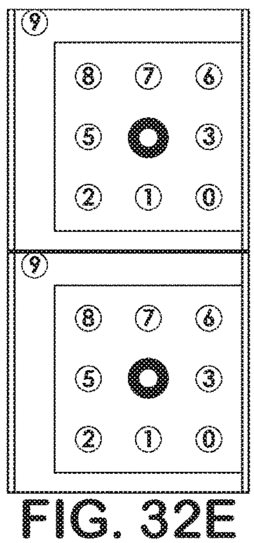
Figure 32F:
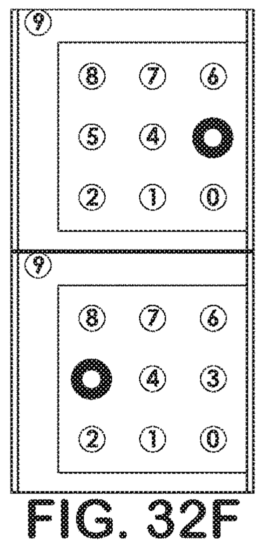
Figure 32G:
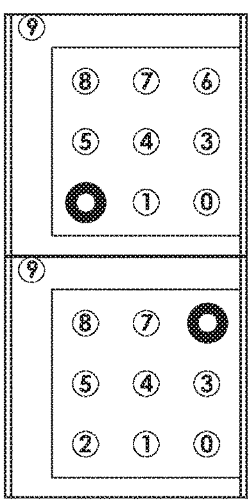
Figure 32H:
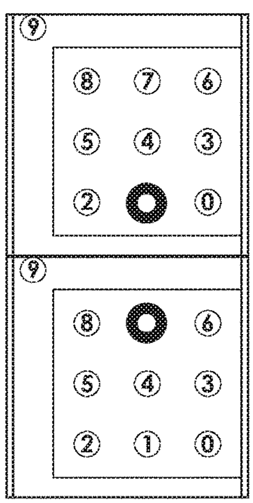
Figure 32I:
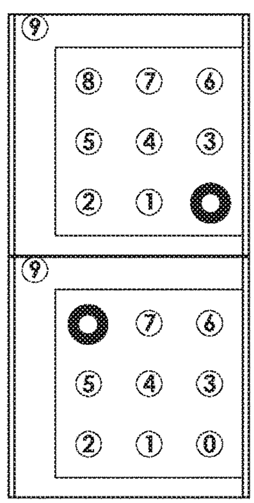
Figure 32J:
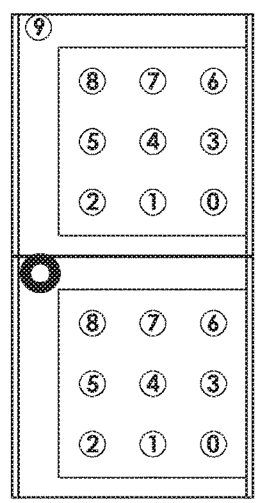
Figure 33A:
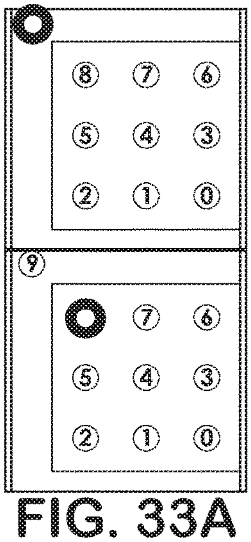
FIGS. 33A to 33J: Subtraction using two beads, worked example.
Figure 33B:
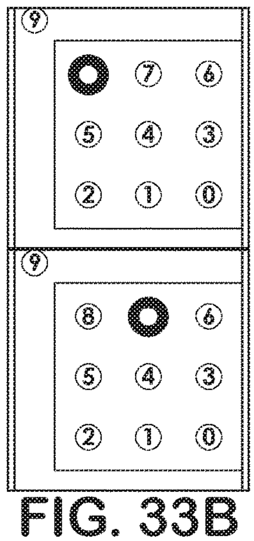
Figure 33C:
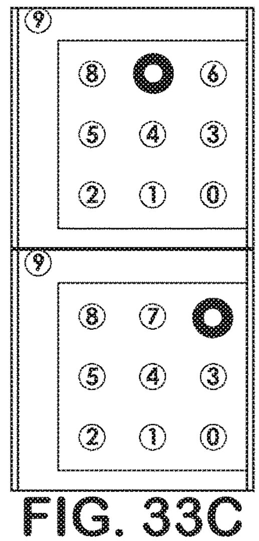
Figure 33D:
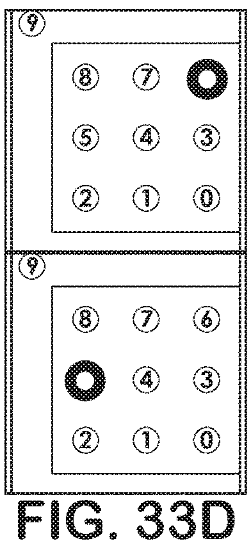
Figure 33E:
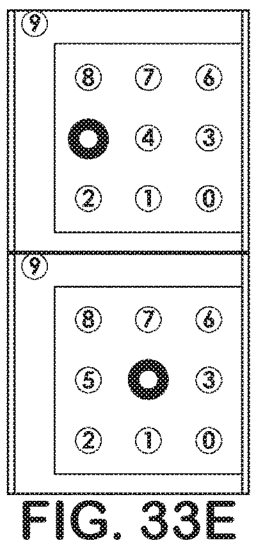
Figure 33F:
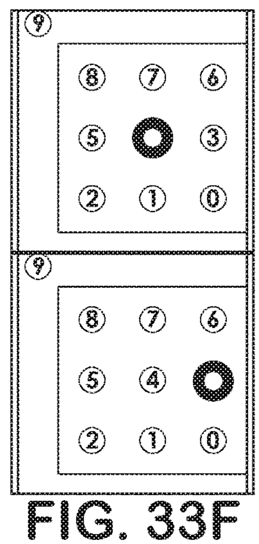
Figure 33G:
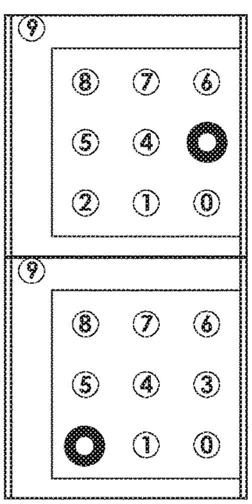
Figure 33H:
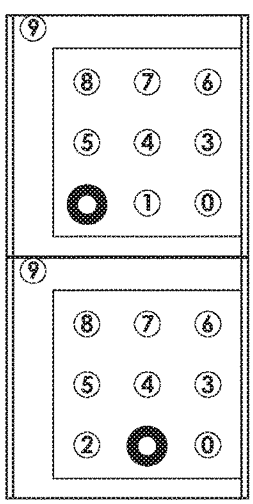
Figure 33I:
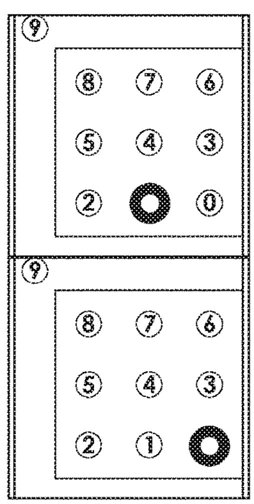
Figure 33J:
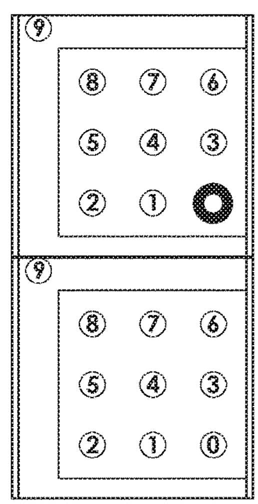

FIG. 31L results after four iterations exhausts all six Digit-Squares on the Candy Board and produces the estimated value "089443", namely 8.9443. Also, every game must be end-capped by the use of plosive-state equilibration if normalizing the final value into canonical form is required.

Thereafter, the Uncle Fred's Birthday storyline is concluded using skills mastered in prior lessons.

I lay claim to:

1. An apparatus for providing instruction, comprising:

at least one instruction tile having a plurality of instruction sites that are each located at a discrete location within a predefined area on the instruction tile and a saturation state instruction site that is located on the instruction tile remote from the predefined area; and a plurality of instruction pieces configured to be positioned on the plurality of instruction sites and the saturation state instruction site in a predetermined order; and a stencil having means for revealing the next instruction site or saturation state instruction site on the instruction tile in the predetermined order.

2. The apparatus of claim 1, wherein each instruction site and the saturation state instruction site has a recess that defines the location of the instruction site and the location of the saturation state instruction site on the instruction tile.

3. The apparatus of claim 1, wherein the instruction pieces are edible.

4. The apparatus of claim 1, wherein the instruction relates to displaying intermediate and final results of state machine emulation of multistate computing for at least one of mathematics and quantifiable sciences.

5. The apparatus of claim 1, wherein each instruction tile has an edge and wherein edges of adjacent instruction tiles are positioned adjacent one another to form an instruction board.

6. The apparatus of claim 5, wherein edges of a plurality of the instruction tiles are positioned adjacent one another to form a tessellation.

7. The apparatus of claim 5, wherein the edge of a first instruction tile adjoins the edge of a second instruction tile to form a tessellation that defines the instruction board.

8. An apparatus for providing instruction in at least one of mathematics and quantifiable sciences, the apparatus comprising:

an instruction board formed from a plurality of instruction tiles, each of the instruction tiles having a predetermined number of instruction sites that are each located at a predetermined discrete location within an area on the instruction tile defined by a plurality of borders and a single saturation state instruction site that is not located within the area on the instruction tile defined by the plurality of borders; and a plurality of instruction pieces configured to be received on the instruction tiles at the instruction sites and the saturation state instruction site in a predetermined order;

wherein the instruction pieces are manipulated on the instruction sites and the saturation state instruction site on the instruction tiles to perform a change of state operation that provides the instruction in the at least one of mathematics and quantifiable sciences.

9. The apparatus of claim 8, wherein each of the instruction sites and the saturation state instruction site has a recess formed on the instruction tile.

10. The apparatus of claim 8, wherein each of the instruction tiles has at least one edge, and wherein the edges of adjacent instruction tiles abut to define a tessellation that forms the instruction board.

11. The apparatus of claim 10, wherein the adjacent instruction tiles define a tessellation on the instruction board that is configured to perform at least one of addition, subtraction, multiplication and division.

12. The apparatus of claim 8, wherein each of the instruction tiles has at least one channel formed thereon for sliding the instruction pieces on the instruction tile, and wherein the channel is disposed between a border of the area and an edge of the instruction tile and the saturation state instruction site is disposed within the channel.

13. The apparatus of claim 8, wherein each of the instruction sites and the saturation state instruction site has printed indicia that corresponds to the location of the respective instruction site and to the location of the respective saturation state instruction site.

14. The apparatus of claim 8, further comprising a stencil having means for revealing the next instruction site or saturation state instruction site on the instruction tile in the predetermined order.

15. A method for providing instruction in at least one of mathematics and quantifiable sciences, the method comprising:

providing an instruction board formed from one or more instruction tiles wherein each instruction tile comprises a plurality of instruction sites at discrete locations within a defined area on the instruction tile and a saturation state instruction site at a location remote from the defined area on the instruction tile;

providing one or more instruction pieces configured to be received on the instruction sites and the saturation state instruction site of the instruction tile in a predetermined order; and manipulating at least one of the instruction pieces from the saturation state instruction site on a first instruction tile to at least one of the instruction sites on a second instruction tile to perform a change of state operation relating to the at least one of mathematics and quantifiable sciences.

16. The method of claim 15, wherein the instruction sites and the saturation state instruction site have recesses formed in the instruction tiles.

17. The method of claim 15, wherein the instruction tiles have at least one edge and wherein the edges of adjacent instruction tiles abut one another to form a tessellation that defines the instruction board.

18. A method for SM-table multiplication comprising the steps:

a) providing a multiplier value in canonical form having a tile count;

b) providing a multiplicand value in canonical form having a tile count;

c) providing an instruction board comprising at least a multiplier row having a plurality of tiles and a product row having a plurality of tiles, the multiplier row and the product row each having a tile count equal to the tile count of the multiplier value added to the tile count of the multiplicand value;

d) creating an SM-table having four rows using an S-value list of 6, 3, 2, 1 from a top row to a bottom row, setting a 1M M-value in the bottom row to the multiplicand value, and by using addition, generating a 2M M-value, a 3M M-value and a 6M M-value in a second row, a third row and a fourth row, respectively, above the bottom row;

e) zeroing all of the tiles in the product row;

f) duplicating the multiplier value into the multiplier row;

g) setting a multiplier focus tile at a rightmost tile in the multiplier row;

h) determining whether a value in all of the tiles in the multiplier row at and to the left of the multiplier focus tile are zero and if the value in all of the tiles in the multiplier row at and to the left of the multiplier focus tile are zero terminating the method, otherwise continuing the method with step i);

i) setting a focus row of the SM-table to the top row of the SM-table;

j) determining whether the value in the multiplier focus tile is less than the S-value in the focus row of the SM-table and if the value in the multiplier focus tile is less than the S-value in the focus row of the SM-table go to step m);

k) reducing the value in the multiplier focus tile by the S-value in the focus row of the SM-table;

l) adding the M-value in the focus row of the SM-table into the product row beginning at the tile in the product row that is aligned with the multiplier focus tile and into all of the product tiles to the left;

m) determining whether the focus row of the SM-table is at the bottom row of the SM-table and if the focus row of the SM-table is at the bottom row of the SM-table go to step o);

n) shifting the focus row of the SM-table down one row in the SM-table and repeating step j);

o) shifting the multiplier focus tile one tile left; and p) repeating step h);

whereby the product row provides the product value.

19. A method for SM-table quotient auto-generation comprising the steps:

a) providing a divisor value in canonical form;

b) providing a dividend value in canonical form;

c) providing an instruction board comprising at least a quotient row, a dividend row, and a subtrahend row, each row having a plurality of tiles and an additional tile above the order of magnitude of the dividend value;

d) creating an SM-table having four rows using an S-value list of 6, 3, 2, 1 from a top row to a bottom row, setting a 1M M-value in the bottom row to the dividend value, and by using addition, generating a 2M M-value, a 3M M-value and a 6M M-value in a second row, a third row and a fourth row, respectively, above the bottom row;

e) zeroing all tiles in the quotient row;

f) duplicating the dividend value into the dividend row;

g) setting a dividend focus tile at a leftmost non-zero valued tile in the dividend row;

h) aligning the tile bearing the leftmost non-zero valued tile of the 1M M-value in the SM-table with the dividend focus tile established in step (g), thereby setting a quotient focus tile to be aligned with a rightmost tile of the 1M M-value in the SM-table, which also establishes a rightmost tile in a partial dividend field of tiles;

i) setting a focus row of the SM-table to the top row of the SM-table;

j) comparing the M-value in the focus row of the SM-table to the value in the partial dividend field of tiles and if the M-value in the focus row is greater go to step n);

k) adding the S-value in the focus row of the SM-table to the value in the quotient focus tile;

l) duplicating the M-value on the focus row of the SM-table from the rightmost tile to a leftmost tile in the subtrahend row, beginning at the subtrahend tile aligned with the quotient focus tile;

m) subtracting the subtrahend row from the partial dividend field within the dividend row, beginning at the subtrahend tile aligned with the quotient focus tile;

n) determining whether the focus row of the SM-table is at the bottom row of the SM-table and if the focus row of the SM-table is at the bottom row of the SM-table go to step p);

o) shifting the focus row of the SM-table down one row in the SM-table and then returning to step j);

p) determining whether the quotient focus tile is aligned to the rightmost tile of the quotient row and if the quotient focus tile is aligned to the rightmost tile of the quotient row terminating the method, otherwise continuing the method with step q);

q) shifting the dividend focus tile one tile to the right;

r) shifting the quotient focus tile one tile to the right; and s) repeating step i) to step p);

whereby the dividend row provides a remainder value and the quotient row provides a quotient value.

* * * * *